(12) United States Patent
Morimoto et al.

(10) Patent No.: US 12,446,482 B2
(45) Date of Patent: Oct. 21, 2025

(54) AGRICULTURAL WORK ASSISTANCE SYSTEM, AGRICULTURAL WORK ASSISTANCE APPARATUS, AND AGRICULTURAL MACHINE

(71) Applicant: KUBOTA CORPORATION, Osaka (JP)

(72) Inventors: Takanori Morimoto, Sakai (JP); Takafumi Morishita, Sakai (JP); Kenji Tamatani, Sakai (JP); Fumiya Yoshimura, Sakai (JP); Ryota Kikuchi, Sakai (JP); Ken Sakuta, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 125 days.

(21) Appl. No.: 18/511,471

(22) Filed: Nov. 16, 2023

(65) Prior Publication Data

US 2024/0081167 A1 Mar. 14, 2024

Related U.S. Application Data

(63) Continuation of application No. PCT/JP2022/012181, filed on Mar. 17, 2022.

(30) Foreign Application Priority Data

May 18, 2021 (JP) .................. 2021-084022
Sep. 21, 2021 (JP) .................. 2021-153541

(51) Int. Cl.
*A01B 69/04* (2006.01)
*G05D 1/00* (2024.01)

(52) U.S. Cl.
CPC ......... *A01B 69/008* (2013.01); *G05D 1/0212* (2013.01)

(58) Field of Classification Search
CPC .............................. G05D 1/0212; A01B 9/008
(Continued)

(56) References Cited

U.S. PATENT DOCUMENTS

2010/0217516 A1* 8/2010 Diekhans ............. A01B 69/007
701/533
2016/0174453 A1* 6/2016 Matsuzaki ............. A01B 69/00
701/2
(Continued)

FOREIGN PATENT DOCUMENTS

EP 3744161 A1 12/2020
EP 3811750 A1 4/2021
(Continued)

OTHER PUBLICATIONS

Official Communication issued in corresponding European Patent Application No. 22804354.3, mailed on Oct. 28, 2024, 11 pages.
(Continued)

*Primary Examiner* — Yazan A Soofi
(74) *Attorney, Agent, or Firm* — Keating & Bennett, LLP

(57) ABSTRACT

An agricultural work assistance system includes a display to display a map representing an agricultural field, and a controller configured or programmed to define or function as an area setter to set a first area and a second area located inward of the first area in the map displayed by the display, and a route creator to create, in at least one of the first area or the second area, a travel route along which an agricultural machine is to travel. The route creator is configured or programmed to set at least a portion of the travel route as an automatic steering route on which the agricultural machine is to be automatically steered and a travel speed of the agricultural machine is to be changed manually.

23 Claims, 76 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 2017/0357261 | A1* | 12/2017 | Foster .................. | A01B 69/008 |
| 2018/0173233 | A1* | 6/2018 | Matsuzaki ............ | G05D 1/0088 |
| 2018/0208242 | A1* | 7/2018 | Sakaguchi ............. | G05D 1/027 |
| 2018/0310461 | A1* | 11/2018 | Shinkai ................ | A01B 69/008 |
| 2019/0186922 | A1* | 6/2019 | Shinkai .................... | G05D 1/02 |
| 2020/0331529 | A1* | 10/2020 | Kawai .................... | B60K 35/00 |
| 2020/0383261 | A1* | 12/2020 | Miyashita .............. | G05D 1/027 |
| 2024/0069557 | A1* | 2/2024 | Morimoto ............ | G05D 1/0278 |
| 2024/0081167 | A1* | 3/2024 | Morimoto ............. | G05D 1/246 |

FOREIGN PATENT DOCUMENTS

| | | | |
|---|---|---|---|
| JP | 2016-031649 | A | 3/2016 |
| JP | 2018-000039 | A | 1/2018 |
| JP | 2019-127120 | A | 8/2019 |
| JP | 2020-099268 | A | 7/2020 |
| JP | 2020-103085 | A | 7/2020 |
| JP | 2020-103088 | A | 7/2020 |
| JP | 2021-003035 | A | 1/2021 |

OTHER PUBLICATIONS

Official Communication issued in International Patent Application No. PCT/JP2022/012181, mailed on Jun. 7, 2022.

* cited by examiner

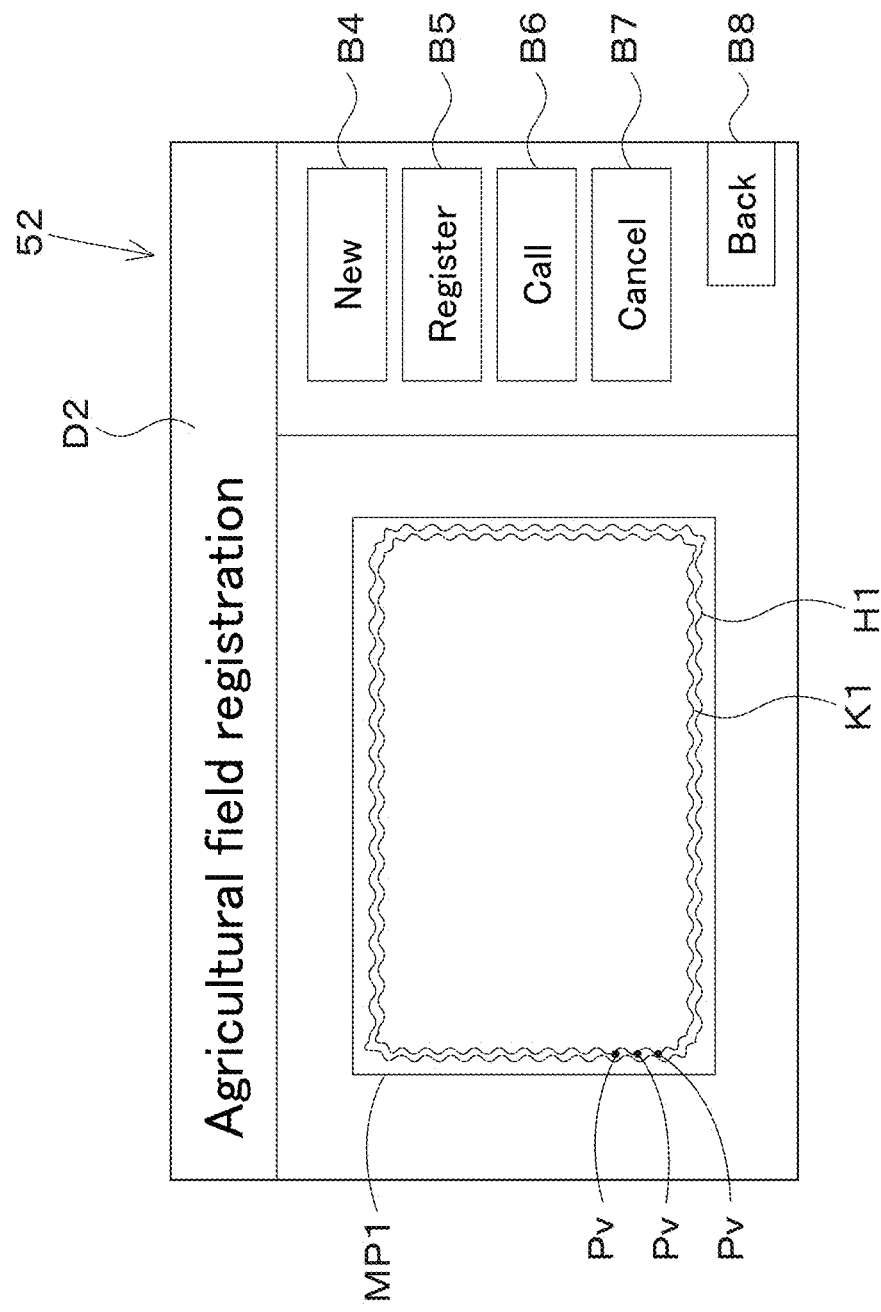

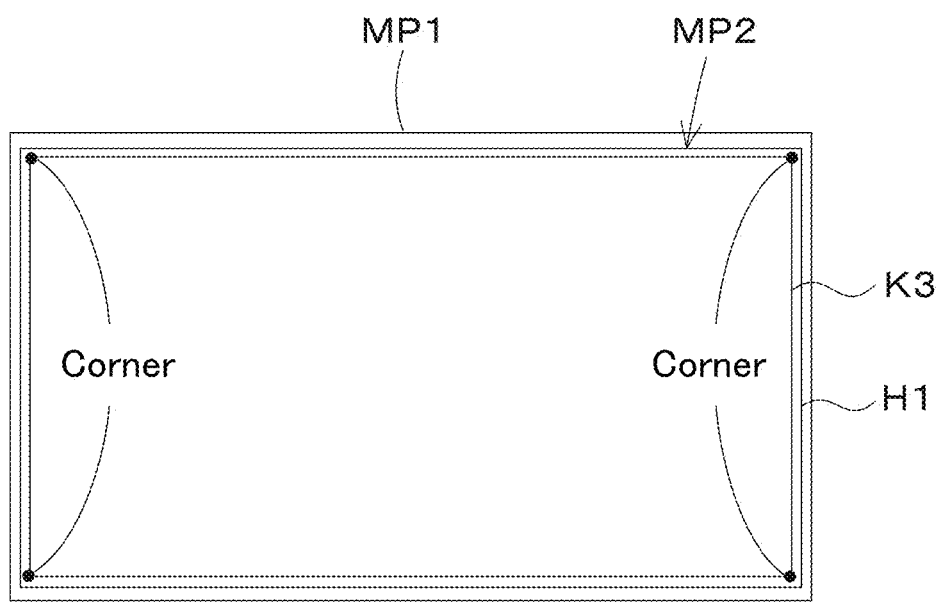

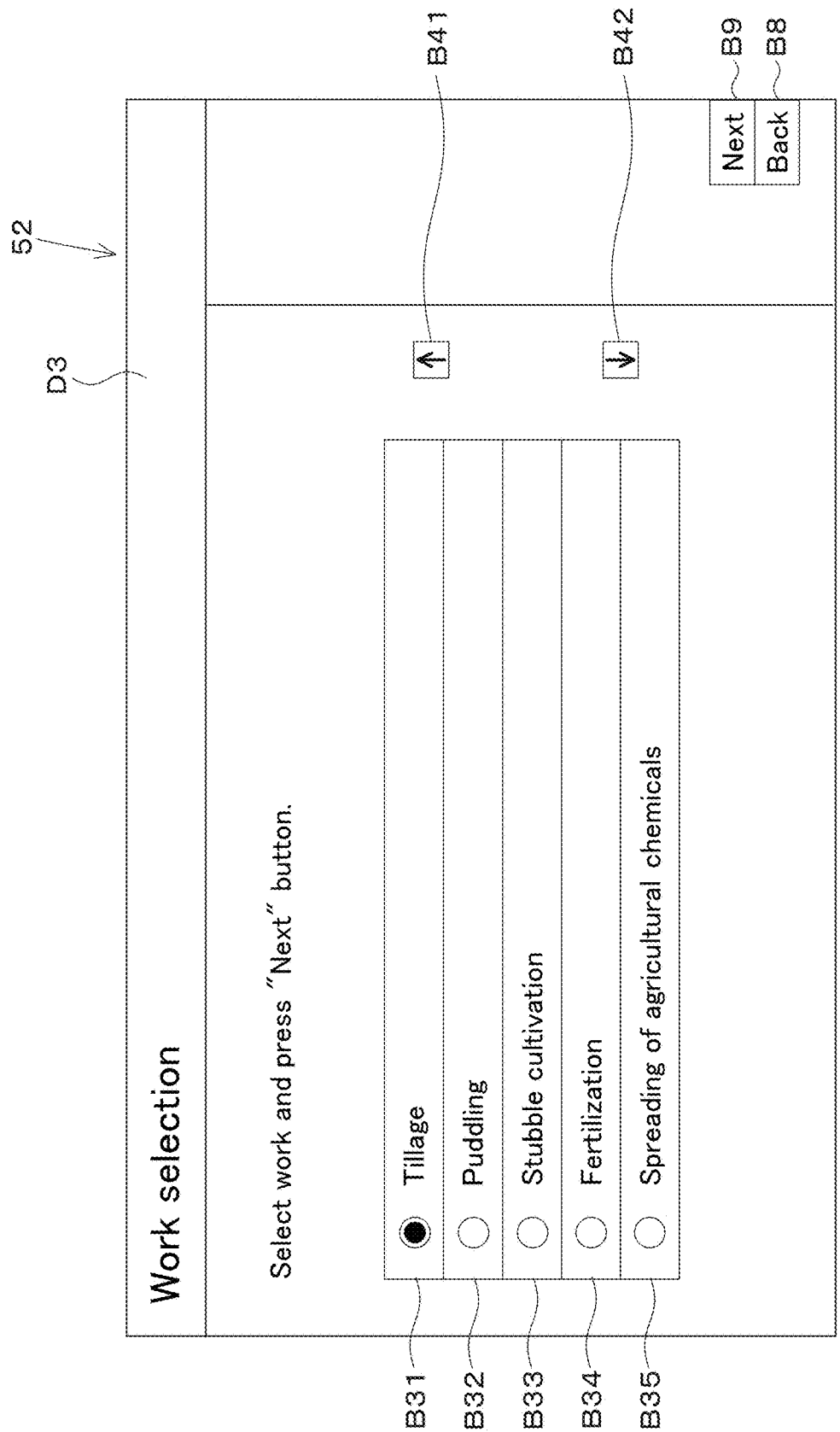

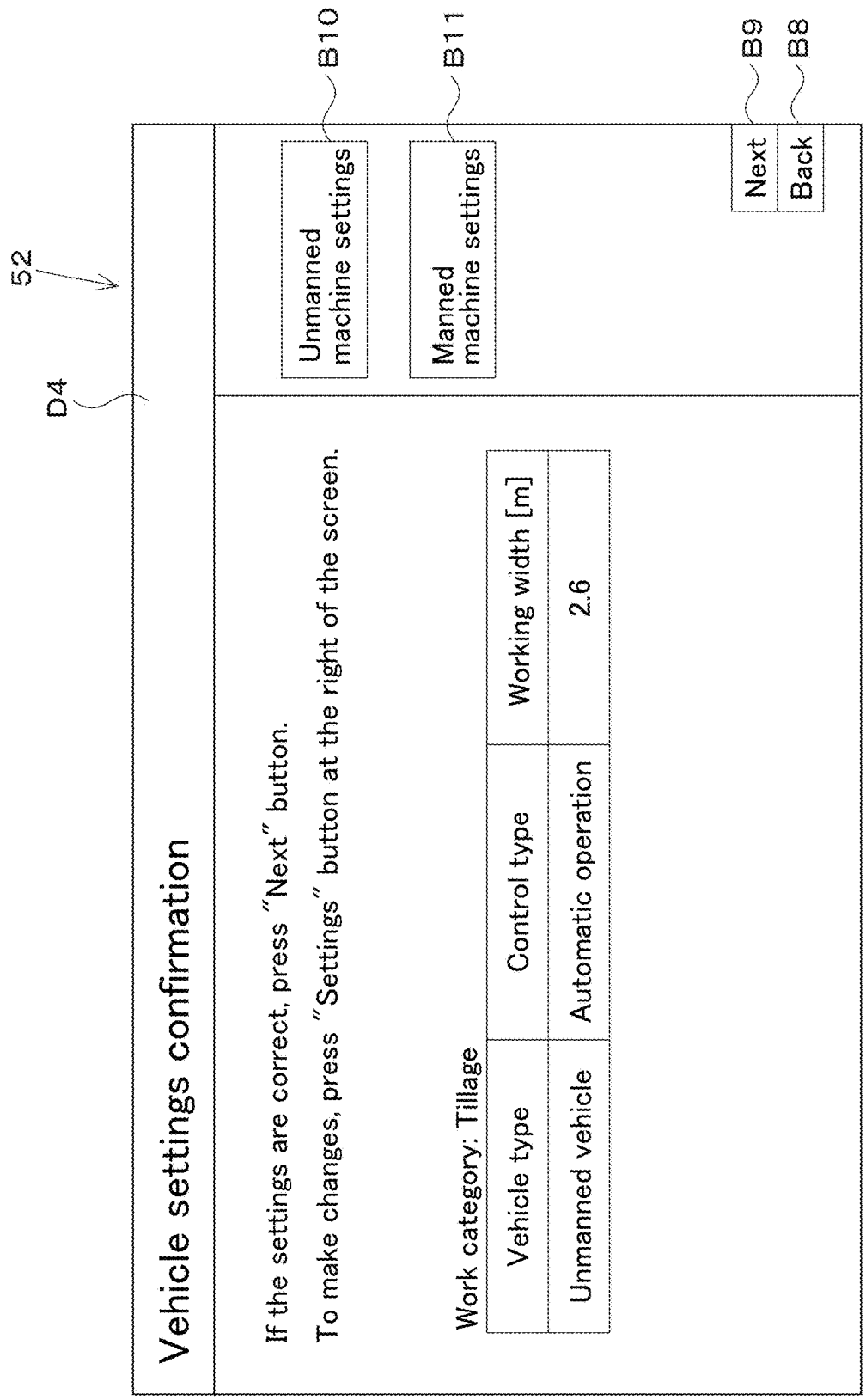

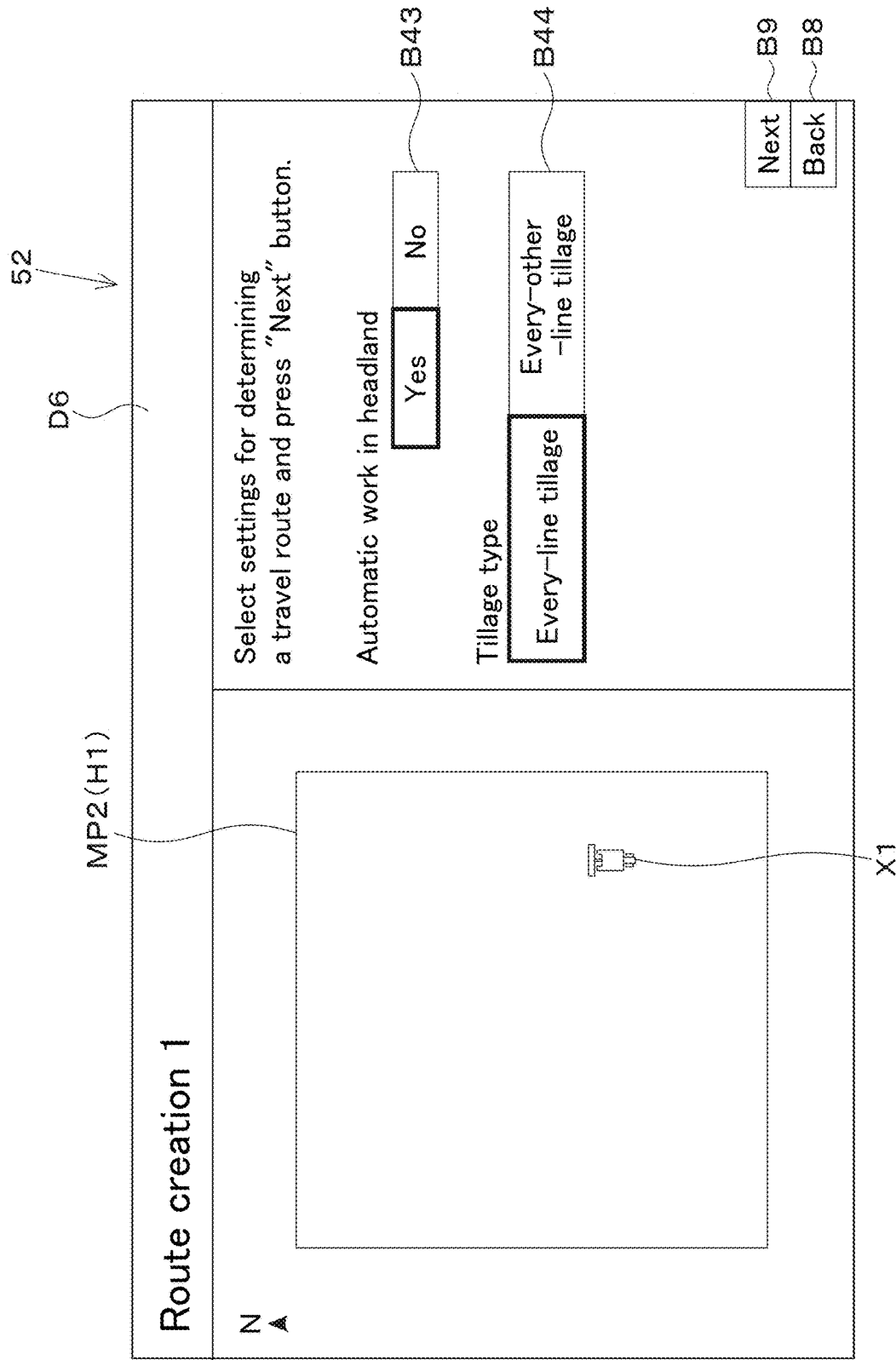

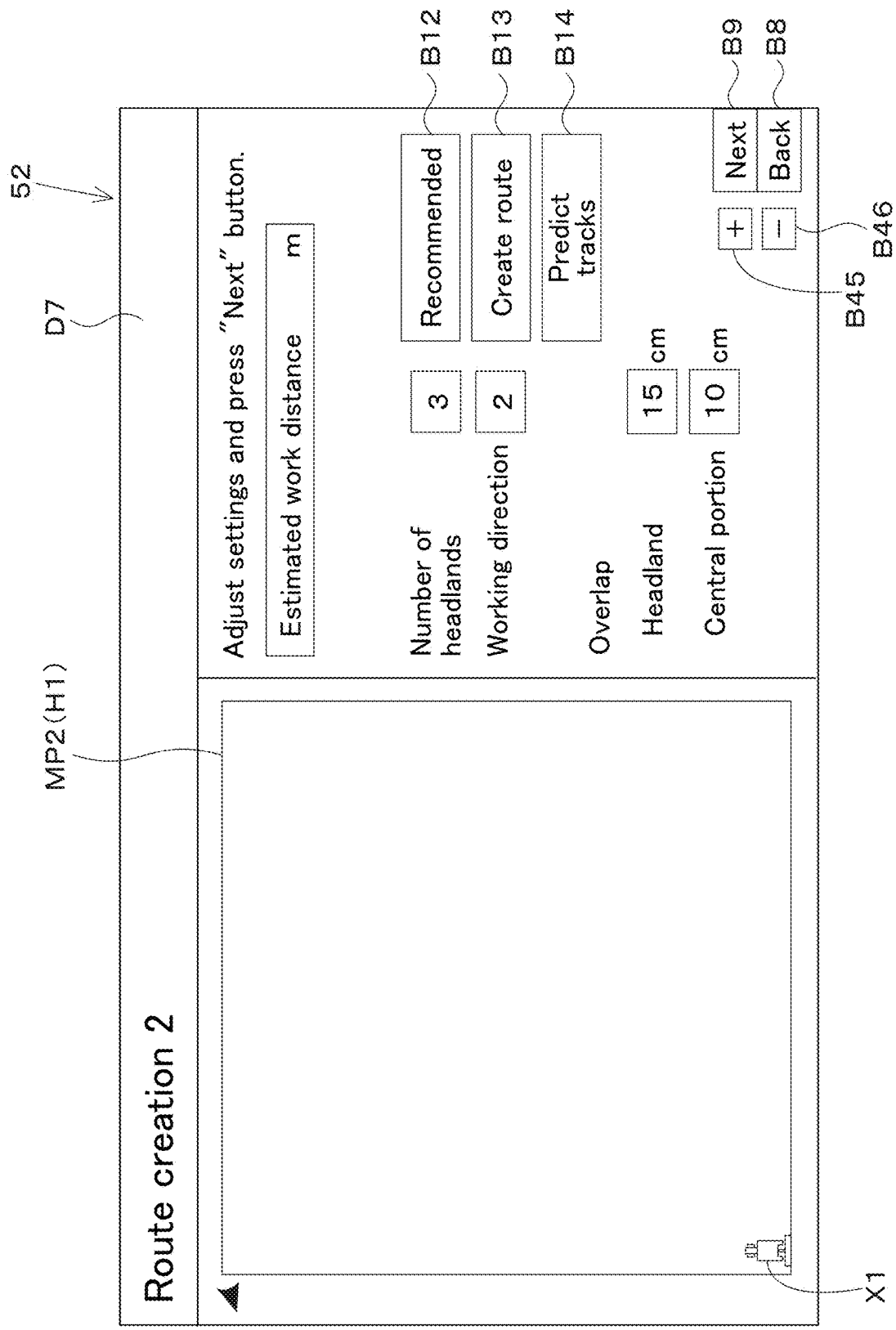

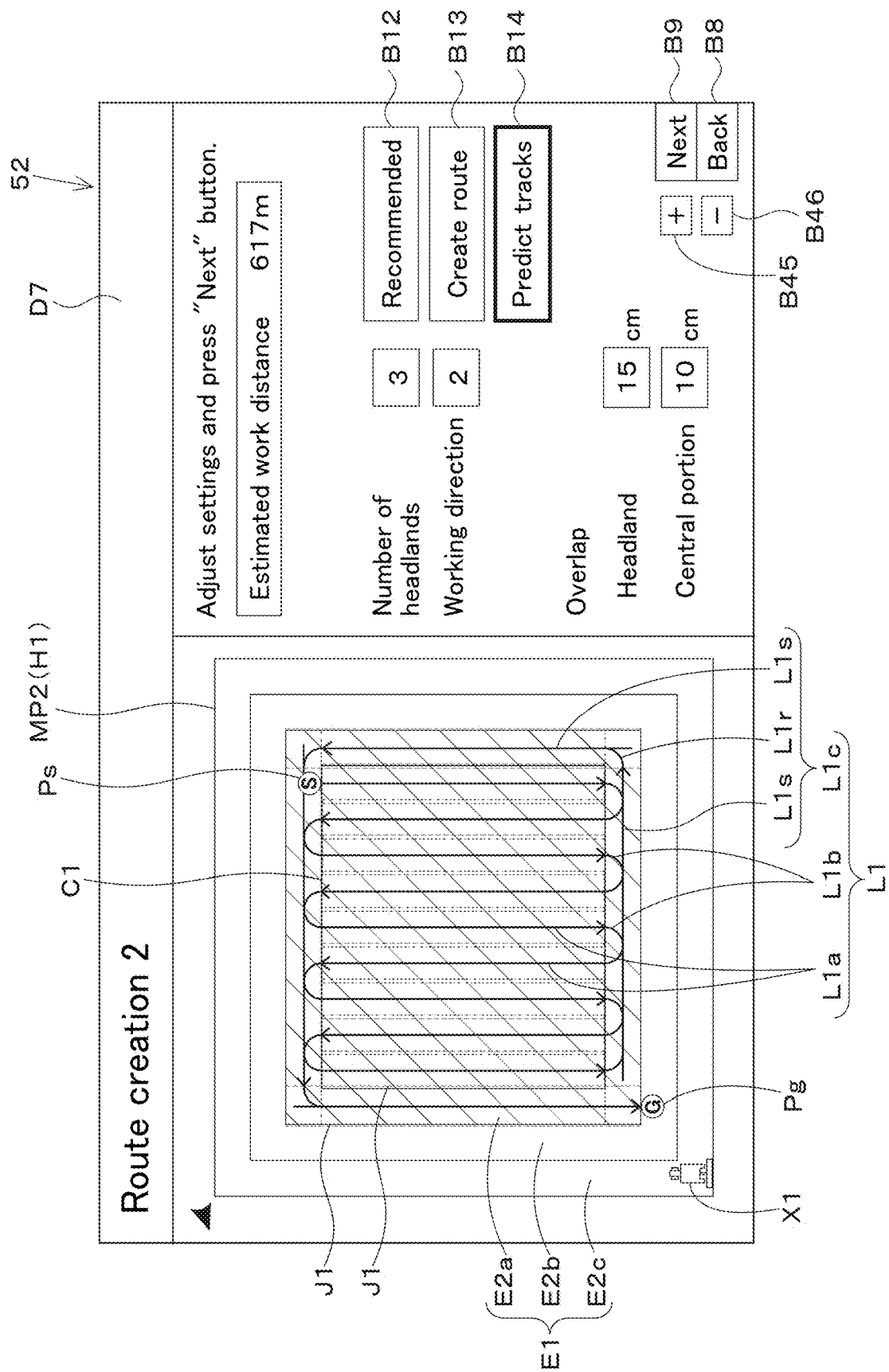

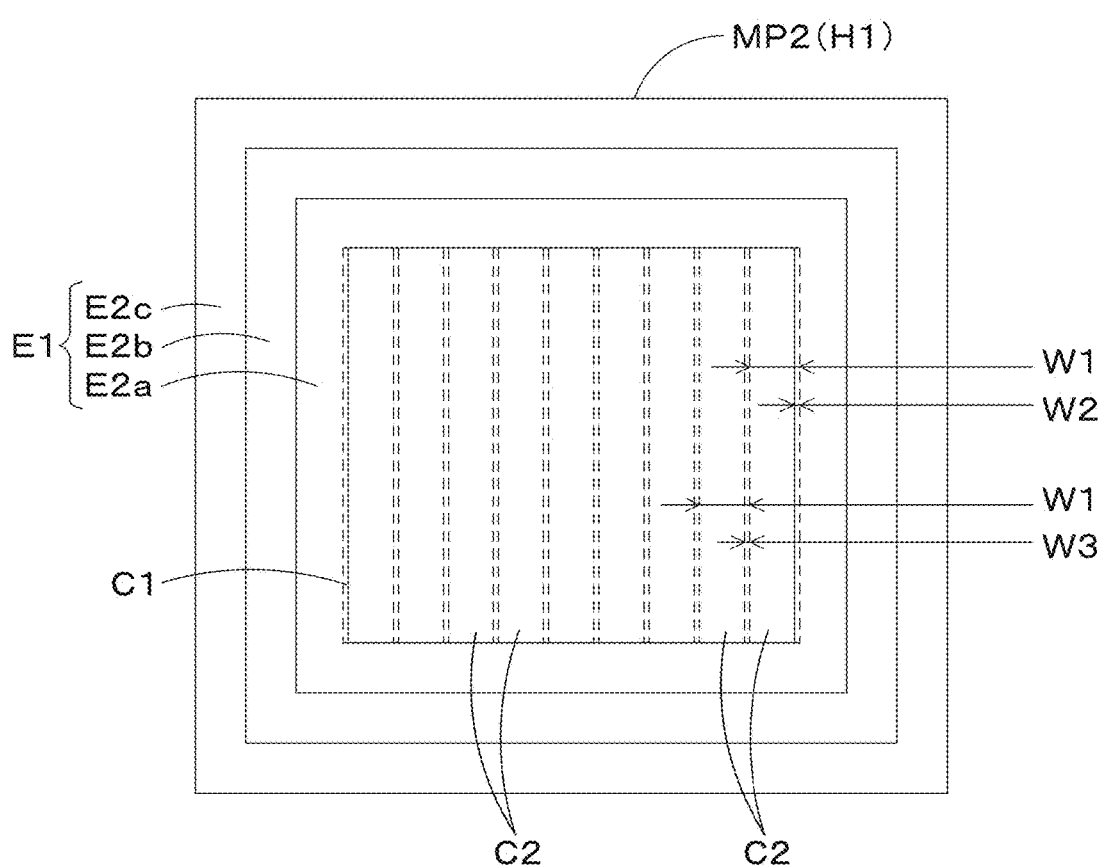

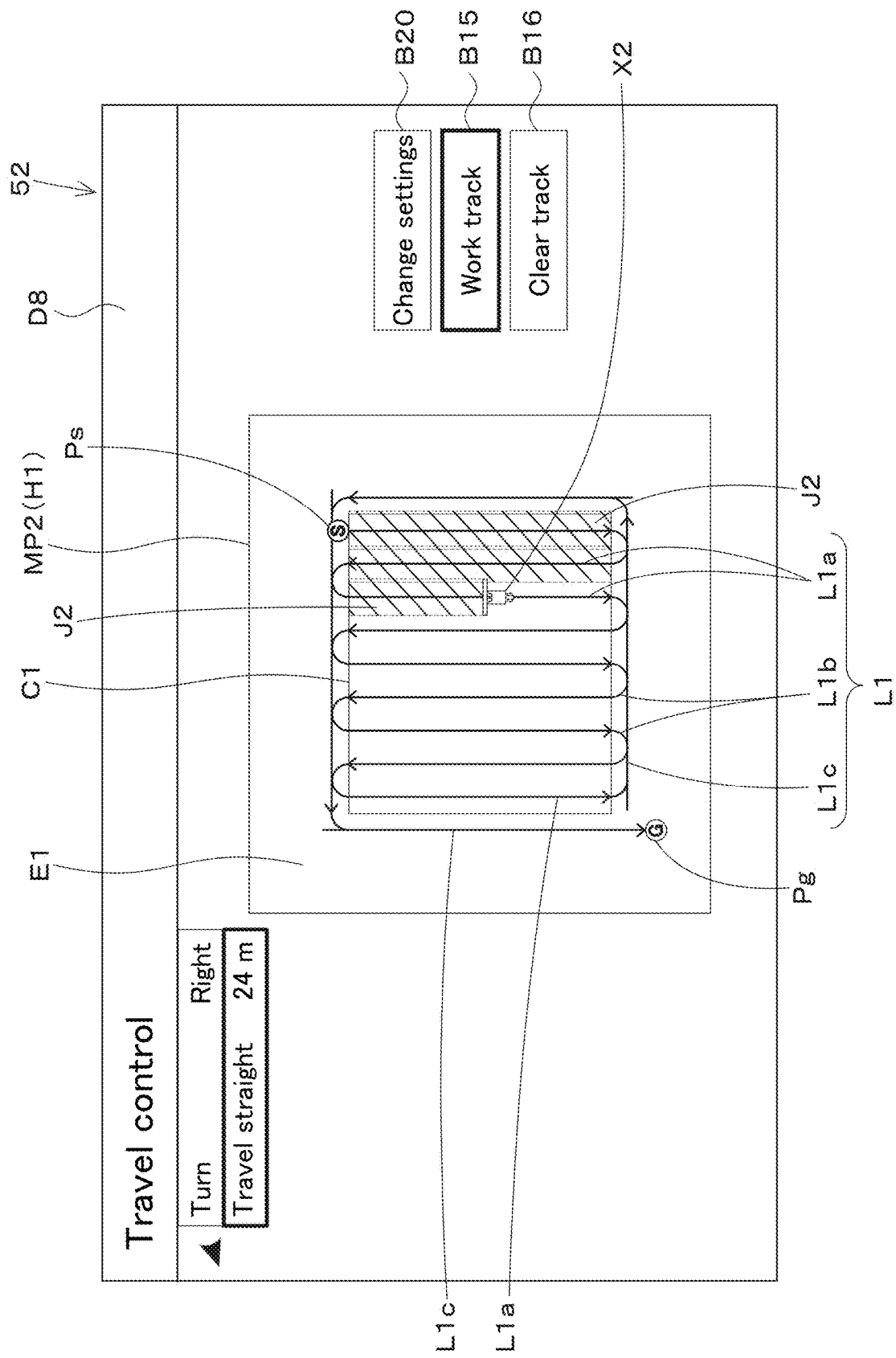

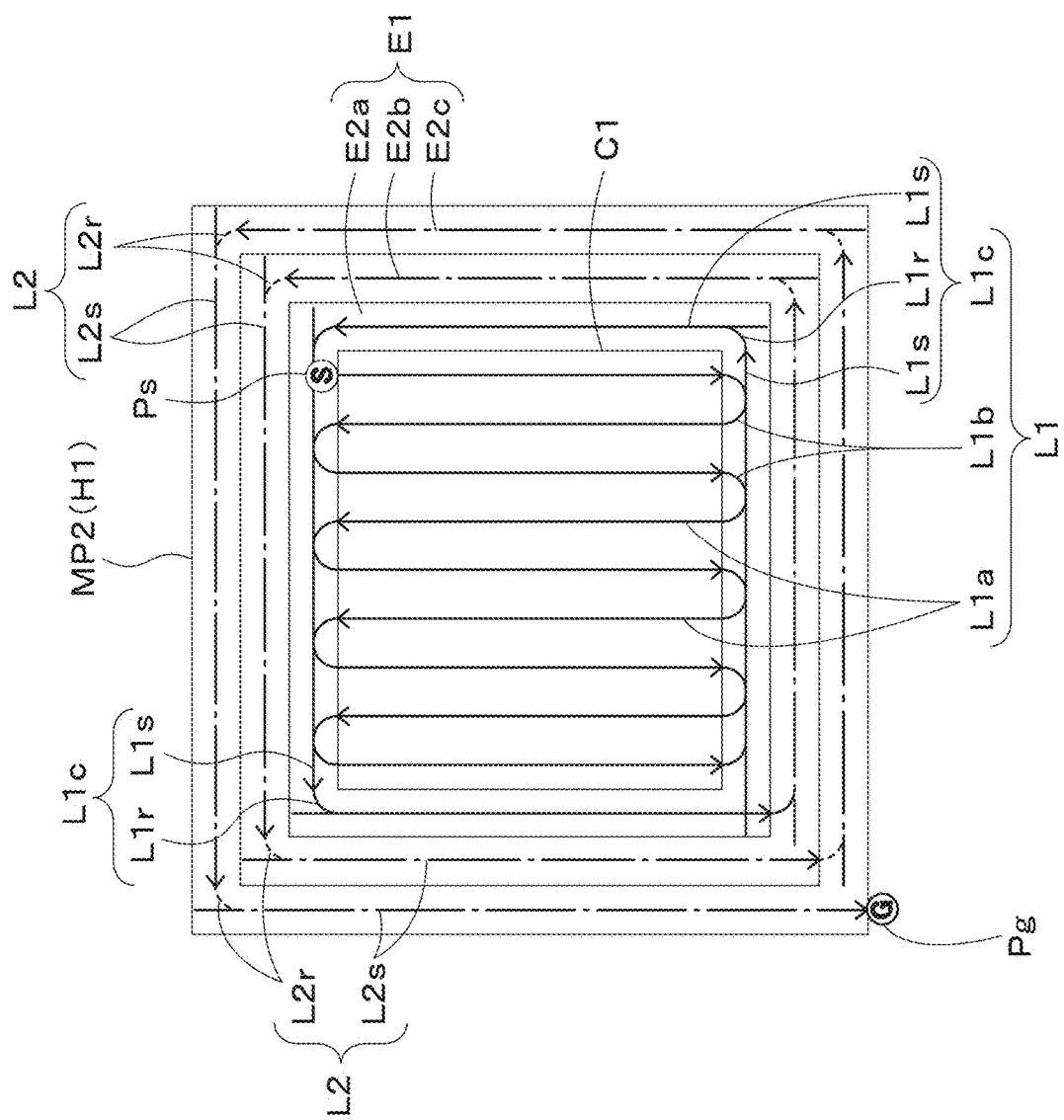

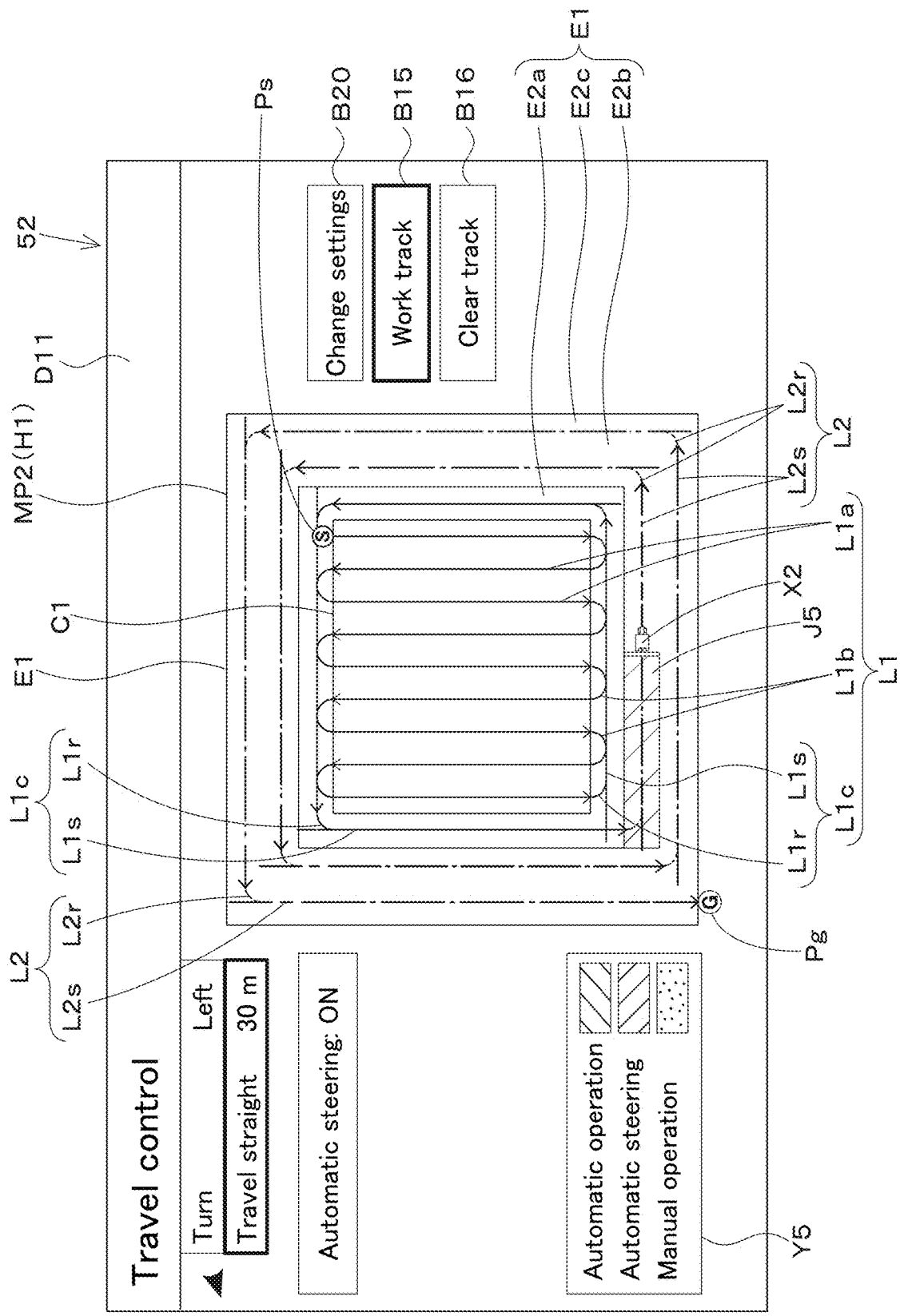

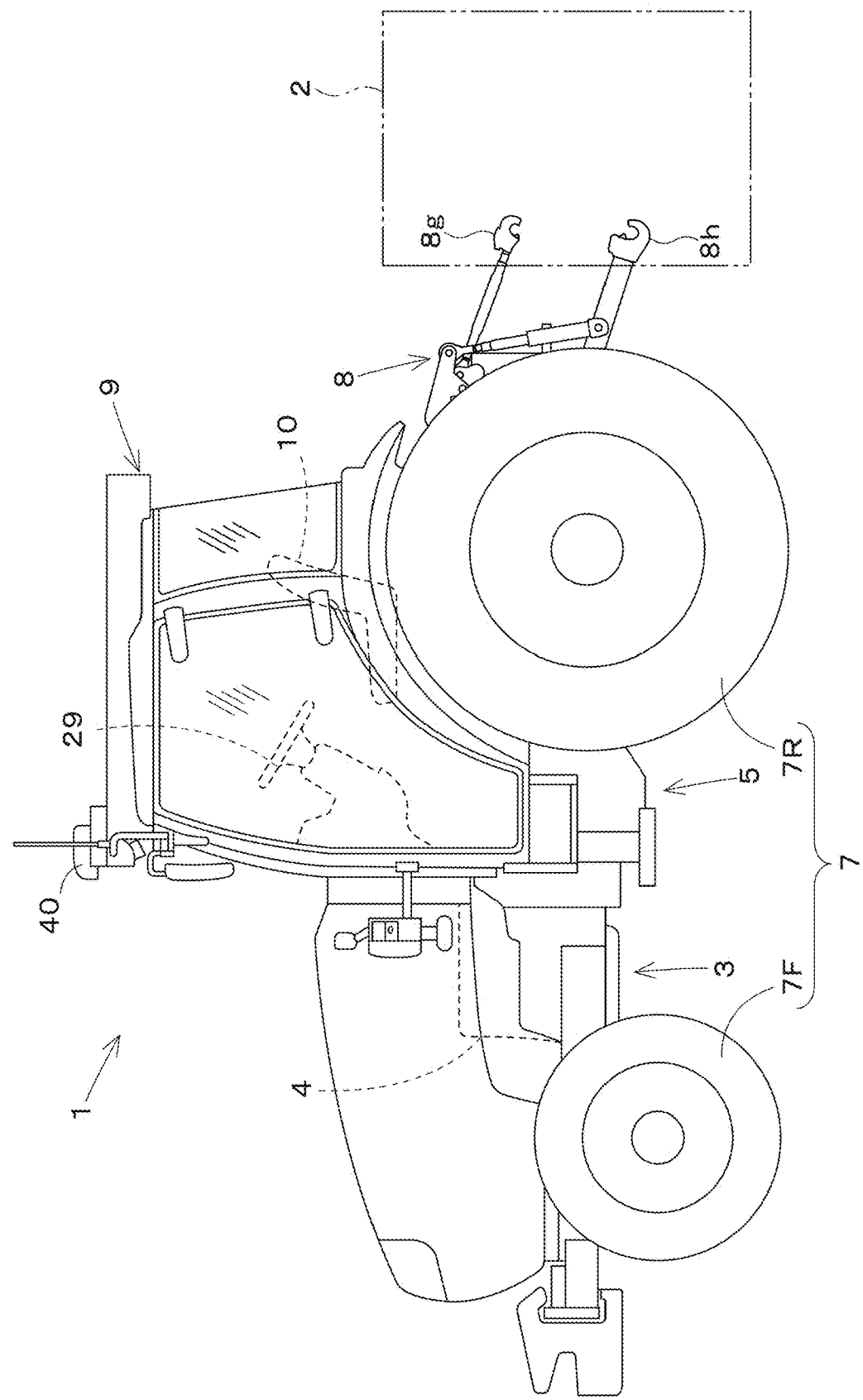

AGRICULTURAL WORK ASSISTANCE SYSTEM, AGRICULTURAL WORK ASSISTANCE APPARATUS, AND AGRICULTURAL MACHINE

CROSS REFERENCE TO RELATED APPLICATIONS

This application is a continuation application of International Application No. PCT/JP2022/012181, filed on Mar. 17, 2022, which claims the benefit of priority to Japanese Patent Application No. 2021-084022, filed on May 18, 2021, and to Japanese Patent Application No. 2021-153541, filed on Sep. 21, 2021. The entire contents of each of these applications are hereby incorporated herein by reference.

BACKGROUND OF THE INVENTION

1. Field of the Invention

The present invention relates to techniques to assist agricultural work while causing an agricultural machine to travel in an agricultural field.

2. Description of the Related Art

Japanese Unexamined Patent Application Publication No. 2018-39 discloses a technique to assist agricultural work performed using a working device coupled to an agricultural machine while causing the agricultural machine to travel by automatic operation in an agricultural field. The agricultural machine disclosed in Japanese Unexamined Patent Application Publication No. 2018-39 includes an acquirer, a work setter, and a display. The acquirer acquires position data of a peripheral portion of an agricultural field. Based on the position data, the work setter sets a footpath neighborhood line, a work start/end line, and a headland line, and sets a work traveling line at a central portion, of the agricultural field, enclosed by the work start/end line and the headland line. Each of these lines is displayed on the display. While traveling by automatic operation based on the work traveling line, the agricultural machine performs agricultural work on the central portion of the agricultural field via the working device. Then, while traveling by automatic operation based on the footpath neighborhood line, the work start/end line, and the headland line, the agricultural machine performs agricultural work on headlands located around the central portion via the working device.

SUMMARY OF THE INVENTION

For example, it is sometimes difficult for an agricultural machine to travel by automatic operation due to an influence of a degree of flatness, a degree of roughness, a contour, or the like of an agricultural field, and a decrease in efficiency of agricultural work performed by a working device coupled to the agricultural machine may occur. Moreover, in this case, if the operator of the agricultural machine stops the automatic operation and drives the agricultural machine manually, the burden on the operator will increase, and the efficiency of the agricultural work may further decrease.

In view of the above problems, preferred embodiments of the present invention make it possible to reduce the burden on the operator of the agricultural machine and improve the efficiency of agricultural work.

Technical solution(s) provided by preferred embodiments of the present invention to solve the above technical problems includes the following feature(s).

An agricultural work assistance system according to an aspect of a preferred embodiment of the present invention includes a display to display a map representing an agricultural field, and a controller configured or programmed to define or function as an area setter to set a first area and a second area located inward of the first area on the map displayed by the display and a route creator to create, in at least one of the first area or the second area, a travel route along which an agricultural machine is to travel, wherein the route creator is configured or programmed to set at least a portion of the travel route as an automatic steering route on which the agricultural machine is to be steered automatically and a travel speed of the agricultural machine is to be manually changed.

In an aspect of a preferred embodiment of the present invention, the route creator may be configured or programmed to set at least a portion of the travel route created in the first area and the second area to the automatic steering route or an automatic operation route on which the agricultural machine is to be steered automatically and the travel speed of the agricultural machine is to be changed automatically.

In an aspect of a preferred embodiment of the present invention, the controller may be configured or programmed to define or function as a route changer to change the automatic operation route to the automatic steering route and change the automatic steering route to the automatic operation route.

In an aspect of a preferred embodiment of the present invention, the route changer may be configured or programmed to change the automatic operation route or the automatic steering route to a manual operation route on which the agricultural machine is to be manually steered and the travel speed of the agricultural machine is to be manually changed and to change the manual operation route to the automatic operation route or the automatic steering route.

In an aspect of a preferred embodiment of the present invention, the display may be operable to display differently the automatic steering route and the automatic operation route on a screen such that the automatic steering route and the automatic operation route are visually recognizable.

In an aspect of a preferred embodiment of the present invention, the display may be operable to display, on a screen, at least one portion of the travel route created in the first area and the second area that is settable as the automatic steering route.

In an aspect of a preferred embodiment of the present invention, the route creator may be configured or programmed to, if an angular difference between a first portion of the travel route and a second portion of the travel route adjacent to each other in a direction of travel along the travel route is greater than a predetermined threshold, set a multipoint turn spot between the first portion and the second portion such that a position and a travel direction of the agricultural machine change at the multi-point turn spot. The route creator may be configured or programmed to, if the angular difference is not greater than the threshold, connect the first portion and the second portion to obtain a continuous portion of the automatic steering route.

In an aspect of a preferred embodiment of the present invention, the route creator may be configured or programmed to, if the angular difference is not greater than the threshold, create a travel route portion connecting a first intermediate point of the first portion and a second intermediate point of the second portion, the first intermediate point and the second intermediate point each being at a predetermined distance from a connection point between the first portion and the second portion, and delete a portion between the first intermediate point of the first portion and the connection point and another portion between the second intermediate point of the second portion and the connection point.

In an aspect of a preferred embodiment of the present invention, the route creator may be configured or programmed to create, as the travel route portion, a straight portion along which the agricultural machine is to travel straight.

In an aspect of a preferred embodiment of the present invention, the controller may be configured or programmed to define or function as a threshold changer to change the threshold.

In an aspect of a preferred embodiment of the present invention, the display may be operable to display a position of the agricultural machine detected by a position detector on the map and display, when the position of the agricultural machine is near the multi-point turn spot while the agricultural machine travels based on the travel route, a notification suggesting that a multi-point turn be performed to change the position and the travel direction of the agricultural machine.

In an aspect of a preferred embodiment of the present invention, the controller may be configured or programmed to define or function as an agricultural field register to register a contour of the agricultural field located inward of an outline of the agricultural field represented by the map. The area setter may be configured or programmed to set, as the second area, an area enclosed by another contour obtained by displacing the contour of the agricultural field inward, and set, as the first area, an area between the second area and the contour of the agricultural field. The route creator may be configured or programmed to create, in the first area, the travel route which surrounds the second area based on a working width over which a working device coupled to the agricultural machine performs ground work or based on an outside width of the working device.

In an aspect of a preferred embodiment of the present invention, the area setter may be configured or programmed to, after obtaining a first contour by displacing the contour of the agricultural field inward once by a first displacement amount calculated based on the working width of the working device, the outside width of the working device greater than the working width thereof, a predetermined overlap, and/or a predetermined shift amount, define one or more second contours by displacing the first contour inward once or more each by a second displacement amount calculated based on the working width or based on the working width and the overlap, the second displacement amount being smaller than the first displacement amount, and set an area enclosed by the innermost one of the one or more second contours as the second area. The route creator may be configured or programmed to create, in the first area, the travel route between the contour of the agricultural field and the first contour, between the first contour and one of the one or more second contours that is closest to the first contour, and between the one or more second contours.

In an aspect of a preferred embodiment of the present invention, the route creator may be configured or programmed to create, in the first area, the travel route that includes a plurality of loops which surround the second area and which have different diameters, set a gap between an outermost loop of the travel route and the contour of the agricultural field based on the working width of the working device, the outside width of the working device greater than the working width thereof, a predetermined overlap, and/or a predetermined shift amount, and set, based on the working width or based on the working width and the overlap, another gap between the outermost loop and a second outermost loop, and one or more further gaps between inner loops such that the another gap and the one or more further gaps are smaller than the gap between the outermost loop and the contour of the agricultural field.

In an aspect of a preferred embodiment of the present invention, the agricultural work assistance system may further include a position detector configured or programmed to detect a position of the agricultural machine, and an automatic controller configured or programmed to perform automatic steering in which the agricultural machine is steered automatically based on the position of the agricultural machine and the automatic steering route, and cause a working device coupled to the agricultural machine to perform agricultural work on the agricultural field.

In an aspect of a preferred embodiment of the present invention, the route creator may be configured or programmed to set the automatic steering route at a portion of the travel route created in the first area and the second area and set an automatic operation route at another portion of the travel route, the automatic operation route being a route on which the agricultural machine is to be steered automatically and the travel speed of the agricultural machine is to be changed automatically. The automatic controller may be configured or programmed to perform an automatic operation in which the agricultural machine is steered automatically and the travel speed of the agricultural machine is changed automatically based on the position of the agricultural machine and the automatic operation route, and switch between the automatic steering and the automatic operation of the agricultural machine automatically as one of the automatic steering route and the automatic operation route that are connected to each other changes to the other while the agricultural machine travels along the travel route.

In an aspect of a preferred embodiment of the present invention, the automatic controller may be configured or programmed to perform the automatic steering of the agricultural machine when the agricultural machine travels rearward along the automatic steering route as a multi-point turn to change the position and a travel direction of the agricultural machine is performed manually.

In an aspect of a preferred embodiment of the present invention, the automatic controller may be configured or programmed to, based on the automatic steering route, perform the automatic steering of the agricultural machine and cause the working device to start agricultural work on the agricultural field if the travel route based on which the agricultural work is started on the agricultural field by the agricultural machine and the working device is the automatic steering route.

In an aspect of a preferred embodiment of the present invention, the agricultural work assistance system may further include a first portion of a display operation interface to select whether or not to perform agricultural work by the automatic steering. The automatic controller may be configured or programmed to, based on the position of the agricultural machine and the travel route, perform the automatic steering of the agricultural machine and cause the working device to start agricultural work on the agricultural field if performing agricultural work by the automatic steering is selected via the first portion of the display operation interface.

In an aspect of a preferred embodiment of the present invention, the agricultural work assistance system may further include a second portion of the display operation interface to select whether or not to perform agricultural work by automatic operation. The automatic controller may be configured or programmed to, based on the position of the agricultural machine and the travel route, perform the automatic operation of the agricultural machine and cause the working device to start agricultural work on the agricultural field if performing agricultural work by the automatic operation is selected via the second portion of the display operation interface. The automatic steering is selectable via the first portion of a display operation interface if not performing agricultural work by the automatic operation is selected via the second portion of the display operation interface.

In an aspect of a preferred embodiment of the present invention, the agricultural work assistance system may further include a third portion of the display operation interface to select, when agricultural work on the agricultural field by the agricultural machine and the working device is to be resumed after a pause, whether to resume the agricultural work by the automatic steering or to resume the agricultural work by automatic operation in which the agricultural machine is steered automatically and the travel speed of the agricultural machine is changed automatically. The automatic controller may be configured or programmed to, based on the position of the agricultural machine and the travel route, perform the automatic steering of the agricultural machine and cause the working device to resume the agricultural work on the agricultural field if resuming the agricultural work by the automatic steering is selected via the third portion of the display operation interface. The automatic controller may be configured or programmed to, based on the position of the agricultural machine and the travel route, perform the automatic operation of the agricultural machine and cause the working device to resume the agricultural work on the agricultural field if resuming the agricultural work by the automatic operation is selected via the third portion of the display operation interface.

An agricultural work assistance apparatus according to an aspect of a preferred embodiment of the present invention includes a controller configured or programmed to cause a display to display a map representing an agricultural field, and to define or function as an area setter to set a first area and a second area located inward of the first area on the map displayed by the display and a route creator to create, in the first area and the second area, a travel route along which an agricultural machine is to travel, wherein the route creator is configured or programmed to set at least a portion of the travel route as an automatic steering route on which the agricultural machine is to be steered automatically and a travel speed of the agricultural machine is to be changed manually.

In an aspect of a preferred embodiment of the present invention, the route creator is configured or programmed to set at least a portion of the travel route to the automatic steering route or an automatic operation route on which the agricultural machine is to be steered automatically and the travel speed of the agricultural machine is to be changed automatically. The controller may be configured or programmed to define or function as a route changer to change the automatic operation route to the automatic steering route and change the automatic steering route to the automatic operation route and is mountable on the agricultural machine.

An agricultural machine according to an aspect of a preferred embodiment of the present invention is an agricultural machine to perform agricultural work assisted by an agricultural work assistance system, the agricultural machine including a traveling vehicle body, a coupling portion to couple a working device to the traveling vehicle body, a position detector configured or programmed to detect a position of the traveling vehicle body, a display to display a map representing an agricultural field, and a controller configured or programmed to define or function as an area setter to set a first area and a second area located inward of the first area on the map displayed by the display and a route creator to create, in the first area and the second area, a travel route along which the traveling vehicle body is to travel, and an automatic controller configured or programmed to cause the working device to perform the agricultural work on the agricultural field, wherein the route creator is configured or programmed to set at least a portion of the travel route as an automatic steering route, and the automatic controller is configured or programmed to automatically steer the traveling vehicle body based on the position of the traveling vehicle body and the automatic steering route.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 4 is a diagram illustrating an example of an agricultural field registration screen of the agricultural work assistance apparatus.

FIG. 5C is a diagram for explaining another agricultural field registration method.

FIG. 6 is a diagram illustrating an example of a work selection screen of the agricultural work assistance apparatus.

FIG. 7 is a diagram illustrating an example of a vehicle settings confirmation screen of the agricultural work assistance apparatus.

FIG. 9 is a diagram illustrating an example of a first route creation screen of the agricultural work assistance apparatus.

FIG. 10A is a diagram illustrating an example of a second route creation screen of the agricultural work assistance apparatus.

FIG. 10C is a diagram illustrating an example of the second route creation screen of the agricultural work assistance apparatus.

FIG. 11B is a diagram for explaining the method of setting areas and a travel route.

FIG. 12 is a diagram illustrating an example of a travel control screen of the agricultural work assistance apparatus.

FIG. 15 is a diagram illustrating an example of an automatic operation route and an automatic steering route.

FIG. 38 is a diagram illustrating another example of the travel control screen of the agricultural work assistance apparatus.

FIG. 45 is an overall side view of the agricultural machine.

DETAILED DESCRIPTION OF THE PREFERRED EMBODIMENTS

Figure 1:
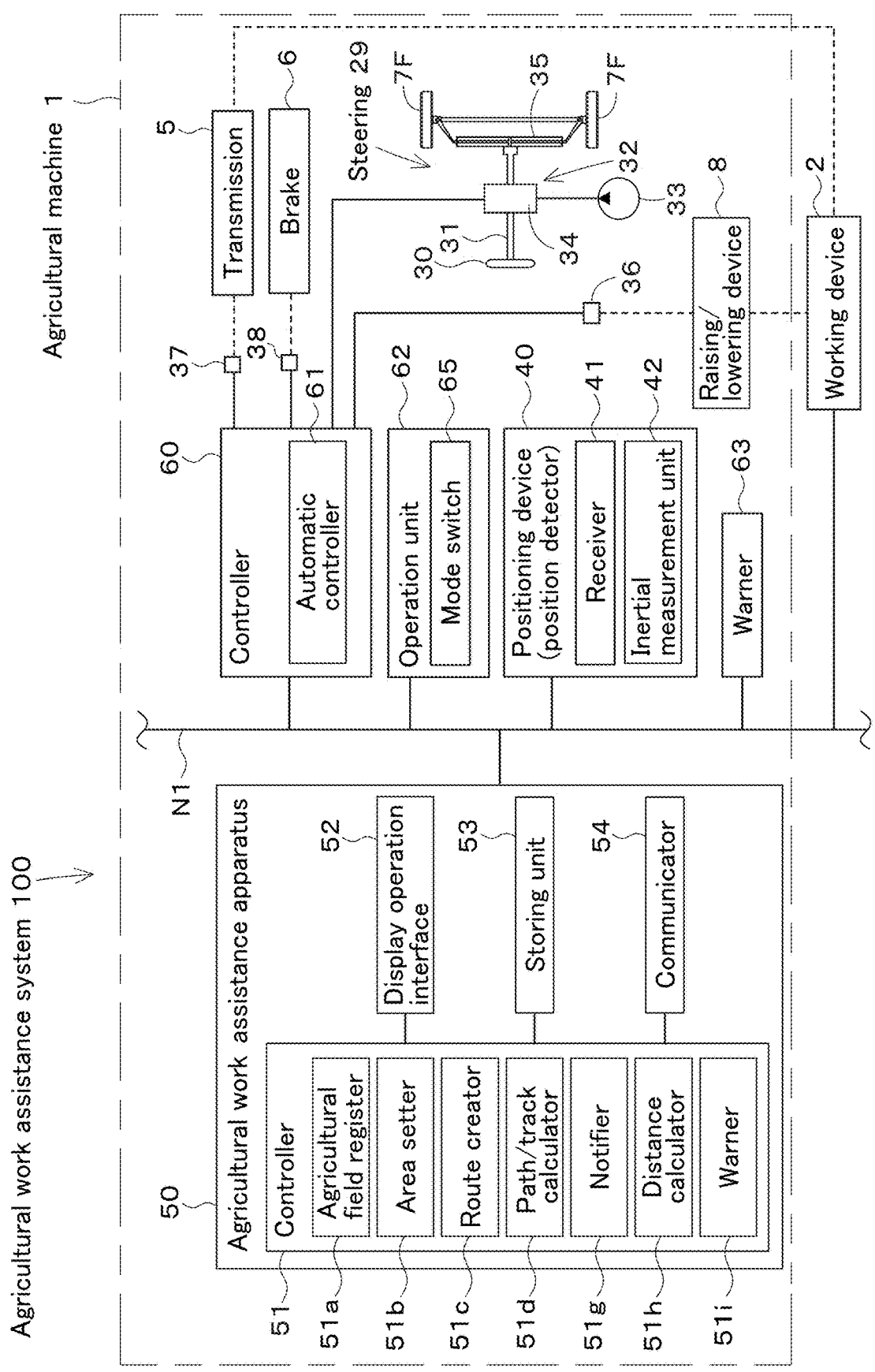
FIG. 1 is a configuration diagram of an agricultural work assistance system.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of the present invention will be described below with reference to the drawings.

FIG. 45 is an overall side view of an agricultural machine 1. The agricultural machine 1 according to the present preferred embodiment is a tractor. The agricultural machine 1 is not limited to a tractor, and may be another kind of agricultural machine such as a rice transplanter or a combine, a working vehicle that performs agricultural work other than a tractor, or the like.

The agricultural machine 1 includes a traveling vehicle body 3, a prime mover 4, a transmission 5, and a traveling device 7. The traveling device 7 includes front wheels 7F and rear wheels 7R. The front wheels 7F may be of a tire type or a crawler type. The rear wheels 7R may also be of a tire type or a crawler type. The prime mover 4 includes a diesel engine, an electric motor, or the like. The transmission 5 can switch a propelling force of the traveling device 7 by changing speed stages, and can also switch between forward traveling and rearward traveling of the traveling device 7. A driving force of the prime mover 4 is transmitted to the traveling device 7 by the transmission 5 to drive the traveling device 7, thereby causing the traveling vehicle body 3 to travel forward or rearward. The left side in FIG. 45 is the front side of the traveling vehicle body 3, and the right side in FIG. 45 is the rear side of the traveling vehicle body 3.

A cabin 9 is provided on the traveling vehicle body 3. An operator's seat 10 is provided inside the cabin 9. A raising/lowering device 8 including a three-point linkage or the like is provided on a rear portion of the traveling vehicle body 3. The raising/lowering device 8 is provided with coupling portions 8g and 8h to which a working device 2 to perform agricultural work can be coupled. Coupling the working device 2 to the coupling portions 8g and 8h links the working device 2 and the traveling vehicle body 3 to each other and thus enables the traveling vehicle body 3 to tow the working device 2.

The working device 2 performs ground work on an agricultural field. For example, the working device 2 includes a tiller (rotary tiller) that performs tillage work on an agricultural field, a stubble cultivator that performs stubble cultivation, a drive harrow that performs puddling, a spreader that spreads fertilizer, agricultural chemicals, or the like, a seeder that performs seeding, a transplanter that transplants seedlings, a harvester that performs harvesting, and so on.

FIG. 1 is a configuration diagram of an agricultural work assistance system 100.

The agricultural work assistance system 100 includes an agricultural work assistance apparatus 50. The agricultural work assistance system 100 and the agricultural work assistance apparatus 50 assist agricultural work performed by the working device 2 while causing the traveling vehicle body 3 of the agricultural machine 1 to travel in an agricultural field.

The agricultural machine 1 includes a controller 60, an operation unit 62, the transmission 5, a brake 6, a steering 29, the raising/lowering device 8, a positioning device 40, and a warner 63. Additionally, in the agricultural machine 1, an in-vehicle network N1 such as a LAN or a CAN is built. The controller 60, the operation unit 62, the positioning device 40, and the warner 63 are connected to the in-vehicle network N1. These components 60, 62, 5, 6, 29, 8, 40, 63, and N1 included in the agricultural machine 1 are included in the agricultural work assistance system 100.

The controller 60 includes an electric circuit or the like including a CPU and a memory. The controller 60 is configured or programmed to control an operation of each component of the agricultural machine 1. The controller 60 is provided with an automatic controller 61 configured or programmed to control operations of the traveling vehicle body 3 (FIG. 45) of the agricultural machine 1 and the working device 2. The operation unit 62 includes a switch, a lever, a pedal, other keys, and so on that are operable by a user such as an operator seated on the operator's seat 10 or a worker located in the vicinity of the agricultural machine 1. The operation unit 62 includes a mode switch 65. The mode switch 65 is operated to switch the mode of the agricultural machine 1.

The transmission 5 is connected to a control valve 37. The control valve 37 is a solenoid valve that operates based on a control signal transmitted from the controller 60. Hydraulic fluid delivered from a hydraulic pump 33 is supplied to the control valve 37. Though the control valve 37 is depicted as one block in FIG. 1, an appropriate number of control valves 37 may be provided in accordance with the number of hydraulic devices such as hydraulic clutches or hydraulic cylinders provided in the transmission 5.

The automatic controller 61 is configured or programmed to control driving of the transmission 5 by electrically controlling a switching position and an opening of the control valve 37. By transmission of a driving force of the prime mover 4 to the traveling device 7 by the transmission 5, the traveling device 7 operates to cause the traveling vehicle body 3 to travel forward or rearward. Additionally, for example, when the working device 2 is a ground working device or the like, the transmission 5 transmits the driving force of the prime mover 4 to the working device 2. This increases an operating force of the working device 2.

The automatic controller 61 communicates with the working device 2 via the in-vehicle network N1. Specifically, the working device 2 includes a controller and a communicator. The automatic controller 61 transmits a work command to the working device 2 via the in-vehicle network N1. Upon receiving the work command via the communicator, the controller of the working device 2 controls, based on the work command, the operation of each component of the working device 2 to perform agricultural work (ground work). In addition, the controller of the working device 2 transmits, via the communicator, information or data indicating a work state or the like to the controller 60 via the in-vehicle network N1. Based on the information or data received from the working device 2 via the in-vehicle network N1, the automatic controller 61 detects the work state or the like of the working device 2.

The brake 6 is connected to a control valve 38. The control valve 38 is a solenoid valve that operates based on a control signal transmitted from the controller 60. Hydraulic fluid delivered from the hydraulic pump 33 is supplied to the control valve 38. By electrically controlling a switching position and an opening of the control valve 38, the automatic controller 61 causes the brake 6 to operate to brake the traveling vehicle body 3.

The steering 29 includes a steering handle (steering wheel) 30, a rotation shaft (steering shaft) 31, and an assist mechanism (power steering mechanism) 32. The steering handle 30 is provided inside the cabin 9 (FIG. 45). The rotation shaft 31 rotates along with the rotation of the steering handle 30. The assist mechanism 32 assists steering performed with the steering handle 30.

The assist mechanism 32 includes a control valve 34 and a steering cylinder 35. The control valve 34 is a solenoid valve that operates based on a control signal transmitted from the controller 60. More particularly, the control valve 34 is a three-position switching valve that is switchable by movement of a spool or the like. Hydraulic fluid delivered from the hydraulic pump 33 is supplied to the control valve 34. By electrically controlling a switching position and an opening of the control valve 34, the controller 60 adjusts the hydraulic pressure of the supply to the steering cylinder 35 to cause the steering cylinder 35 to extend/retract. The steering cylinder 35 is connected to knuckle arms (not illustrated) that change directions of the front wheels 7F.

The control valve 34 can be switched also by steering of the steering shaft 31. Specifically, when the steering handle 30 is operated, the steering shaft 31 rotates in accordance with the operation state to switch the switching position and the opening of the control valve 34. Dependent on the switching position and the opening of the control valve 34, the steering cylinder 35 extends/retracts leftward or rightward of the traveling vehicle body 3. This extending/retracting motion of the steering cylinder 35 changes the steering direction of the front wheels 7F. The steering 29 described above is just an example, and the configuration described above does not imply any limitation.

The traveling vehicle body 3 of the agricultural machine 1 can be manually steered by manual operation of the steering handle 30 and automatically steered by the automatic controller 61. Moreover, the traveling vehicle body 3 is capable of traveling/stopping by the driving of the transmission 5 and the brake 6 in accordance with manual operation of an accelerator or a brake (both of which are not illustrated) included in the operation unit 62. Furthermore, the traveling vehicle body 3 is capable of traveling/stopping automatically in accordance with control of the transmission 5 and the brake 6 by the automatic controller 61.

Figure 2:
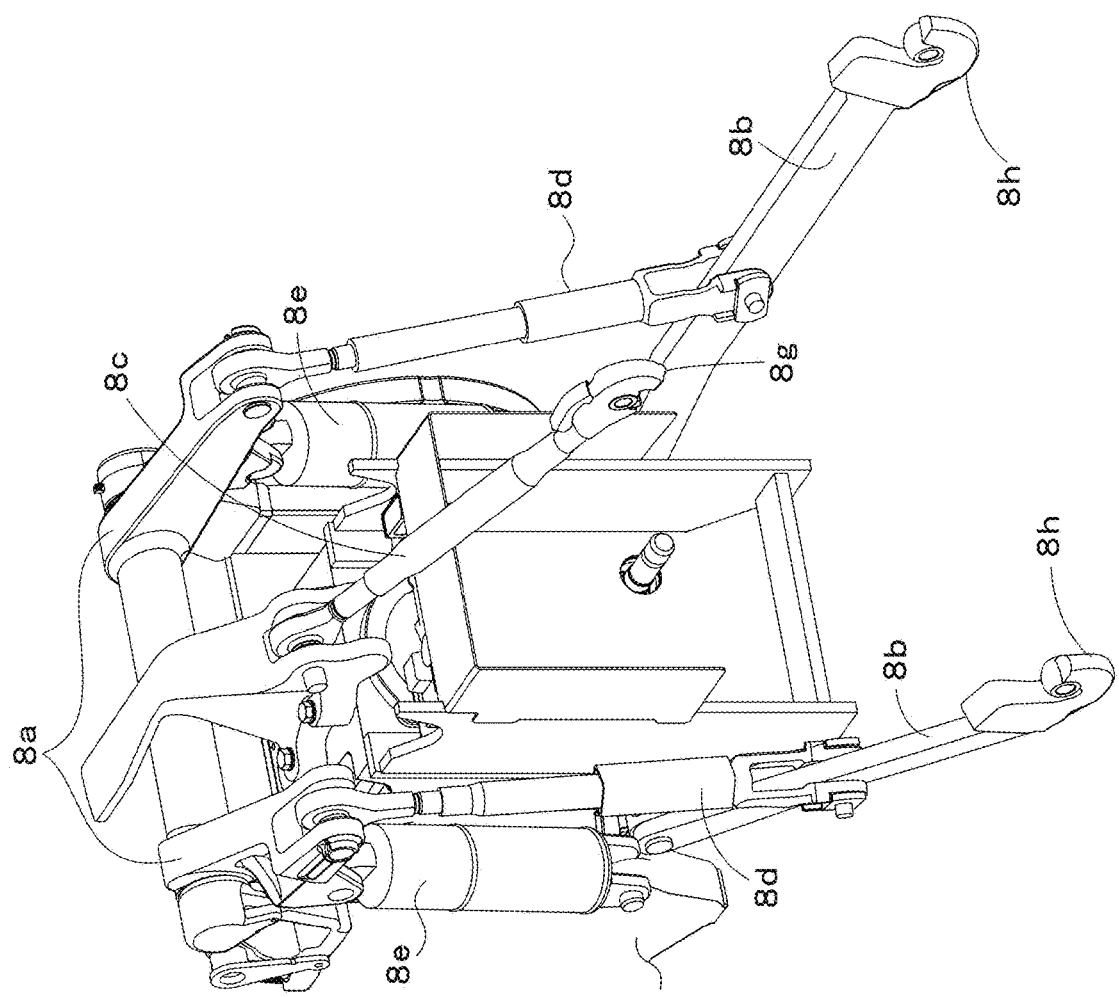
FIG. 2 is a perspective view of a raising/lowering device.

FIG. 2 is a perspective view of the raising/lowering device 8. The raising/lowering device 8 includes lift arms 8a, lower links 8b, a top link 8c, lift rods 8d, and lift cylinders 8e. Front end portions of the lift arms 8a are supported in such a way as to be able to pivot up/down on rear upper portions of a case (transmission case) in which the transmission 5 (FIG. 45) is housed. The lift arms 8a pivot (are raised and lowered) when driven by the lift cylinders 8e. The lift cylinders 8e are hydraulic cylinders. The lift cylinders 8e are connected to a control valve 36 illustrated in FIG. 1. The control valve 36 is a solenoid valve that operates based on a control signal transmitted from the controller 60. Hydraulic fluid delivered from the hydraulic pump 33 is supplied to the control valve 36.

Front end portions of the lower links 8b illustrated in FIG. 2 are supported in such a way as to be able to pivot up/down on rear lower portions of the transmission 5 (FIG. 1, FIG. 45). A front end portion of the top link 8c is supported on a rear portion of the transmission 5 above the lower links 8b in such a way as to be able to pivot up/down. The lift rods 8d link the lift arms 8a to the lower links 8b. The coupling portions 8g and 8h, to which the working device 2 can be coupled, are provided on rear end portions of the lower links 8b and the top link 8c.

By electrically controlling a switching position and an opening of the control valve 36, the automatic controller 61 illustrated in FIG. 1 adjusts the hydraulic pressure of the supply to the lift cylinders 8e illustrated in FIG. 2 to cause the lift cylinders 8e to extend/retract. The extending/retracting motion of the lift cylinders 8e raises/lowers the lift arms 8a and raises/lowers the lower links 8b linked to the lift arms 8a via the lift rods 8d. This moves the working device 2 pivotally upward or downward (raising/lowering motion), with front portions (the opposite of the coupling portions 8g and 8h) of the lower links 8b acting as fulcrums.

The positioning device 40 illustrated in FIG. 1 includes a receiver 41 and an inertial measurement unit (IMU) 42. The receiver 41 receives satellite signals (positions of positioning satellites, a transmission time, correction information, and so on) transmitted from a satellite positioning system (positioning satellites) such as D-GPS, GPS, GLONASS, BeiDou, Galileo, or Michibiki. Based on the satellite signals received by the receiver 41, the positioning device 40 detects a current position (for example, a latitude and a longitude). That is, the positioning device 40 is a position detector that detects a position of the traveling vehicle body 3 of the agricultural machine 1. The inertial measurement unit 42 includes an acceleration sensor, a gyroscope sensor, and the like. The inertial measurement unit 42 detects a roll angle, a pitch angle, and a yaw angle, etc. of the traveling vehicle body 3.

The warner 63 may include a beeper, a speaker, or a warning lamp, etc. provided on the traveling vehicle body 3. The warner 63 issues a warning to people around the traveling vehicle body 3 by sound or light.

The agricultural work assistance apparatus 50 is, for example, a portable tablet terminal device or the like. For example, the agricultural work assistance apparatus 50 is mounted inside the cabin 9 of the agricultural machine 1 and is detachably attached to the agricultural machine 1. That is, the agricultural machine 1 includes the agricultural work assistance apparatus 50.

The agricultural work assistance apparatus 50 includes a controller 51, a display operation interface 52, a storing unit (storage and/or memory) 53, and a communicator 54. The controller 51 includes a CPU and a memory, and controls elements of the agricultural work assistance apparatus 50. The controller 51 is configured or programmed to define or function as an agricultural field register 51a, an area setter 51b, a route creator 51c, a path/track calculator 51d, and a notifier 51g. Each of these elements includes software program(s), but may include hardware.

The display operation interface 52 includes a touch pad, and displays various kinds of information on a screen. Various inputs can be performed by performing predetermined operations on a display screen of the display operation interface 52. The display operation interface 52 is a display and an input interface. The agricultural work assistance apparatus 50 may be provided with an independent display and an independent operation interface (input interface) in place of the display operation interface 52.

The storing unit 53 includes a nonvolatile memory and/or the like. The storing unit 53 is a read/write storing unit which stores information or data for assisting travel and work of the agricultural machine 1. The communicator 54 is an interface for connection to the in-vehicle network N1. The controller 51 communicates with the controller 60, the operation unit (manual operator) 62, the positioning device 40, the warner 63, and the working device 2 over the in-vehicle network N1 via the communicator 54.

Figure 3:
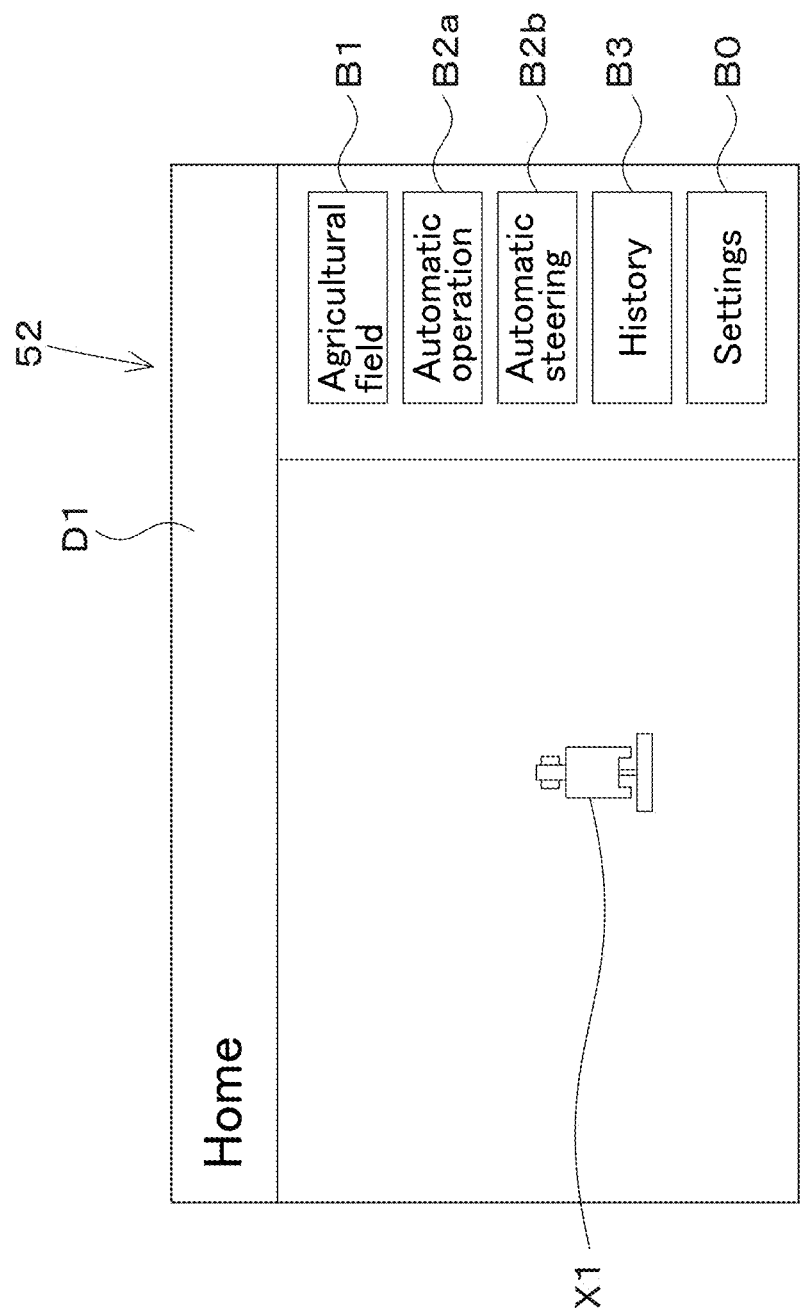
FIG. 3 is a diagram illustrating an example of a home screen of an agricultural work assistance apparatus.

Upon startup of the agricultural work assistance apparatus 50, the controller 51 causes the display operation interface 52 to display a home screen D1 illustrated in FIG. 3. Data of this home screen D1 and data of each screen D2 to D9 to be described later are stored in the storing unit 53. The controller 51 reads the data out of the storing unit 53 when necessary and causes the display operation interface 52 to display a screen based on the data.

The home screen D1 displays an agricultural machine symbol X1, an agricultural field key B1, an automatic operation key B2a, an automatic steering key B2b, a history key B3, and a settings key B0. The settings key B0 is used to perform various settings. By selecting (performing a tap operation on) the settings key B0, it is possible to set predetermined items. The predetermined items include, for example, setting (registration of) the agricultural machine 1 in which the agricultural work assistance apparatus 50 is mounted and the working device 2 coupled to the agricultural machine 1, settings of the manner in which indications are displayed on the display operation interface 52, or the like.

The agricultural field key B1 is used to register an agricultural field in which agricultural work is performed by the agricultural machine 1. The automatic operation key B2a is used to perform settings or prediction related to an automatic traveling work mode of the agricultural machine 1. The automatic steering key B2b is used to perform settings or prediction related to an automatic steering work mode of the agricultural machine 1.

The automatic traveling work mode mentioned above is a mode in which agricultural work (ground work) is performed using the working device 2 while causing the traveling vehicle body 3 of the agricultural machine 1 to travel by automatic operation. The automatic operation of the agricultural machine 1 refers to automatically changing the travel speed of the traveling vehicle body 3 and automatically steering the traveling vehicle body 3. The automatic steering work mode is a mode in which agricultural work (ground work) is performed using the working device 2 while automatically steering the traveling vehicle body 3. When the agricultural machine 1 is in the automatic steering work mode, the operator of the agricultural machine 1 operates the accelerator or the brake included in the operation unit 62 (FIG. 1), and the travel speed of the traveling vehicle body 3 is changed in accordance with this operation. That is, in the automatic steering work mode, the travel speed of the traveling vehicle body 3 is changed based on manual operation.

The agricultural machine 1 can travel by manual operation and can perform ground work using the working device 2 during the travel. The manual operation of the agricultural machine 1 refers to changing the travel speed of the traveling vehicle body 3 by the operator operating the accelerator or the brake of the operation unit 62 and steering the traveling vehicle body 3 by the operator operating the steering handle 30 (FIG. 1).

The history key B3 on the home screen D1 in FIG. 3 is used to display a work history of the agricultural machine 1. When the user selects the agricultural field key B1 on the home screen D1, the controller 51 causes the display operation interface 52 to display an agricultural field registration screen D2 illustrated in FIG. 4.

The agricultural field registration screen D2 displays a map MP1, a position Pv of the traveling vehicle body 3 of the agricultural machine 1, a new key B4, a register key B5, a call key B6, a cancel key B7, and a back key B8. The map MP1 displays an image depicting a map of an area around the position where the agricultural machine 1 is located. The data of the map is acquired by the positioning device 40 controlled by the controller 51 or is pre-stored in the storing unit 53. The map MP1 further displays an agricultural field in which the agricultural machine 1 performs agricultural work and is associated with position information such as latitude and longitude. When the user performs a predetermined operation on the map MP1, a map displayed in the map MP1 is zoomed in or out, or the displayed portion of the map is moved.

Figure 5A:
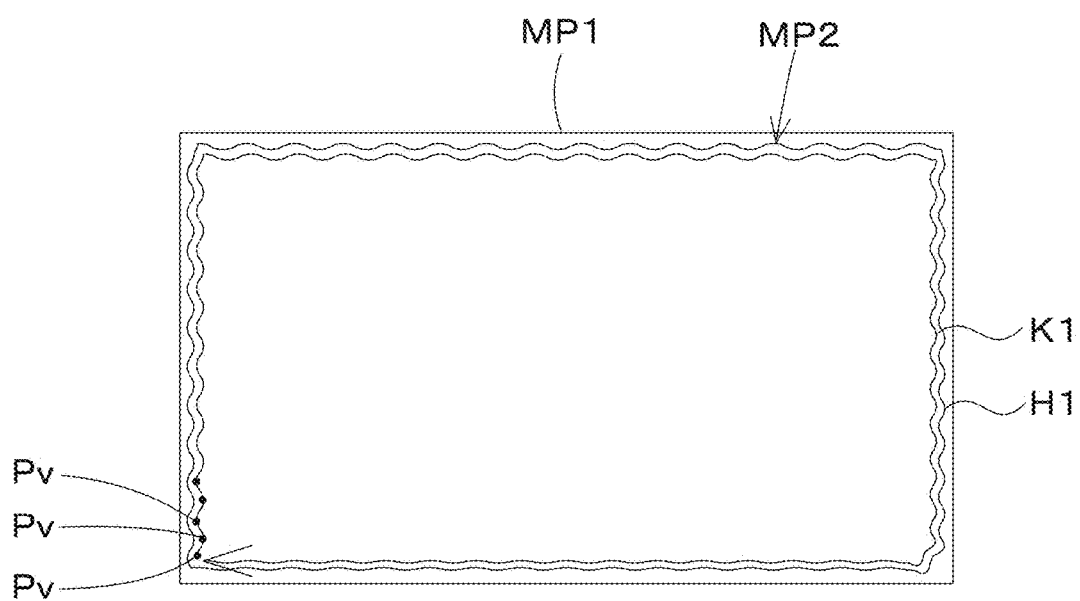
FIG. 5A is a diagram for explaining an agricultural field registration method.

FIG. 5A is a diagram for explaining an agricultural field registration method. For example, the user (operator of the agricultural machine 1) selects the new key B4 on the agricultural field registration screen D2 illustrated in FIG. 4, and causes the agricultural machine 1 to travel in a circumferential direction in the agricultural field by manual operation. In so doing, the working device 2 may be raised by the raising/lowering device 8 such that agricultural work is not performed by the working device 2 on the agricultural field, or the working device 2 may be lowered by the raising/lowering device 8 such that agricultural work is performed by the working device 2 on the agricultural field. The controller 51 of the agricultural work assistance apparatus 50 (FIG. 1) acquires, at predetermined interval(s) via the communicator 54, the position Pv detected by the positioning device 40 and stores the detected position Pv in an internal memory upon each acquisition and causes the detected position Pv to be displayed on the map MP1 upon each acquisition. In FIGS. 4 and 5A, only some of the positions Pv are illustrated for convenience of description.

After the agricultural machine 1 ends traveling in the circumferential direction in the agricultural field, the user selects the register key B5. Upon the selection, based on the plurality of detected positions Pv stored, the agricultural field register 51a calculates a travel path K1 of the traveling vehicle body 3. The controller 51 causes the travel path K1 to be displayed on the map MP1 as illustrated in FIG. 5A. In the example of FIG. 5A, a line K1 passing through the plurality of detected positions Pv in the detected order (acquired order) and then returning to the position Pv detected first is set as the travel path of the traveling vehicle body 3.

Each detected position Pv is a GPS position of the positioning device 40. The travel path K1 is a path traveled by the GPS position. Therefore, the agricultural field register 51a obtains a line H1 located between the travel path K1 and the outline of the map MP1 by displacing the travel path K1 outward by an amount equivalent to the distance in the width direction from the GPS position of the agricultural machine 1 to the outer edge of the working device 2 (the outer edge here refers to, in FIG. 5A, the left edge of the working device 2 because the agricultural machine 1 travels in the circumferential direction in the agricultural field clockwise). In the present preferred embodiment, the GPS position detected by the positioning device 40 is at the center of the traveling vehicle body 3, and the widthwise center of the traveling vehicle body 3 coincides with the widthwise center of the working device 2. Therefore, the displacement amount mentioned above is the same as a half of the outside width (dimension in the width direction) of the working device 2 or a half of the working width (dimension in the width direction) W1 over which the working device 2 performs ground work. As another example, the line H1 may be obtained between the travel path K1 and the outline of the map MP1 using, as the displacement amount mentioned above, a value more than or less than the distance in the width direction from the GPS position of the agricultural machine 1 to the outer edge of the working device 2 by a predetermined amount.

The agricultural field register 51a sets the line H1 obtained as described above as the contour (outer shape) of the agricultural field and registers (stores) an agricultural field map MP2 (data representing the contour of the agricultural field) represented by the contour H1 in the storing unit 53. In so doing, the agricultural field register 51a registers agricultural field identification information such as an agricultural field name or an agricultural field management number in the storing unit 53 such that the information is in association with the agricultural field map MP2. For example, the agricultural field identification information may be assigned by the agricultural field register 51a, may be inputted by the user through an operation on the display operation interface 52, or may be stored in the storing unit 53 in advance. A plurality of agricultural field maps MP2 and/or the like can be registered in the storing unit 53. After the agricultural field register 51a registers the agricultural field map MP2, the controller 51 causes the agricultural field map MP2 (the contour H1 of the agricultural field) to be displayed on the map MP1.

Figure 5B:
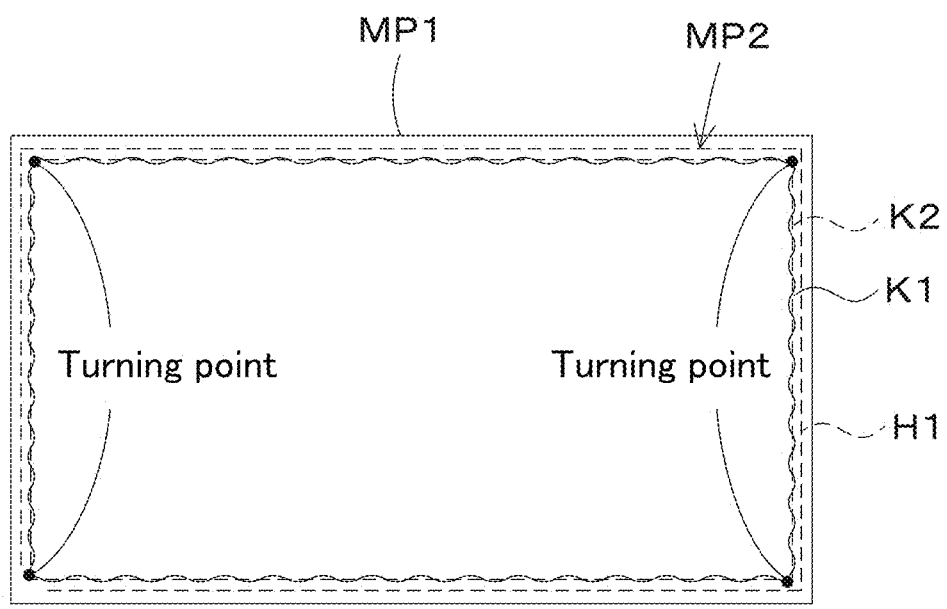
FIG. 5B is a diagram for explaining another agricultural field registration method.

The above-described agricultural field registration method is merely an example, and this does not imply any limitation. As another example, as illustrated in FIG. 5B, the agricultural field register 51a calculates turning points from the travel path K1 of the traveling vehicle body 3, and obtains a line K2 passing through the turning points. Then, the line H1 may be obtained between the travel path K1 and the outline of the map MP1 by displacing the line K2 by the displacement amount mentioned above, the line H1 may be set as the contour H1 of the agricultural field and the agricultural field map MP2, and the agricultural field map MP2 may be stored in the storing unit 53.

Additionally or alternatively, when the agricultural machine 1 travels in the circumferential direction, the user may designate corners of the agricultural field as illustrated in FIG. 5C by operating a predetermined switch, etc. provided in the operation unit 62. In such a case, the agricultural field register 51a obtains a line K3 passing through the corners of the agricultural field in the designated order and then returning to the first designated corner. Then, the line H1 may be obtained between the travel path K1 and the outline of the map MP1 by displacing the line K3 by the displacement amount mentioned above, the line H1 may be set as the contour H1 of the agricultural field and the agricultural field map MP2, and the agricultural field map MP2 may be stored in the storing unit 53. The contour H1 of the agricultural field and the agricultural field map MP2 may be, for example, data represented by positions (latitude and longitude), data represented by coordinates (X axis, Y axis), or data represented in some other fashion.

When the user selects the call key B6 on the agricultural field registration screen D2 illustrated in FIG. 4, the controller 51 reads data of one of the agricultural field map(s) MP2 registered in the storing unit 53, and causes the agricultural field map MP2 to be displayed on the agricultural field registration screen D2 based on the data. When the user selects the cancel key B7, the agricultural field register 51a deletes the positions Pv of the traveling vehicle body 3 and the agricultural field map MP2 (the contour H1 of the agricultural field) currently displayed on the map MP1 and deletes data thereof also from the storing unit 53. That is, the registration of the contour H1 of the agricultural field and the agricultural field map MP2 is canceled.

When the registration of the agricultural field ends and the user selects the back key B8, the controller 51 causes the display operation interface 52 to display the home screen D1 in FIG. 3. That is, the back key B8 is used to return the screen displayed on the display operation interface 52 to the previous screen (the same applies to screens D3 to D9 described later). When the user selects the automatic operation key B2a on the home screen D1, the controller 51 causes the display operation interface 52 to display a work selection screen D3 illustrated in FIG. 6.

The work selection screen D3 displays a message indicating an input operation procedure. The work selection screen D3 displays a plurality of work keys B31 to B35, an up arrow key B41, a down arrow key B42, a next key B9, and the back key B8. The work keys B31 to B35 indicate types of agricultural work that can be performed using the agricultural machine 1 and the working device 2 coupled to the agricultural machine 1. In FIG. 6, the five work keys B31, B32, B33, B34, and B35 are displayed. However, when there are six or more types of agricultural work that can be performed using the agricultural machine 1 and the working device 2, the controller 51 causes work keys indicating other works to be displayed on the work selection screen D3 in response to the user selecting the up arrow key B41 or the down arrow key B42.

When the user selects one of the work keys B31 to B35, the controller 51 causes the selected work key to be displayed on the work selection screen D3 in a manner different from that of the other work keys. In the example of FIG. 6, only the selected work key B31 for tillage is marked with a filled circle. When the user selects the next key B9 while one of the work keys B31, B32, B33, and B34 is in the selected state, the controller 51 causes the display operation interface 52 to display a vehicle settings confirmation screen D4 illustrated in FIG. 7. That is, the next key B9 is used to switch the screen displayed on the display operation interface 52 to the next screen (the same applies to the screens D4 to D9 described later).

The vehicle settings confirmation screen D4 displays a message indicating an input operation procedure, the type of agricultural work, the type of agricultural machine 1, and a working width of the working device 2. The user can set the type of the agricultural machine 1 and the working width of the working device 2 displayed on this vehicle settings confirmation screen D4, for example, by selecting the settings key B0 on the home screen D1 illustrated in FIG. 3 and performing predetermined input operations. Moreover, the user can register a plurality of agricultural machines and types and specifications such as working widths of a plurality of working devices with the agricultural work assistance apparatus 50 by selecting the settings key B0 and performing predetermined input operations. The working width of the working device 2 is a dimension in a horizontal plane perpendicular to the direction of travel of the working device 2 over which the working device 2 performs work.

The vehicle settings confirmation screen D4 in FIG. 7 displays an unmanned machine settings key B10, a manned machine settings key B11, the next key B9, and the back key B8. When the user wishes to change the type of the agricultural machine 1 or the working width displayed on the vehicle settings confirmation screen D4, the user selects the unmanned machine settings key B10 or the manned machine settings key B11. Upon the selection, the controller 51 causes the display operation interface 52 to display another setting screen (not illustrated) in which the type of the agricultural machine 1 or the working width is changeable. When the user performs a predetermined operation after changing the type of the agricultural machine 1 or the working width in the another setting screen, the controller 51 causes the display operation interface 52 to display the vehicle settings confirmation screen D4 again.

The user selects the next key B9 when there is no need to change the type of the agricultural machine 1 or the working width displayed on the vehicle settings confirmation screen D4. Upon the selection, the controller 51 causes the display operation interface 52 to display an agricultural field selection screen D5 illustrated in FIG. 8.

Figure 8:
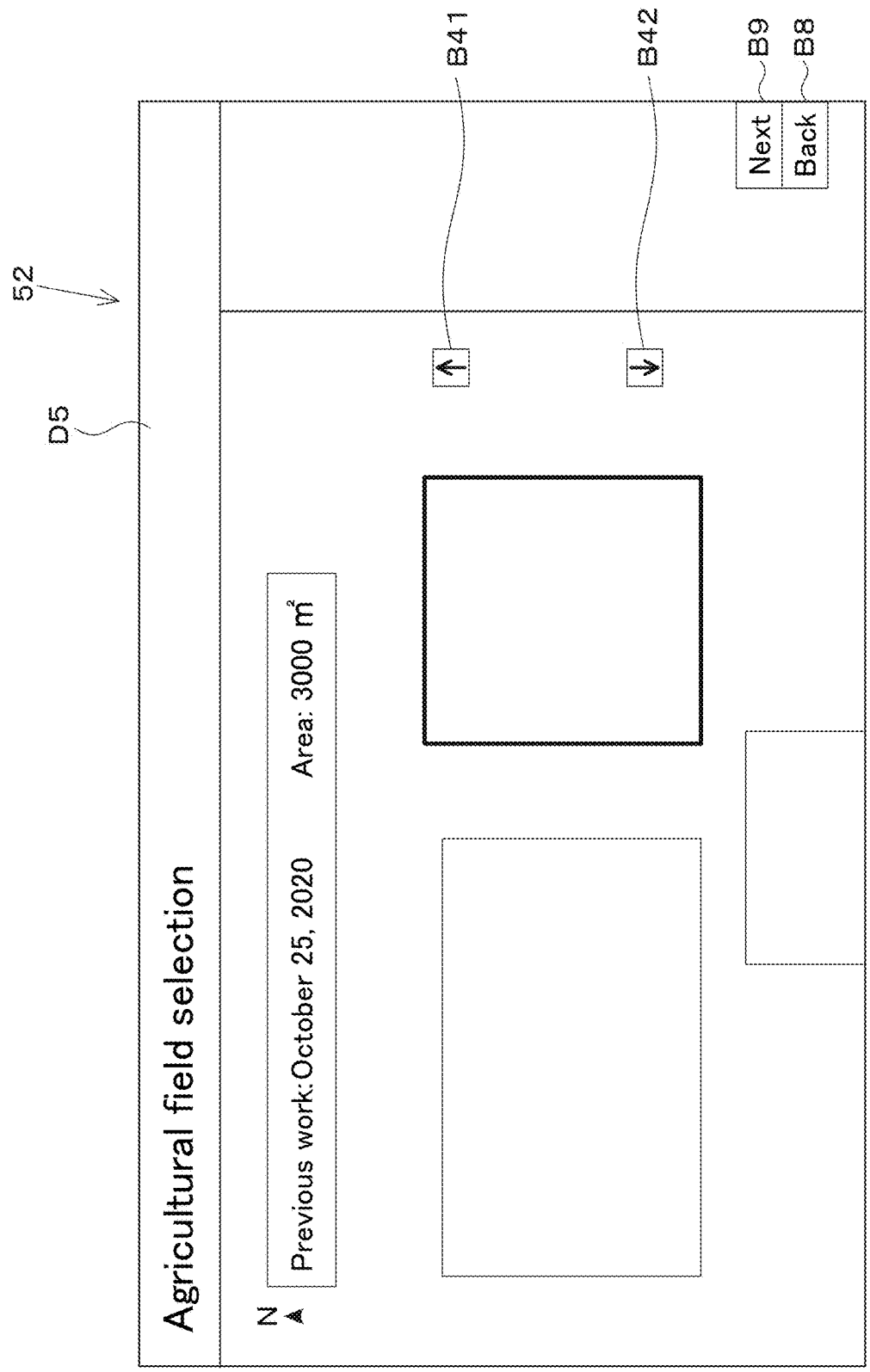
FIG. 8 is a diagram illustrating an example of an agricultural field selection screen of the agricultural work assistance apparatus.

The agricultural field selection screen D5 displays one or more registered agricultural field maps MP2, the up arrow key B41, the down arrow key B42, the next key B9, and the back key B8. In FIG. 8, three agricultural field maps MP2 are displayed. However, when there are four or more registered agricultural field maps MP2, the controller 51 causes the other registered agricultural field map(s) MP2 to be displayed on the agricultural field selection screen D5 in response to the user selecting the up arrow key B41 or the down arrow key B42.

When the user selects one of the agricultural field maps MP2, the controller 51 causes the selected agricultural field map MP2 to be displayed in a manner different from that of the other agricultural field maps MP2. In FIG. 8, only the selected agricultural field map MP2 is enclosed by a thick-line frame. In addition, the controller 51 causes the last work date and time of agricultural work performed in the selected agricultural field map MP2 and the area of the agricultural field map MP2 to be displayed on the agricultural field selection screen D5. When the user selects the next key B9 while one of the agricultural field maps MP2 is in the selected state, the controller 51 causes the display operation interface 52 to display a first route creation screen D6 illustrated in FIG. 9.

The first route creation screen D6 displays the selected agricultural field map MP2 (the contour H1 of the agricultural field), the agricultural machine symbol X1, a message indicating an input operation procedure, an automatic headland work key B43, a work type key B44, the next key B9, and the back key B8. The automatic headland work key B43 is used to select whether or not to perform agricultural work using the working device 2 while causing the traveling vehicle body 3 of the agricultural machine 1 to travel by automatic operation in headland(s) set in the agricultural field map MP2 as will be described later.

The work type key B44 is used to select the manner in which work is performed using the working device 2. In the present preferred embodiment, since a tillage work is selected in the work selection screen D3 in FIG. 6 for example, the work type key B44 in FIG. 9 is a key to select whether the type of the tillage work is "every-line tillage" or "every-other-line tillage". In a case that another kind of work is selected in the work selection screen D3 in FIG. 6, the work type key B44 in FIG. 9 is used to select the manner in which the work is performed. When the user selects the next key B9 after selecting the work manners via the automatic headland work key B43 and the work type key B44, the controller 51 causes the display operation interface 52 to display a second route creation screen D7 illustrated in FIG. 10A.

The second route creation screen D7 in FIG. 10A displays the selected agricultural field map MP2, the agricultural machine symbol X1, a message indicating an input operation procedure, a plurality of setting items and numerical value input fields thereof, a recommendation key B12, a route creation key B13, a track prediction key B14, a plus key B45, a minus key B46, the next key B9, and the back key B8. While the second route creation screen D7 is displayed, the controller 51 may acquire, via the communicator 54, the actual position of the traveling vehicle body 3 detected by the positioning device 40, and may cause the agricultural machine symbol X1 to be displayed at the position on the agricultural field map MP2 corresponding to the position of the traveling vehicle body 3.

The plurality of setting items on the second route creation screen D7 include an estimated work distance, the number of headlands, a working direction, an overlap for headlands, and an overlap for a central portion. Among them, numerical values can be inputted for items other than the estimated work distance. The number of headlands is the number of one or more headlands set along the contour H1 inward of the contour H1 of the registered agricultural field (the agricultural field map MP2).

The working direction is a direction in which work is performed using the working device 2 while the traveling vehicle body 3 is caused to travel straight back and forth in a central portion located inward of the headlands of the agricultural field. By inputting a predetermined numerical value (such as "1" or "2", for example) in the numerical value input field of the working direction, the vertical direction or the horizontal direction corresponding to the numerical value is set in the second route creation screen D7. The overlap for the headlands is an overlap of the working width of the working device 2 with headland(s). The overlap for the central portion is an overlap between the working widths when work is performed using the working device 2 while the traveling vehicle body 3 is caused to travel straight back and forth in the central portion of the agricultural field.

The user selects the numerical value input field of each setting item described above and operates the plus key B45 or the minus key B46 to input a numerical value to the numerical value input field. Additionally or alternatively, in response to the user selecting the recommendation key B12, the controller 51 reads the set value of each setting item corresponding to the agricultural work selected in the work selection screen D3 (FIG. 6) among the set values stored in the storing unit 53 in advance and inputs (displays) the set value in the corresponding numerical value input field.

Figure 10B:
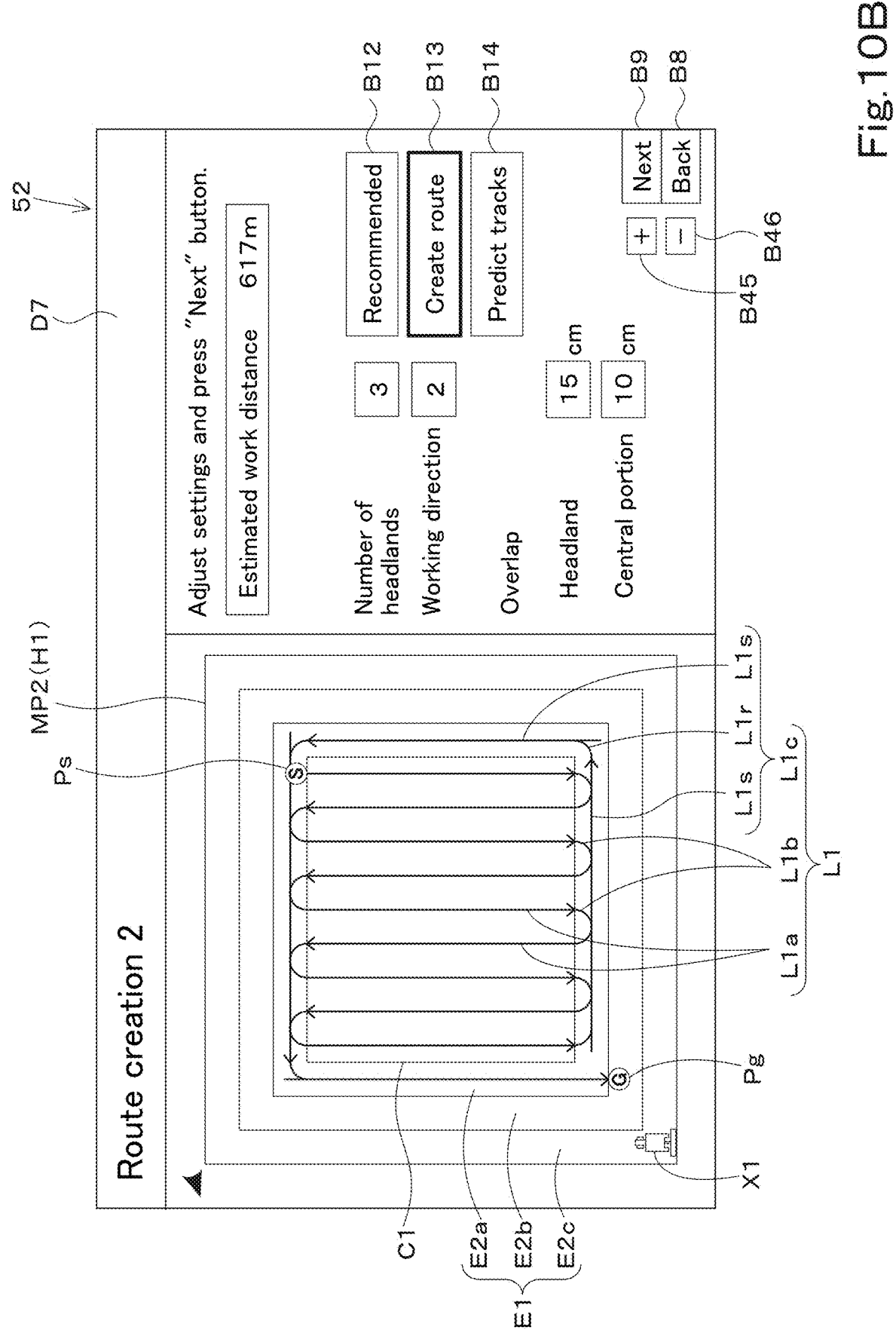
FIG. 10B is a diagram illustrating an example of the second route creation screen of the agricultural work assistance apparatus.

After the numerical value is inputted for each setting item, the user selects the route creation key B13. Upon the selection, as illustrated in FIG. 10B, the area setter 51b (FIG. 1) sets a central area (second area) C1 and a headland area (first area) E1 in the agricultural field map MP2. The route creator 51c (FIG. 1) creates a travel route (planned travel route) L1 in the agricultural field map MP2.

Figure 11A:
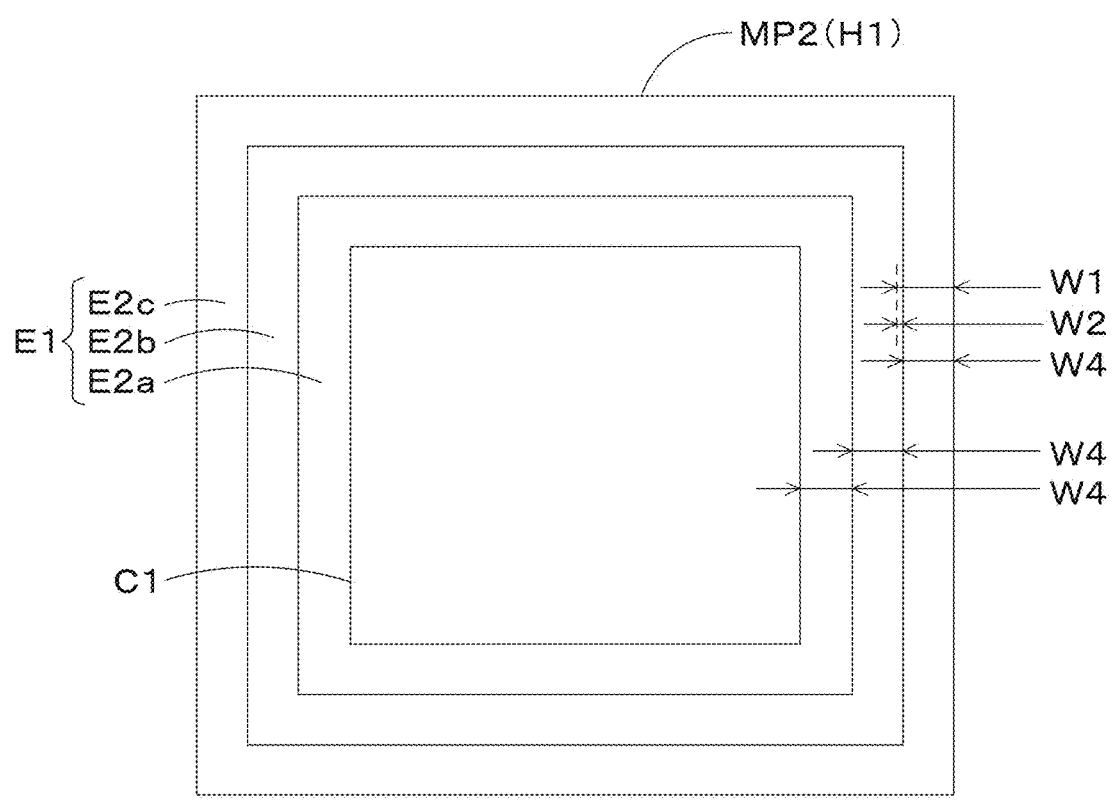
FIG. 11A is a diagram for explaining a method of setting areas and a travel route.

FIGS. 11A to 11D are diagrams for explaining a method of setting the areas C1 and E1 and the travel route L1. When the route creation key B13 is selected by the user, first, the area setter 51b sets the central area C1 and the headland area E1, based on the contour H1 of the agricultural field, the working width of the working device 2, the inputted number of headlands, and/or the overlap for the headlands. More specifically, for example, as illustrated in FIG. 11A, the area setter 51b calculates the contour C1 obtained by displacing the contour H1 of the agricultural field inward a number of times corresponding to the number of headland(s), each by a width W4 obtained by subtracting the overlap W2 for the headlands from the working width W1 of the working device 2, and sets an area (central portion) enclosed by the contour C1 as the central area C1.

As another example, the area setter 51b may calculate a contour obtained by displacing the contour H1 of the agricultural field inward a number of times corresponding to the number of headland(s), each by the working width of the working device 2 (or the outside width of the working device 2), and may set an area (central portion) enclosed by the contour C1 as the central area. The number of headlands, the overlap for the headlands, and/or the overlap for the central portion may be a preset fixed value, and the fixed value may be pre-stored in the storing unit 53, and the area setter 51b may read the fixed value from the storing unit 53 as necessary.

After setting the central area C1 as described above, the area setter 51b defines a frame-shaped area (outer frame portion) located outward of the central area C1 and inward of the contour H1 of the agricultural field as the headland area E1. Then, the area setter 51b causes the storing unit 53 to store data of the position, etc. indicating each area C1, E1.

The route creator 51c creates the travel route L1 based on the set areas C1 and E1, the working width of the working device 2, the inputted working direction, the overlap for the headlands, and/or the overlap for the central portion. More specifically, first, as illustrated in FIG. 11B, the route creator 51c creates a plurality of unit work zones C2 in the central area C1 one after another from one of the opposite edges (the right edge in FIG. 11B) of the central area C1 each extending parallel to the working direction (up-and-down direction in FIG. 11B) such that the unit work zones C2 each have a width equal to the working width W1 of the working device 2. In so doing, in the unit work zone C2 that is created by the route creator 51c first has its width (which equals to the working width W1) overlapped with the headland area E1 by the overlap W2 for the headland(s). The second and subsequent unit work zones C2 created by the route creator 51c have their width (which equals to the working width W1) overlapped with the previously created unit work zone C2 by the overlap W3 for the central portion.

Figure 11C:
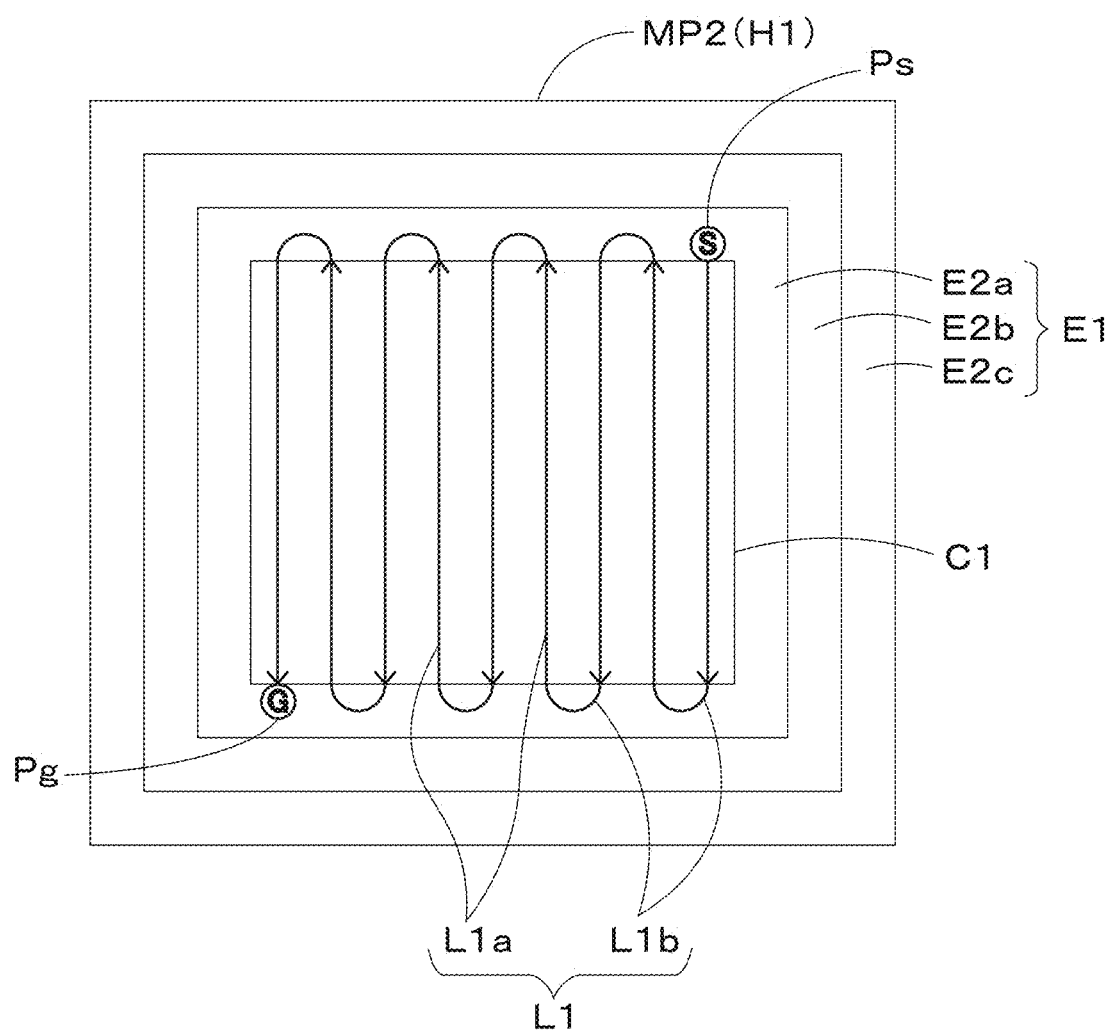
FIG. 11C is a diagram for explaining a method of setting areas and a travel route.

Next, the route creator 51c creates straight route portions L1a along which the traveling vehicle body 3 is to travel straight, for the respective unit work zones C2 as illustrated in FIG. 11C. In so doing, the route creator 51c creates a straight route portion L1a that is a straight line connecting the opposite ends of a corresponding unit work zone C2 in a longitudinal direction, on the widthwise (a left-and-right direction in FIG. 11C) centerline of the unit work zone C2. With regard to the last created unit work zone C2 (the leftmost unit work zone C2 in the central area C1 in FIG. 11B), if the straight route portion L1a created in this unit work zone C2 is located outward of the central area C1, the route creator 51c may exclude this straight route portion L1a from the travel route L1.

Next, the route creator 51c creates route portions L1b each connecting adjacent ones of the straight route portions L1a in the headland area E1. Each of the route portions L1b is a turning route portion along which the traveling vehicle body 3 turns from one of the two adjacent straight route portions L1a to the other. Although turning route portions L1b having a simple semi-circular shape are illustrated in FIG. 11C, etc., this is merely to make it easier to display the turning route portions L1b on the display screen D7 (and display screens D8, D10, and D11 to be described later) of the display operation interface 52, make it easier to visually recognize the travel route L1 on the display screen thereof, for convenience. When the traveling vehicle body 3 actually travels based on one of the adjacent straight route portions L1a and makes a turn toward the other straight route portion L1a, the traveling vehicle body 3 turns while moving forward or rearward, and therefore the actual travel path is more complex than the turning route portion L1b. The route creator 51c may create the turning route portions L1b having a shape other than a semicircular shape. The same applies to other turning route portions to be described later and turning portions included in another travel route.

The controller 60 (FIG. 1) of the agricultural machine 1 causes the raising/lowering device 8 (FIG. 2) to lower the working device 2 to cause the working device 2 to perform ground work when causing the traveling vehicle body 3 to travel based on the straight route portions L1a. The controller 60 causes the raising/lowering device 8 to raise the working device 2 to cause the working device 2 to stop the ground work when causing the traveling vehicle body 3 to travel based on the turning route portions L1b.

That is, each of the straight route portions L1a is a work route portion where ground work is performed by the working device 2 while the traveling vehicle body 3 of the agricultural machine 1 is caused to travel by automatic operation. The central area C1 in which the plurality of straight route portions L1a are created is a work area where ground work is performed by the working device 2 while the traveling vehicle body 3 is caused to travel straight back and forth by automatic operation. The work route portion is not limited to a straight-line route portion like the straight route portion L1a and may be a curved route portion. It is only necessary to create one or more work route portions including either a straight-line work route portion or a curved work route portion, or both, in the work area.

When not performing work in the headland(s) is selected via the automatic headland work key B43 on the first route creation screen D6 in FIG. 9, the route creator 51c creates the travel route L1 including the straight route portions L1a and the turning route portions L1b as illustrated in FIG. 11C, and causes the storing unit 53 to store data of the position, etc. indicating the travel route L1. The route creator 51c sets a start position Ps at the end of one of straight route portions L1a that are not connected to any of the turning route portions L1b (upper end of the rightmost straight route portion L1a in FIG. 11C) among the ends of the straight route portions L1a at the opposite sides of the central area C1, and sets a goal position Pg at the end of the other of the straight route portions L1a that are not connected to any of the turning route portions L1b (lower end of the leftmost straight route portion L1a in FIG. 11C). Then, the route creator 51c causes the storing unit 53 to store data indicating each of the positions Ps and Pg.

The route creator 51c calculates the estimated work distance over which ground work is to be performed by the working device 2 while the traveling vehicle body 3 is caused to travel based on all the straight route portions L1a, and causes the storing unit 53 to store the calculated result. Furthermore, the route creator 51c sets vehicle speed(s) (moving speed(s)) at which the traveling vehicle body 3 is caused to travel by automatic operation on the straight route portions L1a and the turning route portions L1b, and causes the storing unit 53 to store the vehicle speed(s) in association with data of the respective route portions L1a and L1b. In so doing, for example, the route creator 51c sets lower vehicle speeds for portions of the route portions L1a and L1b with a larger curvature. Alternatively, for example, an input field for inputting the vehicle speed for each of the route portions L1a and L1b may be provided on the second route creation screen D7, and the route creator 51c may set the vehicle speed inputted to each of the input fields on the corresponding one of the route portions L1a and L1b.

After the settings and the creation end as described above, the controller 51 causes the areas C1 and E1, the travel route L1, the start position Ps, the goal position Pg, and the estimated work distance to be displayed on the second route creation screen D7 (see FIG. 11C). In so doing, the areas C1 and E1, the travel route L1, the start position Ps, and the goal position Pg are displayed on the second route creation screen D7 as illustrated in FIG. 11C. The travel route L1 includes the straight route portions L1a and the turning route portions L1b.

Figure 11D:
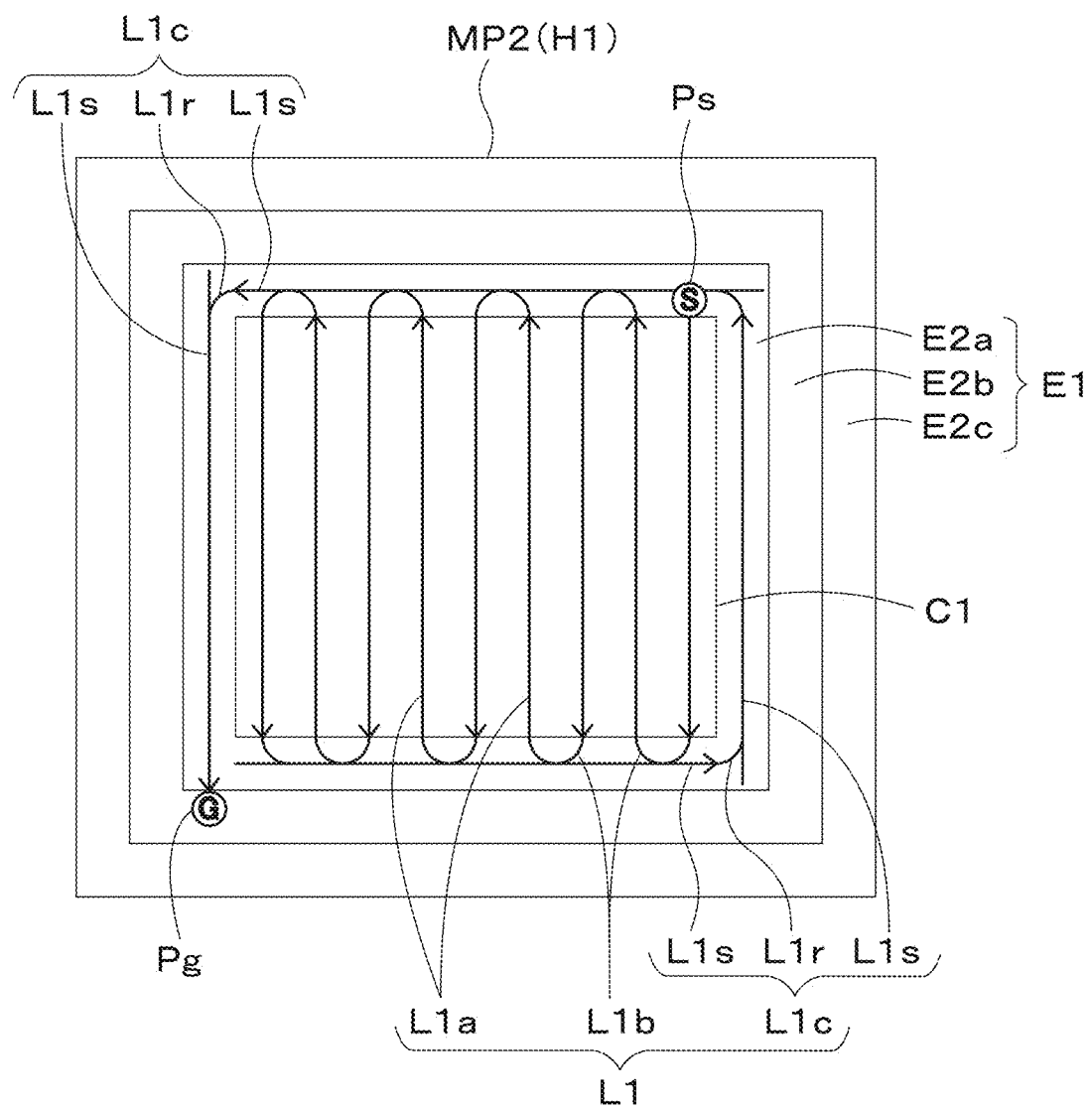
FIG. 11D is a diagram for explaining a method of setting areas and a travel route.
Figure 13A:
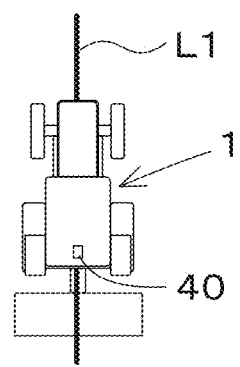
FIG. 13A is a diagram for explaining automatic operation of the agricultural machine.
Figure 13B:
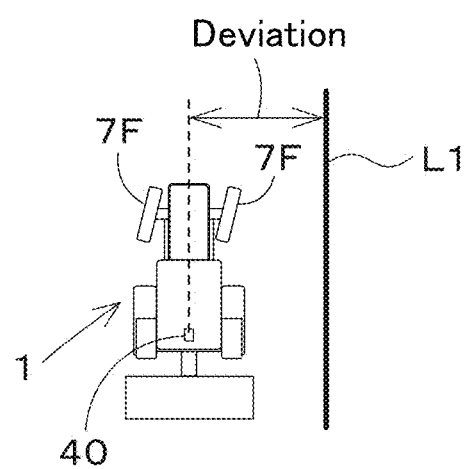
FIG. 13B is a diagram for explaining automatic operation of the agricultural machine.
Figure 13C:
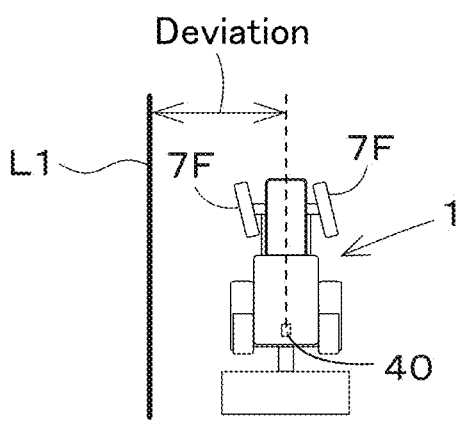
FIG. 13C is a diagram for explaining automatic operation of the agricultural machine.
Figure 13D:
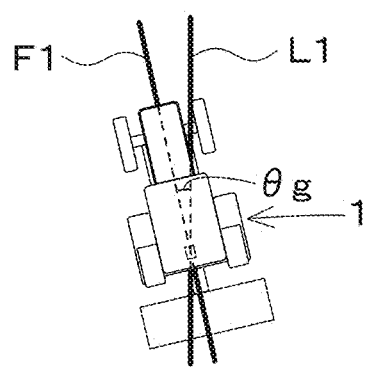
FIG. 13D is a diagram for explaining automatic operation of the agricultural machine.

In contrast, when performing work in the headland(s) is selected via the automatic headland work key B43 on the first route creation screen D6 in FIG. 9, the route creator 51c creates, in the headland area E1, a go-around route portion L1c which surrounds the central area C1 as illustrated in FIG. 11D in addition to the straight route portions L1a and the turning route portions L1b. In so doing, for example, the route creator 51c creates the go-around route portion L1c in a headland E2a located closest to the central area C1 among headlands E2a, E2b, and E2c that are set outside the central area C1 by the area setter 51b.

The route creator 51c sets a starting position Ps at the end not connected to any turning route portion L1b (the upper end of the rightmost straight route portion L1a in FIG. 11D) of one of endmost straight route portions L1a (the leftmost and rightmost straight route portions L1a in FIG. 11D) in the central area C1, and connects the go-around route portion L1c to the end of the other of the endmost straight route portions L1a (to the lower end of the leftmost straight route portion L1a in FIG. 11D). The route creator 51c sets a goal position Pg at the end of the go-around route portion L1c that is not connected to any straight route portion L1a.

The go-around route portion L1c is a work route portion on which ground work is done by the working device 2 while the traveling vehicle body 3 is caused to travel in automatic operation. The go-around route portion L1c includes straight portions L1s which are substantially straight and turning portions L1r in the form of a curve with a curvature equal to or greater than a predetermined value. Each of the straight portions L1s is created on the widthwise centerline of the headland E2a. One of adjacent straight portions L1s in the direction of travel on the go-around route portion (travel route) L1c and the other of the adjacent straight portions L1s extend in different directions (differ in direction of travel). Each of the turning portions L1r connects such adjacent straight route portions L1s and is a portion on which the traveling vehicle body 3 turns from one of the adjacent straight portions L1s toward the other.

Depending on the shape of the contour H1 of the agricultural field (for example, when the contour H1 of the agricultural field has an irregular shape), the go-around route portion L1c may include, in addition to the straight portions L1s and the turning portions L1r, a gentle curved portion (curved route portion, not illustrated) that is curved with a curvature less than the predetermined value. In such a case, the ground work may be performed by the working device 2 when the traveling vehicle body 3 travels by automatic operation based on the straight portions L1s and the gentle curve portion of the go-around route portion L1c and ground work may not be performed by the working device 2 when the traveling vehicle body 3 travels by automatic operation based on the turning portions L1r.

The headland E2a in which the go-around route portion L1c is created as described above is a work area where ground work is performed by the working device 2 while the traveling vehicle body 3 is traveling at the outer side around the central area C1. As another example, the route creator 51c may create a go-around route portion also in the other headlands E2b and E2c located outward of the headland E2a. A key operable to input the number of headlands in which a go-around route portion is to be created may be provided on the second route creation screen D7.

The route creator 51c may create a go-around route portion that goes through at least one of the headlands E2a, E2b, and E2c two or more times. The route creator 51c may create a go-around route portion that goes through each of adjacent headlands. That is, the route creator 51c may create, in the headland area E1, a go-around route portion that goes around outside the central area C1 one or more times equal to or more than the number of headlands.

As described above, after creating the travel route L1 including the straight route portions L1a, the turning route portions L1b, and the go-around route portion L1c, the route creator 51c causes the storing unit 53 to store data of the position, etc. indicating the travel route L1. In addition, the route creator 51c sets the start position Ps and the goal position Pg of the travel route L1, and causes the storing unit 53 to store data indicating the positions Ps and Pg. Moreover, the route creator 51c calculates the estimated work distance over which ground work is to be performed by the working device 2 while the traveling vehicle body 3 is caused to travel based on all the straight route portions L1a and the go-around route portion L1c, and causes the storing unit 53 to store the calculation result. Furthermore, the route creator 51c sets vehicle speeds at which the traveling vehicle body 3 is caused to travel by automatic operation on the straight route portions L1a, the turning route portions L1b, and the go-around route portion L1c, and causes the storing unit 53 to store the vehicle speeds in association with data of the respective routes L1a, L1b, and L1c.

After the settings and the creation end as described above, as illustrated in FIG. 10B, the controller 51 causes the areas C1 and E1, the travel route L1, the start position Ps, the goal position Pg, and the estimated work distance to be displayed on the second route creation screen D7. The travel route L1 displayed here includes the straight route portions L1a, the turning route portions L1b, and the go-around route portion L1c.

After the travel route L1 is displayed on the second route creation screen D7, the user selects the track prediction key B14. Upon the selection, the path/track calculator 51d (FIG. 1) calculates a predicted work portion where ground work is predicted to be performed by the working device 2 while the traveling vehicle body 3 is caused to travel by automatic operation based on the travel route L1, that is, a predicted work track J1 of the working device 2.

More particularly, based on the travel route L1 and the working width of the working device 2, the path/track calculator 51d calculates the predicted work track J1. For example, the path/track calculator 51d determines, as the predicted work track J1, a passed portion (passed area) having the working width of the working device 2 when the traveling vehicle body 3 and the working device 2 are moved (moved forward or rearward) along the work route portion (the straight route portions L1a and the straight portions L1s of the go-around route portion L1c in FIG. 10C) where ground work is performed by the working device 2 in the travel route L1. In so doing, the widthwise center of the traveling vehicle body 3 and the center of the working width of the working device 2 are set on the work route portion.

Then, the path/track calculator 51d causes the storing unit 53 to store data of the predicted work track J1. As illustrated in FIG. 10C, the controller 51 causes the predicted work track J1 (hatched portion) to be displayed over the travel route L1 on the agricultural field map MP2 included in the second route creation screen D7 in a superimposed manner.

The path/track calculator 51d may, upon the route creator 51c creating the travel route L1, immediately calculate the predicted work track J1 and cause the storing unit 53 to store data of the predicted work track J1. Then, when the user selects the track prediction key B14, the controller 51 may read the data of the predicted work track J1 from the storing unit 53 and cause the predicted work track J1 to be displayed on the second route creation screen D7 based on the data. The path/track calculator 51d may determine, as the predicted work track J1, a passed portion having the working width of the working device 2 when the working device 2 is moved along not only the straight work route portions but also the curved work route portions in the travel route L1.

In FIG. 10C, the work route portions L1a and L1c (the straight route portions L1a and the go-around route portion L1c) where ground work is performed by the working device 2 while the traveling vehicle body 3 is caused to travel by automatic operation are created in the central area C1 and the headland E2a. Therefore, the predicted work track J1 is displayed along the work route portions L1a and L1c.

In contrast, if not performing work in the headland(s) is selected via the automatic headland work key B43 in the first route creation screen D6 in FIG. 9 and the work route portion L1a is created in the central area C1 only as illustrated in FIG. 11C, the predicted work track J1 is displayed along the work route portion L1a.

For example, assume that the user who has looked at the travel route L1 or the predicted work track J1 displayed on the second route creation screen D7 inputs numerical value(s) again for any of the setting items, and then selects the route creation key B13. In this case, the area setter 51b sets the areas C1 and E1 again and the route creator 51c creates the travel route L1 again in the procedure described above, and the areas C1 and E1 and/or the travel route L1, etc. displayed on the second route creation screen D7 are updated.

Assume that the user selects the start position Ps or the goal position Pg, moves the position Ps, Pg to a desired position on the agricultural field map MP2, and then selects the route creation key B13. Upon the selection, the area setter 51b sets the areas C1 and E1 again and the route creator 51c creates the travel route L1 again in the procedure described above, and the areas C1 and E1 and/or the travel route L1, etc. displayed on the second route creation screen D7 are updated.

Assume that, after the updating of the areas C1 and E1 and the travel route L1 described above, the user selects the track prediction key B14. Upon the selection, the path/track calculator 51d calculates the predicted work track again in the procedure described above, and the predicted work track J1 displayed on the second route creation screen D7 is updated.

After the travel route L1 is displayed on the second route creation screen D7, the user selects the next key B9. Upon the selection, the controller 51 transmits, via the communicator 54, data indicating the agricultural field map MP2, the areas C1 and E1, and the travel route L1 displayed on the screen D7 to the controller 60 (FIG. 1) via the in-vehicle network N1. In addition, the controller 51 causes the display operation interface 52 to display a travel control screen D8 illustrated in FIG. 12.

The travel control screen D8 displays a traveling state and a work state of the agricultural machine 1 in the automatic traveling work mode. The travel control screen D8 illustrated in FIG. 12 depicts an example of a traveling state and a work state of the agricultural machine 1 after a while since the start of the automatic traveling work mode. The travel control screen D8 displays the agricultural field map MP2, the travel route L1, the start position Ps, the goal position Pg, an agricultural machine symbol X2, the traveling state of the agricultural machine 1, a setting change key B20, a work track key B15, and a track clear key B16.

The controller 51 acquires, at predetermined interval(s) via the communicator 54, the actual position of the traveling vehicle body 3 detected by the positioning device 40, and causes the agricultural machine symbol X2 to be displayed at the position on the agricultural field map MP2 corresponding to the position of the traveling vehicle body 3 whenever acquired. That is, the agricultural machine symbol X2 in the travel control screen D8 indicates the actual position of the traveling vehicle body 3 of the agricultural machine 1.

For example, the user moves the agricultural machine 1 to the start position Ps by manual operation while looking at the travel control screen D8 and then performs a predetermined operation for entering the automatic traveling work mode via the mode switch 65 (FIG. 1). Upon the operation, the automatic controller 61 (FIG. 1) enters the automatic traveling work mode to perform ground work using the working device 2 while causing the traveling vehicle body 3 to travel by automatic operation, based on the travel route L1 received (acquired) from the agricultural work assistance apparatus 50 and the position of the traveling vehicle body 3 detected by the positioning device 40.

More particularly, first, the automatic controller 61 causes the working device 2 to start ground work while causing the traveling vehicle body 3 to travel by automatic operation from the start position Ps based on the straight route portions La1 and the turning route portions L1b. In so doing, the automatic controller 61 causes ground work to be performed by the working device 2 when causing the traveling vehicle body 3 to travel by automatic operation based on a straight route portion L1a, and causes the ground work performed by the working device 2 to be stopped when causing the traveling vehicle body 3 to travel (turn) by automatic operation based on a turning route portion L1b. Then, the working device 2 is caused to resume ground work when the traveling vehicle body 3 begins to travel by automatic operation based on the next straight route portion L1a. With this, the traveling vehicle body 3 travels straight back and forth in the central area C1 by automatic operation, and the ground work is performed by the working device 2 in the central area C1.

After that, based on the go-around route portion L1c and the position of the traveling vehicle body 3, the automatic controller 61 causes the working device 2 to perform ground work while causing the traveling vehicle body 3 to travel by automatic operation. With this, the traveling vehicle body 3 goes around outside the central area C1 by automatic operation, and ground work is performed by the working device 2 in the headland E2a (see FIG. 11D etc.) surrounding the central area C1.

FIGS. 13A to 13D are diagrams for explaining automatic steering of the agricultural machine 1. In the automatic traveling work mode, the automatic controller 61 calculates a deviation of the position of the traveling vehicle body 3 detected by the positioning device 40 from the travel route L1 while causing the traveling vehicle body 3 to travel automatically. If the deviation is less than a threshold (for example, FIG. 13A), the automatic controller 61 keeps the rotation angle of the steering shaft 31 (FIG. 1). If the deviation of the position of the traveling vehicle body 3 from the travel route L1 is greater than or equal to the threshold and the traveling vehicle body 3 is located on the left side with respect to the travel route L1 (for example, FIG. 13B), the automatic controller 61 causes the steering shaft 31 to rotate to steer the traveling vehicle body 3 to the right. If the deviation of the position of the traveling vehicle body 3 from the travel route L1 is greater than or equal to the threshold and the traveling vehicle body 3 is located on the right side with respect to the travel route L1 (for example, FIG. 13C), the automatic controller 61 causes the steering shaft 31 to rotate to steer the traveling vehicle body 3 to the left.

In the example described above, the steering angle of the steering 29 is changed based on the deviation of the position of the traveling vehicle body 3 from the travel route L1. However, as another example, the steering angle of the steering 29 may be changed based on an angle θg of a traveling direction F1 of the traveling vehicle body 3 with respect to the travel route L1 illustrated in FIG. 13D. In this case, for example, the automatic controller 61 calculates the traveling direction F1 of the traveling vehicle body 3 from changes in the position of the traveling vehicle body 3, and further calculates the angle θg of the traveling direction F1 with respect to the travel route L1. Then, if the angle θg is greater than or equal to a threshold, the automatic controller 61 causes the steering shaft 31 to rotate such that the traveling direction F1 of the traveling vehicle body 3 matches the direction of the travel route L1 (that is, θg="0°").

Alternatively, as another example, the automatic controller 61 may calculate a first steering angle based on the deviation of the position of the traveling vehicle body 3 from the travel route L1, and may calculate a second steering angle based on the travel route L1 and the traveling direction F1 of the traveling vehicle body 3. Then, the automatic controller 61 may calculate a third steering angle based on the first steering angle and the second steering angle, and cause the steering shaft 31 to rotate based on the third steering angle.

Additionally or alternatively, based on changes in the position of the traveling vehicle body 3, the automatic controller 61 calculates an actual vehicle speed of the traveling vehicle body 3 when causing the traveling vehicle body 3 to automatically travel based on the travel route L1. Then, the automatic controller 61 controls the driving of the transmission 5, the brake 6, and the prime mover 4 such that the actual vehicle speed matches the vehicle speed associated with the straight route portion L1a, the turning route portion L1b, or the go-around route portion L1c.

As described above, in the automatic traveling work mode, the automatic controller 61 of the agricultural machine 1 causes the traveling vehicle body 3 to be steered automatically while automatically changing the travel speed of the traveling vehicle body 3, based on the travel route L1 and the position of the traveling vehicle body 3. In addition, the automatic controller 61 causes the working device 2 to automatically perform and automatically stop agricultural work (ground work).

In the travel control screen D8 illustrated in FIG. 12, the user selects the work track key B15. Upon the selection, the path/track calculator 51d calculates an actual work track J2 along which the working device 2 has performed ground work, based on the position of the traveling vehicle body 3 detected by the positioning device 40 and the working width of the working device 2. The path/track calculator 51d causes the storing unit 53 to store data of the actual work track J2. As illustrated in FIG. 12, the controller 51 causes the actual work track J2 (hatched portion) to be displayed over the straight route portion L1a on the agricultural field map MP2 in a superimposed manner. When the user selects the track clear key B16, the controller 51 deletes the displayed actual work track J2.

When the work track key B15 is selected during the automatic traveling work mode, the path/track calculator 51d calculates the actual work track J2 from the start of the automatic traveling work mode to the present, and causes the storing unit 53 to store data of the work track J2. Then, the controller 51 cases the actual work track J2 to be displayed over the agricultural field map MP2. If the selection of the work track key B15 continues, the calculation and display of the actual work track J2 and storage of the data are performed at predetermined interval(s). With this, on the travel control screen D8, the displayed position of the agricultural machine symbol X2 indicating the position of the traveling vehicle body 3 is updated on a real-time basis and the actual work track J2 extends.

After entering the automatic traveling work mode, the path/track calculator 51d may calculate the actual work track J2 at predetermined interval(s) and may cause the storing unit 53 to store the data of the work track J2. Then, when the user selects the work track key B15, the controller 51 may read the data of the actual work track J2 from the storing unit 53 and cause the actual work track J2 be displayed on the travel control screen D8, based on the data.

The modes which can be performed by the agricultural machine 1 include, as described earlier, the automatic steering work mode in addition to the automatic traveling work mode. In the automatic traveling work mode, the steering of the traveling vehicle body 3 and the changing of the travel speed are performed automatically (which is, i.e., an automatic operation traveling state, simply referred to also as an automatic traveling state). In contrast, in the automatic steering work mode, the steering of the traveling vehicle body 3 is performed automatically (that is, an automatic steering state), and the travel speed is changed manually.

In the automatic traveling work mode and the automatic steering work mode, ground work is performed automatically by the working device 2 as appropriate. In addition to the automatic traveling work mode and the automatic steering work mode, work modes which can be performed by the agricultural machine 1 include a manual operation work mode. In the manual operation work mode, the user of the agricultural machine 1 changes the travel speed of the traveling vehicle body 3 by operating the accelerator or the brake of the operation unit 32 and steers the traveling vehicle body 3 by operating the steering handle 30. In the manual operation work mode, the performing and stopping of ground work by the working device 2 may be operated by the user via the operation unit 62 or may be controlled based on the position of the traveling vehicle body 3 and the travel routes L1 and L2 by the automatic controller 61.

Besides the modes mentioned above, for example, an automatic traveling mode in which the traveling vehicle body 3 is caused to travel by automatic operation or an automatic steering mode in which the traveling vehicle body 3 is steered automatically, without performing ground work by the working device 2 automatically, can be performed by the agricultural machine 1.

For example, when the user selects the setting change key B20 on the travel control screen D8 illustrated in FIG. 12, the controller 51 of the agricultural work assistance apparatus 50 causes the display operation interface 52 to display the home screen D1 illustrated in FIG. 3. Then, when the user selects the automatic steering key B2*b* on the home screen D1, the controller 51 causes the display operation interface 52 to display a selection screen (not illustrated) to select whether to maintain, or discard, settings about the automatic traveling work mode that are already set and valid here (the content of settings having been made on the screens D2 to D7 illustrated in FIGS. 4 to 10C, etc.) If the user selects maintaining the valid settings about the automatic traveling work mode by performing a predetermined operation on the selection screen, the controller 51 causes the display operation interface 52 to display a third route creation screen D10 illustrated in FIG. 14A.

The third route creation screen D10 is a screen to perform settings about the automatic steering work mode. The third route creation screen D10 displays the agricultural field map MP2, the agricultural machine symbol X1, a message indicating an input operation procedure, a plurality of setting items and numerical value input fields thereof, an automatic steering (AS) headland work key B47, the route creation key B13, the track prediction key B14, a route change key B21, the plus key B45, the minus key B46, the next key B9, and the back key B8.

Figure 14A:
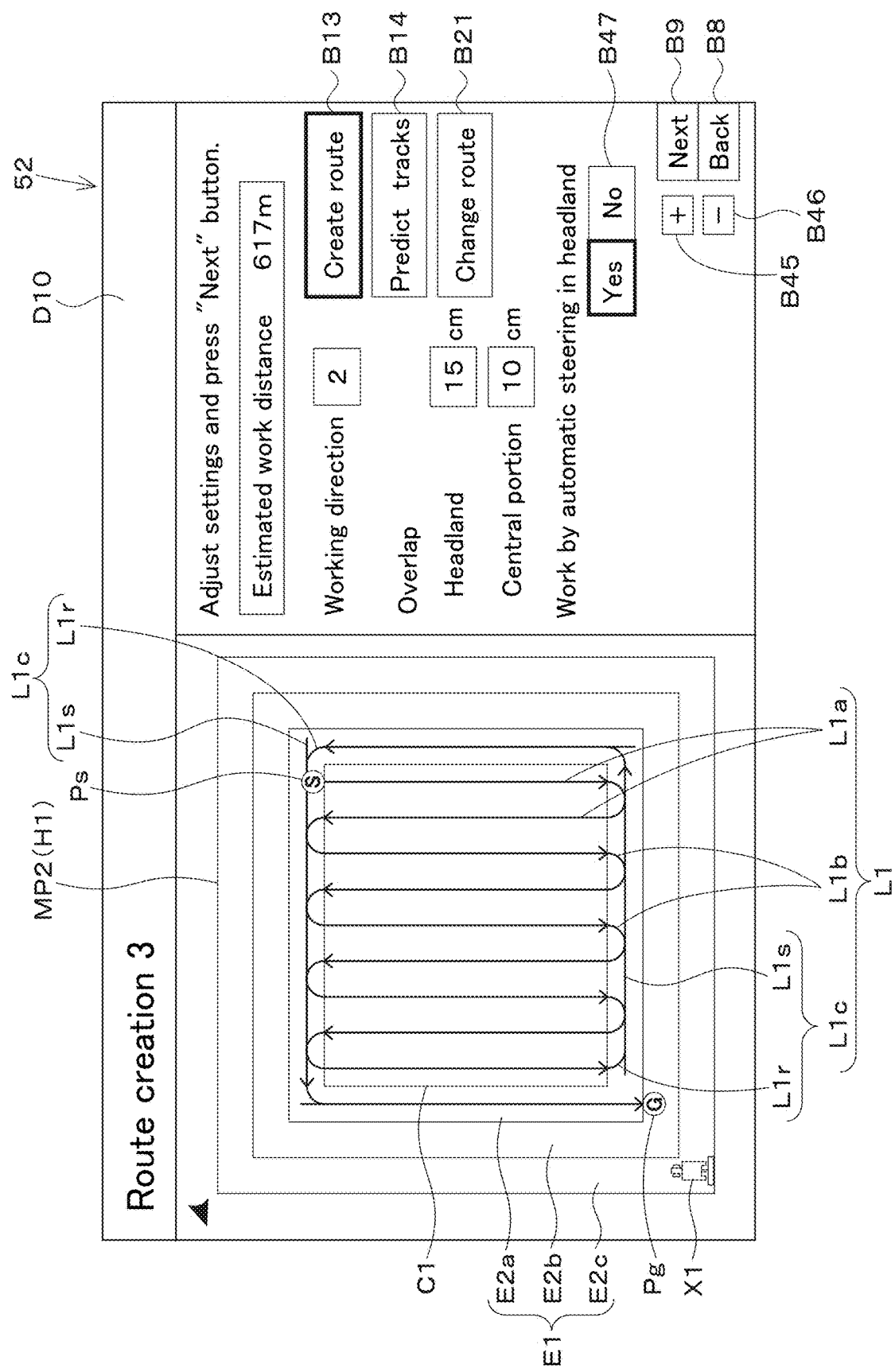
FIG. 14A is a diagram illustrating an example of a third route creation screen of the agricultural work assistance apparatus.

Based on inputs on the second route creation screen D7 (FIG. 10B, etc.) described earlier, on the agricultural field map MP2 included in the third route creation screen D10, the areas C1 and E1 set by the area setter 51*b*, the travel route L1 created by the route creator 51*c*, and the start position Ps and the goal position Pg of the travel route L1 are displayed. The travel route L1 displayed in FIG. 14A is an automatic operation route along which the traveling vehicle body 3 is caused to travel by automatic operation in the automatic traveling work mode.

The plurality of setting items in the third route creation screen D10 include the aforementioned estimated work distance, the aforementioned working direction, the aforementioned overlap for headlands, and the aforementioned overlap for the central portion. Among them, in the numerical value input fields of the working direction, the overlap for headlands, and the overlap for the central portion, the numerical values having been inputted on the second route creation screen D7 (FIG. 10B, etc.) described earlier are displayed. The numerical values displayed in the numerical value input fields of the working direction, the overlap for headlands, and the overlap for the central portion are changeable by operating the plus key B45 or the minus key B46. In the numerical value input field of the estimated work distance, the numerical value calculated based on the travel route L1 by the route creator 51*c* is displayed.

The AS headland work key B47 is used to select whether or not to perform work using the working device 2 while performing automatic steering of the traveling vehicle body 3 of the agricultural machine 1 in headland(s) set in the agricultural field map MP2. The route change key B21 is used to change the use of a travel route.

Figure 14B:
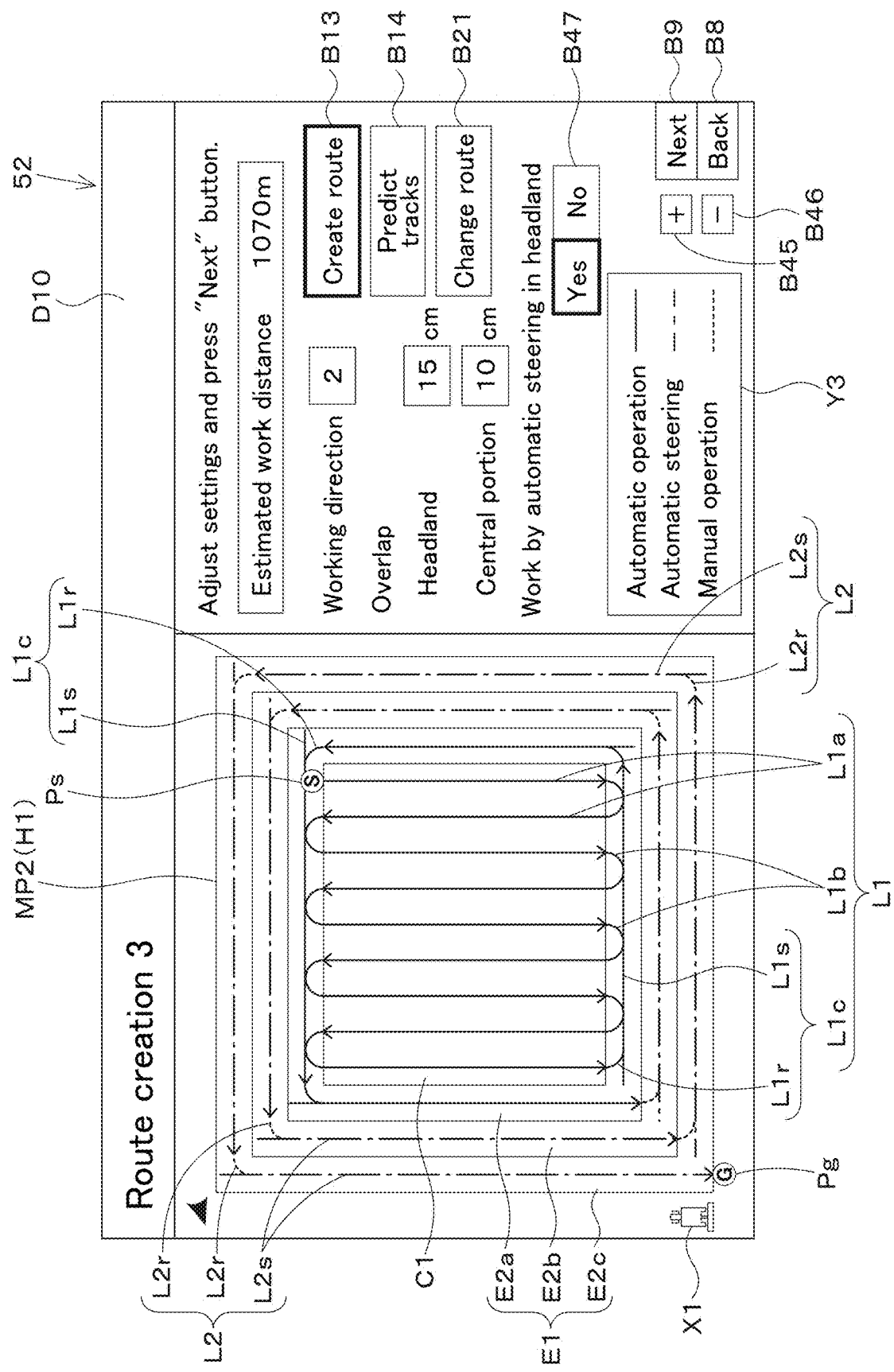
FIG. 14B is a diagram illustrating an example of the third route creation screen of the agricultural work assistance apparatus.

The user inputs a numerical value for each setting item, selects a work state at the headland via the AS headland work key B47, and thereafter selects the route creation key B13. Upon the selection, as illustrated in FIG. 14B, based on the areas C1 and E1, the working width of the working device 2, the overlap for the headlands, and the selection state of the AS headland work key B47, the route creator 51*c* (FIG. 1) creates a travel route L2 for the automatic steering work mode in the agricultural field map MP2. In so doing, for example, if it is selected via the AS headland work key B47 to perform work at headland(s), as illustrated in FIG. 15, the route creator 51*c* creates the travel route L2 for going around outside the central area C1 in the headlands E2*b* and E2*c* where the travel route L1 is not created on the agricultural field map MP2.

More particularly, for example, the route creator 51*c* creates, in the inner headland E2*b*, a travel route L2 for going around outside the central area C1 such that the travel route L2 continues from one end of the travel route L1 that is not provided with the start position Ps (distal end of the go-around route portion L1*e*). Next, the route creator 51*c* creates, in the outer headland E2*c*, another travel route L2 for going around outside the central area C1 such that the other travel route L2 continues from the distal end of the travel route L2 been created in the inner headland E2*b*. Then, the route creator 51*c* sets the goal position Pg again at the distal end of the travel route L2 created in the outer headland E2*c*.

Similarly to the straight portions L1*s* and the turning portions L1*r* of the go-around route portion L1*c*, the travel route L2 includes a plurality of straight portions L2*s* that are substantially straight and a plurality of turning portions L2*r* that are curved with a predetermined curvature or greater. The straight portions L2*s* are created on the widthwise centerline of each of the headlands E2*b* and E2*c*. Each of the turning portions L2*r* is a route portion that connects one of straight portions L2*s* (one portion of the travel route L2) which are arranged next to each other in the direction of travel of the travel route L2 and which extend in different directions (different in direction of travel) and the other of the straight portions L2*s* (another portion of the travel route L2) to cause the traveling vehicle body 3 to turn from the one of the straight portions L2*s* to the other.

Although the turning portion L2*r* has a shape of an arc in the example illustrated in FIG. 15, etc., this does not imply any limitation. The turning portion L2*r* may be created in any shape as appropriate. Depending on the shape of the contour H1 of the agricultural field, the travel route L2 may include, in addition to the straight portions L2*s* and the turning portions L2*r*, a gentle curved portion (curved route, not illustrated in FIGS. 14B to 14E and 15, see a curved portion L2*c* in FIGS. 23A and 23B, etc. to be described later) that is curved with a curvature less than a predetermined value.

In the automatic steering work mode of the agricultural machine 1, the user operates the accelerator or the brake included in the operation unit 62, and, based on this operation, the automatic controller 61 controls the transmission 5 and/or the brake 6 (FIG. 1) to change the travel speed of the traveling vehicle body 3 and cause the traveling vehicle body 3 to travel along the travel route(s) L2. Then, when the traveling vehicle body 3 travels along a straight portion L2*s* (or a curved portion) of the travel route L2, based on the position of the traveling vehicle body 3 detected by the positioning device 40 and the straight portion L2*s* (or the gentle curved portion), the automatic controller 61 controls the steering 29 to steer the traveling vehicle body 3 automatically. When the traveling vehicle body 3 travels along a turning portion L2r of the travel route L2, the user operates the steering handle 30 (FIG. 1) to steer the traveling vehicle body 3 manually.

That is, each straight portion L2s (or the curved portion) of the travel route L2 is an automatic steering route where the steering of the traveling vehicle body 3 of the agricultural machine 1 is performed automatically and the travel speed of the traveling vehicle body 3 is changed manually. Each turning portion L2r of the travel route L2 is a manual operation route where the traveling vehicle body 3 of the agricultural machine 1 is steered manually and the travel speed is changed manually.

As described earlier, in a case where performing work in the headland(s) is selected via the AS headland work key B47, when the traveling vehicle body 3 travels along a straight portion L2s (or a curved portion) of the travel route L2 (during automatic steering), the automatic controller 61 causes the working device 2 to perform ground work. When the traveling vehicle body 3 travels along a turning portion L2r of the travel route L2 (during manual steering), usually, the automatic controller 61 causes the raising/lowering device 8 to raise the working device 2 such that ground work is not performed by the working device 2.

That is, the straight portion L2s (or the curved portion) of the travel route L2 is a work route portion where ground work is performed by the working device 2 while the traveling vehicle body 3 goes around outside the central area C1. The headland E2b, E2c in which the travel route L2 is created is also a work area where ground work is performed by the working device 2 while the traveling vehicle body 3 goes around outside the central area C1. Furthermore, the headland area E1, which includes the headland E2a in which the travel route L1 is created and the headlands E2b and E2c, is also a work area.

Upon creating the travel route L2 in addition to the travel route L1 as described above, the route creator 51c causes the storing unit 53 to store data of the position, etc. indicating the travel route L2 in association with the data of the travel route L1. The route creator 51c causes the storing unit 53 to store data of the goal position Pg whose settings have been changed, in association with the data of the start position Ps. Furthermore, the route creator 51c calculates again the estimated work distance over which ground work is to be performed by the working device 2 while the traveling vehicle body 3 is caused to travel based on the travel routes L1 and L2, and causes the storing unit 53 to store the calculation result (updating of the estimated work distance).

Upon completion of adding the travel route L2 or making settings related thereto, as illustrated in FIG. 14B, the controller 51 causes the travel routes L1 and L2, the start position Ps, the goal position Pg, and the estimated work distance to be displayed on the agricultural field map MP2 included in the third route creation screen D10. The controller 51 causes the travel routes L1 and L2 to be displayed on the agricultural field map MP2 differently from each other.

Furthermore, the controller 51 causes a legend Y3, which shows the uses of portions of the travel routes L1 and L2 and shows how these uses are displayed, to be displayed on the third route creation screen D10. In FIG. 14B, etc., the legend Y3 indicates that the travel route L1 is an automatic operation route and is represented by solid-line arrows, the straight portions L2s of the travel route L2 are automatic steering routes and are represented by dot-and-dash-line arrows, and the turning portions L2r of the travel route L2 are manual operation routes and are represented by broken-line arrows. In a case where the display operation interface 52 is capable of performing color display, lines or arrows representing the automatic operation route, the automatic steering route, and the manual operation route may be displayed in different colors.

After the travel routes L1 and L2 are displayed on the third route creation screen D10, for example, the user selects the track prediction key B14. In this case, the path/track calculator 51d (FIG. 1) calculates, based on the travel route L1, the predicted work track(s) J1 of the working device 2 during automatic operation (automatic traveling work mode), and calculates, based on the travel route L2, predicted work track(s) J3 of the working device 2 during automatic steering (automatic steering work mode). The method of calculating the predicted work track(s) J1 during automatic operation has already been described.

To calculate the predicted work track J3 during automatic steering, for example, first, the path/track calculator 51d determines, as the predicted work track J3 during automatic steering, a passed portion (passed area size) having the working width of the working device 2 when the traveling vehicle body 3 and the working device 2 are moved (moved forward or rearward) along the work route portion (the straight portions L1s in FIG. 15) where ground work is performed by the working device 2 in the travel route L2. In so doing, the widthwise center of the traveling vehicle body 3 and the center of the working width of the working device 2 are set on the work route portion. Then, the path/track calculator 51d causes the storing unit 53 to store data of each of the predicted work tracks J1 and J3.

Figure 14C:
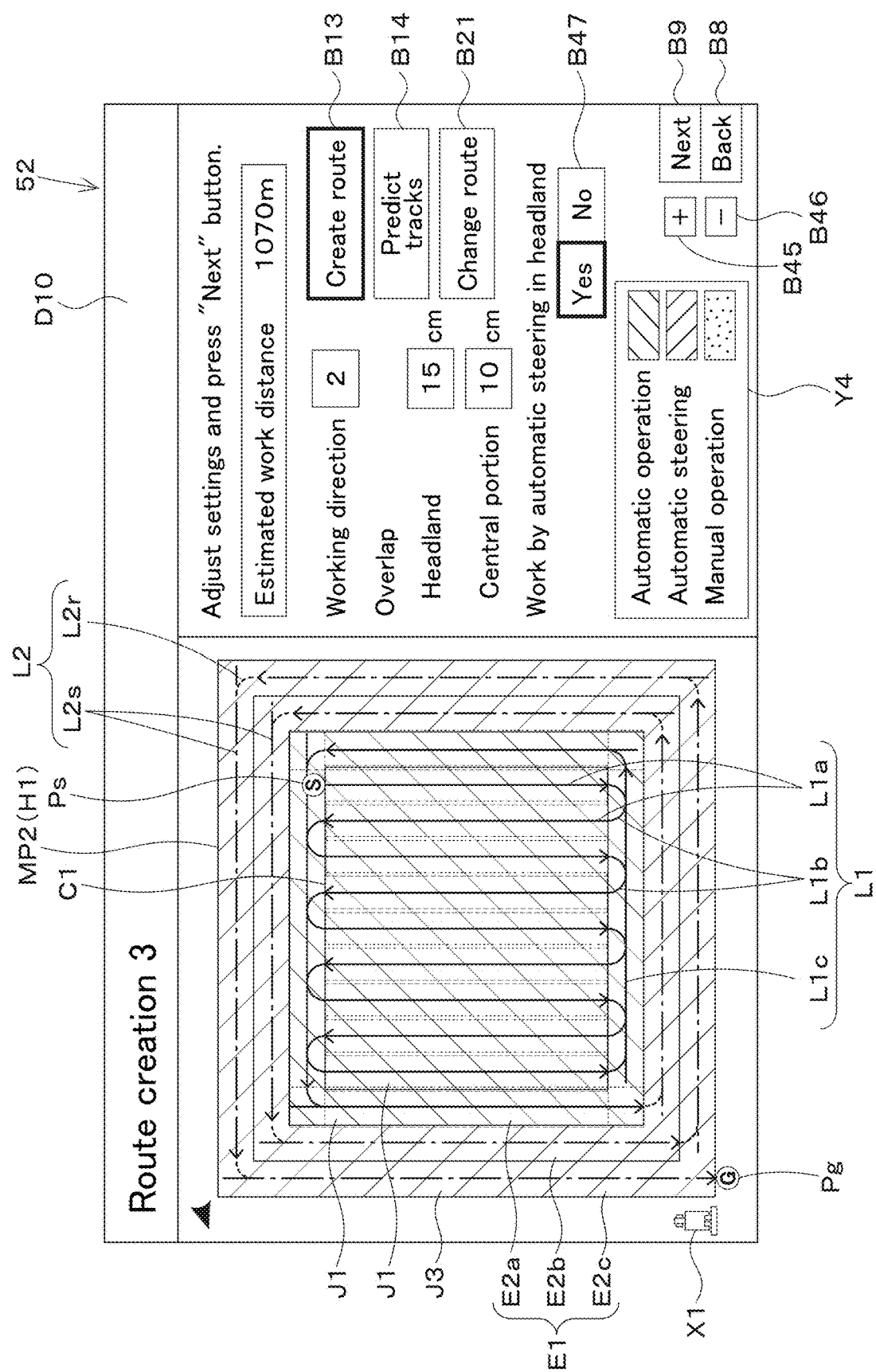
FIG. 14C is a diagram illustrating an example of the third route creation screen of the agricultural work assistance apparatus.

In addition, as illustrated in FIG. 14C, the controller 51 causes the predicted work track J1 during automatic operation to be displayed over the travel route L1 on the agricultural field map MP2 included in the third route creation screen D10 in a superimposed manner. In addition, the controller 51 causes the predicted work track J3 during automatic steering to be displayed over the travel route L2 in a superimposed manner. In FIG. 14C, since the work route portions L1a and L1c are created in the central area C1 and the headland E2a, the predicted work track J1 during automatic operation is displayed along the work route portions L1a and L1c. In addition, since the work route portion L2 is created in the headlands E2b and E2c, the predicted work track J3 during automatic steering is displayed along the work route portion L2.

In addition, the controller 51 causes the predicted work track J1 during automatic operation and the predicted work track J3 during automatic steering to be displayed on the agricultural field map MP2 in different manners from each other. Furthermore, the controller 51 causes a legend Y4, which shows how each of the predicted work tracks J1 and J3 is displayed, to be displayed on the third route creation screen D10. How a predicted work track during manual operation of the agricultural machine 1 is displayed is also shown in the legend Y4. In this example, the predicted work track during automatic operation, the predicted work track during automatic steering, and the predicted work track during manual operation are displayed in different hatch patterns. However, in a case where the display operation interface 52 is capable of performing color display, the respective predicted work tracks may be filled with different colors, or shades of the colors may be different from one another (the same applies to an actual work track during automatic operation, an actual work track during automatic steering, and an actual work track during manual operation, which will be described later).

As described above, the route creator 51c sets portion(s) of a series of travel route(s) L1 and/or L2 created in the agricultural field map MP2 as an automatic operation route L1 (straight route portions L1a, turning route portions L1b, go-around route portion L1c). In addition, the route creator 51c sets another portion(s) of the travel route(s) L1 and/or L2 as an automatic steering route L2s (straight portions L2s of the travel route L2) or a manual operation route L2r (turning portions L2r of the travel route L2). In addition, the route creator 51c sets portion(s) of the series of travel route(s) L1 and/or L2 as the work route portions L1a, L1s, and L2s (straight route portion L1a of the travel route L1, straight portions L1s of the go-around route portion L1c, straight portions L2s of the travel route L2).

The route creator 51c causes the storing unit 53 to store the setting information of the routes described above in association with their corresponding routes. As another example, the controller 51 may detect, based on the data of each route stored in the storing unit 53, the position and shape of each route, and determine, based on the detection result, the use of each route (that is, automatic operation route L1, automatic steering route L2s, work route portions L1a, L1s, L2s). Specifically, it is only necessary that, for example, the controller 51 determine the travel route L1 created in the central area C1 and the innermost headland E2a as an automatic operation route, determine the straight portions L2s of the travel route L2 created in the other headlands E2b and E2c as an automatic steering route, and determine the straight route portions L1a and the straight portions L1s and L2s, which are straight, as the work route portions.

As described earlier, the work route portions L1a and L1s are each set as the automatic operation route, and the work route portions L2s are each set as the automatic steering route. However, in a state in which any of the work route portions L1a, L1s, and L2s is selected, the user can change the setting of the selected route to the automatic steering route, the automatic operation route, or the manual operation route by thereafter performing a predetermined operation on the route change key B21.

Specifically, for example, on the third route creation screen D10, the user taps any route among the plurality of straight route portions L1a and the plurality of straight portions L1s of the go-around route portion L1c, each of which is a work route portion and an automatic operation route, to select this route. Then, the user taps the route change key B21 once, and, in response thereto, the route that is in the selected state changes to the automatic steering route. When the user further taps the route change key B21 once, the route that is in the selected state changes into the manual operation route. When the user further taps the route change key B21 once, the route that is in the selected state changes into the automatic operation route.

In accordance with such a change in setting of the use of the route, the controller 51 changes the manner in which the route is displayed, and the route creator 51c causes the storing unit 53 to store the content of this setting change. Also for the plurality of straight portions L2s of the travel route L2, each of which is a work route portion and an automatic steering route, the set use can be changed through the same procedure as above, and the manner of display and the content of storage can be changed therethrough. The display operation interface 52 and the route creator 51c correspond to a route changer that changes routes as described above.

Figure 14D:
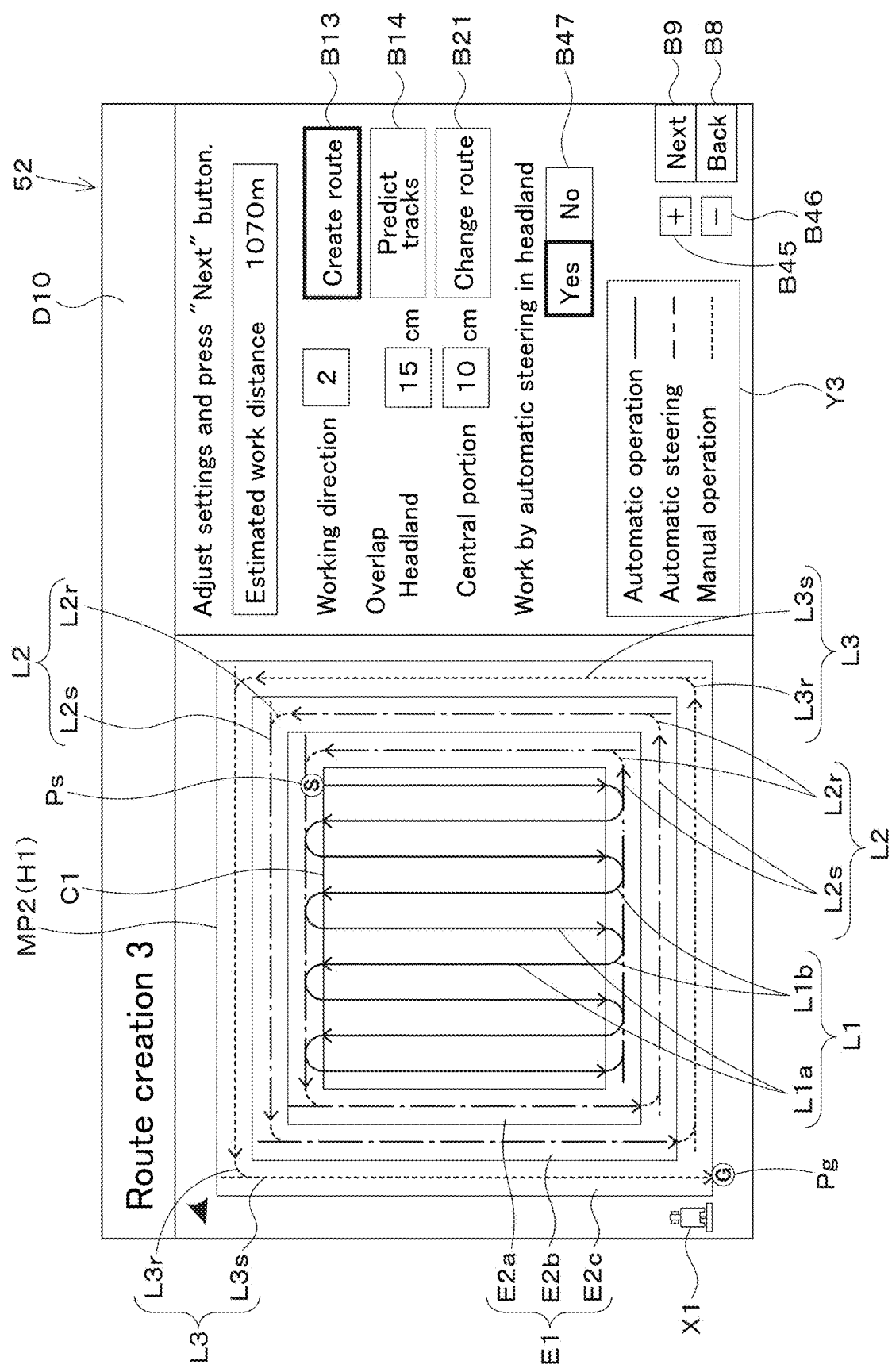
FIG. 14D is a diagram illustrating another example of the third route creation screen of the agricultural work assistance apparatus.

For example, each of the straight portions L1s included in the go-around route portion L1c, which is created in the innermost headland E2a among the plurality of headlands E2a, E2b, and E2c set in the agricultural field map MP2 illustrated in FIG. 14B, is set as the automatic operation route together with each of the turning portions L1r included in the go-around route portion L1c. Each of the straight portions L1s created in the headland E2a is changed from the automatic operation route in the automatic steering route through the operation procedure described above, for example. In this case, as illustrated in FIG. 14D, the controller 51 changes the display of each of the straight portions L1s created in the headland E2a illustrated in FIG. 14B in the display of the straight portion L2s included in the travel route L2 for the automatic steering work mode. In addition, in accordance with this change, as illustrated in FIG. 14D, the controller 51 changes the display of each of the turning portions L1r created in the headland E2a illustrated in FIG. 14B in the display of the turning portion L2r (display of the manual operation route) included in the travel route L2 for the automatic steering work mode. That is, as illustrated in FIG. 14D, the controller 51 changes the display of the go-around route portion L1c created in the headland E2a illustrated in FIG. 14B in the display of the travel route L2 for the automatic steering work mode. The route creator 51c causes the storing unit 53 to store the content of this setting change of the route.

Each of the straight portions L2s included in the travel route L2 created in the outermost headland E2c in the agricultural field map MP2 illustrated in FIG. 14B is set as the automatic steering route together with each of the turning portions L2r included in the travel route L2. Each of the straight portions L2s created in the headland E2c is changed from the automatic steering route in the manual operation route through the operation procedure described above, for example. In this case, as illustrated in FIG. 14D, the controller 51 changes the display of each of the straight portions L2s created in the headland E2c illustrated in FIG. 14B in the display of a straight portion L3s included in a manual operation route L3 for the manual operation work mode. In accordance with this change, as illustrated in FIG. 14D, the controller 51 changes the display of each of the turning portions L2r created in the headland E2c illustrated in FIG. 14B in the display of a turning portion L3r (display of the manual operation route) included in the manual operation route L3 for the manual operation work mode. That is, as illustrated in FIG. 14D, the controller 51 changes the display of the travel route L2 created in the headland E2c illustrated in FIG. 14B in the display of the manual operation route L3 for the manual operation work mode. The route creator 51c causes the storing unit 53 to store the content of this setting change of the route.

The display operation interface 52 displays portions of the travel routes L1, L2, and L3 that are settable as an automatic steering route including portions whose settings can be changed (in this example, the straight portions L2s, L1s, and L3s and the straight route portions L1a). These portions L2s, L1s, L3s, and L1a settable as an automatic steering route may be displayed by the display operation interface 52 in a manner different from that of the other portions. In addition, portions of the travel routes L1, L2, and L3 that are not settable as an automatic steering route (in this example, the turning route portions L1b and the turning portions L1r, L2r, and L3r) may be displayed in such a manner that they cannot be selected through a selection operation on the display operation interface 52.

For example, as illustrated in FIG. 14D, after making a route use setting change, the user selects the track prediction key B14. In this case, based on the travel routes L1, L2, and L3, the path/track calculator 51d calculates the predicted work track J1 during automatic operation, the predicted work track J3 during automatic steering, and the predicted work track J4 during manual operation. Then, based on the calculation result, the controller 51 causes each of the predicted work tracks J1, J3, and J4 to be displayed on the agricultural field map MP2.

Figure 14E:
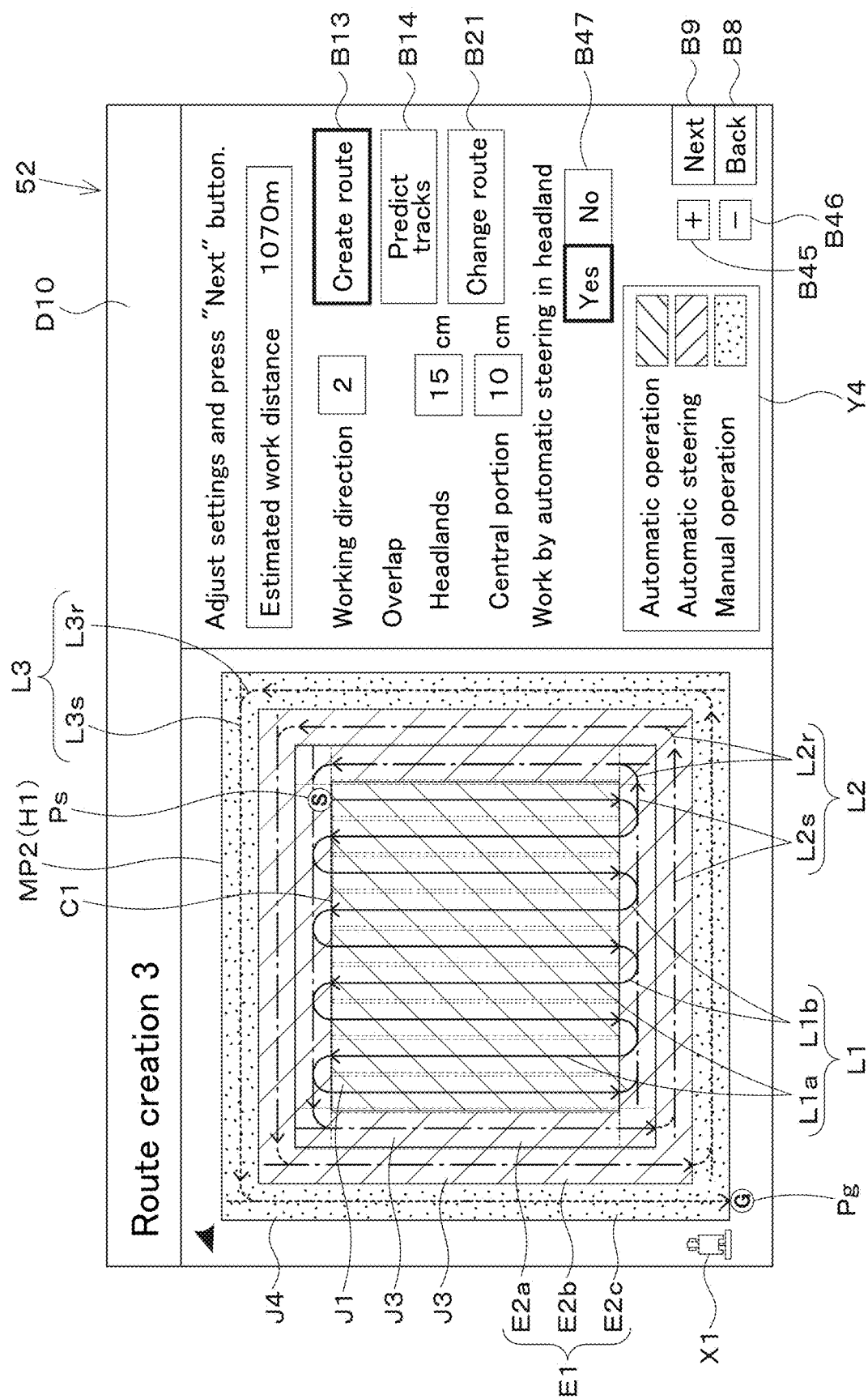
FIG. 14E is a diagram illustrating another example of the third route creation screen of the agricultural work assistance apparatus.

As a result, as illustrated in FIG. 14E, based on the automatic operation route L1a, the predicted work track J1 during automatic operation is drawn in the central area C1 only. Furthermore, based on the automatic steering route L2s, the predicted work track J3 during automatic steering is drawn in the inner headlands E2a and E2b. Further, based on the straight portions L3s of the manual operation route L3, the predicted work track J4 during manual operation is drawn in the outermost headland E2c.

For example, on the third route creation screen D10 illustrated in FIG. 14B, the user selects the next key B9. In this case, the controller 51 transmits, via the communicator 54, data indicating the agricultural field map MP2, the areas C1 and E1, and the travel routes L1 and L2 displayed on the screen D10 to the controller 60 (FIG. 1) via the in-vehicle network N1. The controller 51 causes the display operation interface 52 to display a travel control screen D11 illustrated in FIG. 16.

Figure 16:
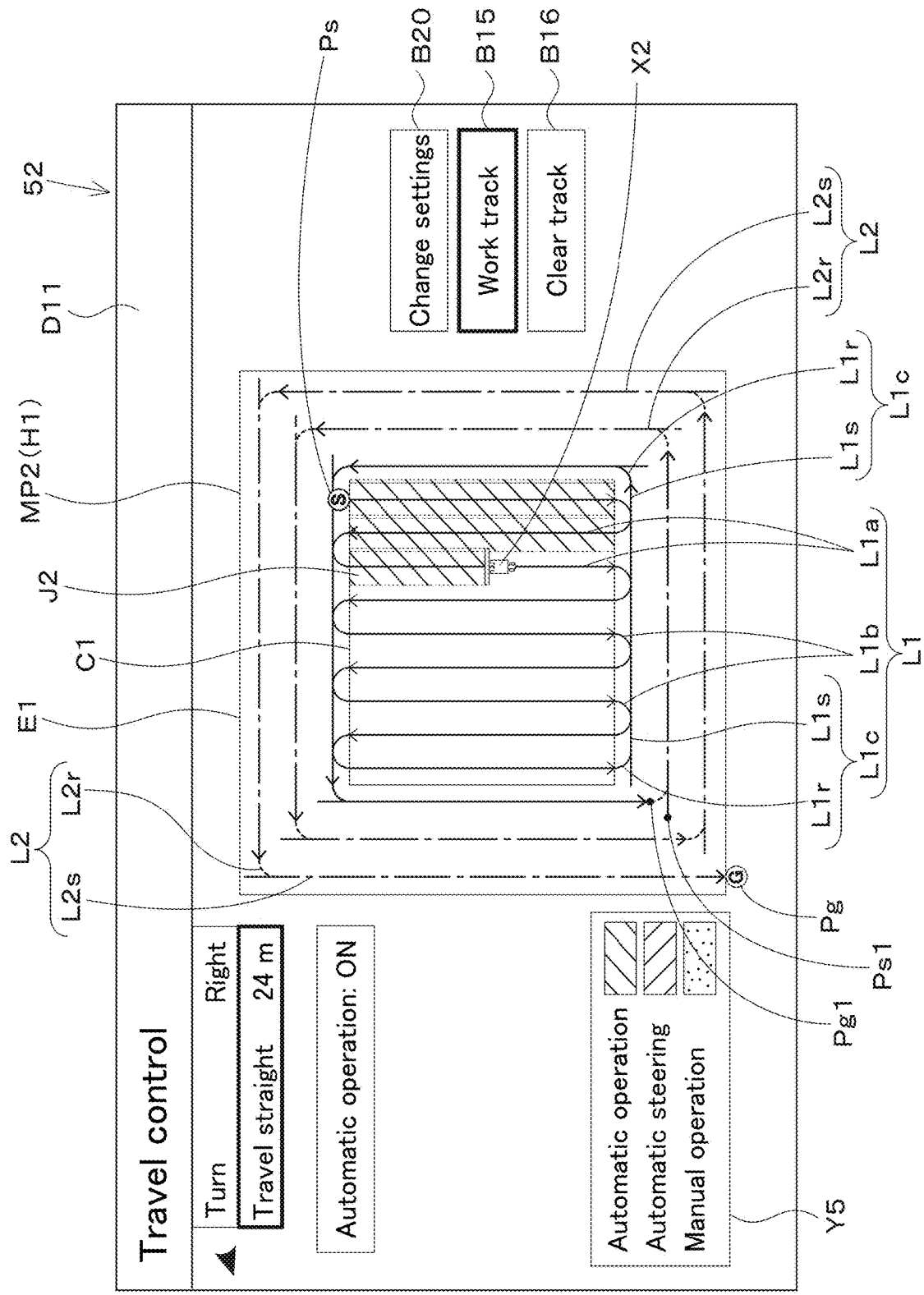
FIG. 16 is a diagram illustrating another example of the travel control screen of the agricultural work assistance apparatus.

The travel control screen D11 is a screen operable to display a traveling state and a work state of the agricultural machine 1 in a case where the plural work modes described above are used in combination. In FIG. 16, an example of a traveling state and a work state of the agricultural machine 1 after a while since the start of the automatic traveling work mode from the start position Ps is illustrated. The travel control screen D11 displays the agricultural field map MP2, the travel routes L1 and L2, the start position Ps, the goal position Pg, the agricultural machine symbol X2, the traveling state of the agricultural machine 1, the setting change key B20, the work track key B15, the track clear key B16, and a legend Y5.

The legend Y5 shows how the track resulting from actual work performed by the working device 2 during automatic operation (automatic traveling work mode) of the agricultural machine 1 is displayed (automatic operation; hatched with oblique lines sloping down leftward), how the track resulting from actual work performed by the working device 2 during automatic steering (automatic steering work mode) thereof is displayed (automatic steering; hatched with oblique lines sloping down rightward), and how the track resulting from actual work performed by the working device 2 during manual operation (manual operation work mode) thereof is displayed (manual operation; hatched with dots).

For example, the user moves the agricultural machine 1 to the start position Ps by manual operation while viewing the travel control screen D11 and then performs a predetermined operation for entering the automatic traveling work mode via the mode switch 65 (FIG. 1). Upon the operation, as described earlier, the automatic controller 61 (FIG. 1) enters the automatic traveling work mode to perform ground work using the working device 2 while causing the traveling vehicle body 3 to travel by automatic operation, based on the position of the traveling vehicle body 3 detected by the positioning device 40 and the travel route L1. Furthermore, the controller 51 of the agricultural work assistance apparatus 50 causes the travel control screen D11 to display an indication that the agricultural machine 1 is under automatic operation (displayed above the legend Y5) and updates, based on the position of the traveling vehicle body 3, the display position of the agricultural machine symbol X2.

When the user selects the work track key B15, the path/track calculator 51d calculates, based on the position of the traveling vehicle body 3 and the working width of the working device 2, the actual work track J2 during automatic operation along which the working device 2 has performed ground work, and causes the storing unit 53 to store data of the actual work track J2. Then, as illustrated in FIG. 16, the controller 51 causes the actual work track J2 to be displayed over the straight route portions L1a in a superimposed manner.

Since the automatic traveling work mode is performed by the automatic controller 61, the traveling vehicle body 3 travels straight back and forth in the central area C1 by automatic operation, and the ground work is performed by the working device 2 in the central area C1. Next, the traveling vehicle body 3 travels along the headland E2a surrounding the central area C1 by automatic operation, and the ground work is performed by the working device 2 in the headland E2a.

Figure 17A:
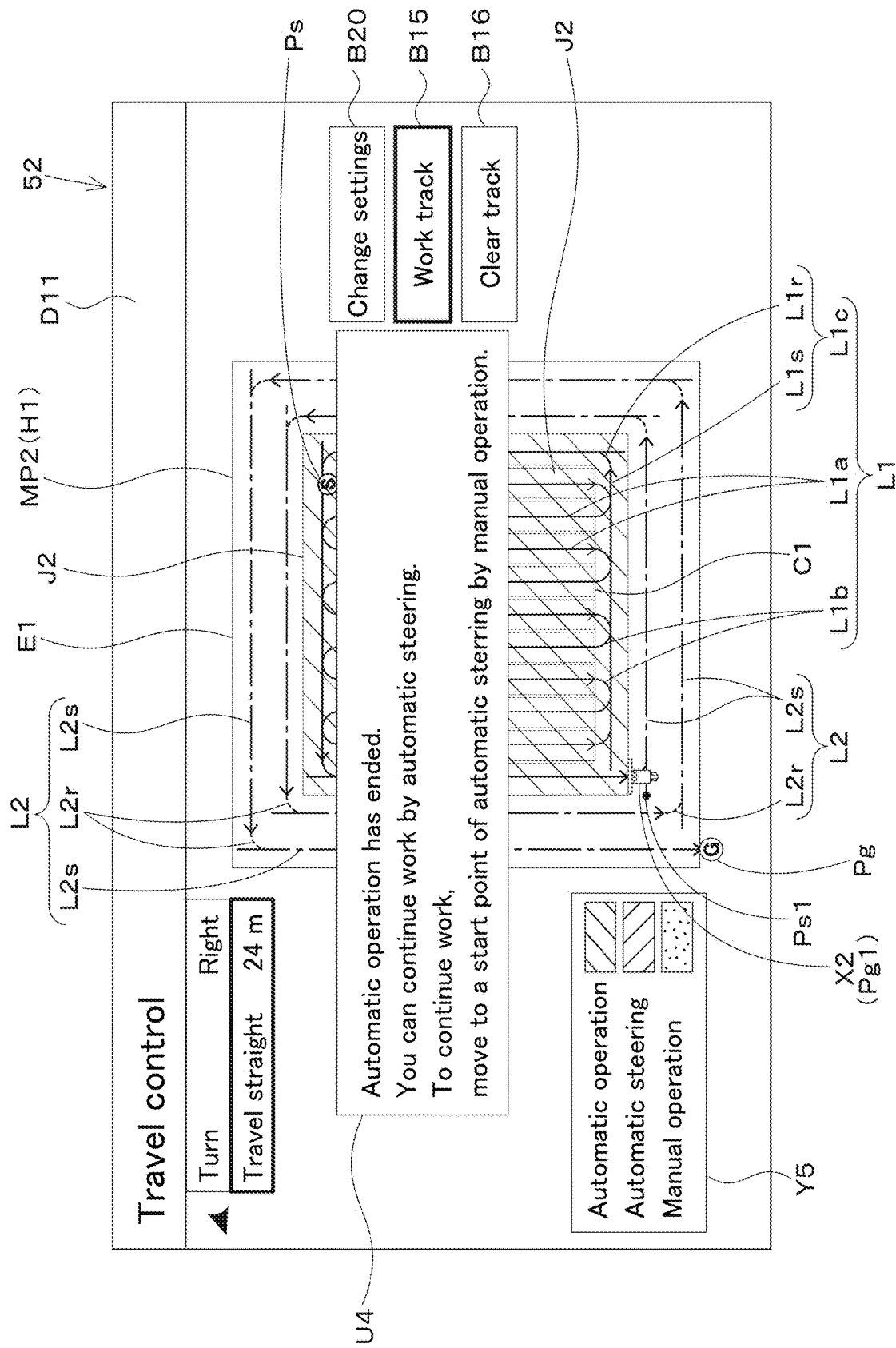
FIG. 17A is a diagram illustrating another example of the travel control screen of the agricultural work assistance apparatus.

Then, as illustrated in FIG. 17A, upon completion of the ground work performed by the working device 2 up to a termination point (end position of the ground work under automatic operation) Pg1 of the travel route L1, the automatic controller 61 causes the raising/lowering device 8 to raise the working device 2 to stop the ground work performed by the working device 2 and terminate the automatic traveling work mode. The notifier 51g of the agricultural work assistance apparatus 50 causes a notification U4 including the message "Automatic operation has ended. You can continue work by automatic steering. To continue work, move to a start point of automatic steering by manual operation." to appear at the central portion of the travel control screen D11. That is, the user is notified by the notifier 51g and the display operation interface 52 that automatic operation of the agricultural machine 1 has ended, it is possible to continue automatic steering of the agricultural machine 1, and, it is necessary to move the traveling vehicle body 3 to the automatic steering start point by manual operation.

After looking at the above notification U4, the user, for example, performs a multi-point turn of the traveling vehicle body 3 manually and moves the traveling vehicle body 3 to the start point Ps1 of the automatic steering work mode (the start point of the first straight portion L2s of the travel route L2) for the purpose of continuing the ground work by entering the automatic steering work mode.

More particularly, for example, first, the user operates the steering handle 30 and the accelerator/brake of the operation unit 62 to cause the traveling vehicle body 3 to make a turn along the turning portion L2r of the travel route L2 connected to the termination point Pg1 of the travel route L1. Next, the user operates the steering handle 30 and the accelerator, etc. to cause the traveling vehicle body 3 to travel rearward along the straight portion L2s connected to this turning portion L2r and bring the orientation of the traveling vehicle body 3 into alignment with the traveling direction of this straight portion L2s gradually. In a case where the user operates the mode switch 65 to start the automatic steering work mode before this rearward traveling of the traveling vehicle body 3, when the user causes the traveling vehicle body 3 to travel rearward by operating the accelerator without operating the steering handle 30, the automatic controller 61 performs, based on the straight portion L2s and the position of the traveling vehicle body 3, automatic steering of the traveling vehicle body 3.

Figure 17B:
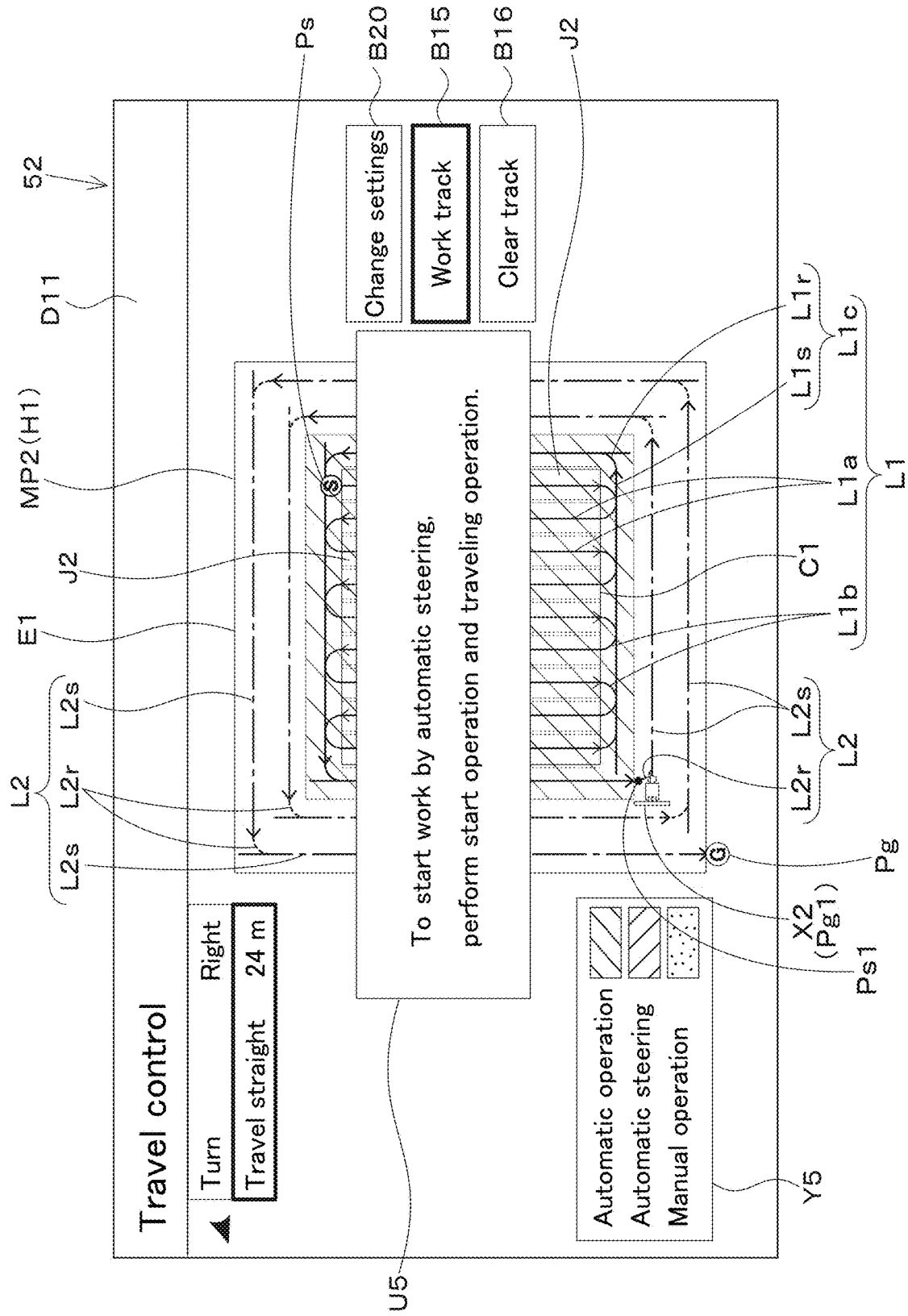
FIG. 17B is a diagram illustrating another example of the travel control screen of the agricultural work assistance apparatus.

Then, when the user stops the traveling vehicle body 3 at the start point Ps1 of the automatic steering work mode by operating the brake (vehicle speed=zero), as illustrated in FIG. 17B, the notifier 51g causes a notification U5 including the message "To continue work by automatic steering, perform start operation and traveling operation." to appear at the central portion of the travel control screen D11. That is, the user is notified by the notifier 51g and the display operation interface 52 that a start operation and a traveling operation are needed to start ground work by automatic steering of the agricultural machine 1.

After looking at the above notification U5, the user, for example, operates the mode switch 65 to start the automatic steering work mode, and, upon this switch operation, the automatic controller 61 starts the automatic steering work mode and causes the raising/lowering device 8 to lower the working device 2 to a position where ground work can be performed. Then, when the user operates the accelerator to cause the traveling vehicle body 3 to travel (forward), based on the straight portion L2s of the travel route L2 and the position of the traveling vehicle body 3, the automatic controller 61 causes the working device 2 to perform ground work while performing automatic steering of the traveling vehicle body 3.

In a case where the user operates the mode switch 65 to start the automatic steering work mode when performing a multi-point turn of the traveling vehicle body 3 to move to the start point Ps1 of the automatic steering work mode, after the notification U5 is displayed, the user may cause the traveling vehicle body 3 to travel by operating the accelerator without operating the mode switch 65 again. In this case, when the traveling vehicle body 3 stops at the start point Ps1, the automatic controller 61 causes the raising/lowering device 8 to lower the working device 2 in advance to a position where ground work can be performed, and then, based on the straight portion L2s and the position of the traveling vehicle body 3, causes the working device 2 to perform ground work while performing automatic steering of the traveling vehicle body 3 when the traveling vehicle body 3 travels.

As another example, the automatic controller 61 may automatically perform a multi-point turn of the traveling vehicle body 3 from the termination point Pg1 of the travel route L1 to the start point Ps1 of the automatic steering work mode and switching from the automatic traveling work mode to the automatic steering work mode. In this case, after the ground work is performed by the working device 2 until the termination point Pg1 is reached, the automatic controller 61 causes the raising/lowering device 8 to raise the working device 2 to stop the ground work performed by the working device 2 and thereafter performs a multi-point turn of the traveling vehicle body 3 by automatic operation, based on the travel route L2 and the position of the traveling vehicle body 3.

More particularly, for example, first, the automatic controller 61 causes the traveling vehicle body 3 to make a turn along the turning portion L2r of the travel route L2 connected to the termination point Pg1 by automatic operation. Next, the automatic controller 61 causes the traveling vehicle body 3 to travel rearward along the straight portion L2s connected to this turning portion L2r by automatic operation and brings the orientation of the traveling vehicle body 3 into alignment with the traveling direction of this straight portion L2s gradually. Then, upon causing the traveling vehicle body 3 to stop at the start point Ps1 of the automatic steering work mode, the automatic controller 61 causes the raising/lowering device 8 to lower the working device 2 to a position where ground work can be performed, and enters the automatic steering work mode from the automatic traveling work mode.

When the automatic steering work mode is started and then the traveling vehicle body 3 travels by manual operation, the controller 51 of the agricultural work assistance apparatus 50 causes the notification U5 to disappear from the travel control screen D11 and display an indication that the agricultural machine 1 is under automatic steering (displayed above the legend Y5 in FIG. 18, for example) and updates, based on the position of the traveling vehicle body 3, the display position of the agricultural machine symbol X2.

When the work track key B15 is selected, the path/track calculator 51d calculates, based on the position of the traveling vehicle body 3 and the working width of the working device 2, an actual work track J5 during automatic steering along which the working device 2 has performed ground work, and causes the storing unit 53 to store data of the actual work track J5. Then, the controller 51 causes the actual work track J5 to be displayed over the straight portions L2s of the travel route L2 in a superimposed manner (FIG. 18).

When the user operates the steering handle 30 during automatic steering of the traveling vehicle body 3, the automatic controller 61 stops automatic steering of the traveling vehicle body 3 and terminates the automatic steering work mode. In so doing, the steering of the traveling vehicle body 3 is performed based on the operation of the steering handle 30 (manual steering state). After that, when the user performs a predetermined operation on the mode switch 65 to resume the automatic steering work mode, the automatic controller 61 resumes automatic steering of the traveling vehicle body 3.

Figure 18:
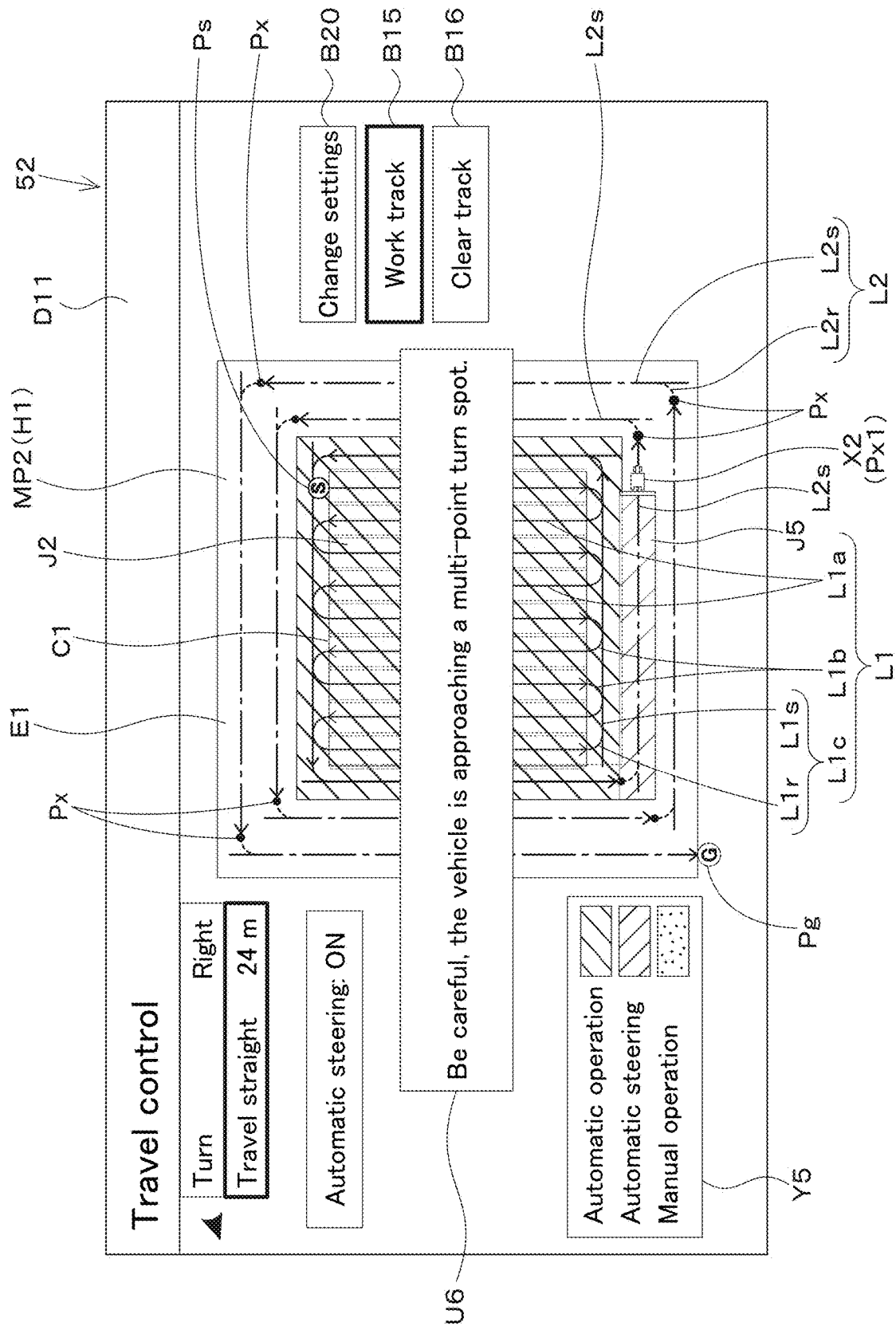
FIG. 18 is a diagram illustrating another example of the travel control screen of the agricultural work assistance apparatus.

In FIG. 18, a connection point Px (point indicated by a filled circle) between the distal end of each straight portion L2s of the travel route L2 and a corresponding turning portion L2r is a multi-point turn spot (multi-point turn start position) where automatic steering of the traveling vehicle body 3 is temporarily stopped and a multi-point turn of the traveling vehicle body 3 for movement to the next straight portion L2s is started manually (in FIG. 18, for convenience of description, only some of points indicated by filled circles are assigned "Px").

A multi-point turn spot Px is a connection point located between two portions such as straight portions L2s, L1s, turning portions L2r, L1r thereof, straight route portions L1a, and/or turning route portions L1b of the travel route L2, L1 (or a connection point located between two straight portions L2s) where an angular difference between one portion and the other portion is greater than a predetermined threshold (a detailed explanation will be given later with reference to FIG. 24, etc.).

As illustrated in FIG. 18, upon the traveling vehicle body 3 reaching a predetermined intermediate point Px1 on the straight portion L2s that is short of the multi-point turn spot Px by a predetermined distance, the notifier 51g causes a notification U6 including the message "Be careful, the vehicle is approaching a multi-point turn spot." to appear at the central portion of the travel control screen D11 for a predetermined duration That is, the user is notified by the notifier 51g and the display operation interface 52 that the traveling vehicle body 3 is near the multi-point turn spot Px, at which automatic steering will be temporarily stopped, and a multi-point turn of the traveling vehicle body 3 by manual operation is needed.

Figure 19A:
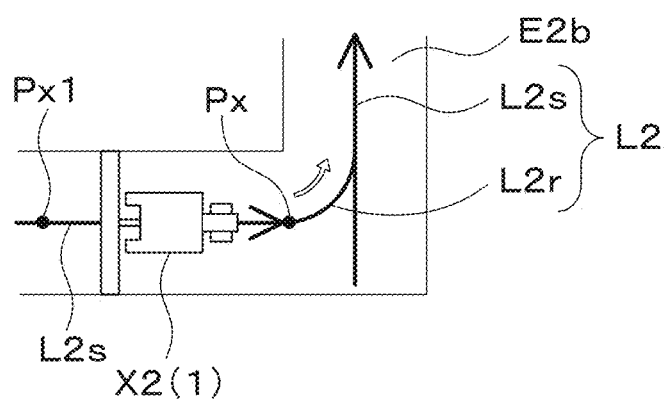
FIG. 19A is a diagram illustrating an example of a behavior of the agricultural machine.

After the above notification U6 is displayed, as illustrated in FIG. 19A, the traveling vehicle body 3 travels along one straight portion L2s, and, for example, the traveling vehicle body 3 or the working device 2 reaches the multi-point turn spot Px. In so doing, the controller 51 of the agricultural work assistance apparatus 50 may cause the travel control screen D11 to display a message, etc. indicating that the multi-point turn spot Px is reached or indicating a multi-point turn of the traveling vehicle body 3 needs to be performed by manual operation.

For example, after looking at the notification U6, etc. illustrated in FIG. 18, the user recognizes on the travel control screen D11 that the agricultural machine symbol X2 has reached the multi-point turn spot Px, and then performs, based on the travel route L2 and the position of the traveling vehicle body 3, a multi-point turn of the traveling vehicle body 3 manually.

More particularly, for example, first, the user operates the steering handle 30 and the accelerator/brake to make a turn along the turning portion L2r while causing the traveling vehicle body 3 to travel forward (manual operation state). In so doing, the automatic controller 61 temporarily stops automatic steering of the traveling vehicle body 3 and causes the raising/lowering device 8 to raise the working device 2 to temporarily stop the ground work performed by the working device 2. The controller 51 of the agricultural work assistance apparatus 50 causes the travel control screen D11 to display the temporary stop of the automatic steering (not illustrated).

Figure 19B:
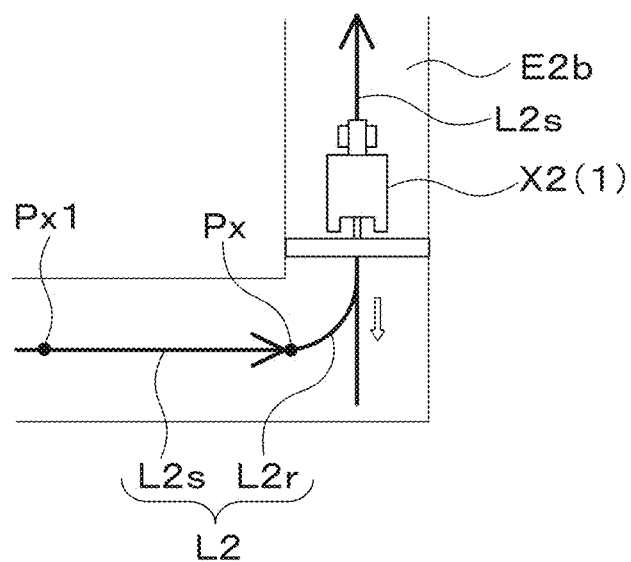
FIG. 19B is a diagram illustrating an example of a behavior of the agricultural machine.

For example, after the traveling vehicle body 3 makes a turn as illustrated in FIG. 19B, the user causes the traveling vehicle body 3 to travel rearward along the next straight portion L2s by operating the steering handle 30 and/or a forward/rearward traveling switching lever and the accelerator, etc. included in the operation unit 62. Then, by operating the brake, the user causes the traveling vehicle body 3 to stop at the start point of the next straight portion L1s as illustrated in FIG. 19B. With this, the orientation of the traveling vehicle body 3 is brought into alignment with the traveling direction of the next straight portion L2s, and the multi-point turn of the traveling vehicle body 3 ends. After that, for example, when the user performs a predetermined operation on the mode switch 65 to resume automatic steering, the automatic controller 61 causes the raising/lowering device 8 to lower the working device 2 to put the working device 2 into the state in which ground work can be performed by the working device 2.

In contrast, assume that, for example, the user, before causing the traveling vehicle body 3 to travel rearward along the next straight portion L2s, performs a predetermined operation on the mode switch 65 to resume automatic steering. In this case, when the user causes the traveling vehicle body 3 to travel rearward by operating the accelerator, etc. without operating the steering handle 30, the automatic controller 61 performs, based on the next straight portion L2s and the position of the traveling vehicle body 3, automatic steering of the traveling vehicle body 3 (resumption of automatic steering). Then, when the traveling vehicle body 3 stops at the start point of the next straight portion L2s, the automatic controller 61 causes the raising/lowering device 8 to lower the working device 2 to put the working device 2 into the state in which ground work can be performed by the working device 2.

This makes it unnecessary for the user to steer the traveling vehicle body 3 by operating the steering handle 30 when the traveling vehicle body 3 travels rearward and makes it easier to bring the orientation of the traveling vehicle body 3 into alignment with the traveling direction of the next straight portion L2s. Moreover, also when the user thereafter causes the traveling vehicle body 3 to travel forward by operating the steering handle 30 and the accelerator, etc., the automatic controller 61 performs automatic steering of the traveling vehicle body 3 and, therefore, the user does not need to resume automatic steering by performing a predetermined operation on the mode switch 65.

As another example, the automatic controller 61 may resume automatic steering of the traveling vehicle body 3 when, for example, the user causes the traveling vehicle body 3 to travel forward by a predetermined distance from the start point of the next straight portion L2s by operating the accelerator, etc., without operating the steering handle 30. With this, automatic steering of the traveling vehicle body 3 is resumed without having to perform a predetermined operation on the mode switch 65.

The procedure for a multi-point turn of the traveling vehicle body 3 and behaviors at the time of the multi-point turn of the traveling vehicle body 3 are not limited to those described above. For example, there may be cases in which, depending on the user's skill of driving the agricultural machine 1, the positional relationship between one straight portion L2s and the next straight portion L2s, and/or the like, the user causes the traveling vehicle body 3 to turn many times and/or travel rearward/forward many times by operating the steering handle 30 or the accelerator, etc., when performing a multi-point turn of the traveling vehicle body 3 manually. Also in such a case, the automatic controller 61 performs automatic steering of the traveling vehicle body 3 when the traveling vehicle body 3 travels rearward or forward along the automatic steering route L2s.

Figure 19C:
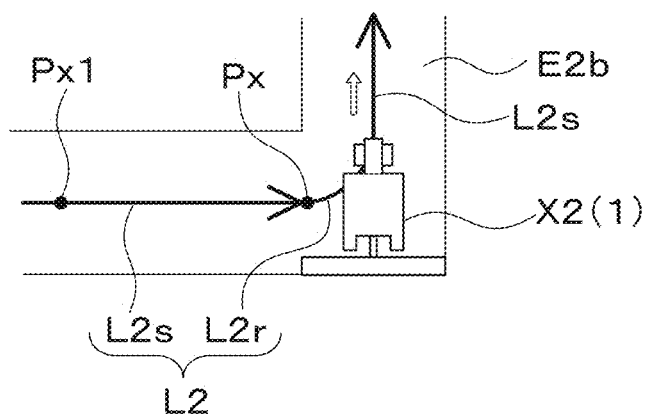
FIG. 19C is a diagram illustrating an example of a behavior of the agricultural machine.
Figure 19D:
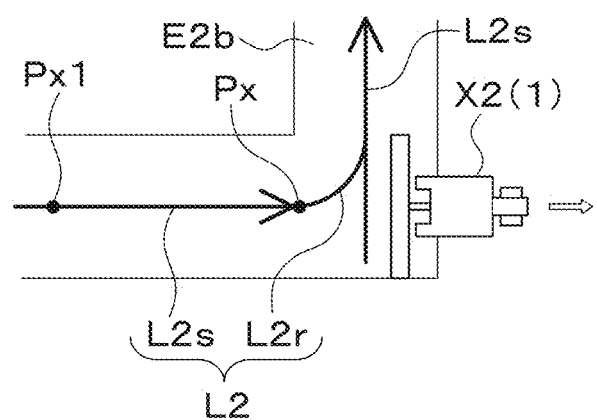
FIG. 19D is a diagram illustrating an example of a behavior of the agricultural machine.

On the other hand, there may be cases in which the traveling vehicle body 3 and the working device 2 keep traveling straight and thus pass through the multi-point turn spot Px as illustrated in FIG. 19D because the user did not perform a multi-point turn of the traveling vehicle body 3 by manual operation. To address this, for example, after a predetermined time (or after the traveling vehicle body 3 travels a predetermined distance) without manual operation of the steering handle 30 after the traveling vehicle body 3 passes through the multi-point turn spot Px, the automatic controller 61 causes the brake 6 (FIG. 1) to stop the traveling vehicle body 3 forcibly. In so doing, the notifier 51g may cause the display operation interface 52 to display a message, etc. indicating the traveling vehicle body 3 was force stopped because a multi-point turn of the traveling vehicle body 3 was not performed manually.

For example, as illustrated in FIGS. 19A to 19C, the user performs a multi-point turn of the traveling vehicle body 3 manually, performs a predetermined operation on the mode switch 65 to resume automatic steering, and thereafter operates the accelerator to cause the traveling vehicle body 3 to travel. Upon this, based on the straight portion L2s of the travel route L2 and the position of the traveling vehicle body 3, the automatic controller 61 performs automatic steering of the traveling vehicle body 3 and causes the working device 2 to resume ground work. The controller 51 of the agricultural work assistance apparatus 50 causes the travel control screen D11 to display an indication that automatic steering is active.

After that, as described above, automatic steering of the traveling vehicle body 3 while the traveling vehicle body 3 travels along the straight portion L2s of the travel route L2 by manual operation, and a multi-point turn of the traveling vehicle body 3 along the turning portion L2r and the straight portion L2s by manual operation, are repeated alternately. With this, the traveling vehicle body 3 travels along the headland E2b and ground work is performed by the working device 2 in the headland E2*b*, and then the traveling vehicle body 3 travels along the headland E2*c* and ground work is performed by the working device 2 in the headland E2*c*.

Next, when the working device 2 reaches the goal position Pg and the ground work performed by the working device 2 in the headland E2*c* finishes, the automatic controller 61 ends automatic steering of the traveling vehicle body 3, and the automatic steering work mode also ends. The controller 51 of the agricultural work assistance apparatus 50 causes the travel control screen D11 to display that automatic steering ended. Furthermore, in a case where the work track key B15 in the travel control screen D11 is selected, as illustrated in FIG. 20, the actual work track J2 during automatic operation is displayed at a region corresponding to the central area C1 and the innermost headland E2*a* in the agricultural field map MP2, and the actual work track J5 during automatic steering is displayed in the headlands E2*b* and E2*c* (see FIG. 14B, etc.) located outward of the headland E2*a*.

Figure 21:
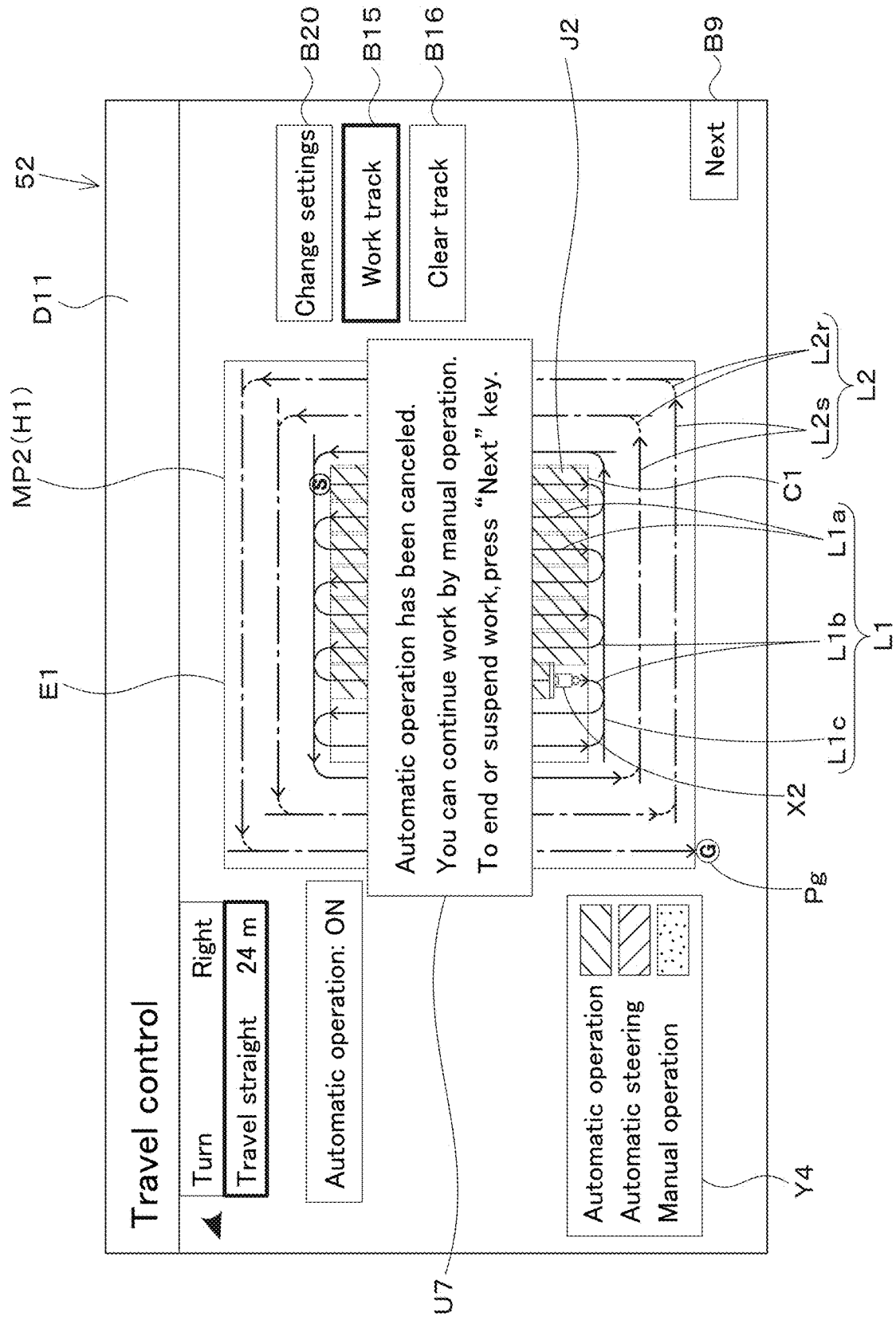
FIG. 21 is a diagram illustrating another example of the travel control screen of the agricultural work assistance apparatus.

On the other hand, there may be cases in which the automatic controller 61 stops (cancels) automatic operation of the traveling vehicle body 3 during the automatic traveling work mode on the agricultural machine 1 due to operation of the mode switch 65 by the user or some trouble, etc. In such cases, for example, as illustrated in FIG. 21, the notifier 51*g* (FIG. 1) of the agricultural work assistance apparatus 50 causes a notification U7 including the message "Automatic operation has been canceled. You can continue work by manual operation. To end or suspend work, press 'Next' key." to appear on the travel control screen D11. That is, the user is notified by the notifier 51*g* and the display operation interface 52 that automatic operation of the agricultural machine 1 has been canceled, the agricultural machine 1 can perform the ground work by manual operation, and the user can select whether to end or suspend the ground work performed by the agricultural machine 1. The user can know the status of the agricultural machine 1 from the notification U7.

There may be cases in which the automatic controller 61 stops automatic steering of the traveling vehicle body 3 also during the automatic steering work mode on the agricultural machine 1. In such cases, for example, the notifier 51*g* of the agricultural work assistance apparatus 50 causes a notification including the message "Automatic steering has been canceled. You can continue work by manual operation. To end or suspend work, press 'Next' key." to appear on the travel control screen D11 (not illustrated). That is, the user is notified by the notifier 51*g* and the display operation interface 52 that automatic steering of the agricultural machine 1 has been canceled, the agricultural machine 1 can perform the ground work by manual operation, and the user can select whether to end or suspend the ground work performed by the agricultural machine 1. The user can know the status of the agricultural machine 1 from the notification.

Figure 20:
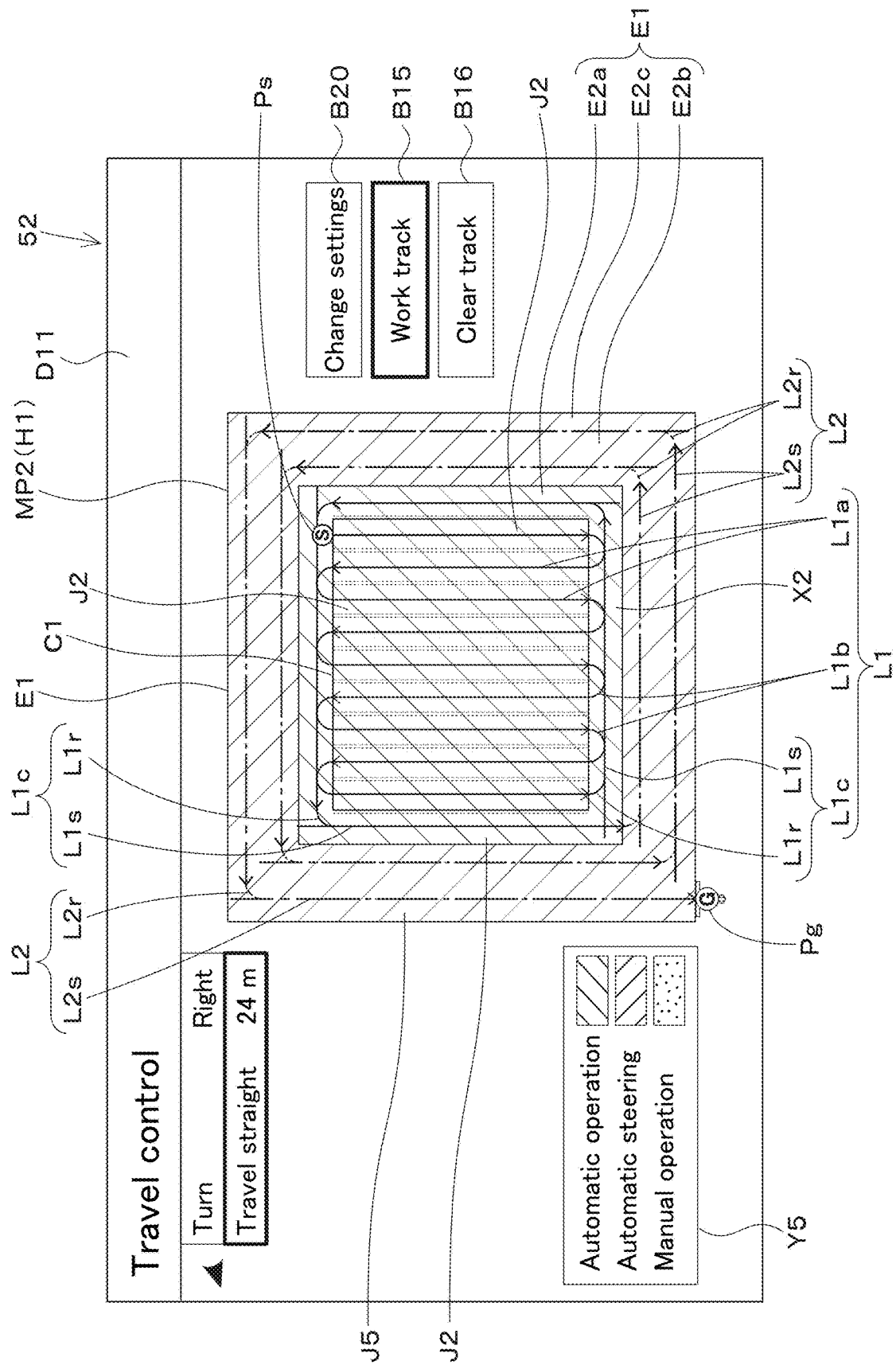
FIG. 20 is a diagram illustrating another example of the travel control screen of the agricultural work assistance apparatus.

In the preferred embodiment described above, an example in which, as illustrated in FIGS. 14B, 14D, and 20, etc., the travel route L2 for the automatic steering work mode is created in the headland area E1 of the agricultural field map MP2 has been discussed. However, for example, as illustrated in FIG. 22, the travel route L2 may be created in the central area C1.

Figure 22:
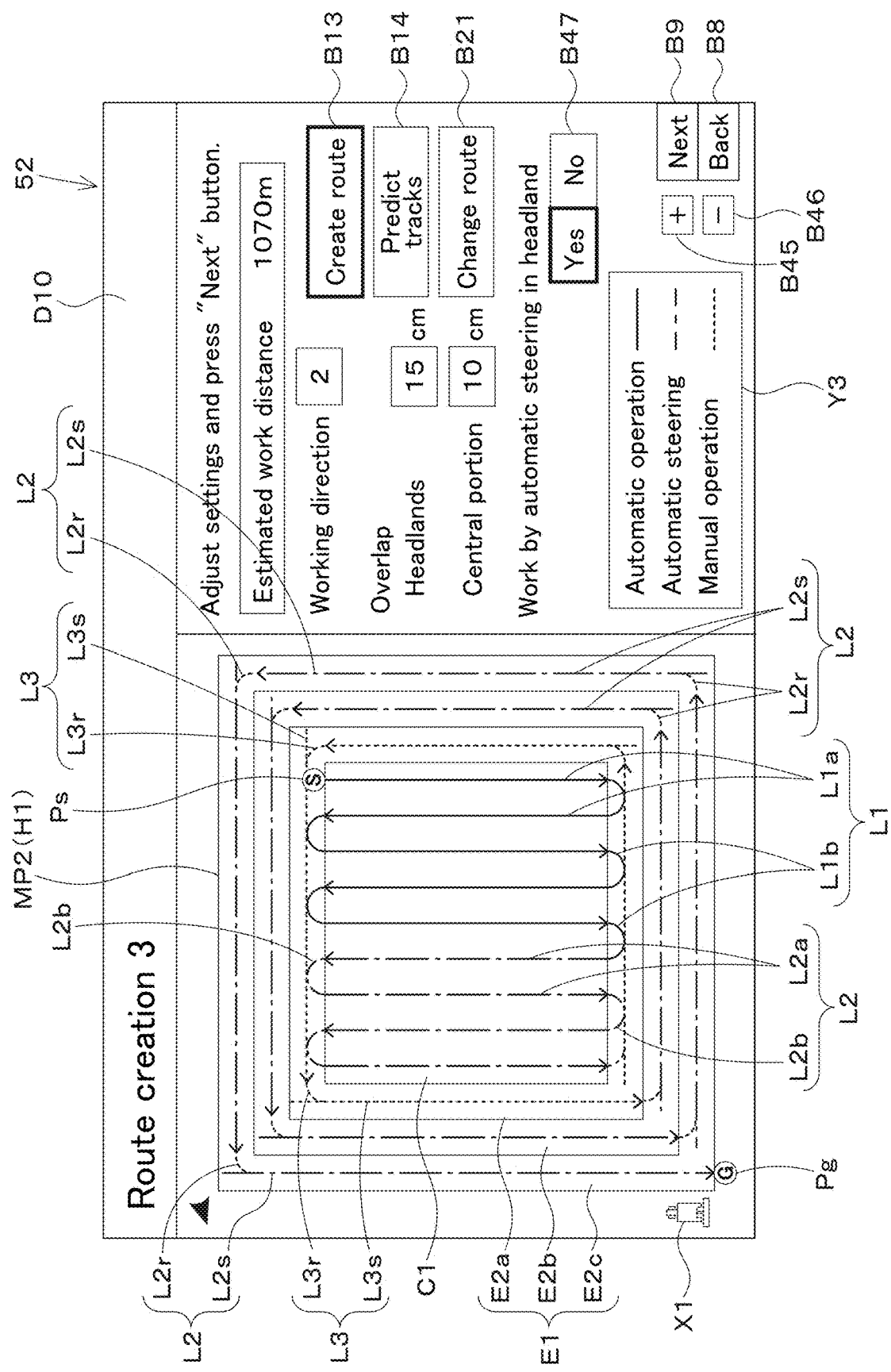
FIG. 22 is a diagram illustrating another example of the third route creation screen of the agricultural work assistance apparatus.

In the example illustrated in FIG. 22, on the agricultural field map MP2 included in the third route creation screen D10, a travel route L1*a* for the automatic traveling work mode (automatic operation route) is created in substantially the right half of the central area C1, and the travel route L2 for the automatic steering work mode is created in substantially the left half of the central area C1. The travel route L2 in the central area C1 includes a straight route portion L2*a* and a turning route portion L2*b*. The straight route portion L2*a* and the turning route portion L2*b* have shapes similar to those of the straight route portion L1*a* and the turning route portion L1*b* of the travel route L1, respectively. Each of the straight route portions L1*a* and L2*a* is a work route portion. The straight route portion L2*a* is an automatic steering route.

Among the plurality of headlands E2*a*, E2*b*, and E2*c* surrounding the central area C1, the manual operation route L3 for the manual operation work mode is created in the innermost headland E2*a*, and the travel route L2 for the automatic steering work mode is created in the other headlands E2*b* and E2*c*. The manual operation route L3 in the headland E2*a* includes straight portions L3*s* and turning portions L3*r*. The travel route L2 in the headlands E2*b* and E2*c* includes straight portions L2*s* and turning portions L2*r*. Each of the straight portions L3*s*, L2*s* is a work route portion. The straight portion L2*s* is an automatic steering route.

As described above, the work route portion L1*a*, L2*a*, L2*s*, L3*s* included in each route L1, L2, L3 is set as an automatic operation route, an automatic steering route, or a manual operation route and can be changed to an automatic operation route, an automatic steering route, or a manual operation route by performing a predetermined operation on the third route creation screen D10 and the route change key B21.

When ground work is performed based on the routes L1, L2, and L3 created in the agricultural field map MP2 as illustrated in FIG. 22 by the agricultural machine 1, as one of the automatic operation route and the automatic steering route changes to the other, the automatic controller 61 performs switching between automatic operation and automatic steering of the traveling vehicle body 3 automatically. Additionally or alternatively, when one of the automatic traveling work mode, the automatic steering work mode, and the manual operation work mode switches to another, the notifier 51*g* may cause the display operation interface 52 to display a notification indicating the content of this switching of modes or a message, etc. that prompts the user to operate the operation unit 62.

In the preferred embodiment described above, an example in which the route creator 51*c* changes the work route portion L1*a*, L1*s*, L2*a*, L2*s*, L3*s* included in each route L1, L2, L3 created in the agricultural field map MP2 to the automatic operation route, the automatic steering route, or the manual operation route in accordance with the operation of the route change key B21 has been discussed. However, the route creator 51*c* may change a portion other than the work route portion included in each route L1, L2, L3 (the turning route portion L1*b*, L2*b*, the turning portion L1*r*, L2*r*, etc.) to the automatic operation route, the automatic steering route, or the manual operation route in accordance with the operation of the route change key B21.

In the preferred embodiment described above, an example in which the travel route L2 for the automatic steering work mode is added after creation of the travel route L1 for the automatic traveling work mode in the agricultural field map MP2 has been discussed. However, for example, by selection of the automatic steering key B2*b* included in the home screen D1 illustrated in FIG. 3 before selection of the automatic operation key B2*a*, on the third route creation screen D10 displayed on the display operation interface 52, the travel route L2 may be created in the agricultural field map MP2 before the travel route L1, or the travel route L2 alone may be created in the central area C1 and the headland area E1. After that, each portion L2s, L2r, L2a, L2b of the travel route L2 for the automatic steering work mode created in the agricultural field map MP2 may be changed in a portion L1s, L1r, L1a, L1b of the travel route L1 for the automatic traveling work mode or to a portion L3s, L3r of the manual operation route L3 for the manual operation work mode.

Although the route change key B21 for changing the use and/or the manner of display of a route is provided in the third route creation screen D10 in the preferred embodiment described above, additionally or alternatively, the route change key B21 may be provided also in, for example, the travel control screen D11, D8, or the second route creation screen D7. Providing the route change key B21 in the travel control screen D11, D8 makes it possible to change the automatic operation route, the automatic steering route, and the manual operation route to a route of another use by operating the route change key B21 during the automatic traveling work mode, the automatic steering work mode, or the manual operation work mode of the agricultural machine 1. Providing the route change key B21 in the second route creation screen D7 makes it possible to change the automatic operation route to the automatic steering route or the manual operation route by operating the route change key B21 when creating the automatic operation route.

In the preferred embodiment described above, an example in which, on the third route creation screen D10 illustrated in FIG. 14B, etc., the travel route L1 is set as an automatic operation route and the straight portions L2s of the travel route L2 are set as an automatic steering route has been discussed. However, for example, without setting the use of each portion of travel routes during display of screens for route creation (the screens D7 and D10) or at the time of creation of travel routes, at least a portion of the travel routes may be set to the automatic steering route, the automatic operation route, or the manual operation route in accordance with the operation of the display operation interface 52 thereafter during display of a travel control screen (screens D8 and D11).

Alternatively, during display of the travel control screen D8, D11, in accordance with the operation of the mode switch 65, at least a portion of the travel route may be set to the automatic steering route, the automatic operation route, or the manual operation route, and also the automatic steering work mode, the automatic traveling work mode, or the manual operation work mode may be performed. In such a case, for example, among the travel routes created in the central area C1 and/or the headland area E1, all portion(s) where agricultural work is to be performed may be set to the automatic steering route or the automatic operation route.

The AS headland work key B47 may be provided in the travel control screen D8, D11 (FIG. 12, FIG. 16, etc.) instead of providing the AS headland work key B47 in the third route creation screen D10 (FIG. 14, etc.) Alternatively or additionally, during display of the travel control screen D8, D11, at the point in time at which manual operation of the agricultural machine 1 (the timing of display of the notification U4 in FIG. 17A, etc.) is performed upon completion or suspension of automatic traveling of the agricultural machine 1, the AS headland work key B47 may be displayed in the form of a dialog on the travel control screen D8, D11.

That is, at the point in time at which the agricultural machine 1 switches from automatic traveling to manual operation, whether to perform work using the working device 2 while performing automatic steering of the agricultural machine 1 in the headland E1 may be selectable via the AS headland work key B47. Then, if "Yes" is selected using the AS headland work key B47, that is, if performing work by the working device 2 while performing automatic steering of the agricultural machine 1 in the headland E1 is selected, the route creator 51c (FIG. 1) may create the travel route L2 in the headland E1, and the controller 51 may cause the travel route L2 to be displayed on the travel control screen D8, D11. In this case, in accordance with the creation of the travel route L2, the route creator 51c may make the settings of the goal position Pg again and/or set the straight portions L2s of the travel route L2 to the automatic steering route.

Additionally or alternatively, the route creator 51c may create the travel route L2 in the headland E1 before the AS headland work key B47 is displayed on the travel control screen D8, D11. Then, the route creator 51c may set the straight portions L2s of the travel route L2 to the automatic steering route when "Yes" is selected on the AS headland work key B47 displayed on the travel control screen D8, D11.

Figure 23A:
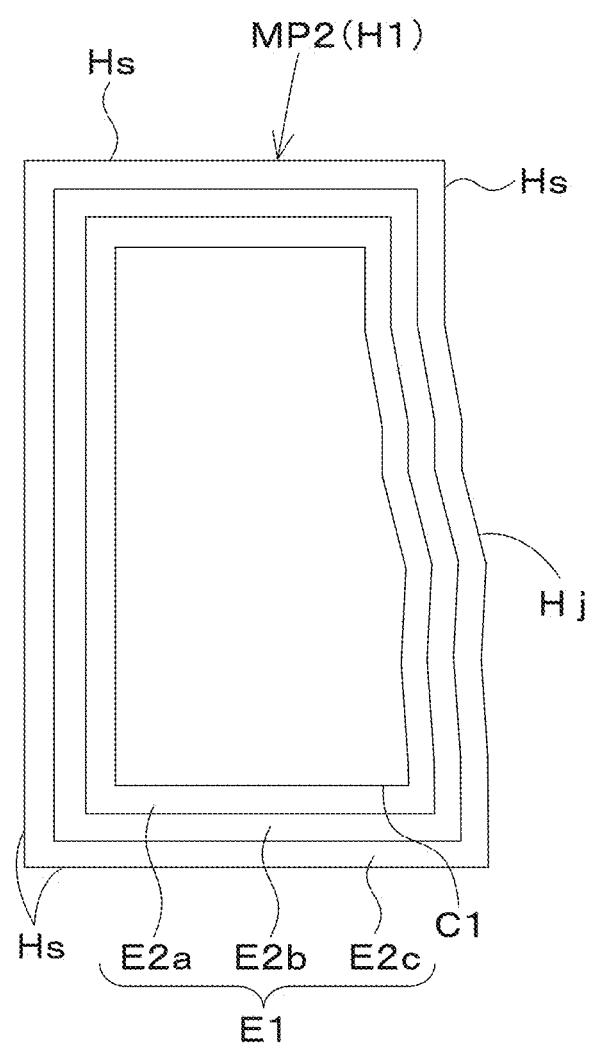
FIG. 23A is a diagram for explaining a method of setting a travel route in an irregular agricultural field.
Figure 23B:
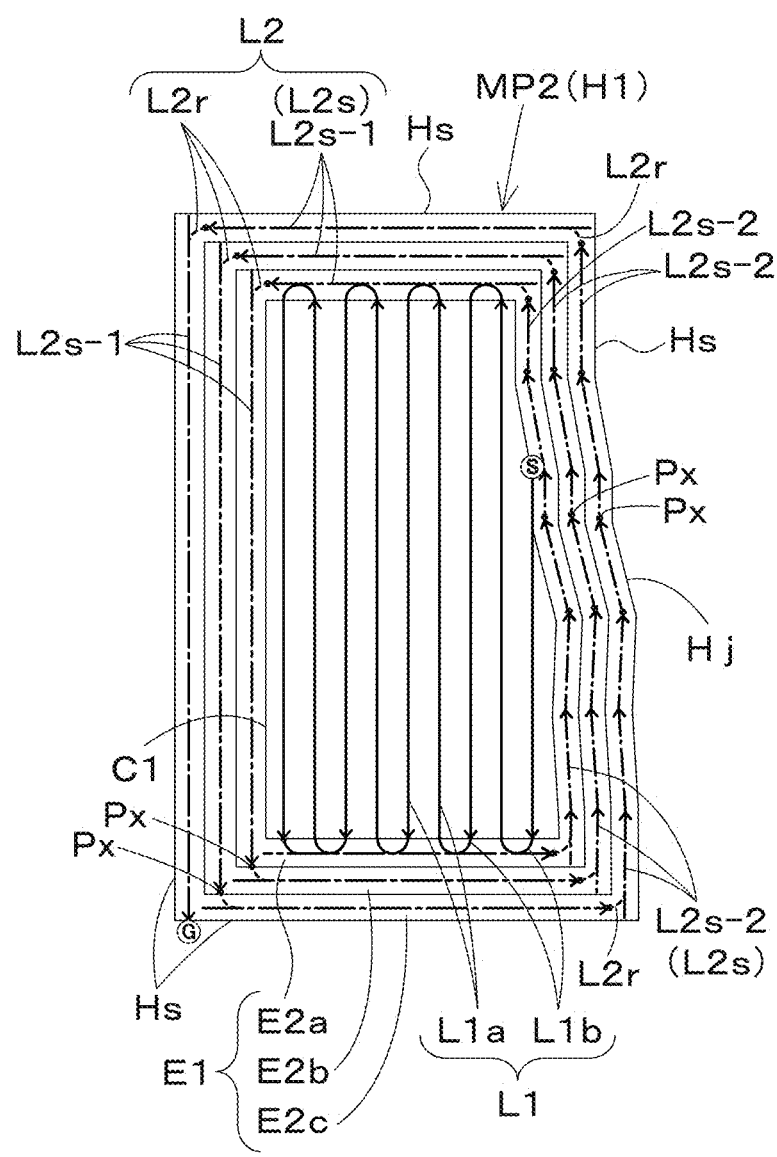
FIG. 23B is a diagram for explaining the method of setting a travel route in an irregular agricultural field.

An agricultural field where agricultural work is performed by the agricultural machine 1 is not limited to an agricultural field having a rectangular contour described above. There may be an agricultural field having an irregular contour different from a rectangle. FIGS. 23A and 23B are diagrams illustrating a setting example of the areas C1 and E1 and the travel routes L1 and L2 in the agricultural field map MP2 representing an agricultural field having an irregular contour H1. FIG. 24 is an enlarged view of the travel route L2 created at a right-side portion of each of the headlands E2a, E2b, and E2c illustrated in FIGS. 23A and 23B.

Although the most portion of the contour H1 of the agricultural field map MP2 illustrated in FIGS. 23A and 23B has a rectangular shape, a portion thereof (right portion) has a zigzag shape. That is, the contour H1 of the agricultural field illustrated in FIGS. 23A and 23B includes linear straight portions Hs and a zigzag portion Hj. Each of the linear straight portions Hs is represented by a single straight line. The zigzag portion Hj is represented by a plurality of connected straight lines.

The following description discusses an example case where, for such an agricultural field map MP2, areas C1 and E1 and a travel route L1 for the automatic traveling work mode are set first on the second route creation screen D7 illustrated in FIG. 10A, etc., and then a travel route L2 for the automatic steering work mode is set on the third route creation screen D10 illustrated in FIG. 14A, etc.

As described earlier, first, based on the contour H1 of the agricultural field, the working width of the working device 2 (or the outside width of the working device 2), the number of headlands inputted on the second route creation screen D7 (FIG. 10A, etc.), and/or the overlap for the headlands, the area setter 51b sets the central area C1 and the headland area E1 in the agricultural field map MP2. In the example illustrated in FIG. 23A, the area setter 51b sets, as the central area C1, an area having the contour C1 obtained by displacing the contour H1 of the agricultural field inward a number of times corresponding to the number of headlands (three times), each by a width obtained by subtracting the overlap for the headlands from the working width of the working device 2. The area setter 51b sets the headland area E1 including three headlands E2a, E2b, and E2c located outward of the central area C1.

Next, based on the areas C1 and E1, the working width of the working device 2, the working direction, the overlap for the headlands, and/or the overlap for the central portion, for example, the route creator 51c creates the travel route L1 including a plurality of straight route portions L1a and a plurality of turning route portions L1b throughout the central area C1 and the headland E2a. With this, as illustrated in FIG. 23B, the straight route portions L1a each of which is an automatic operation route and a work route portion are set in the central area C1.

After that, based on the areas C1 and E1, the working width of the working device 2, the overlap for the headlands, and/or the selection state of the AS headland work key B47 in the third route creation screen D10 (FIG. 14A, etc.), the route creator 51c creates the travel route L2 for the automatic steering work mode in the headland area E1. More particularly, the route creator 51c creates the travel route L2 in the headlands E2a, E2b, and E2c that surrounds the central area C1 and that is continuous from the travel route L1.

In so doing, the route creator 51c creates, as the travel route L2, straight portions L2s on the widthwise centerline of each of the headlands E2a, E2b, and E2c in parallel with the contour H1 of the agricultural field. With this, as illustrated in FIG. 23B, a straight portion L2s-1 (represented by a solid-line arrow) that is a relatively long single line is created at each linear straight portion of each of the headlands E2a, E2b, and E2c parallel to the linear straight portions Hs of the contour H1 of the agricultural field. Furthermore, a plurality of straight portions L2s-2 (indicated by solid-line arrows) each of which is relatively short are created at the right-side portion of each of the headlands E2a, E2b, and E2c parallel to the zigzag portion Hj of the contour H1 of the agricultural field. The straight portions L2s-2 are connected in a zigzag manner in parallel to the zigzag portion Hj of the contour H1.

Next, the route creator 51c detects an angle of each of the straight portions L2s created in the headlands E2a, E2b, and E2c. In so doing, the route creator 51c calculates the angle of each of the straight portions L2s with respect to the preset coordinates (not illustrated). Next, the route creator 51c calculates a difference (angular difference) $\Delta\theta$ between the angle of one (a portion of the travel route L2) of straight portions L2s which are arranged next to each other in the direction of travel of the travel route L2 and which extend in different directions and the angle of the other (another portion of the travel route L2) of such straight portions L2s. Note that the angular difference $\Delta\theta$ is an absolute value. Moreover, the angular difference $\Delta\theta$ is, as illustrated in FIG. 24, a smaller one of the angles each between the traveling direction of one straight portion L2s and the traveling direction of the other straight portion L2s.

Next, if the angular difference $\Delta\theta$ between the one straight portion L2s and the other straight portion L2s is greater than a predetermined first threshold $\Delta\theta s1$, the route creator 51c sets a multi-point turn spot Px between the one straight portion L2s and the other straight portion L2s (or a connection point). The first threshold $\Delta\theta s1$ is set to be, for example, not greater than the upper limit of the steering angle within which the traveling vehicle body 3 can be automatically steered (e.g., 45°).

Figure 24:
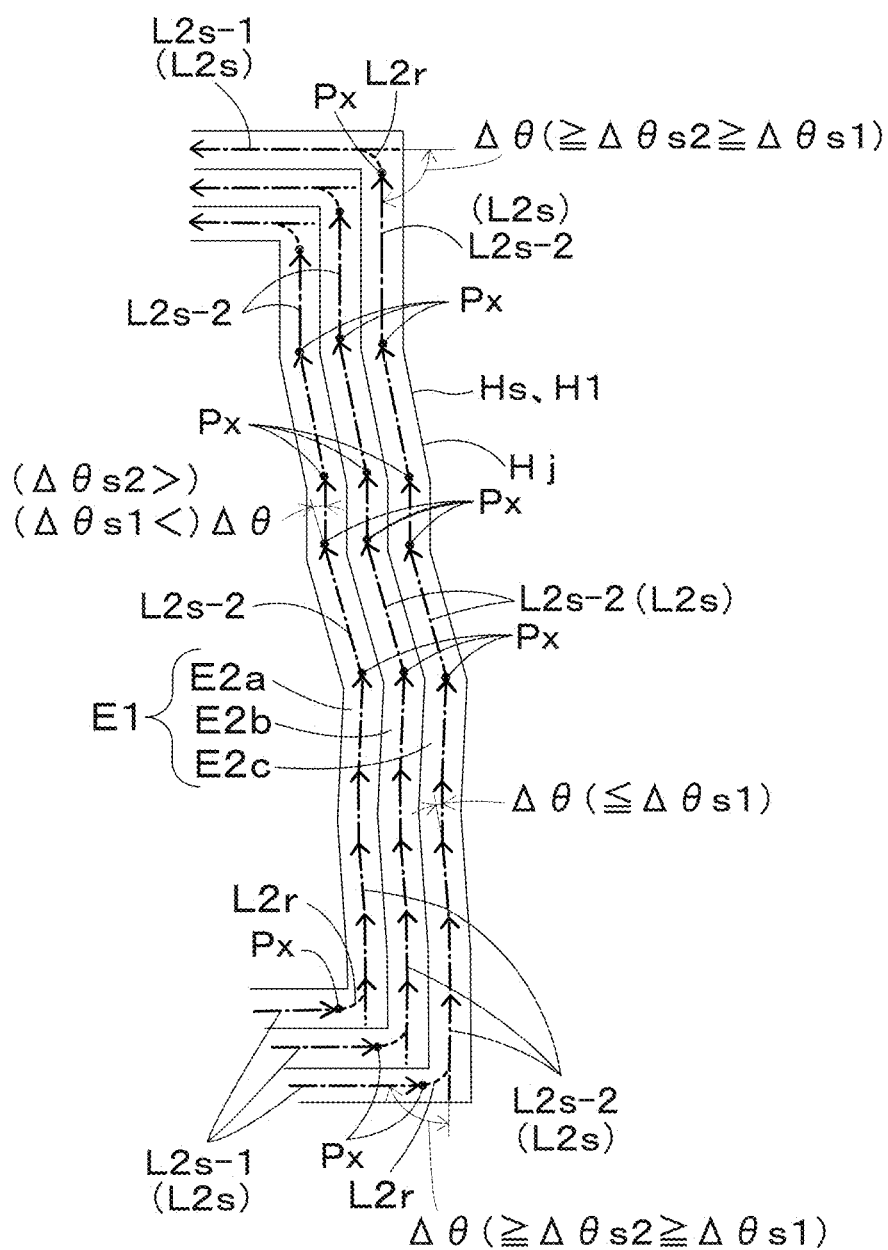
FIG. 24 is an enlarged view of an essential portion of FIG. 23A, 23B.

In so doing, for example, as shown at a top portion and a bottom portion of each headland E2a, E2b, E2c in FIG. 24, if the angular difference $\Delta\theta$ between one straight portion L2s and the other straight portion L2s is equal to or greater than a predetermined second threshold $\Delta\theta s2$, the route creator 51c may set a multi-point turn spot Px at a position that is short of the distal end of the one straight portion L2s by a predetermined distance and may create a turning portion L2r along which the traveling vehicle body 3 makes a turn (multi-point turn) manually from the multi-point turn spot Px toward the other straight portion L2s (see also FIG. 23B). The second threshold $\Delta\theta s2$ (e.g., 90°) is set to be not less than the first threshold $\Delta\theta s1$. The procedure for creating the turning portion L2r described here may be applied to creating the turning portion L1r of the travel route L1 described earlier.

As another example, the comparison of the angular difference $\Delta\theta$ between one straight portion L2s and the other straight portion L2s with the second threshold $\Delta\theta s2$ may be omitted, and the multi-point turn spot Px may be set between the one straight portion L2s and the other straight portion L2s only when the angular difference $\Delta\theta$ is greater than the first threshold $\Delta\theta s1$.

On the other hand, as illustrated in FIG. 24, if the angular difference $\Delta\theta$ between the one straight portion L2s and the other straight portion L2s is not greater than the first threshold $\Delta\theta s1$, the route creator 51c does not set a multi-point turn spot Px or a turning portion L2r between the one straight portion L2s and the other straight portion L2s and connect the one straight portion L2s and the other straight portion L2s to obtain a continuous portion of the automatic steering route.

With this, as illustrated in FIG. 23B, a multi-point turn spot Px or a turning portion L2r is set between every adjacent straight portions having an angular difference $\Delta\theta$ greater than the first threshold $\Delta\theta s1$, among the plurality of the straight portions L2s-1 and L2s-2 created in the headlands E2a, E2b, and E2c. Furthermore, adjacent straight portions L2s having an angular difference $\Delta\theta$ not greater than the first threshold $\Delta\theta s1$ are set as a continuous portion of the automatic steering route. In FIG. 23B, for convenience of description, only some of the multi-point turn spots are assigned "Px", and the other multi-point turn spots are represented by filled circles.

Upon creating the travel route L2 in the headlands E2a, E2b, and E2c as described above, the route creator 51c causes the storing unit 53 to store data of each portion (the straight route portions L1a, the turning route portions L1b, the straight portions L2s, the turning portions L2r, and connection points thereof (including the multi-point turn spots Px), etc.) of the travel routes L1 and L2. Furthermore, the route creator 51c sets the start position Ps at one end of the travel route L1 and the goal position Pg at one end of the travel route L2, and causes the storing unit 53 to store data indicating the positions Ps and Pg. Moreover, the route creator 51c calculates the estimated work distance over which ground work is to be performed by the working device 2 while the traveling vehicle body 3 is caused to travel based on the straight route portions L1a included in the travel route L1 and the straight portions L2s included in the travel route L2, and causes the storing unit 53 to store the calculation result.

The controller 51 causes the travel routes L1 and L2, the positions Ps and Pg, or the like set by the route creator 51c as illustrated in FIG. 23B to be displayed on the third route creation screen D10 (FIG. 14B, etc.) or the travel control screen D11 (FIG. 16, etc.), together with the agricultural field map MP2.

After that, the automatic steering work mode is performed after the automatic traveling work mode is performed on the agricultural machine 1 as described earlier, and the traveling vehicle body 3 travels along the automatic steering route (straight portions) L2s of the travel route L2 in the headlands E2a, E2b, and E2c. In so doing, based on the straight portions L2s and the position of the traveling vehicle body 3, the automatic controller 61 causes the working device 2 to perform ground work while performing automatic steering of the traveling vehicle body 3. At each connection point located between adjacent straight portions L2s between which no multi-point turn spot Px is set, based on the adjacent straight portions L2s located on the opposite sides of the connection point located therebetween and based on the position of the traveling vehicle body 3, the automatic controller 61 causes the working device 2 to continue performing ground work while continuing automatic steering of the traveling vehicle body 3.

In contrast, when the traveling vehicle body 3 approaches a multi-point turn spot Px, the notification U6 (FIG. 18) suggesting that a multi-point turn of the agricultural machine 1 be performed is displayed on the travel control screen D11 by the display operation interface 52. Upon the traveling vehicle body 3 reaching the multi-point turn spot Px, the automatic controller 61 temporarily stops automatic steering of the traveling vehicle body 3. At the multi-point turn spot Px, the traveling vehicle body 3 is caused to perform a multi-point turn by the operator's manual operation, the orientation of the traveling vehicle body 3 is brought into alignment with the traveling direction of the next straight portion L2s, and then the automatic controller 61 resumes automatic steering of the traveling vehicle body 3.

In a case where a turning portion L2r is connected to the multi-point turn spot Px, when a multi-point turn of the traveling vehicle body 3 is performed described above, the automatic controller 61 causes the working device 2 to temporarily stop the ground work. In a case where the multi-point turn spot Px is a connection point located between adjacent straight portions L2s-2, the automatic controller 61 may cause the working device 2 to temporarily stop the ground work or may cause the working device 2 to continue performing the ground work.

Figure 25A:
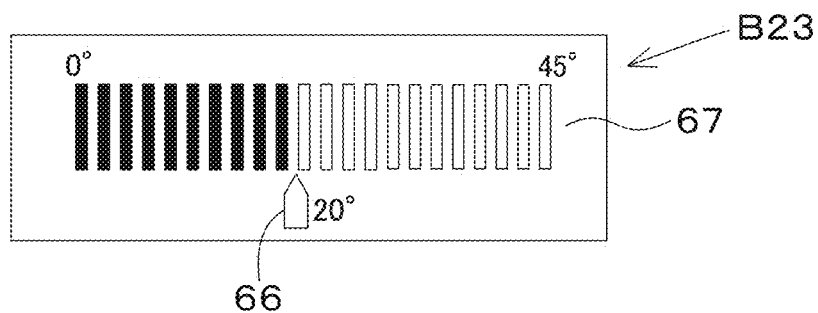
FIG. 25A is a diagram illustrating a first threshold change key.
Figure 25B:
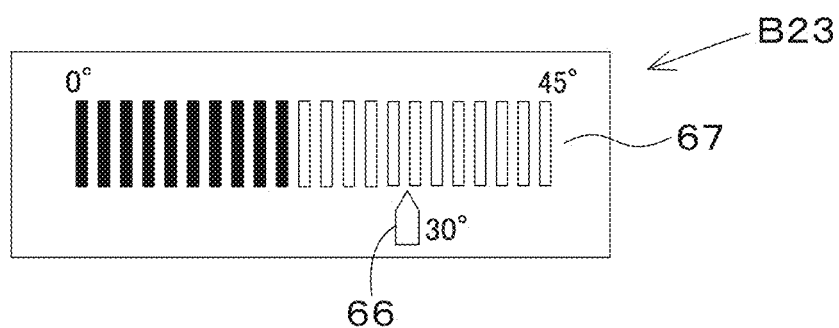
FIG. 25B is a diagram illustrating the first threshold change key.
Figure 25C:
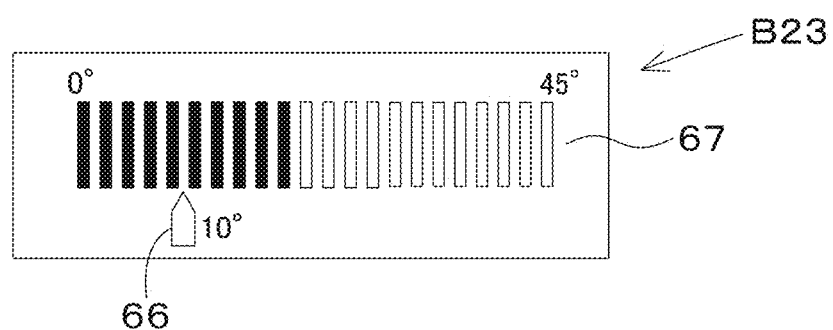
FIG. 25C is a diagram illustrating the first threshold change key.

The first threshold $\Delta\theta s1$ for setting the multi-point turn spot Px, etc. described above may be changeable via, for example, a first threshold change key B23 illustrated in FIGS. 25A to 25C. Specifically, for example, when the travel routes L1 and L2, etc. illustrated in FIG. 23B are displayed on the third route creation screen D10 (FIG. 14B, etc.) or the travel control screen D11 (FIG. 16, etc.), after selecting (tap operation) any of the straight portion L2s of the travel route L2, the turning portion L2r thereof, and the multi-point turn spot Px, the user performs a predetermined operation (for example, a long tap operation in which the key is touched for a predetermined duration or longer, or successive-tap operation in which the key is touched a plurality of times at short interval(s)) on the route change key B21 or the setting change key B20. When this user operation is notified from the display operation interface 52, the controller 51 causes the first threshold change key B23 illustrated in FIGS. 25A to 25C to be displayed on the third route creation screen D10 or the travel control screen D11.

The first threshold change key B23 is used to change the first threshold $\Delta\theta s1$ described above within the range from 0° to 45°, for example. The first threshold change key B23 includes a cursor 66 that indicates the first threshold $\Delta\theta s1$ and a meter 67 that shows the range within which the first threshold $\Delta\theta s1$ is changeable. The range within which the first threshold $\Delta\theta s1$ is changeable via the first threshold change key B23 is not limited to 0° to 45°. Any other angular range, for example, from a value greater than 0° to a value less than 45°, may be used.

In a default state, an optimum value (e.g., 20°) to perform automatic steering or automatic traveling of the traveling vehicle body 3 is set as the first threshold $\Delta\theta s1$. As illustrated in FIG. 25A, the cursor 66 of the first threshold change key B23 lies at a position indicating the optimum value of the first threshold $\Delta\theta s1$, and a portion of the meter 67 from 0° to a position indicated by the cursor 66 is displayed in a highlighted manner as compared with the other portion. That is, in the default state, the first threshold change key B23 indicates that the first threshold $\Delta\theta s1$ is set at the optimum value and that angles from 0° to the optimum value of the meter 67 are valid as the steering angle to perform automatic steering. In a case where the first threshold $\Delta\theta s1$ is set at the optimum value as described here, as illustrated in FIGS. 23B and 24, the straight portions L2s of the travel route L2, the turning portions L2r thereof, and the multi-point turn spots Px are created by the route creator 51c in the headland E1.

Figure 26A:
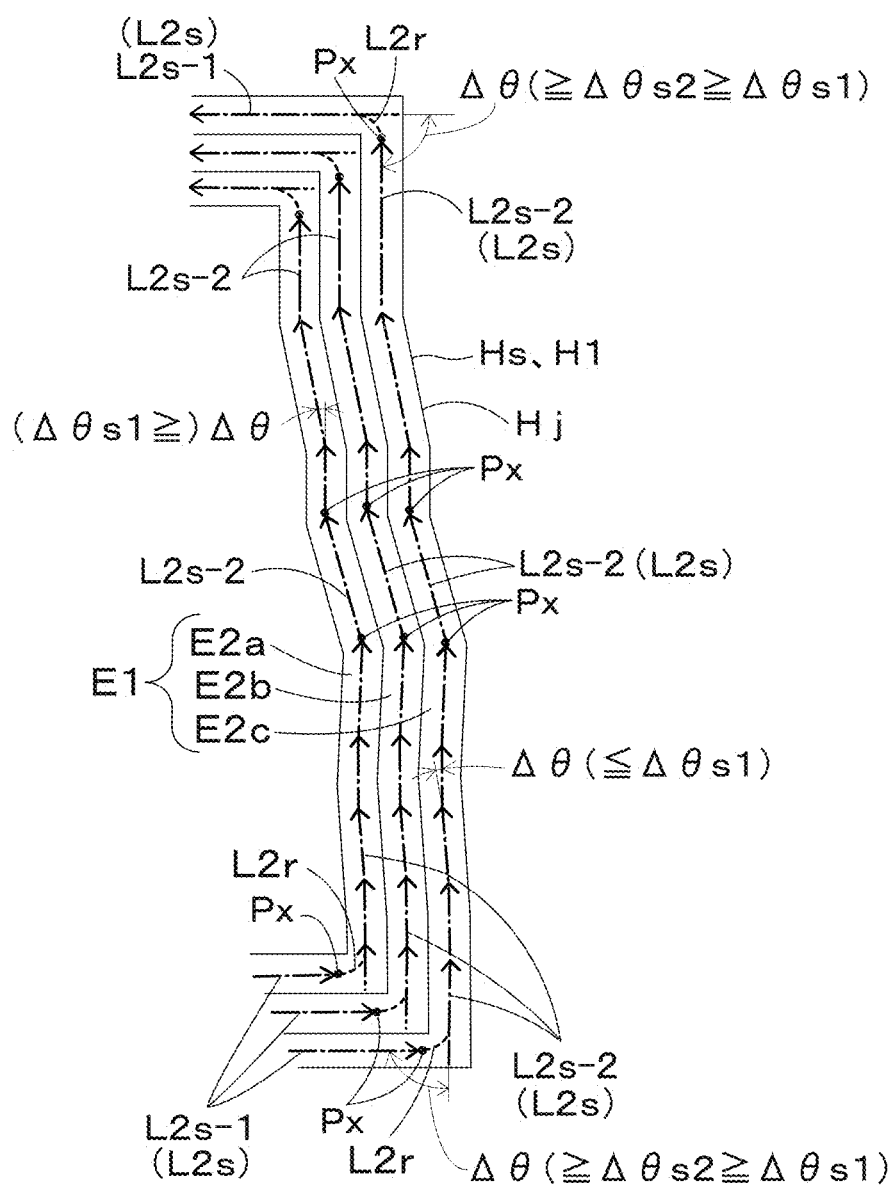
FIG. 26A is a diagram for explaining a method of creating a travel route in an irregular agricultural field.

For example, the user drags the cursor 66 of the first threshold change key B23, and, as illustrated in FIG. 25B, moves the cursor 66 to a position indicating a value (e.g., 30°) greater than the optimum value. Upon this cursor movement, angles from 0° to this greater value of the meter 67 become valid as the steering angle to perform automatic steering, and the portion therebetween is displayed in a highlighted manner. The route creator 51c changes the first threshold $\Delta\theta s1$ to this greater value pointed to by the cursor 66, and, based on the first threshold $\Delta\theta s1$ after the change, creates the straight portions L2s of the travel route L2, the turning portions L2r thereof, and the multi-point turn spots Px again. With this, for example, as illustrated in FIG. 26A, on the travel route L2, the number of the multi-point turn spots Px decreases, and the distance over which automatic steering of the traveling vehicle body 3 is performed continuously increases.

Figure 26B:
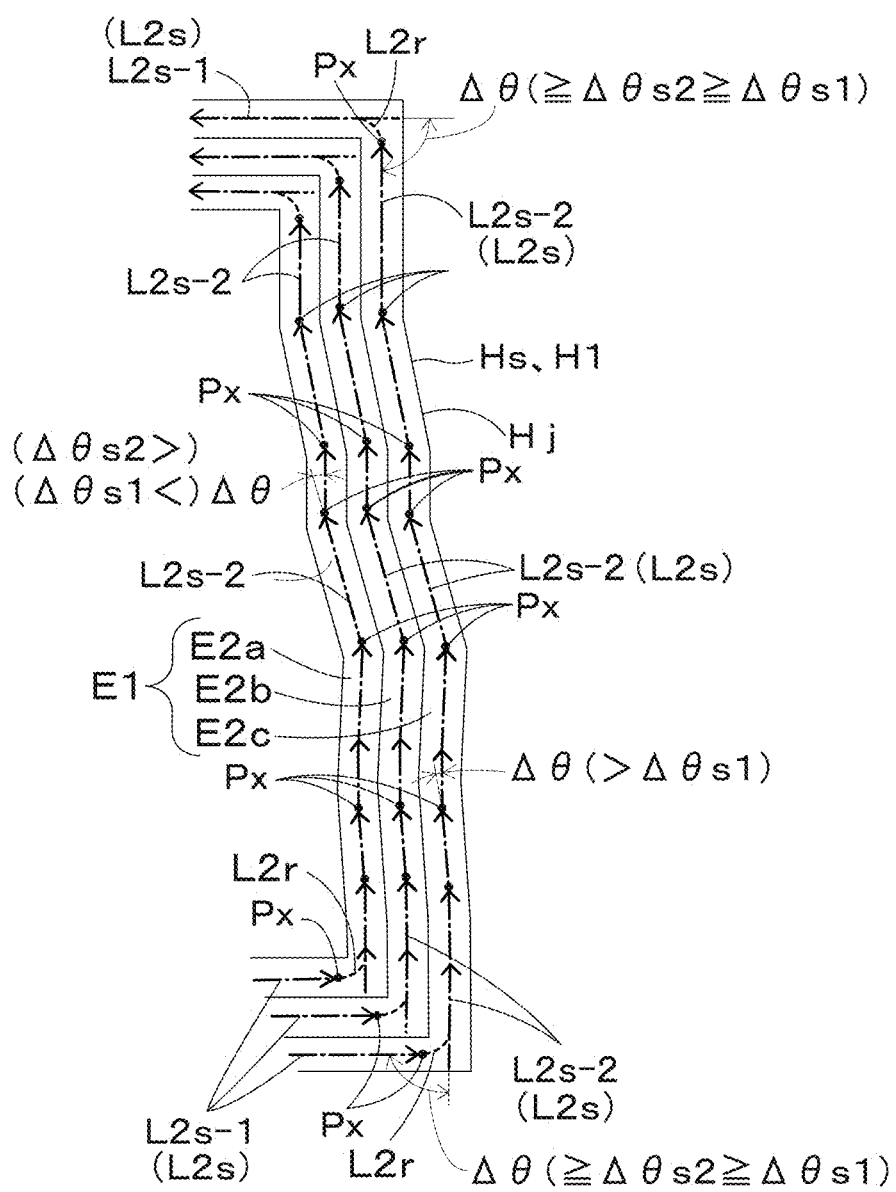
FIG. 26B is a diagram for explaining the method of creating a travel route in an irregular agricultural field.

For example, assume that, as illustrated in FIG. 25C, the user moves the cursor 66 to a position indicating a value (e.g., 10°) less than the optimum value. With this, angles from 0° to this less value of the meter 67 become valid as the steering angle to perform automatic steering, and the portion therebetween is displayed in a highlighted manner. The route creator 51c changes the first threshold $\Delta\theta s1$ to this less value pointed to by the cursor 66, and, based on the first threshold $\Delta\theta s1$ after the change, creates the straight portions L2s of the travel route L2, the turning portions L2r thereof, and the multi-point turn spots Px again. With this, for example, as illustrated in FIG. 26B, on the travel route L2, the number of the multi-point turn spots Px increases, and the steering angle during automatic steering of the traveling vehicle body 3 is reduced, making it possible to perform automatic steering more stably.

In accordance with the change in the travel route L2 by the route creator 51c described above, the controller 51 updates the manner of display of the travel route L2 in the third route creation screen D10 or the travel control screen D11. Moreover, if the first threshold change key B23 is not operated for a certain length of time, the controller 51 deletes the display of the first threshold change key B23. The display operation interface 52 and the route creator 51c correspond to a threshold changer that changes the first threshold $\Delta\theta s1$ as described above.

In the preferred embodiment described above, when the first threshold $\Delta\theta s1$ is changed, the route creator 51c creates each travel route L2 again. However, as another example, when the first threshold $\Delta\theta s1$ is changed in a state in which either the straight portion L2s of the travel route L2 or the multi-point turn spot Px created by the route creator 51c is selected by the user, the route creator 51c may create again the travel route L2 for the selected portion and the straight portion L2s connected thereto. A second threshold change key via which the second threshold $\Delta\theta s2$ described above can be changed may be provided in the screen D10, D11, etc. of the display operation interface 52 such that the user can operate it.

In the preferred embodiment described above, as illustrated in FIG. 24, if the angular difference Δθ between one straight portion L2s and the other straight portion L2s is not greater than the first threshold Δθs1, the one straight portion L2s and the other straight portion L2s are set as a continuous portion of the automatic steering route. However, besides this example, for example, as illustrated in FIGS. 27A to 27C, smoothing may be performed to reduce the steering angle during automatic steering on the one straight portion L2s and the other straight portion L2s.

Figure 27A:
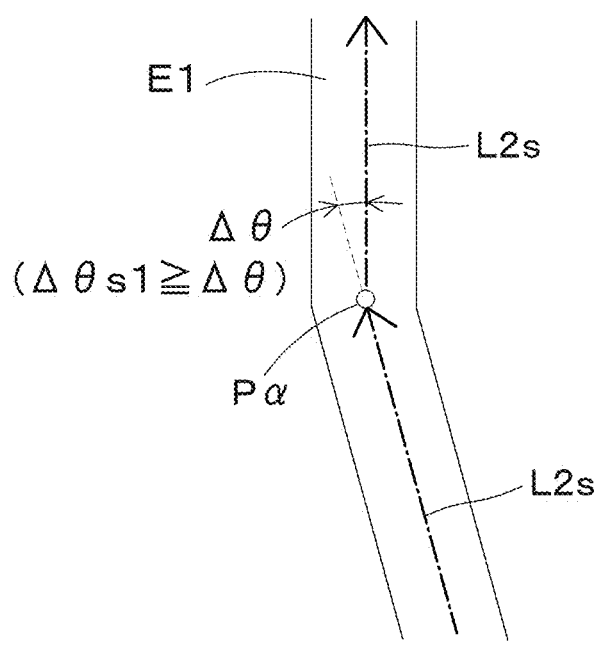
FIG. 27A is a diagram for explaining smoothing processing on a travel route.

Specifically, after calculating the angular difference Δθ between the one straight portion L2s and the other straight portion L2s connected to each other of the travel route L2 created in the headland area E1, the route creator 51c, as illustrated in FIG. 27A, performs smoothing on the one straight portion L2s and the other straight portion L2s having an angular difference Δθ not greater than the first threshold Δθs1.

Figure 27B:
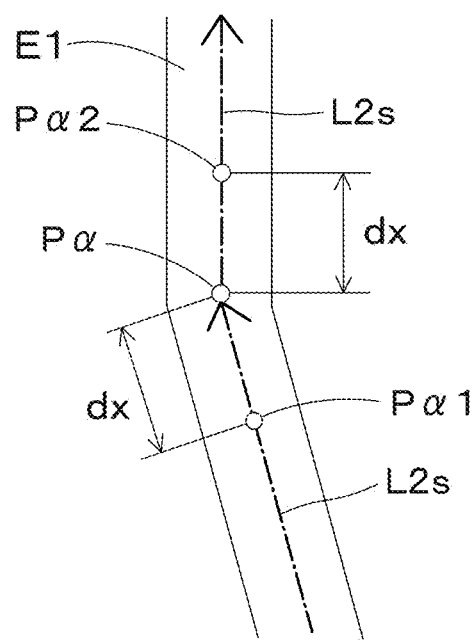
FIG. 27B is a diagram for explaining smoothing processing on a travel route.

In the smoothing, first, as illustrated in FIG. 27A, the route creator 51c creates, on the one straight portion L2s, a first intermediate point Pα1 located at a predetermined distance dx from the connection point Pα located between the one straight portion L2s and the straight portion L2s having an angular difference Δθ not greater than the first threshold Δθs1, and creates, on the other straight portion L2s, a second intermediate point Pα2 at the predetermined distance dx from the connection point Pα (FIG. 27B). Next, the route creator 51c creates a straight portion L2s connecting the first intermediate point Pα1 and the second intermediate point Pα2, and deletes a portion between the first intermediate point Pα1 of the one straight portion L2s and the connection point P and a portion between the second intermediate point Pα2 of the other straight portion L2s and the connection point Pα (FIG. 27C). Note that the deleted portion of the straight portions L2s created earlier is represented by broken line in FIG. 27C. Then, the route creator 51c connects the one straight portion L2s, the newly created straight portion L2s, and the other straight portion L2s to obtain a continuous portion of the automatic steering route.

Figure 27C:
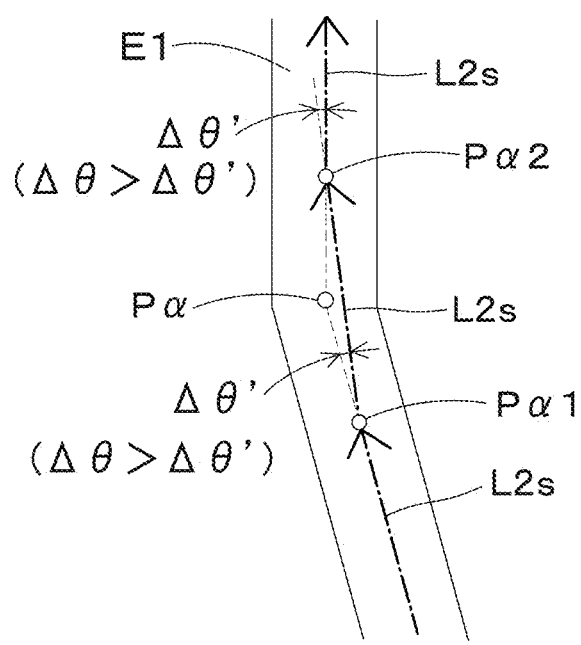
FIG. 27C is a diagram for explaining smoothing processing on a travel route.

With this, the two consecutive straight portions L2s illustrated in FIGS. 27A and 27B turn into three consecutive straight portions L2s as illustrated in FIG. 27C. Moreover, the angular difference Δθ' between the consecutive straight portions L2s illustrated in FIG. 27C (the newly created straight portion L2s and each straight portion L2s created earlier) is less than the angular difference Δθ between the connected straight portions L2s illustrated in FIG. 27A (the straight portions L2s created earlier). That is, adding a straight portion L2s as described above reduces the angular difference Δθ between the consecutive straight portions L2s and reduces the degree of zigzag (a degree of curve) of the travel route L2. Therefore, in comparison with the consecutive straight portions L2s illustrated in FIG. 27A, the consecutive straight portions L2s illustrated in FIG. 27C make it possible to reduce the steering angle during automatic steering.

Even if the angular difference Δθ between one straight portion L2s and the others straight portion L2s is not greater than the first threshold Δθs1, in a case where the length of the one straight portion L2s or the other straight portion L2s is less than the predetermined distance dx, the route creator 51c does not create a straight portion L2s between the one straight portion L2s or the other straight portion L2s, and connects the one straight portion L2s and the other straight portion L2s to obtain a continuous portion of the automatic steering route.

In the preferred embodiment described above, smoothing is performed on one straight portion L2s and the other straight portion L2s having an angular difference Δθ not greater than the first threshold Δθs1. However, besides this example, for example, smoothing may be performed on one straight portion L2s and another straight portion L2s having an angular difference Δθ not greater than the first threshold Δθs1 and equal to or greater than a predetermined third threshold Δθs3. The third threshold Δθs3 is set to be not greater than the first threshold Δθs1.

In the smoothing in this case, first, for one straight portion L2s and another straight portion L2s having an angular difference Δθ not greater than the first threshold Δθs1 and not less than the third threshold Δθs3, as illustrated in FIGS. 27A to 27C, the route creator 51c creates, on the one straight portion L2s, the first intermediate point Pα1 at the predetermined distance dx from the connection point Pα between the straight portions L2s, and creates, on the other straight portion L2s, the second intermediate point Pα2 located at the predetermined distance dx from the connection point Pα. Next, the route creator 51c creates a straight portion L2s connecting the first intermediate point Pα1 and the second intermediate point Pα2, and deletes a portion between the first intermediate point Pα1 of the one straight portion L2s and the connection point Pα and a portion between the second intermediate point Pα2 of the other straight portion L2s and the connection point Pα. Then, the route creator 51c connects the one straight portion L2s, the newly created straight portion L2s, and the other straight portion L2s to obtain a continuous portion of the automatic steering route.

Even if the angular difference Δθ between the one straight portion L2s and the other straight portion L2s is not greater than the first threshold Δθs1 and is not less than the third threshold Δθs3, in a case where the length of the one straight portion L2s or the other straight portion L2s is less than the predetermined distance dx, the route creator 51c does not create a straight portion L2s between the one straight portion L2s or the other straight portion L2s, and connects the one straight portion L2s and the other straight portion L2s to obtain a continuous portion of the automatic steering route. Moreover, also when the angular difference Δθ between one straight portion L2s and another straight portion L2s is less than the third threshold Δθs3, the route creator 51c does not create a straight portion L2s between the one straight portion L2s or the other straight portion L2s, and connects the one straight portion L2s and the other straight portion L2s to obtain a continuous portion of the automatic steering route.

Since only relatively long straight portions L2s having an angular difference Δθ not greater than the first threshold Δθs1 and not less than the third threshold Δθs3 are smoothened through the above processing, it is possible to reduce the processing burden on the route creator 51c. Moreover, in the travel route L2 in a case where the smoothing is performed, in comparison with the travel route L2 in a case where the smoothing is not performed, the number of relatively short straight portions L2s-2 increases, making it possible to reduce the steering angle during automatic steering.

As another example, a third threshold change key via which the third threshold Δθs3 can be changed may be provided in the screen D10, D11, etc. of the display operation interface 52 such that the user can operate it. In this case, as the set value of the third threshold Δθs3 decreases in relation to the first threshold Δθs1, the number of times of the smoothing performed on the straight portions L2s of the travel route L increases. Therefore, in the travel route L2, the number of relatively short straight portions L2s-2 further increases, making it possible to further reduce the steering angle during automatic steering. As the set value of the third threshold Δθs3 becomes equal to the first threshold Δθs1 or closer to the first threshold Δθs1, the number of times of the smoothing performed on the straight portions L2s of the travel route L decreases. Therefore, the processing burden on the route creator 51c is reduced, and, in the travel route L2, the number of relatively short straight portions L2s-2 decreases, making it possible to increase the distance over which the traveling vehicle body 3 travels straight continuously during automatic steering.

In accordance with the change in the travel route L2 through the smoothing by the route creator 51c described above, the controller 51 updates the display of the travel route L2 in the third route creation screen D10 or the travel control screen D11. Moreover, if the third threshold change key B24 is not operated for a certain length of time, the controller 51 deletes the display of the key B24. The display operation interface 52 and the route creator 51c correspond also to a threshold changer that changes the third threshold Δθs3 as described above.

Figure 28A:
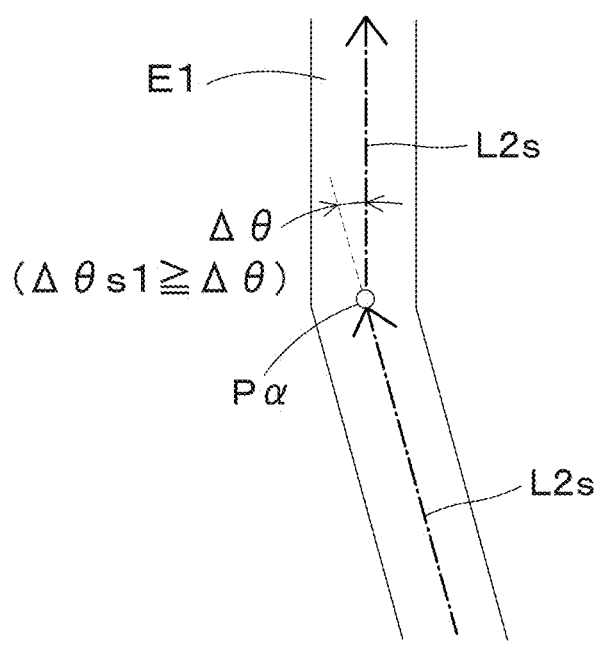
FIG. 28A is a diagram for explaining another smoothing processing on a travel route.
Figure 28B:
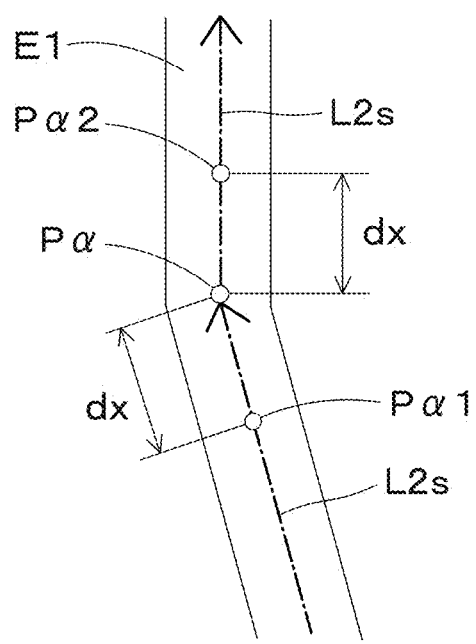
FIG. 28B is a diagram for explaining another smoothing processing on a travel route.
Figure 28C:
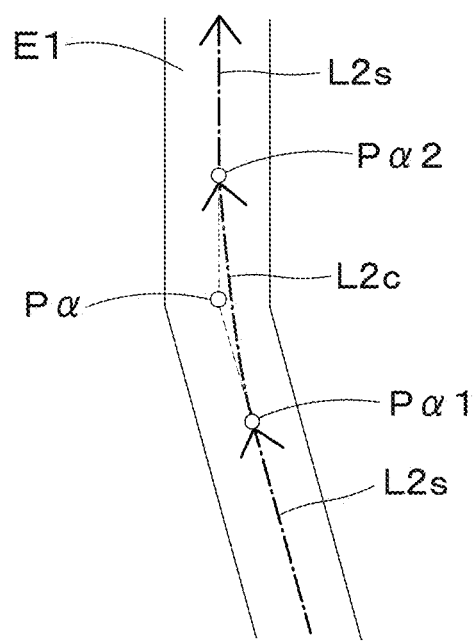
FIG. 28C is a diagram for explaining another smoothing processing on a travel route.

In the preferred embodiment described above, an example in which, in the smoothing, as illustrated in FIGS. 27A to 27C, a straight portion L2s is created between straight portions L2s having an angular difference Δθ not greater than the first threshold Δθs1 or the like (and not less than the third threshold Δθs3) has been discussed. However, instead of the straight portion L2s, for example, as illustrated in FIGS. 28A to 28C, a curved portion L2c may be created. The curved portion L2c is a route along which the traveling vehicle body 3 is caused to draw a gentle curve (travel while making a turn), and is included in the travel route L2. The curved portion L2c can be set to the automatic steering route, the automatic operation route, or the manual operation route.

Specifically, the route creator 51c creates, on one straight portion L2s, a first intermediate point Pα1 at a predetermined distance dx from a connection point Pα (FIG. 28A) between the one straight portion L2s and the other straight portion L2s having an angular difference Δθ not greater than the first threshold Δθs1 (or not greater than the first threshold Δθs1 and not less than the third threshold Δθs3), and creates, on the other straight portion L2s, a second intermediate point Pα2 at the predetermined distance dx from the connection point Pα (FIG. 28B). Next, the route creator 51c creates a curved portion L2c to connect the first intermediate point Pα1 and the second intermediate point Pα2, and deletes a portion between the first intermediate point Pα1 of the one straight portion L2s and the connection point Pα and a portion between the second intermediate point Pα2 of the other straight portion L2s and the connection point Pα (FIG. 28C). Then, the route creator 51c connects the one straight portion L2s, the newly created curved portion L2c, and the other straight portion L2s to obtain a continuous portion of the automatic steering route.

The curvature radius of the curved portion L2c is set based on, for example, the angular difference Δθ between the straight portions L2s, the first threshold Δθs1 (or the third threshold Δθs3), the length (distance) of each straight portion L2s, the predetermined distance dx, and/or the position of the connection point Pα by the route creator 51c. The curved portion L2c should preferably be created such that, at least, the minimum distance from the connection point Pα to the curved portion L2c is less than a predetermined separation distance (not illustrated) less than the predetermined distance dx.

A key that allows the user to select whether or not to perform the smoothing or whether or not to change the threshold Δθs1, Δθs2, Δθs3 may be provided in the third route creation screen D10, etc. The above-described procedure for creating the travel route L2 or the multi-point turn spot Px or for the smoothing may be applied not only to an agricultural field that includes a zigzag portion Hj on the contour H1 but also to an agricultural field that includes a curved portion such as an arc curve.

In the preferred embodiment described above, an example in which the straight portion L2s, L2a (straight route portion L2a) included in the travel route L2 for the automatic steering work mode and the turning portion L2r, L2b (turning route portion L2b), etc. are displayed on the screen of the display operation interface 52 has been discussed. However, among them, the straight portion L2s, L2a, etc. that is the automatic steering route may be displayed on the display operation interface 52 without displaying the turning portion L2r, L2b that is the manual operation route on the display operation interface 52.

Figure 29:
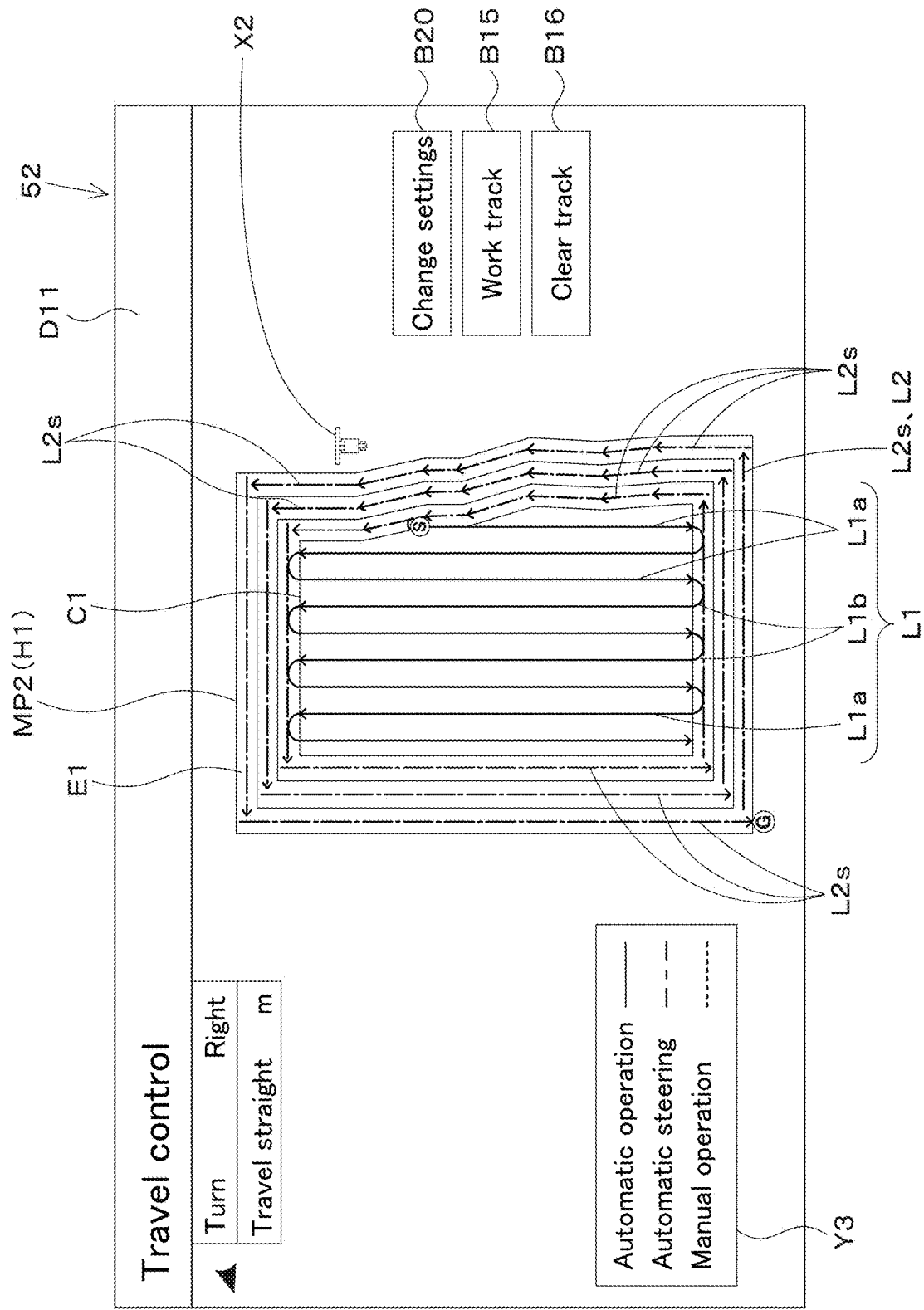
FIG. 29 is a diagram illustrating another example of the travel control screen of the agricultural work assistance apparatus.

For example, in the preferred embodiment illustrated in FIG. 29, on the agricultural field map MP2 included in the travel control screen D11 displayed on the display operation interface 52, the straight portions L2s (automatic steering route) of the travel route L2 created by the route creator 51c, are displayed, and the turning portions L2r (FIG. 16, etc.) that are the manual operation route are not displayed. Furthermore, the straight route portions (automatic operation route) L1a that can be changed into the automatic steering route by operating the route change key B21, etc. are displayed on the agricultural field map MP2. With this, the user is able to easily recognize the portion(s) (straight portion L2s, L1a, etc.), of the travel route L1, L2, settable as the automatic steering route.

Also on the agricultural field map MP2 displayed on the second route creation screen D7, the third route creation screen D10, or the travel control screen D8, the portion(s) of the travel route L1, L2, L3 that is/are settable as the automatic steering route may be displayed and the portion(s) not settable as the automatic steering route (turning portion L2r, L1r, L3r, L2b, L1b) may not be displayed. In addition, an operation key for allowing the user to select whether or not to display the portion(s) not settable as the automatic steering route may be provided in the screen D7, D8, D10, D11.

In the preferred embodiment described above, an example in which the route creator 51c creates the turning portion L2r, L2b that is the manual operation route in addition to the straight portion L2s, L2a that is the automatic steering route when creating the travel route L2 for the automatic steering work mode has been discussed. However, the route creator 51c may be configured or programmed to create the straight portion(s) L2s, L2a that is/are the automatic steering route and not to create the turning portion(s) L2r, L2b that is/are the manual operation route when creating the travel route L2. In this case, although the straight portion(s) L2s, L2a created by the route creator 51c is/are displayed on the subsequent travel control screen D8, D11, the turning portion(s) L2r, L2b that is/are not created is/are not displayed on the travel control screen D8, D11.

In a case where the straight portion L2s, L2a is thereafter changed into the automatic operation route by operating the route change key B21, etc., it is only necessary that the route creator 51c create turning portions connected to the such straight portions and the controller 51 cause all of them to be displayed on the travel control screen D8, D11 of the display operation interface 52.

Other Preferred Embodiments

In the preferred embodiment illustrated in FIG. 18, an example in which the notification U6 suggesting that a multi-point turn of the traveling vehicle body 3 be performed is displayed on the screen D11 of the display operation interface 52 when the traveling vehicle body 3 approaches the multi-point turn spot Px in the automatic steering work mode has been discussed. However, also in the automatic traveling work mode, a notification indicating that a multi-point turn of the traveling vehicle body 3 will be performed automatically may be displayed on the travel control screen D8, D11 of the display operation interface 52 when the traveling vehicle body 3 approaches a point where the traveling vehicle body will change its position and/or traveling direction (the termination point of the straight route portion L1a included in the travel route L1, the termination point of the straight portion L1s included in the go-around route portion L1c, or the like).

In addition, also in the manual operation work mode, a notification suggesting that a multi-point turn of the traveling vehicle body 3 be performed may be displayed on the screen of the display operation interface 52 when the traveling vehicle body 3 approaches a point where the traveling vehicle body 3 will change its position and/or traveling direction (the termination point of the straight portion L3s of the travel route L3, etc.). A multi-point turn of the traveling vehicle body 3 of the agricultural machine 1 is the action of causing the traveling vehicle body 3 to travel forward, travel rearward, or make a turn for the purpose of changing the position and/or traveling direction of the traveling vehicle body 3 and, for example, may not include one of the forward traveling and rearward traveling actions of the traveling vehicle body 3 not involving a turn.

In the preferred embodiment described above, the following example has been discussed. The route creator 51c creates the straight portions L2s, the turning portions L2r, and/or the multi-point turn spots Px, etc. (including the curved portions L2c) based on the angular difference Δθ between the traveling direction of one straight portion L2s and that of another straight portion L2 connected to the one straight portion L2 when creating the travel route L2 on the agricultural field map MP2 having an irregular contour H1 as illustrated in FIGS. 23A and 23B, etc. However, for example, similarly, the route creator 51c may create the straight portion(s), the turning portion(s), and/or the multi-point turn spot(s), etc. based on the angular difference between one straight portion included in the travel route L2 and another straight portion connected to the distal end of the one straight portion when creating the travel route L2 for the automatic steering work mode on the agricultural field map MP2 having a rectangular contour H1 as illustrated in FIG. 14B, etc. Similarly, the route creator 51c may create the straight portion(s), the turning portion(s), and/or the multi-point turn spot(s), etc. based on the angular difference between the traveling direction of one straight portion and that of another straight portion connected to the distal end of the one straight portion when creating the travel route L1 for the automatic traveling work mode.

In the preferred embodiment described above, as illustrated in FIG. 11A, etc., the area setter 51b sets, as the central area C1, the area within the contour C1 obtained by displacing the contour H1 of the agricultural field inward a number of times corresponding to the number of headlands, each by the width W4, which is less than the working width W1 of the working device 2, and sets the area between the contour C1 and the contour H1 as the headland area E1. However, in consideration of, for example, the maintenance state of the area of the agricultural field that is adjacent to a footpath, work performance of the agricultural machine 1, and/or the like, the headland area E1 may be set to be wider. In addition, the travel route L2 may be created such that the agricultural machine 1 will travel along a line located somewhat inward of the contour H1 of the agricultural field.

Figure 30:
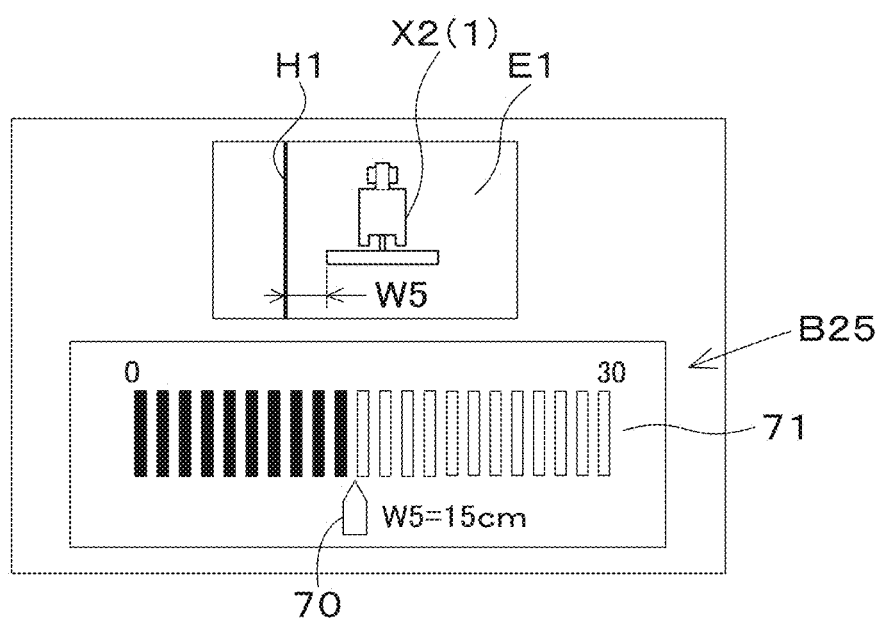
FIG. 30 is a diagram illustrating an agricultural field shift amount change key.

Specifically, for example, after the settings key B0 illustrated in FIG. 3 is selected, the controller 51 of the agricultural work assistance apparatus 50 causes the display operation interface 52 to display an agricultural field shift amount change key B25 illustrated in FIG. 30 when a predetermined input operation is performed on the display operation interface 52. Alternatively, the agricultural field shift amount change key B25 may be displayed on the first route creation screen D6 illustrated in FIG. 9 or the second route creation screen D7 illustrated in FIG. 10, etc. The agricultural field shift amount change key B25 is used to adjust the position of the outermost traveling line on the agricultural field map MP2, that is, a shift amount W5 that is a gap between the outermost traveling line and the contour H1 of the agricultural field. The agricultural field shift amount change key B25 includes a cursor 70 that indicates, and changes, the shift amount W5, and a meter 71 that shows a range within which the shift amount W5 is adjustable. The shift amount W5 is adjustable via the agricultural field shift amount change key B25 within a range from, for example, 0 to 30 cm.

Figure 31:
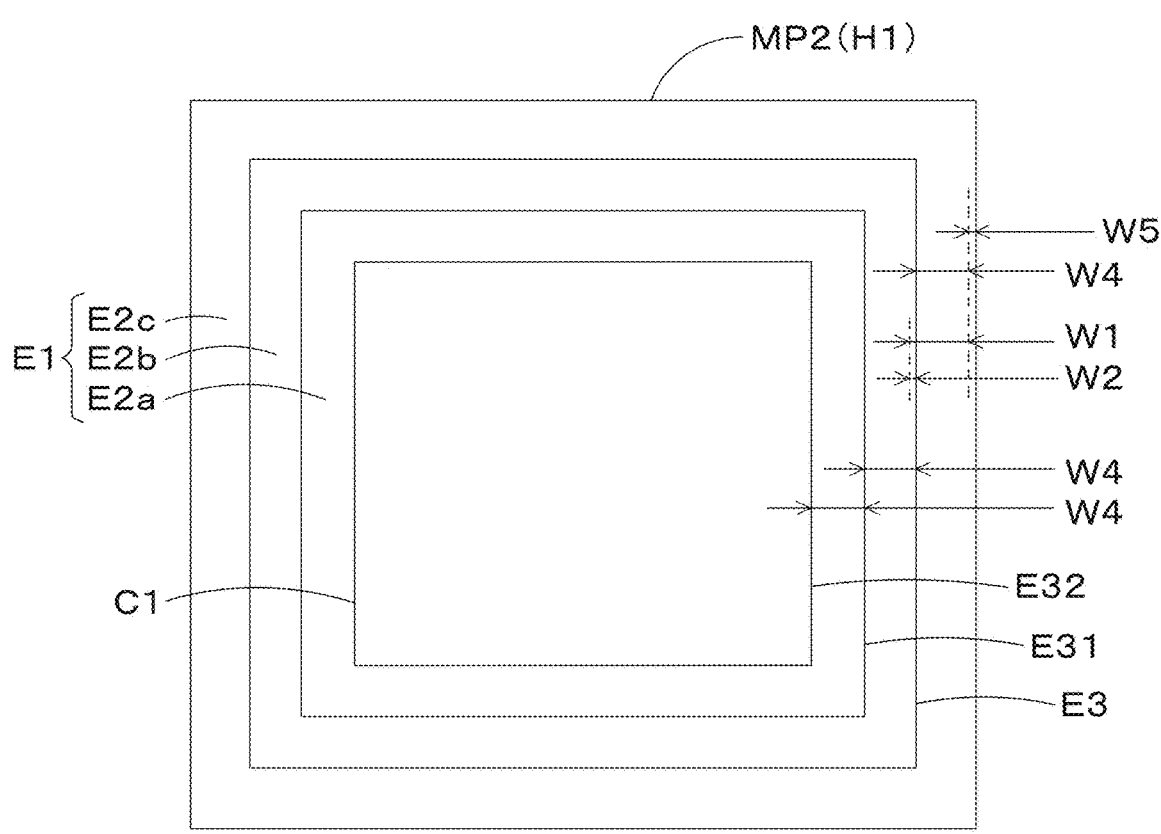
FIG. 31 is a diagram for explaining another method of setting areas and a travel route.

As illustrated in FIG. 30, when the cursor 70 of the agricultural field shift amount change key B25 is operated to set the shift amount W5, which is the gap between the outermost traveling line and the contour H1 of the agricultural field, to a value greater than zero, first, as illustrated in FIG. 31, the area setter 51b calculates a contour E3 (first contour) obtained by displacing the contour H1 of the agricultural field inward by a displacement amount obtained by adding, to the shift amount W5, the width W4, which is obtained by subtracting the overlap W2 for the headlands from the working width W1 of the working device 2 (first displacement amount=W4+W5=W1−W2+W5). Next, the area setter 51b calculates contours E31 and E32 (second contour) formed by displacing the contour E3 a number of times obtained by subtracting one from the inputted number of headlands, each by the width W4 (second displacement amount). Then, the area setter 51b sets an area enclosed by the innermost one E32 of the contours E31 and E32 (the area within the contour E32) as the central area C1, and sets the headlands E2a, E2b, and E2c the number of which corresponds to the inputted number of headlands between the central area C1 and the contour H1 of the agricultural field. As a result, the width of the outermost headland E2c is equal to the displacement amount described above. The width of each of the other headlands E2b and E2a is equal to the width W4 and is less than the width of the headland E2c.

Figure 32:
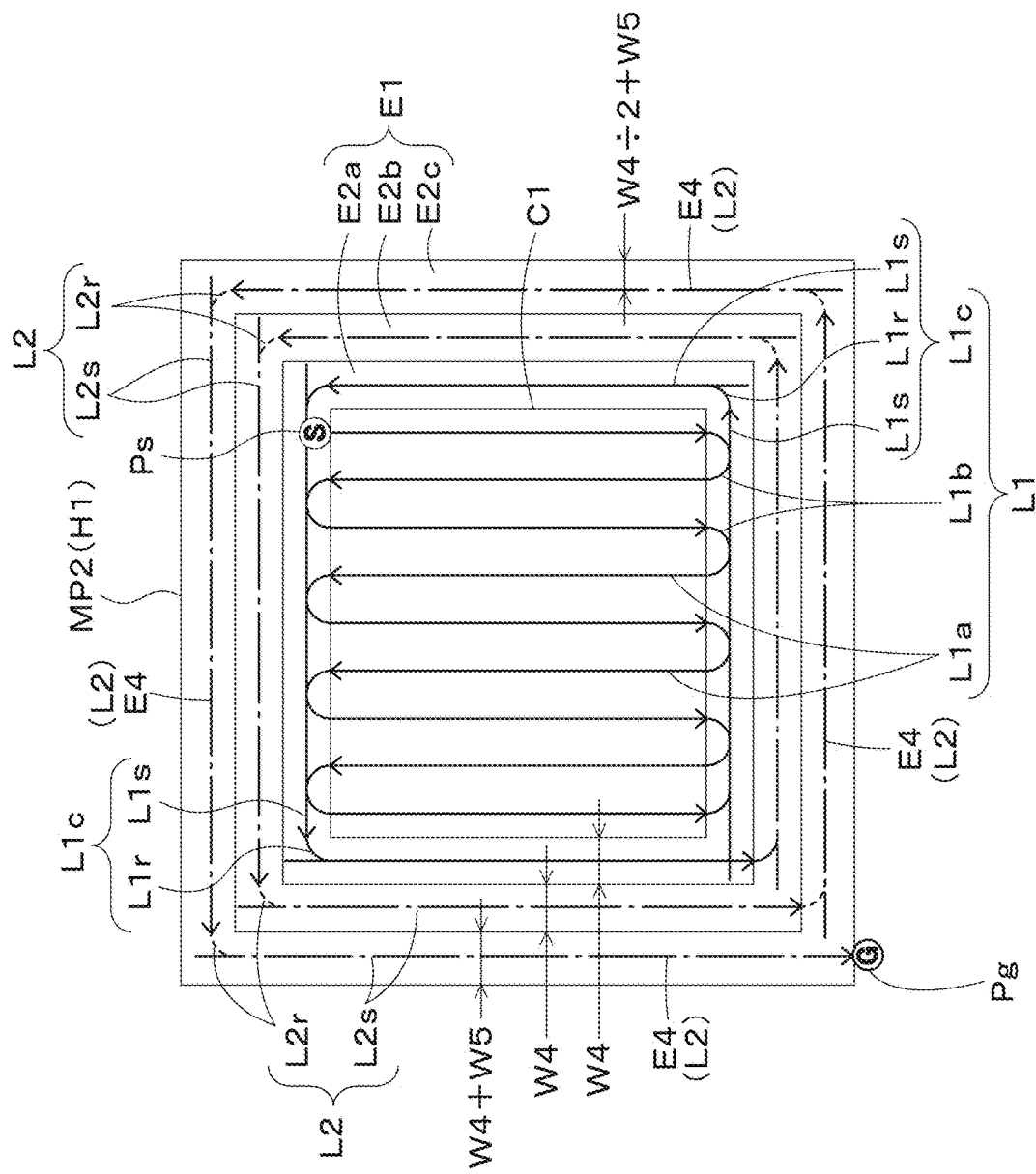
FIG. 32 is a diagram for explaining another method of setting areas and a travel route.

After the central area C1 and the headland area E1 are set inward of the contour H1 of the agricultural field, the route creator 51c creates the travel routes L1 and L2 in the central area C1 and the headland area E1 as illustrated in FIG. 32. When this is performed, for the central area C1, and for the headlands E2a and E2b other than the outermost headland E2c in the headland area E1, the route creator 51c creates the travel routes L1, L1c, and L2 through the procedure having been described with reference to FIGS. 11B to 11D and FIG.

15, etc. For the outermost headland E2c in the headland area E1, the route creator 51c creates the travel route L2 on a line E4 created by displacing the contour H1 of the agricultural field inward by a displacement amount obtained by adding a half of the width W4 to the shift amount W5 (W4/2+W5).

Figure 33:
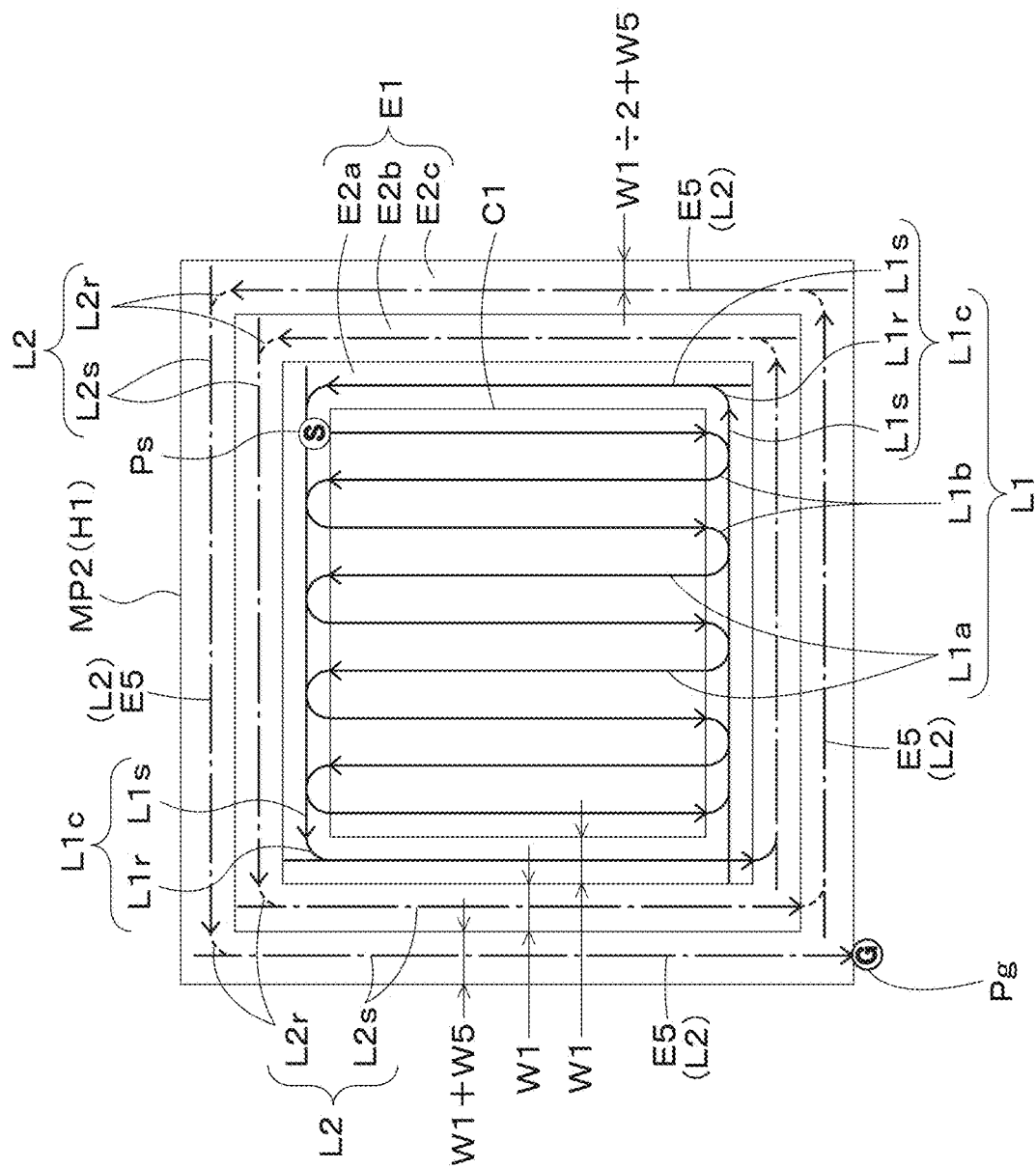
FIG. 33 is a diagram for explaining another method of setting areas and a travel route.

In a case where the overlap W2 for the headlands is set to zero, the width W4 is equal to the working width W1 (W4=W1) and, therefore, as illustrated in FIG. 33, the width of the outermost headland E2c is equal to the sum of the working width W1 and the gap W5, and the width of each of the other headlands E2b and E2a is equal to the working width W1. Then, for the outermost headland E2c, the route creator 51c creates the travel route L2 on a line E5 created by displacing the contour H1 of the agricultural field inward by a displacement amount obtained by adding a half of the working width W1 to the shift amount W5 (W1/2+W5).

Figure 34:
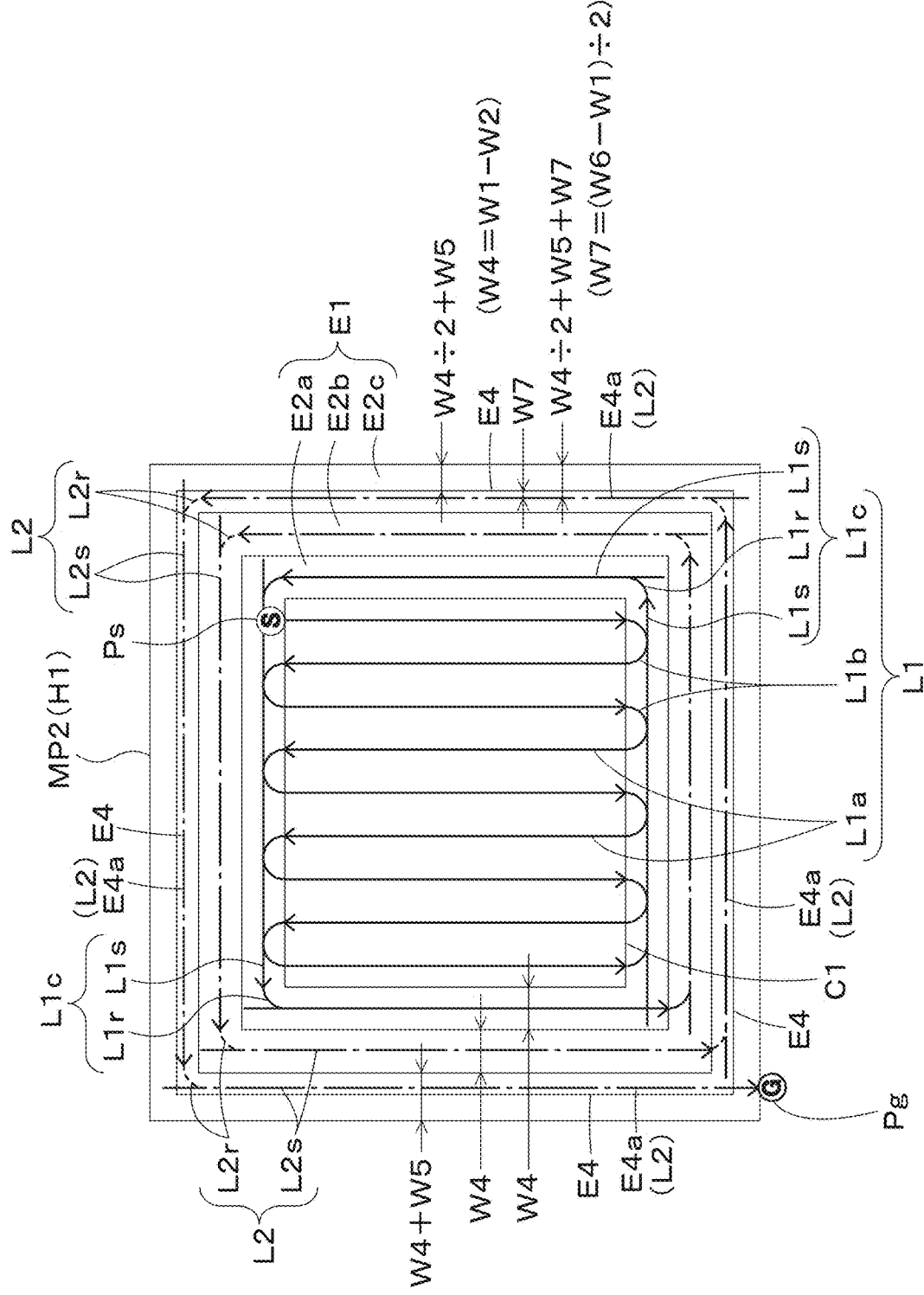
FIG. 34 is a diagram for explaining another method of setting areas and a travel route.
Figure 35:
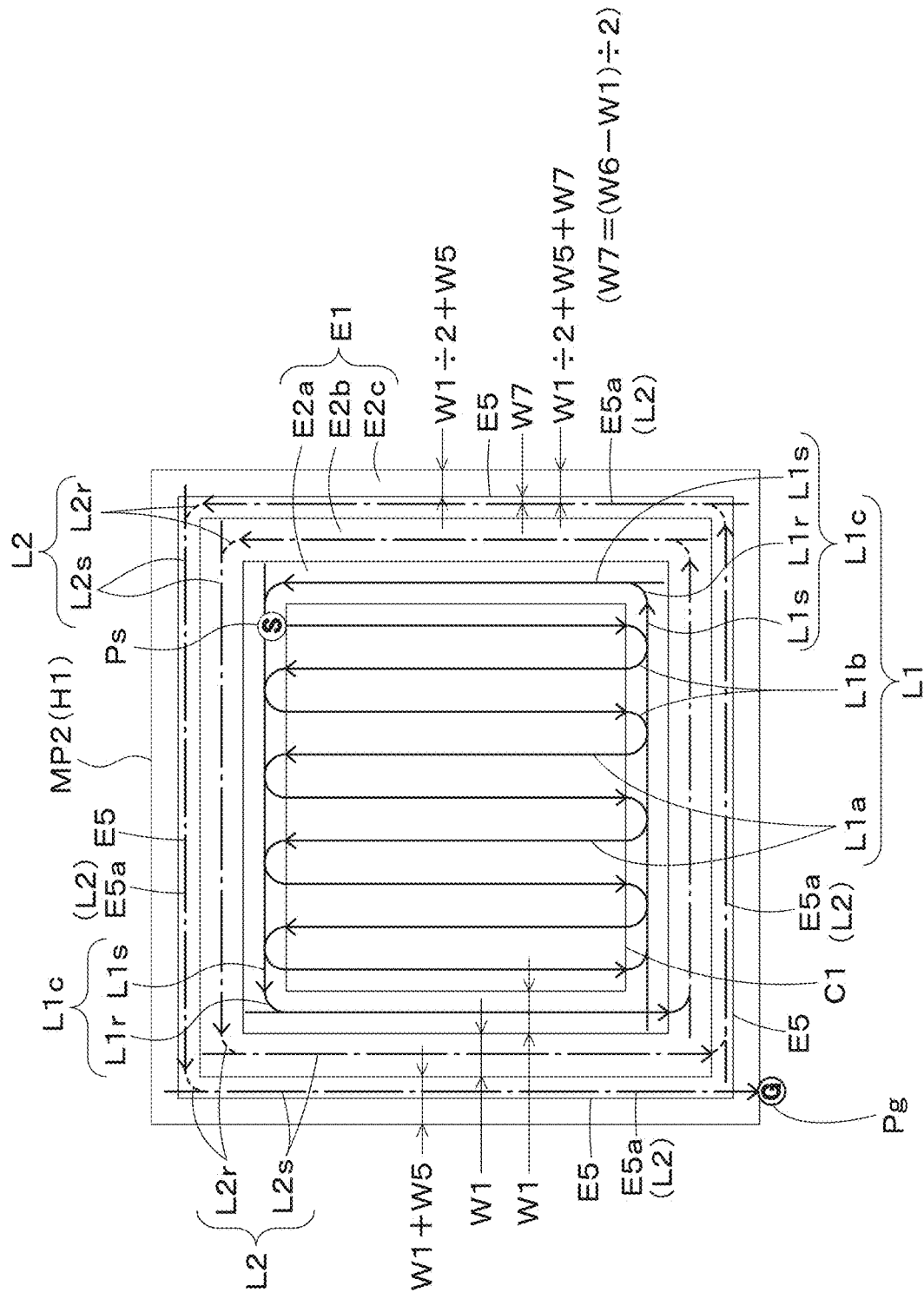
FIG. 35 is a diagram for explaining another method of setting areas and a travel route.
Figure 36:
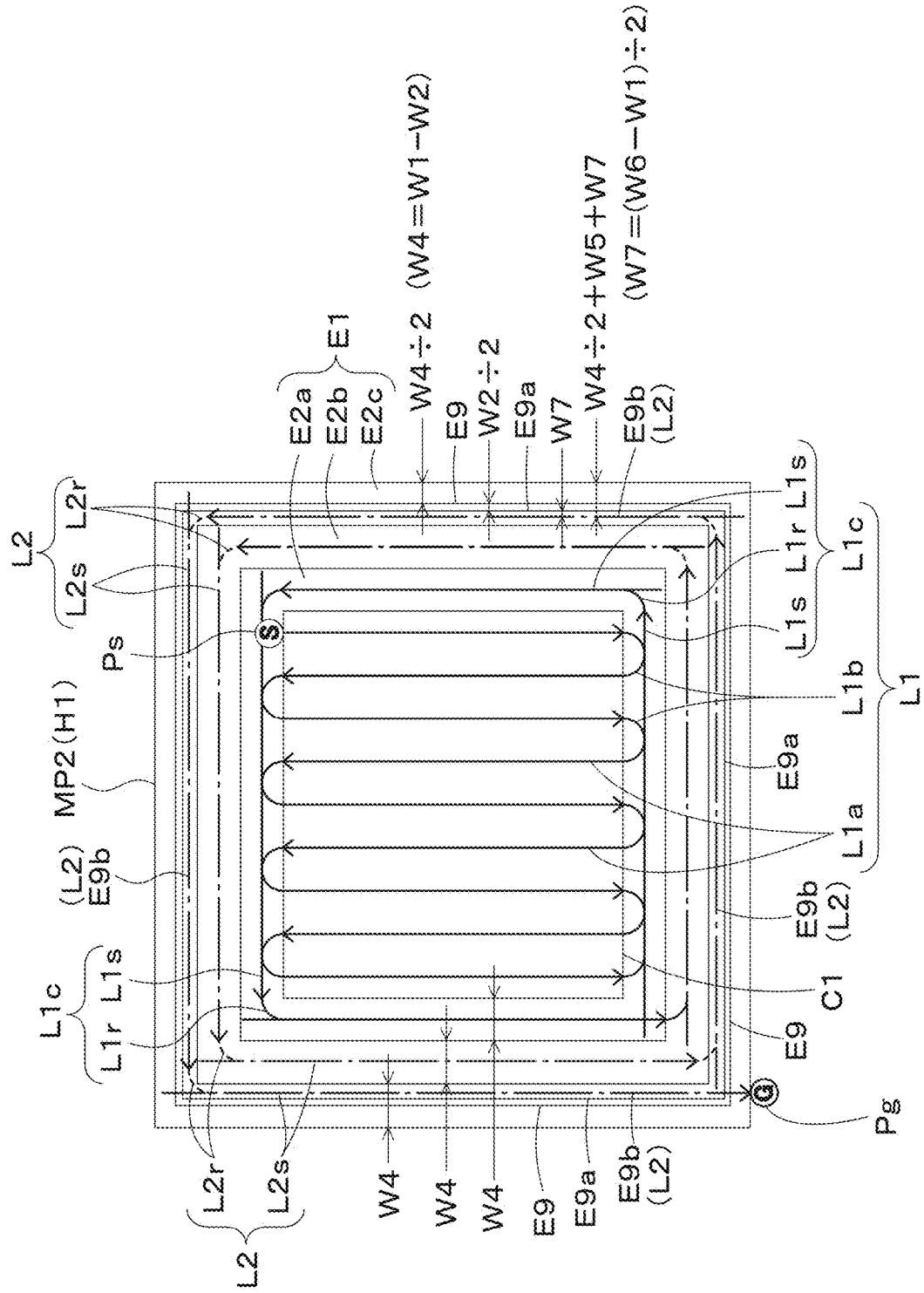
FIG. 36 is a diagram for explaining another method of setting areas and a travel route.

The travel route L2 and/or the areas C1 and E1 may be created in consideration of the outside width (horizontal width) of the working device 2. Specifically, in a case where an outside width W6 of the working device 2 is greater than the working width W1, for example, after the area setter 51b sets the central area C1 and the headland area E1 as illustrated in FIGS. 31 to 33 or FIG. 11A, etc., the route creator 51c creates the travel routes L1, L1c, and L2 in the central area C1 and the headland area E1 as illustrated in FIGS. 34 to 36. In so doing, for the central area C1, the route creator 51c creates the travel route L1 through the procedure having been described with reference to FIGS. 11B and 11C. Furthermore, the route creator 51c calculates, as a displacement amount W7, a half of the value obtained by subtracting the working width W1 from the outside width W6 of the working device 2 (W7=(W6−W1)/2).

As illustrated in FIG. 34, in a case where the width (W4+W5) of the outermost headland E2c in the headland area E1 is greater than the width W4 of each of the inner headlands E2a and E2b, for the outermost headland E2c, the route creator 51c creates the line E4 by displacing the contour H1 of the agricultural field inward once by a displacement amount obtained by adding, to the shift amount W5, a half of the width W4 obtained by subtracting the overlap W2 for the headlands from the working width W1 of the working device 2 (W4/2+W5). Then, the route creator 51c creates the travel route L2 on a line E4a created by displacing the line E4 inward once by the displacement amount W7.

In a case where the overlap W2 for the headlands is set to zero and where, as illustrated in FIG. 35, the width (W1+W5) of the outermost headland E2c in the headland area E1 is greater than the width W4 of each of the inner headlands E2a and E2b, the route creator 51c creates the line E5 by displacing the contour H1 of the agricultural field inward once by a displacement amount obtained by adding a half of the working width W1 of the working device 2 to the shift amount W5 (W1/2+W5). Then, the route creator 51c creates the travel route L2 on a line E5a created by displacing the line E5 inward once by the displacement amount W7.

Alternatively, as illustrated in FIG. 36, in a case where the width of each of the headlands E2a, E2b, and E2c in the headland area E1 is the same value W4, for the outermost headland E2c, the route creator 51c creates a line E9a by displacing a widthwise centerline E9 of the headland E2c inward once by a half of the value of the overlap W2 for the headlands. Then, the route creator 51c creates the travel route L2 on a line E9b created by displacing the line E9a inward once by the displacement amount W7.

Furthermore, in the cases illustrated in FIGS. 34 to 36, for the inner headlands E2b and E2a in the headland area E1, the route creator 51c creates the travel route L2 (or the go-around route portion L1c) on the widthwise centerline of each of the headlands E2b and E2a.

With the above configuration, when, based on the travel route L2 created in each of the headlands E2a, E2b, and E2c, the automatic controller 61 thereafter causes the working device 2 to perform ground work while performing automatic steering of the traveling vehicle body 3, the work track for the headland E2a and the work track for the headland E2b overlap by the overlap W2, whereas the work track for the headland E2b and the work track for the headland E2c overlap by a width that is the sum of the overlap W2 and the displacement amount W7 (W2+W7).

Moreover, the gap between the travel route L2 created in the outermost headland E2c and the contour H1 of the agricultural field (W4/2+W5+W7 in FIG. 34, W1/2+W5+W7 in FIG. 35, W4/2+W2/2+W7 in FIG. 36) is set to be not less than a half of the value of the outside width W6 of the working device 2 (in FIG. 34, setting the overlap W2 to be not greater than a double of the shift amount W5 will work). Therefore, it is possible to prevent the working device 2 from protruding outward of the agricultural field when, based on the travel route L2 created in the outermost headland E2c, the automatic controller 61 causes the working device 2 to perform ground work while performing automatic steering of the traveling vehicle body 3.

Alternatively, in FIG. 31, the areas E1 and C1 may be set by using the displacement amount W7 instead of the shift amount W5. Specifically, the area setter 51b calculates the first contour formed by displacing the contour H1 of the agricultural field inward by a displacement amount obtained by adding, to the displacement amount W7, the width W4, which is obtained by subtracting the overlap W2 for the headlands from the working width W1 of the working device 2 (first displacement amount=W4+W7=W1−W2+W7) (not illustrated). Next, the area setter 51b calculates the second contours formed by displacing the first contour a number of times obtained by subtracting one from the inputted number of headlands, each by the width W4 (second displacement amount). Then, the area setter 51b sets an area enclosed by the innermost one of the second contours as the central area C1, and sets the headlands E2a, E2b, and E2c the number of which corresponds to the inputted number of headlands between the central area C1 and the contour H1 of the agricultural field. As a result, the width of the headland E2c, the outermost one, is equal to a sum of the first displacement amount W7 and the width W4. The width of each of the other headlands E2b and E2a is equal to the width W4 and is less than the width of the headland E2c.

After the central area C1 and the headland area E1 are set inward of the contour H1 of the agricultural field, the route creator 51c creates the travel routes L1, L1c, and L2 in the central area C1 and the headland area E1. In so doing, for the central area C1, and for the headlands E2a and E2b other than the outermost headland E2c in the headland area E1, the route creator 51c creates the travel routes L1, L1c, and L2 through the procedure described earlier. For the outermost headland E2c in the headland area E1, the route creator 51c creates the travel route L2 on a line created by displacing the contour H1 of the agricultural field inward by a displacement amount obtained by adding a half of the width W4 to the first displacement amount W7 (W4/2+W7).

As described above, by creating the outermost headland E2c and the travel route L2 by displacing the contour H1 of the agricultural field inward, it is possible to avoid a collision with a footpath or the like from occurring due to the working device 2 protruding beyond the contour H1 of the agricultural field when, based on the travel route L2, the automatic controller 61 causes the working device 2 to perform ground work while performing automatic steering of the agricultural machine 1 (the traveling vehicle body 3) in the headland area E1. Especially by setting the gap W5 by which the contour H1 of the agricultural field is shifted (displaced) inward to a value greater zero via the agricultural field shift amount change key B25 illustrated in FIG. 30 and, by setting the outermost headland 2c and creating the travel route L2 in the headland E2c in consideration of the outside width W6 greater than the working width W1 of the working device 2, it is possible to further avoid a collision with a footpath or the like from occurring due to the working device 2 protruding beyond the contour H1 of the agricultural field. Furthermore, by creating the inner headland E2b, E2a based on the width W4 that is less than the width of the outermost headland E2c, it is possible to obtain a large central area C1 where the automatic traveling work route portion is set.

In the example illustrated in FIG. 30, the shift amount W5 by which the contour H1 of the agricultural field is shifted (displaced) inward is adjustable via the agricultural field shift amount change key B25 within a range from 0 to 30 cm. However, the range within which the shift amount W5 is adjustable via the agricultural field shift amount change key B25 may be from the lower limit greater than zero to the upper limit greater than the lower limit. A key that allows the user to select whether or not to create the outermost headland E2c or the travel route L2 by displacing the contour H1 of the agricultural field inward may be provided in the screen D6, D7, etc.

As another example, the travel route L1 to L3 may be created at a position that is off the widthwise centerline of a unit work zone C2 or a headland E2a to E2c illustrated in FIG. 11B, etc.

In the preferred embodiment described above, the following example has been discussed. The automatic controller 61 performs the automatic traveling work mode, in which agricultural work is performed on the agricultural field by the working device 2 by automatic operation of the agricultural machine 1, first when the agricultural work is started by the agricultural machine 1 and the working device 2 on the agricultural field corresponding to the agricultural field map MP2 after creation of the travel routes in the central area C1 and the headland area E1 of the agricultural field map MP2. However, this does not imply any limitation. The automatic controller 61 may perform the automatic steering work mode, in which agricultural work is performed on the agricultural field by the working device 2 by automatic steering of the agricultural machine 1, first when the agricultural work is started by the agricultural machine 1 and the working device 2 on the agricultural field corresponding to the agricultural field map MP2 after creation of the travel routes on the agricultural field map MP2.

Figure 37A:
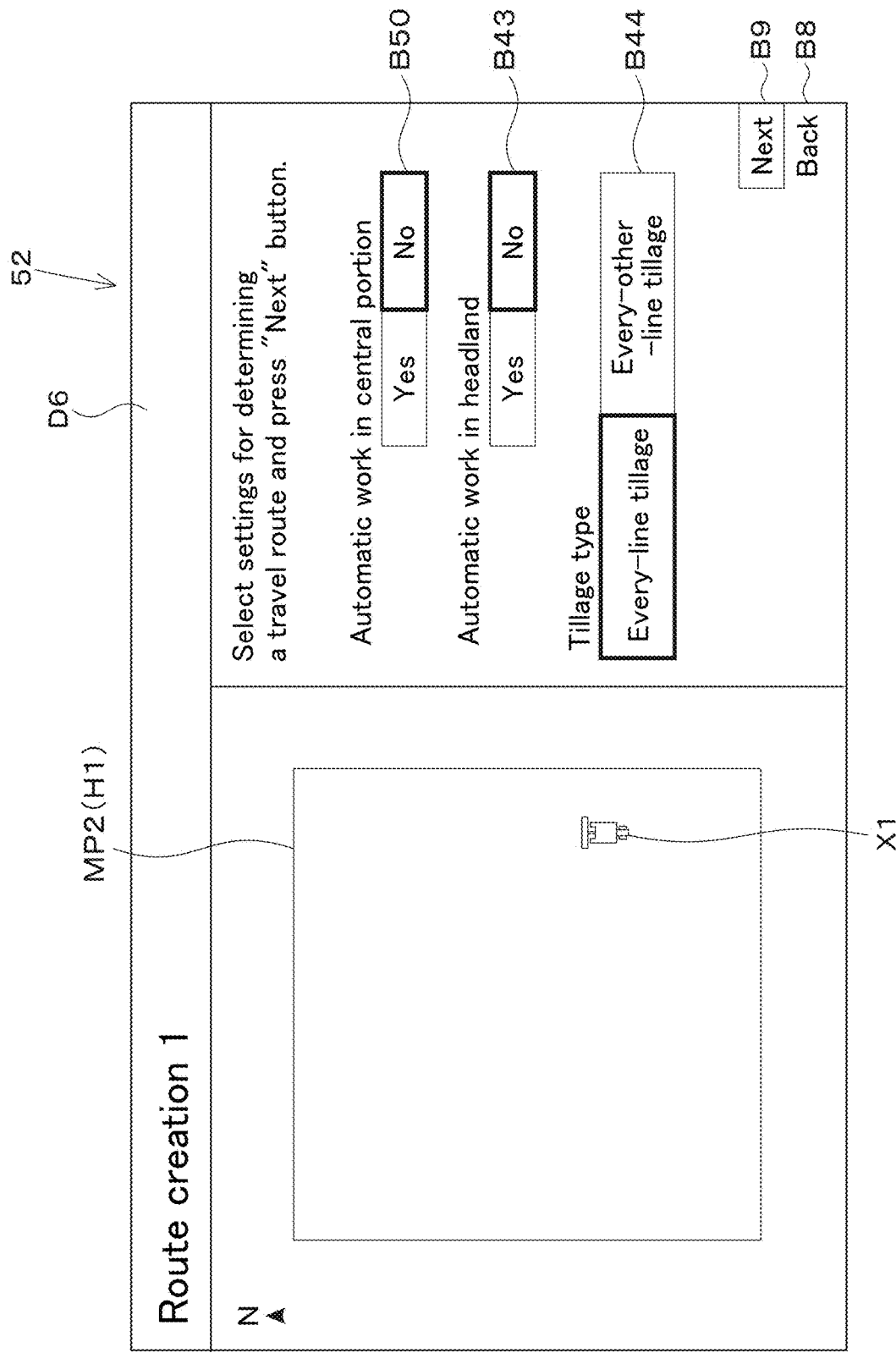
FIG. 37A is a diagram illustrating another example of the first route creation screen of the agricultural work assistance apparatus.

For example, as illustrated in FIG. 37A, an automatic center work key B50 is provided in addition to the automatic headland work key B43 and the work type key B44, etc. in the first route creation screen D6 displayed on the display operation interface 52. The automatic center work key B50 is used to select whether or not to perform agricultural work using the working device 2 while causing the agricultural machine 1 (traveling vehicle body 3) to travel by automatic operation (automatic traveling work mode) at the central area C1 set in the agricultural field map MP2. The configuration of the first route creation screen D6 except for the automatic center work key B50 is the same as the configuration of the first route creation screen D6 illustrated in FIG. 9.

On the first route creation screen D6, the user selects, via the automatic center work key B50, to perform agricultural work using the working device 2 while causing the agricultural machine 1 to travel by automatic operation at the central portion (central area C1) of the agricultural field, selects, via the automatic headland work key B43, to perform agricultural work using the working device 2 while causing the agricultural machine 1 to travel by automatic operation at the headlands (headland area E1), and thereafter selects the next key B9.

In this case, as described earlier, the controller 51 causes the display operation interface 52 to display the second route creation screen D7 (FIG. 10A). Then, based on the content of an input to each input field on the second route creation screen D7, the area setter 51b sets the central area C1 and the headland area E1 in the agricultural field map MP2, and the route creator 51c creates the travel route L1 in the areas C1 and E1 and sets the start position Ps, the goal position Pg, and the like. In addition, the route creator 51c sets the created travel route L1 as the automatic operation route. Furthermore, the controller 51 causes the areas C1 and E1 and the travel route L1 to be displayed on the agricultural field map MP2 included in the second route creation screen D7 (FIGS. 10B and 10C).

Then, when the user selects the next key B9 included in the second route creation screen D7, the controller 51 causes the display operation interface 52 to display the travel control screen D8 (FIG. 12). Then, when the user performs a predetermined operation to perform an automatic operation of the agricultural machine 1, the automatic controller 61 starts the automatic operation work mode, in which ground work is performed by the working device 2 while the agricultural machine 1 is caused to travel by automatic operation, based on the position of the agricultural machine 1 (traveling vehicle body 3) detected by the positioning device 40 and the automatic operation route L1.

The predetermined operation performed by the user to perform an automatic operation of the agricultural machine 1 includes movement of the agricultural machine 1 to the start position Ps by manual operation, an operation of the mode switch 65 for entering the automatic traveling work mode, an operation for returning, to a predetermined default position, an operation member (manual operator, not illustrated) such as a transmission shift lever to switch a transmission state of the transmission 5, a position lever operable to change the position of the working device 2, etc.

By contrast, when agricultural work is performed by performing automatic steering of the agricultural machine 1, the travel speed of the traveling vehicle body 3 and the position of the working device 2 are changed manually. Therefore, before agricultural work based on automatic steering starts, the operation member such as the transmission shift lever, the position lever, etc. may be at any arbitrary position, and there is no need to perform an operation for returning the operation member to the default position.

On the other hand, on the first route creation screen D6, as illustrated in FIG. 37A, the user selects, via the automatic center work key B50, not to perform agricultural work using the working device 2 while causing the agricultural machine 1 to travel by automatic operation at the central portion of the agricultural field, selects, via the automatic headland work key B43, not to perform agricultural work using the working device 2 while causing the agricultural machine 1 to travel by automatic operation at the headlands, and thereafter selects the next key B9.

Figure 37B:
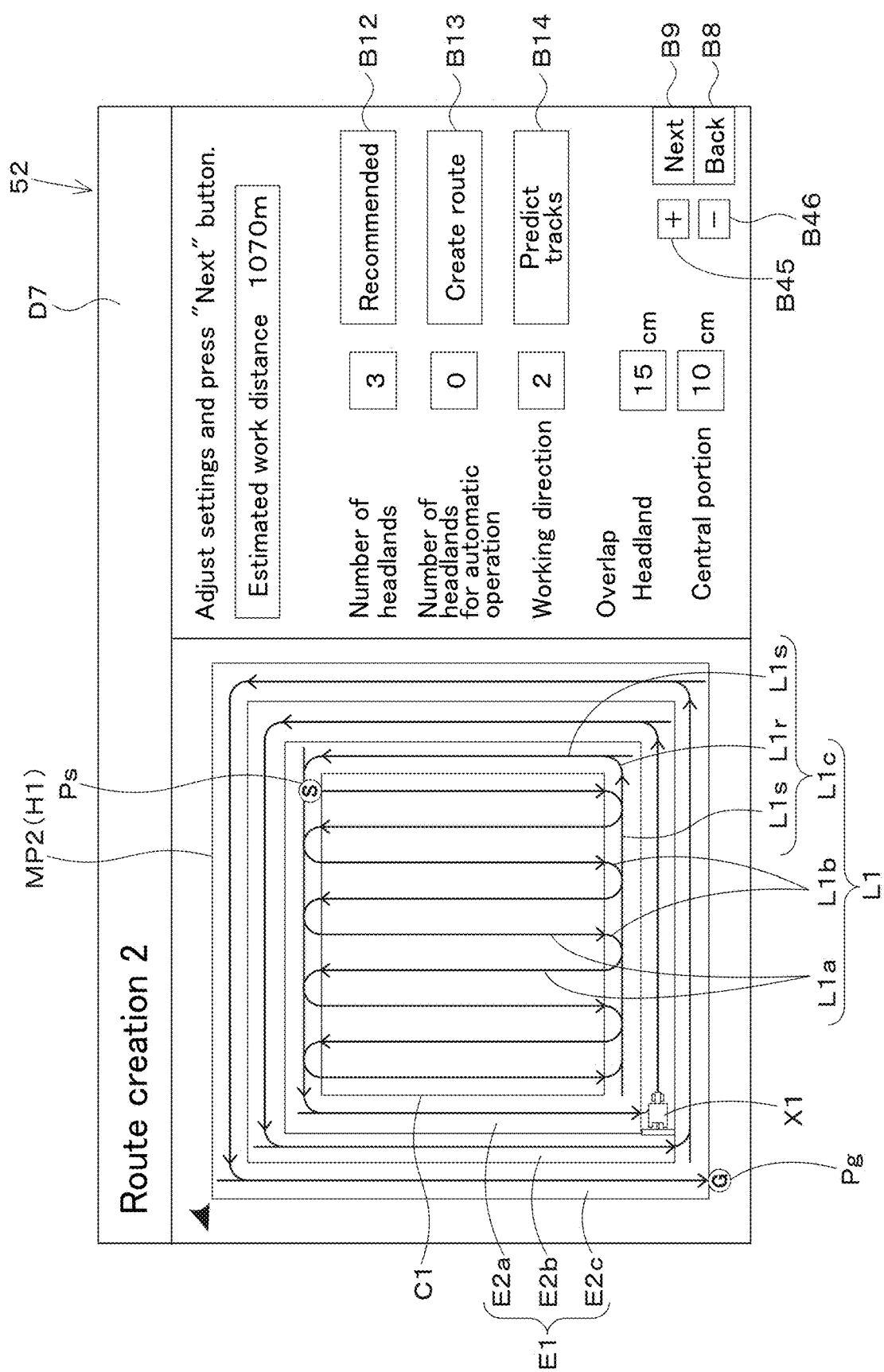
FIG. 37B is a diagram illustrating another example of the second route creation screen of the agricultural work assistance apparatus.

In this case, the controller 51 causes the display operation interface 52 to display the second route creation screen D7 illustrated in FIG. 37B. An input field for inputting the number of headlands where ground work is to be performed by automatic operation is provided in the second route creation screen D7 illustrated in FIG. 37B. Except for this, the illustrated configuration is the same as that of the second route creation screen D7 illustrated in FIGS. 10A to 10C. As described earlier, the user selects, via the automatic headland work key B43, not to perform agricultural work using the working device 2 while causing the agricultural machine 1 to travel by automatic operation at the headlands. Therefore, zero has been automatically entered as the number of headlands where ground work is to be performed by automatic operation.

When the user selects the next key B9 after completion of inputting to each input field on the second route creation screen D7, based on the content of an input to each input field on the second route creation screen D7, the area setter 51*b* sets the central area C1 and the headland area E1 in the agricultural field map MP2. In addition, based on the content of an input to each input field on the second route creation screen D7, the route creator 51*c* creates the travel route L1 in the areas C1 and E1 and sets the start position Ps, the goal position Pg, and the like. The travel route L1 created here may be set as the automatic operation route by the route creator 51*c* or yet to be set. The controller 51 causes the areas C1 and E1 and the travel route to be displayed on the agricultural field map MP2 included in the second route creation screen D7 and causes a selector S1 illustrated in FIG. 37C to be displayed at the center of the second route creation screen D7.

The selector S1 (a first portion of the display operation interface 52) allows the user to select whether or not to perform agricultural work by automatic steering of the agricultural machine 1. On the selector S1, the question "Do you want to perform work by automatic steering?" and a YES key B51 and a NO key B52 for answering the question are displayed. If the user selects the YES key B51 to perform agricultural work by automatic steering, as illustrated in FIG. 38, the controller 51 causes the display operation interface 52 to display the travel control screen D11. The route creator 51*c* sets the travel route L1 created in the areas C1 and E1 as (or changes it into) the automatic steering route L2.

Figure 37C:
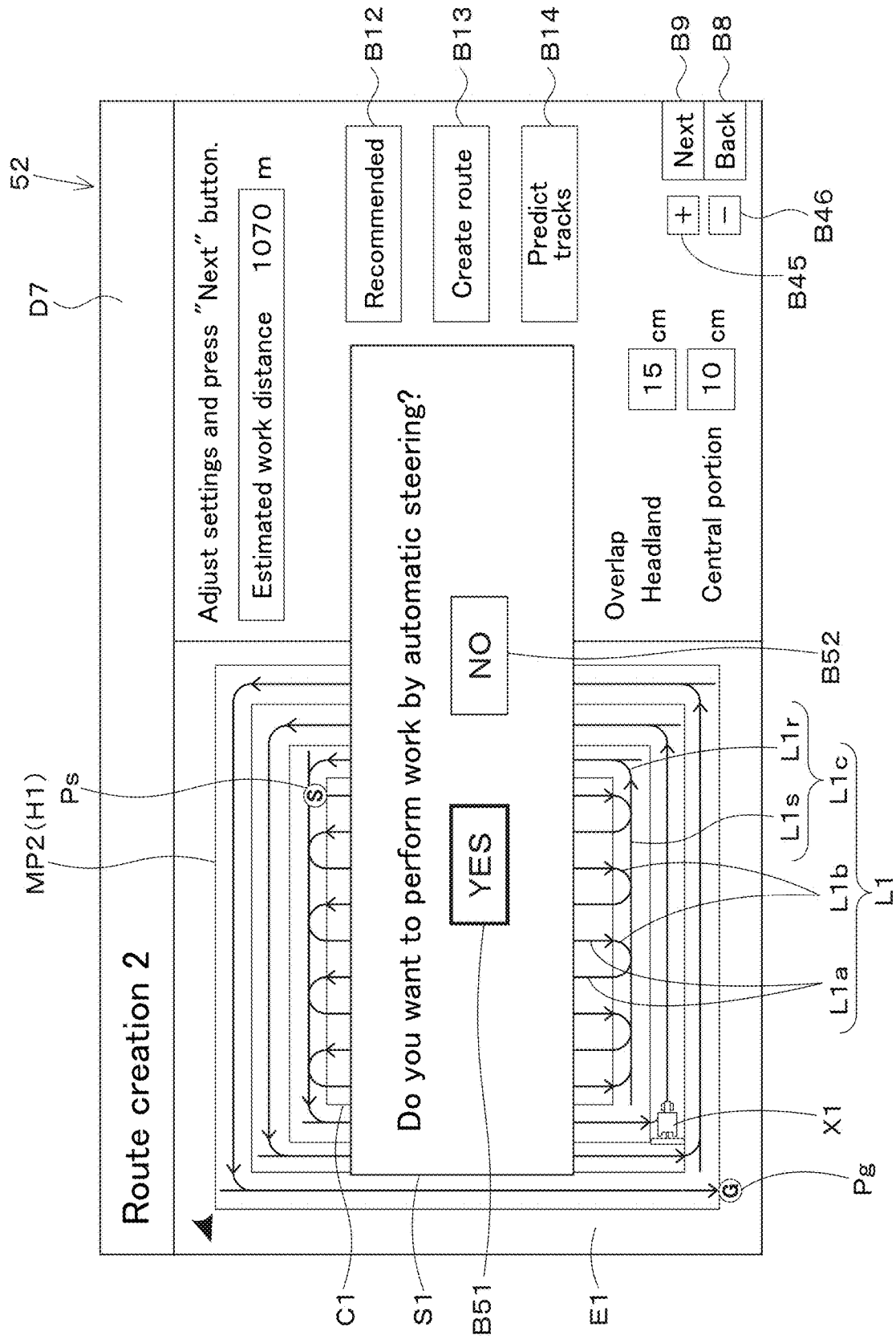
FIG. 37C is a diagram illustrating a selector S1 drawn on the second route creation screen.

Then, the user moves the agricultural machine 1 by manual operation to the start position Ps where agricultural work by automatic steering is to be started, and performs an operation for entering the automatic steering work mode on the mode switch 65. Alternatively, in a case where the agricultural machine 1 is located at this time at an end of the travel route (automatic steering route) L2 where agricultural work should be started as illustrated in FIG. 37C, the user operates the mode switch 65 to enter the automatic steering work mode. Upon this operation, the automatic controller 61 starts the automatic steering work mode, in which ground work is performed by the working device 2 while the agricultural machine 1 is steered automatically based on the position of the agricultural machine 1 and the automatic steering route L2. In the automatic steering work mode, the user operates the accelerator, etc. to change the travel speed of the agricultural machine 1 and operates the position lever, etc. to change the position of the working device 2.

With this, when agricultural work is started on the agricultural field, the travel route on which the automatic controller 61 is based initially has been set to be the automatic steering route L2 and, therefore, the automatic controller 61 is capable of, based on the automatic steering route L2 and the position of the agricultural machine 1, performing automatic steering of the agricultural machine 1, and causing the working device 2 to start the agricultural work on the agricultural field.

In the example illustrated in FIGS. 37C and 38, the agricultural machine 1 starts agricultural work in the automatic steering work mode for the headland area E1 first. However, this does not imply any limitation. For example, the user is able to cause the agricultural machine 1 to start agricultural work in the automatic steering work mode for the central area C1 first by performing an operation for entering the automatic steering work mode on the mode switch 65 after positioning the agricultural machine 1 by manual operation at an end of the travel route (automatic steering route) L2 set in the central area C1.

Figure 39:
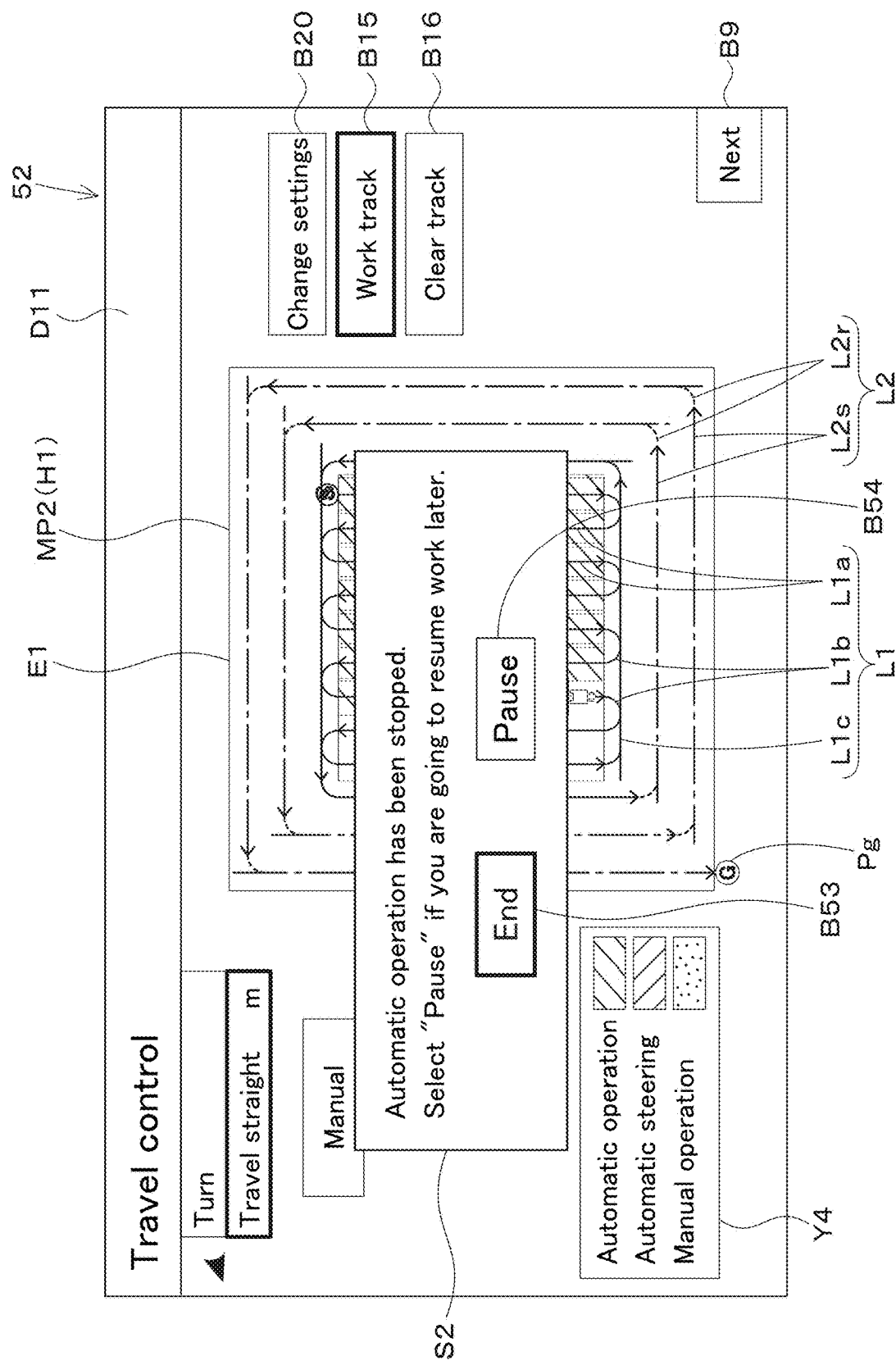
FIG. 39 is a diagram illustrating a selector S2 drawn on the travel control screen.

Also when agricultural work on the agricultural field is resumed after a pause by the agricultural machine 1, the automatic steering work mode may be performed first on the agricultural machine 1. In this case, before ground work on the agricultural field by the agricultural machine 1 and the working device 2 finishes up to the goal position Pg, the user performs a predetermined operation to cause the agricultural machine 1 and the working device 2 to stop, thus stopping the groundwork on the central area C1 or the headland area E1. Upon the stop, the controller 51 causes a selector S2 (a second portion of the display operation interface 52) illustrated in FIG. 39 to be displayed.

The selector S2 allows the user to select whether or not to pause the stopped agricultural work by the agricultural machine 1 for the purpose of resuming it later. On the selector S2, a message asking the user to instruct whether to end the agricultural work (a case where the agricultural work will not be resumed later) or to pause it (a case where the agricultural work will be resumed later), an end key B53, and a pause key B54 are displayed. If the user selects the pause key B54 so that the agricultural work can be continued (resumed) later by the agricultural machine 1, the controller 51 causes the storing unit 53 to store a work history such as the content of the agricultural work having been done by the agricultural machine 1 and the working device 2, the specifications of the agricultural machine 1 and the working device 2, a work state, and the date and time of the pause of the agricultural work. On the other hand, if the user selects the end key B53 so as to end (finish) the agricultural work without a later continuation by the agricultural machine 1, the controller 51 does not cause the storing unit 53 to store the work history mentioned above.

Figure 40A:
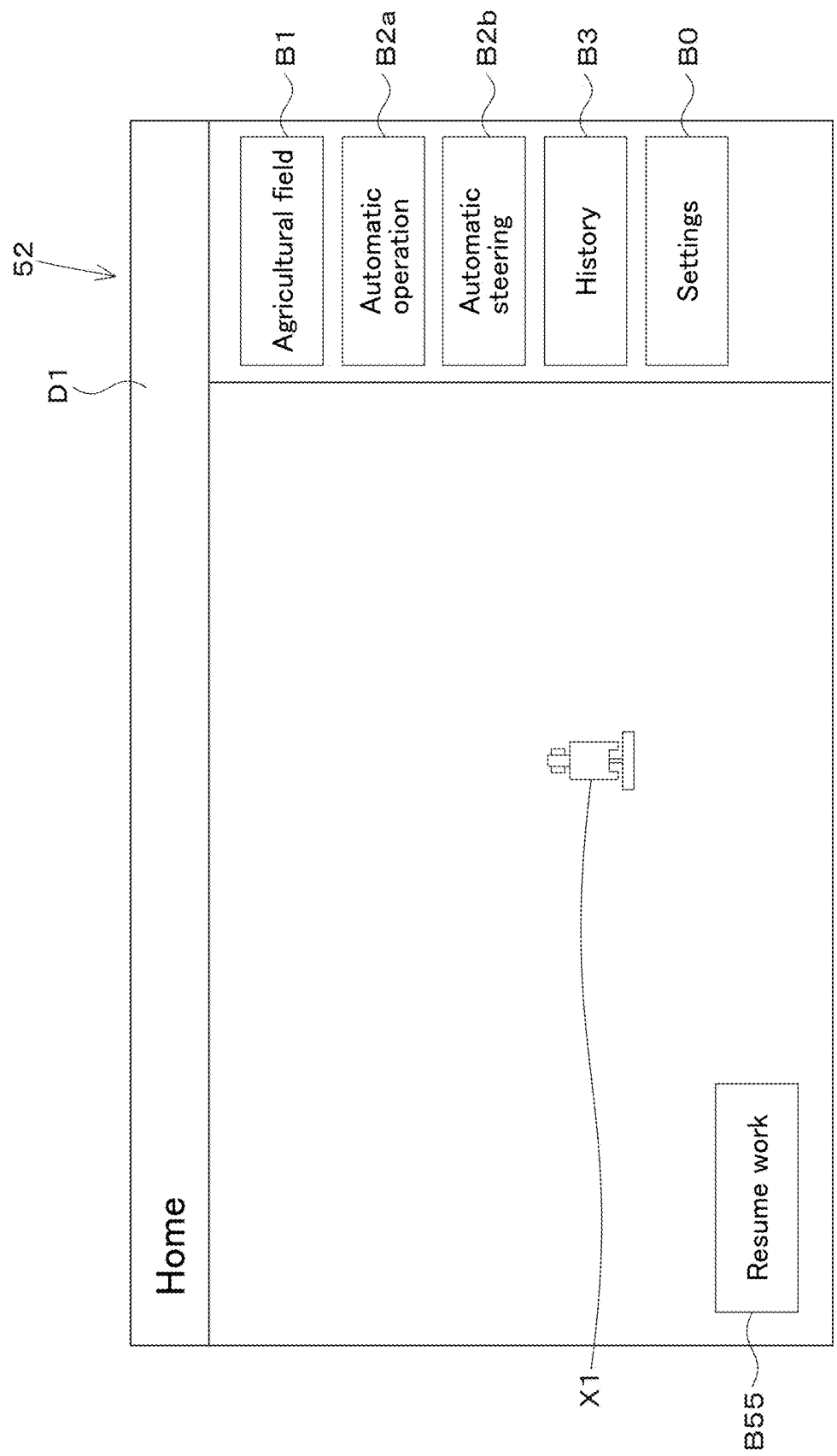
FIG. 40A is a diagram illustrating another example of the home screen of the agricultural work assistance apparatus.
Figure 40B:
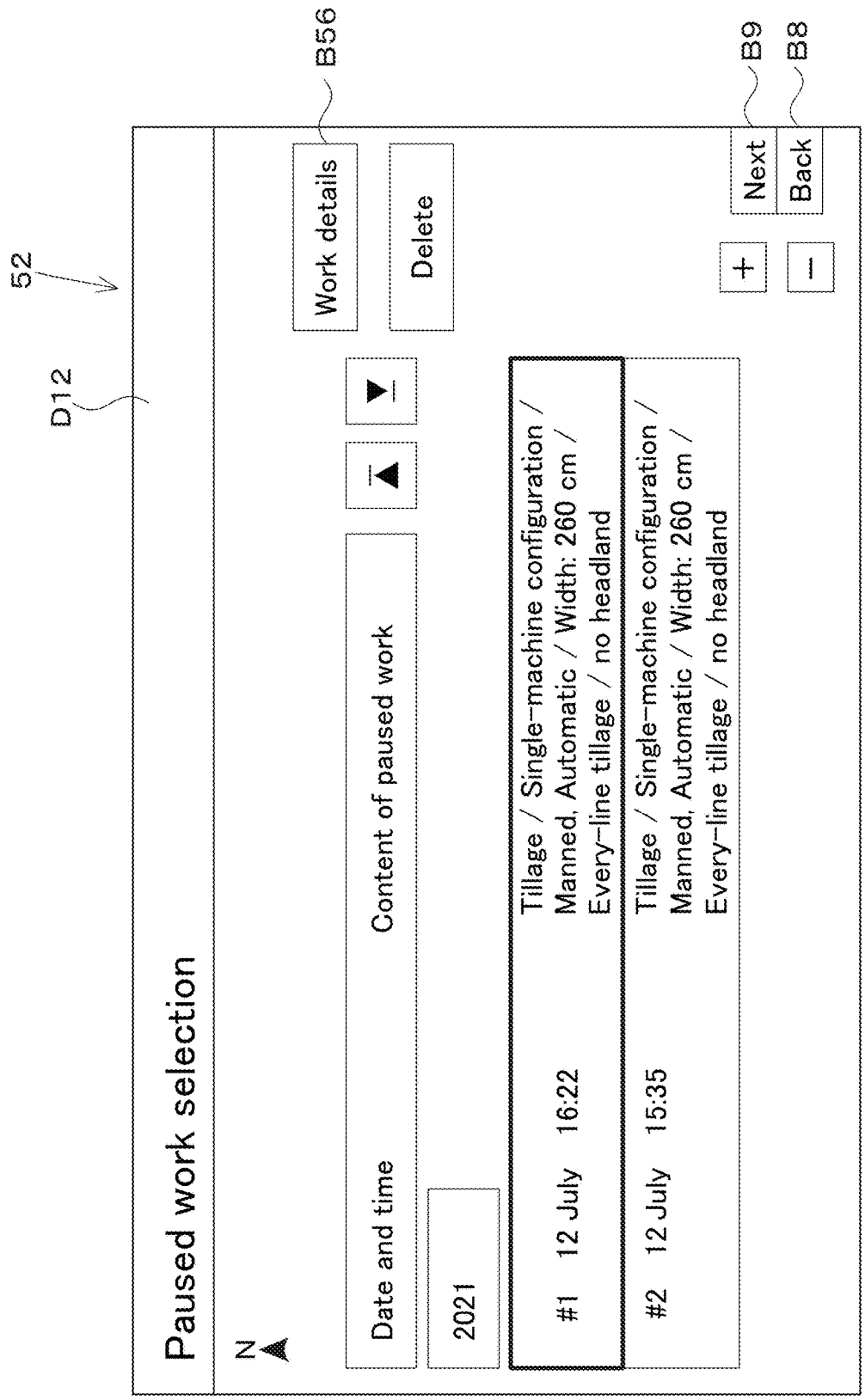
FIG. 40B is a diagram illustrating an example of a work selection screen of the agricultural work assistance apparatus.

In a case where the work history of the paused agricultural work is stored in the storing unit 53, the controller 51, when causing the display operation interface 52 to display the home screen D1 later, causes a work resumption key B55 to be displayed on the home screen D1 as illustrated in FIG. 40A. If the user selects the work resumption key B55, the controller 51 reads the work history of every paused agricultural work from the storing unit 53 and causes the display operation interface 52 to display a work selection screen D12 that gives an overview of the work history as illustrated in FIG. 40B.

Figure 40C:
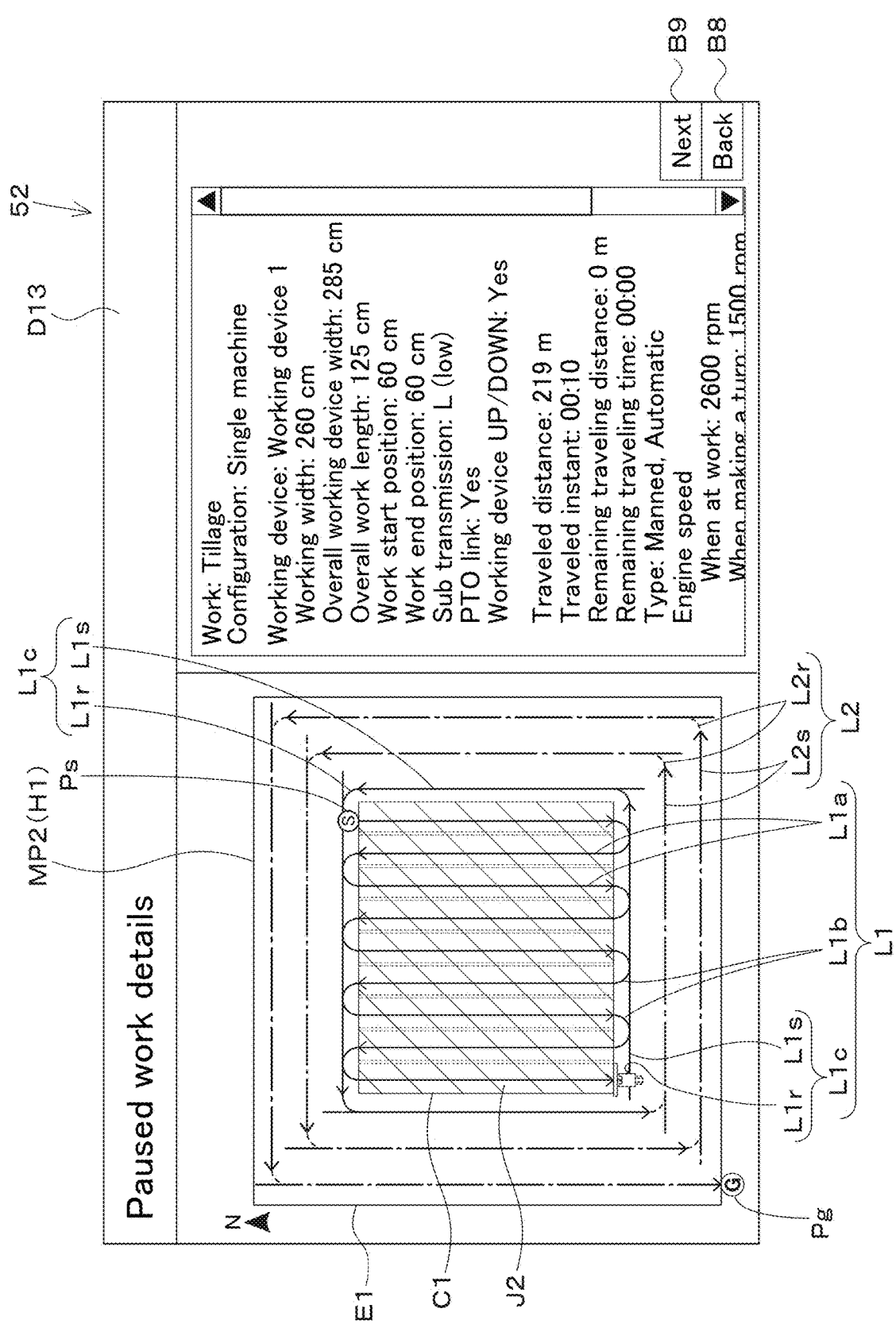
FIG. 40C is a diagram illustrating an example of a work detail screen of the agricultural work assistance apparatus.

On the work selection screen D12, the user, after selecting the agricultural work that the user wants to resume, selects a work detail key B56 and, upon this key selection, the controller 51 causes the display operation interface 52 to display a work detail screen D13 illustrated in FIG. 40C. On the work detail screen D13, information showing the details of the work history of the selected agricultural work, the work track of the agricultural machine 1 in the agricultural field map MP2, and the like are displayed. When the user selects the next key B9 so as to resume the agricultural work displayed on the work detail screen D13, the controller 51 causes a selector S3 (a third portion of the display operation interface 52) illustrated in FIG. 40D to be displayed at the center of the work detail screen D13.

The selector S3 allows the user to select automatic steering or automatic operation as a method for resuming the stopped agricultural work. On the selector S3, a message asking the user to select a method for resuming the paused agricultural work, an automatic steering key B57 to select to resume the agricultural work by automatic steering, and an automatic operation key B58 to select to resume the agricultural work by automatic operation are displayed.

Figure 41:
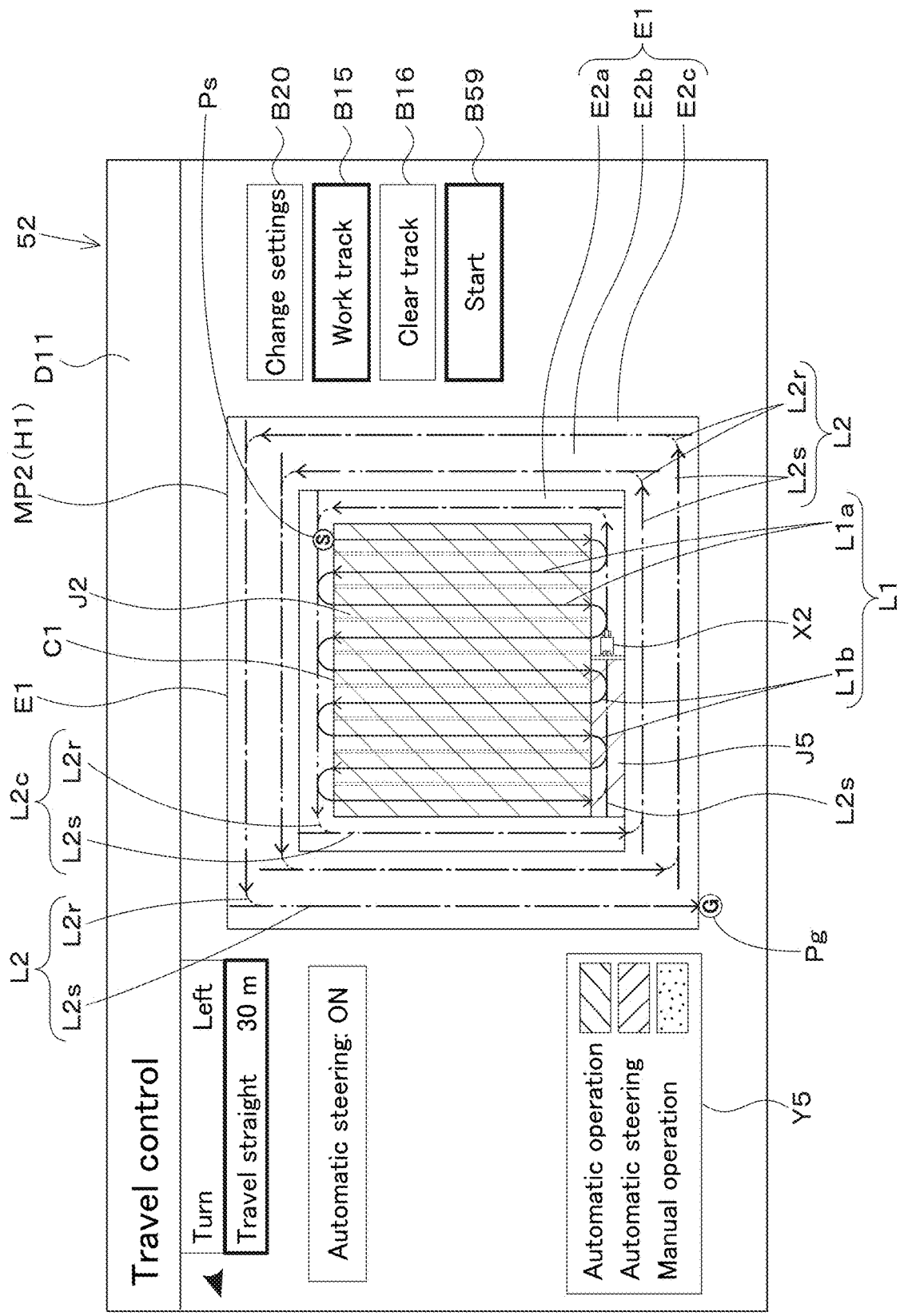
FIG. 41 is a diagram illustrating another example of the travel control screen of the agricultural work assistance apparatus.

When the user selects the automatic steering key B57 so as to resume the agricultural work by automatic steering, as illustrated in FIG. 41, the controller 51 causes the display operation interface 52 to display the travel control screen D11 including the work track of the agricultural work having been performed before the pause. In addition, the route creator 51c sets the travel route located at the unworked portion of the area C1, E2 where the agricultural machine 1 has not traveled yet and has not performed ground work yet as (or changes it into) the automatic steering route L2. Then, for example, the user moves the agricultural machine 1 by manual operation to the position where the agricultural work by automatic steering is to be resumed, performs an operation for entering the automatic steering work mode on the mode switch 65, and then selects a start key B59 on the travel control screen D11. Upon this operation, the automatic controller 61 resumes the automatic steering work mode, in which ground work is performed by the working device 2 while the agricultural machine 1 is steered automatically based on the position of the agricultural machine 1 and the automatic steering route L2 located at the unworked portion.

Figure 40D:
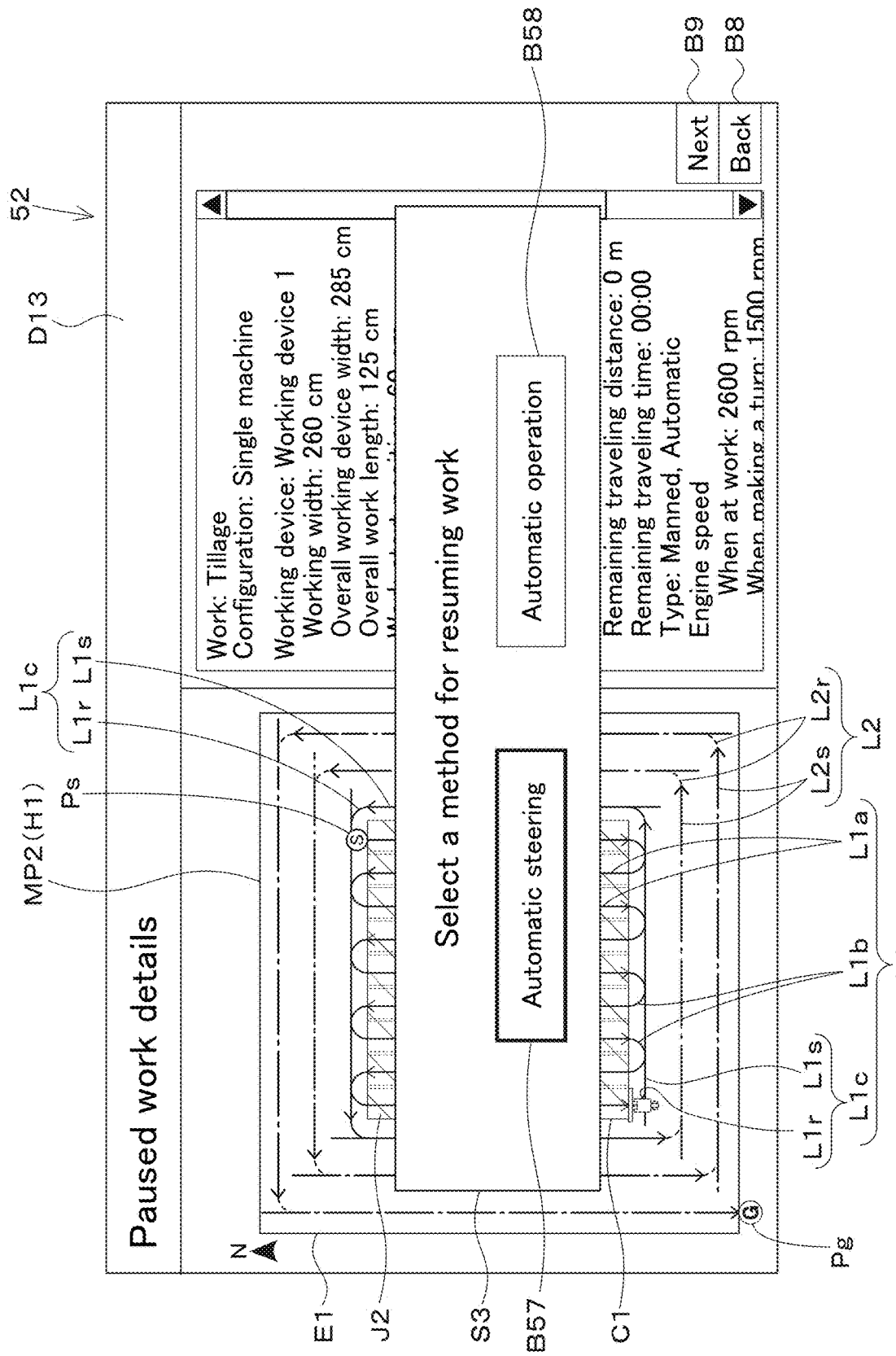
FIG. 40D is a diagram illustrating an example of a selector S3 drawn on the work detail screen.

On the other hand, when the user selects the automatic operation key B58 on the selector S3 illustrated in FIG. 40D so as to resume the agricultural work by automatic operation, the controller 51 causes the display operation interface 52 to display the travel control screen D11 including the work track of the agricultural work having been performed before the pause. The route creator 51c sets the travel route located at the unworked portion of the area C1, E2 as (or changes it into) the automatic operation route L1. Then, for example, the user moves the agricultural machine 1 by manual operation to the position where the agricultural work by automatic operation is to be resumed, performs an operation for entering the automatic operation work mode on the mode switch 65, and then selects the start key B59 on the travel control screen D11. Upon this operation, the automatic controller 61 resumes the automatic operation work mode, in which ground work is performed by the working device 2 while the agricultural machine 1 is driven automatically based on the position of the agricultural machine 1 and the automatic operation route L1 located at the unworked portion.

With this, when agricultural work is resumed after a pause on the agricultural field by the agricultural machine 1 and the working device 2, the travel route on which the automatic controller 61 is based initially has been set to be the automatic steering route L2 and, therefore, the automatic controller 61 is capable of, based on the automatic steering route L2 and the position of the agricultural machine 1, performing automatic steering of the agricultural machine 1 to cause the working device 2 to resume the agricultural work on the agricultural field.

The controller 51 and the automatic controller 61 are capable of performing each processing described above for pausing and resuming the agricultural work on the agricultural field by the agricultural machine 1 and the working device 2 at the time of switching from one to another of the automatic operation route L1, the automatic steering route L2, and the manual operation route L3, at a termination end of a travel route, at an intermediate portion of a travel route, and the like.

The position where agricultural work is resumed by the agricultural machine 1 is not limited to an unworked portion of the area C1, E2 where the agricultural machine 1 has not traveled yet and has not performed ground work yet, but also may be a worked portion of the area C1, E2 where the agricultural machine 1 has already traveled and has already performed ground work, or any other portion. In this case, for example, when the user selects the automatic steering key B57 (or the automatic operation key B58) so as to resume the agricultural work by automatic steering (or automatic operation), the route creator 51c sets the travel route leading to the goal position Pg from immediately ahead of the agricultural machine 1 in the traveling direction thereof as (or changes it into) the automatic steering route L2 (or the automatic operation route L1). Then, the user performs an operation for entering the automatic steering work mode (or the automatic operation work mode) on the mode switch 65 and selects the start key B59, and, upon this key selection, the automatic controller 61 resumes the automatic steering work mode (or the automatic operation work mode), in which ground work is performed by the working device 2 while the agricultural machine 1 is steered automatically (or driven automatically) based on the position of the agricultural machine 1 and the automatic steering route L2 (or the automatic operation route L1) set as described above. With this, it is possible to cause the agricultural machine 1 to resume the agricultural work by automatic steering (or automatic traveling) from a position corresponding to any arbitrary travel route in the area C1, E2.

In the preferred embodiment described above, before the route creator 51c creates the travel route in the area C1, E2, it is set via the automatic center work key B50 and the automatic headland work key B43 provided in the first route creation screen D6 illustrated in FIG. 37A whether or not to start agricultural work by automatic operation, and, after the route creator 51c creates the travel route in the area C1, E2, it is set via the selector S1 illustrated in FIG. 37C whether or not to start agricultural work by automatic steering. However, this does not imply any limitation. The setting as to whether or not to start agricultural work by automatic operation and the setting as to whether or not to start agricultural work by automatic steering may be performed before or after the route creator 51c creates the travel route in the area C1, E2.

Alternatively or additionally, for example, in a case where the automatic operation key B2a is selected by the user on the home screen D1, every travel route created thereafter by the route creator 51c may be set as the automatic operation route L1. In this case, when agricultural work is started on the agricultural field, the automatic controller 61 is able to start the agricultural work on the agricultural field by performing the automatic operation work mode based on the automatic operation route L1 without going through the automatic steering work mode.

Alternatively or additionally, in a case where the automatic steering key B2b is selected by the user on the home screen D1, every travel route created thereafter by the route creator 51c may be set as the automatic steering route L2. In this case, when agricultural work is started on the agricultural field, the automatic controller 61 is able to start the agricultural work on the agricultural field by performing the automatic steering work mode based on the automatic steering route L2 without going through the automatic operation work mode.

The contour of an agricultural field is sometimes made of a structure such as a footpath. In addition, an area beyond a footpath of an agricultural field is sometimes in a condition where the user wants the agricultural machine 1 not to travel, for example, because there is another agricultural field, a cliff, or the like. Therefore, there is a need to avoid the agricultural machine 1 (and the working device 2) from coming into contact with the structure such as the footpath contouring the agricultural field or from traveling outward of the agricultural field beyond the structure (crossing the border) while the agricultural machine 1 is traveling by automatic steering along the travel route L2 created in the headland area E1 (especially, the outermost headland E2c) of the agricultural field.

For a solution to the above need, the controller 51 of the agricultural work assistance apparatus 50 may issue a warning when the agricultural machine 1 approaches the structure such as a footpath contouring the agricultural field while the agricultural machine 1 is traveling by automatic steering in the headland area E1.

Specifically, for example, based on the contour H1 of the agricultural field registered by the agricultural field register 51a, pre-acquired neighborhood information of the agricultural field, and the like, the controller 51 detects the position of the structure such as the footpath of which the contour H1 of the agricultural field is made. The position of the contour H1 of the agricultural field is substantially the same as the position of the structure of which the contour H1 is made.

While the agricultural machine 1 is traveling by automatic steering along the travel route L2 created in the headland area E1, the controller 51 detects, via the positioning device 40, the position of the agricultural machine 1 (traveling vehicle body 3) in a predetermined cycle. In addition, a distance calculator 51h (FIG. 1) provided in the controller 51 calculates the distance from the position of the agricultural machine 1 to the structure lying ahead of the agricultural machine 1 in the traveling direction thereof in a predetermined cycle.

Figure 42:
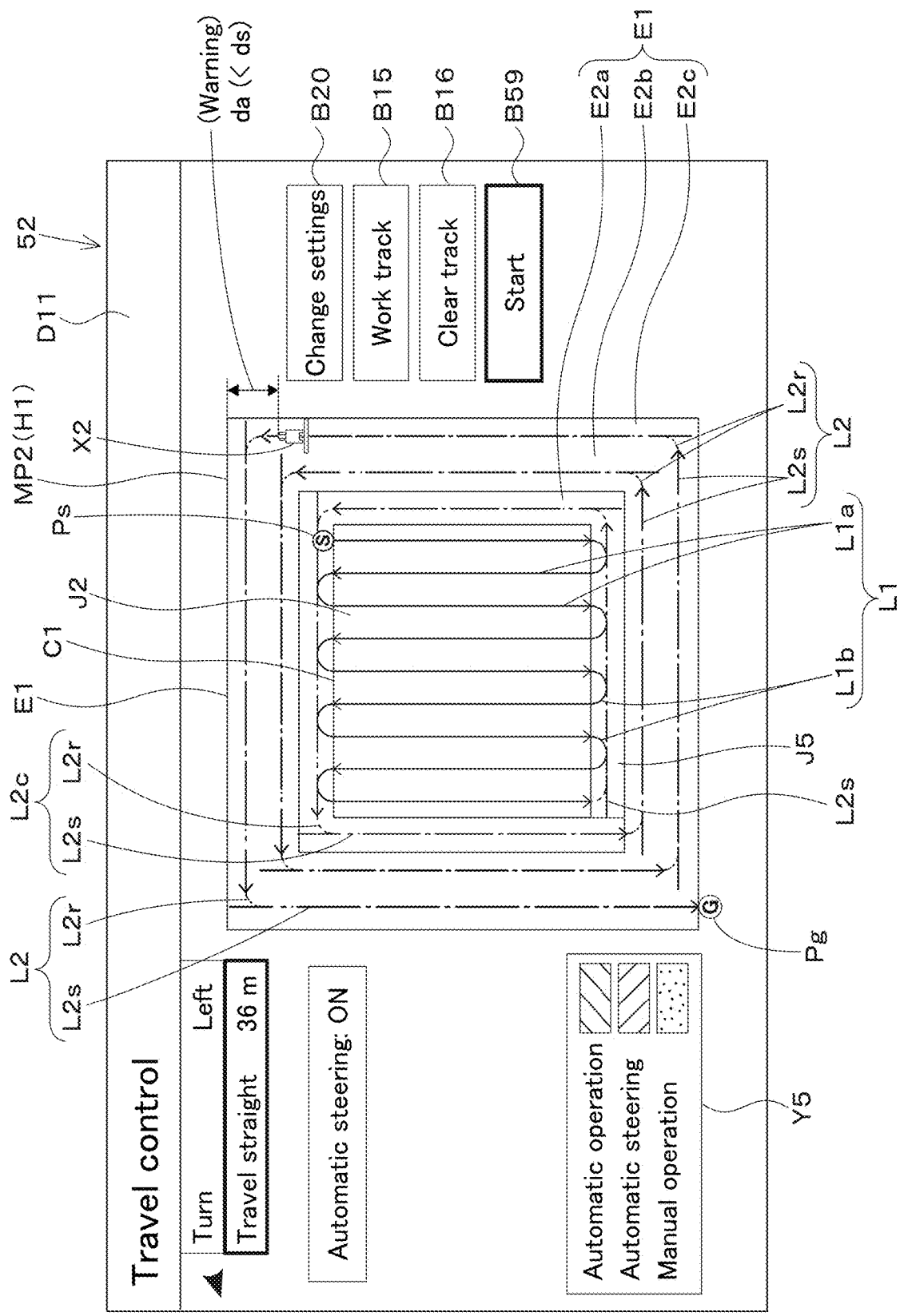
FIG. 42 is a diagram for explaining a relationship between a distance from the agricultural machine to a structure of which the contour of an agricultural field is made, and warning.

For example, as illustrated in FIG. 42, when the distance da calculated by the distance calculator 51h from the agricultural machine 1 to the structure has become equal to or less than a predetermined distance ds, a warner 51i (FIG. 1) provided in the controller 51 warns the user. The predetermined distance ds is a value greater than zero and is set to be great enough so that the agricultural machine 1 that is traveling can stop inside the agricultural field without traveling beyond the structure, due to the operation of the brake 6 (FIG. 1) (for example, 5 to 10 m, etc.). Based on a change in the position of the agricultural machine 1, the controller 51 may detect the travel speed of the agricultural machine 1 and may change the predetermined distance ds in accordance with the travel speed.

The warning issued by the warner 51i is, for example, sound or light outputted by the warner 63 (FIG. 1) such as a beeper, a speaker, or a warning lamp, etc. provided in the agricultural machine 1 to the user of the agricultural machine 1 and the neighborhood thereof. Though it is possible to perform warning display on the screen of the display operation interface 52 to show that the agricultural machine 1 is approaching the structure, it is better not to perform such warning display on the screen of the display operation interface 52 so that a state of work performed by the agricultural machine 1 will be easily visually recognizable.

Furthermore, when the distance da from the agricultural machine 1 to the structure has become equal to or less than the predetermined distance ds, the warner 51i increases the intensity of the warning as the distance da decreases. Specifically, for example, the volume of warning sound outputted from the buzzer, etc. is increased, or the output interval of warning beeps outputted intermittently is made shorter, as the distance da decreases. Alternatively, for example, the blinking interval of the warning lamp is made shorter, or the emission color of the warning lamp turns red from yellow, as the distance da decreases. Alternatively, the number of devices that output the warning may be increased as the distance da decreases.

During the warning by the warner 51i, if the user operates the agricultural machine 1 to stop the agricultural machine 1, or if the distance da from the agricultural machine 1 to the structure has become greater than the predetermined distance ds, the warning by the warner 51i stops.

Figure 43:
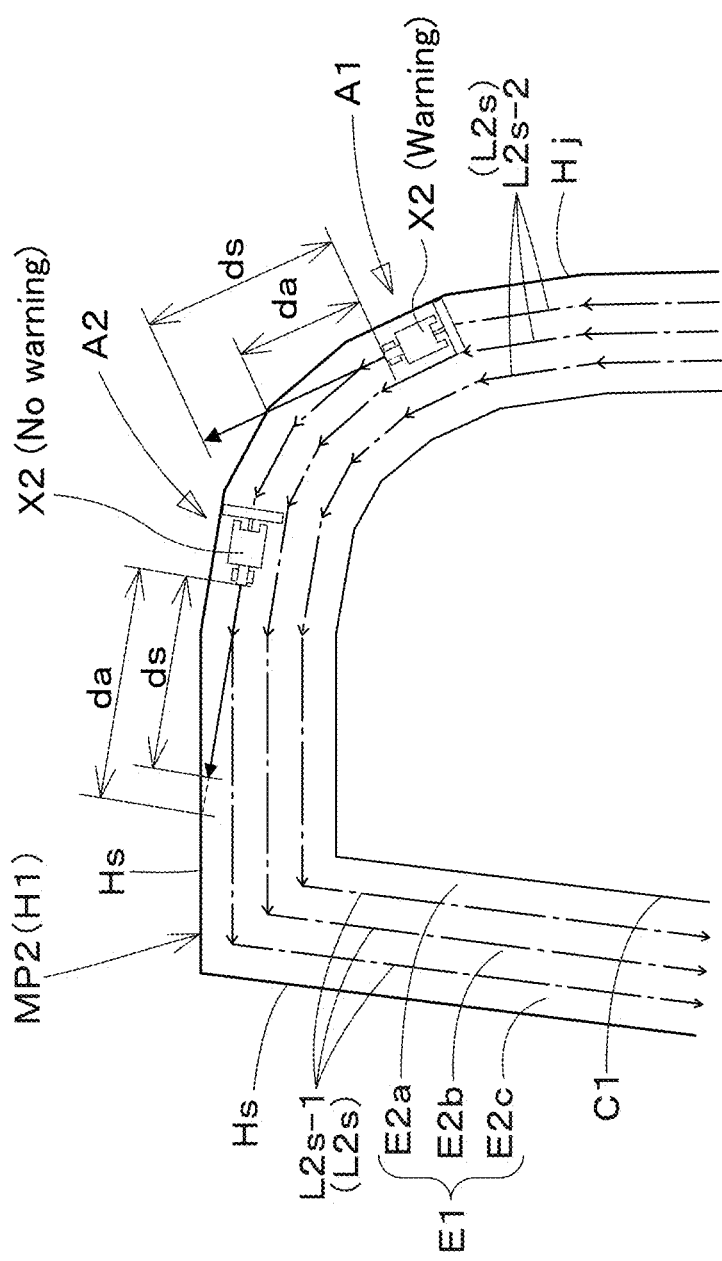
FIG. 43 is a diagram for explaining a relationship between a distance from the agricultural machine to a structure of which the contour of an irregular agricultural field is made, and warning.

For example, on an agricultural field having an irregular contour H1 as illustrated in FIG. 43, a warning is issued by the warner 51i when the distance da from the agricultural machine 1 to the structure (contour H1) has become equal to or less than the predetermined distance ds while the agricultural machine 1 is traveling along the automatic steering route L2 created in the outermost headland E2c. For example, in a state indicated by an arrow A1, the agricultural machine 1 is located between ends of a relatively short straight portion L2s-2 of the automatic steering route L2 and there is some distance to the termination end of this straight portion L2s-2. However, since the distance da from the agricultural machine 1 to the structure (≈contour H1) is less than the predetermined distance ds, a warning is issued by the warner 51i. The warning continues until the distance da becomes greater than the predetermined distance ds. When the agricultural machine 1 comes to a position indicated by an arrow A2, the warning is stopped by the warner 51i because the distance da from the agricultural machine 1 to the structure is greater than the predetermined distance ds.

When the distance da from the agricultural machine 1 to the structure has become equal to or less than a predetermined close-range distance that is less than the predetermined distance ds, the warner 51i may transmit a request for stopping the agricultural machine 1 to the automatic controller 61 via the communicator 54, and, upon receiving the stop request, the automatic controller 61 may bring the agricultural machine 1 to an emergency stop via the brake 6.

A sensor such as a LiDAR sensor and/or an ultrasonic sensor may be provided on a front portion of the traveling vehicle body 3, and, based on a sensing result of the sensor, the controller 51 may detect the position of the structure such as the footpath of which the contour H1 of the agricultural field is made.

Also when the agricultural machine 1 travels rearward by automatic steering in the headland area E1, a warning may be issued by the warner 51i when the distance to the structure lying ahead of the agricultural machine 1 in the traveling direction thereof has become equal to or less than a predetermined distance. However, since the user performs a visual rear check when causing the agricultural machine 1 to travel rearward for the purpose of performing a multi-point turn for a change in direction, the warning by the warner 51i may be omitted so as to avoid complexity.

Figure 44:
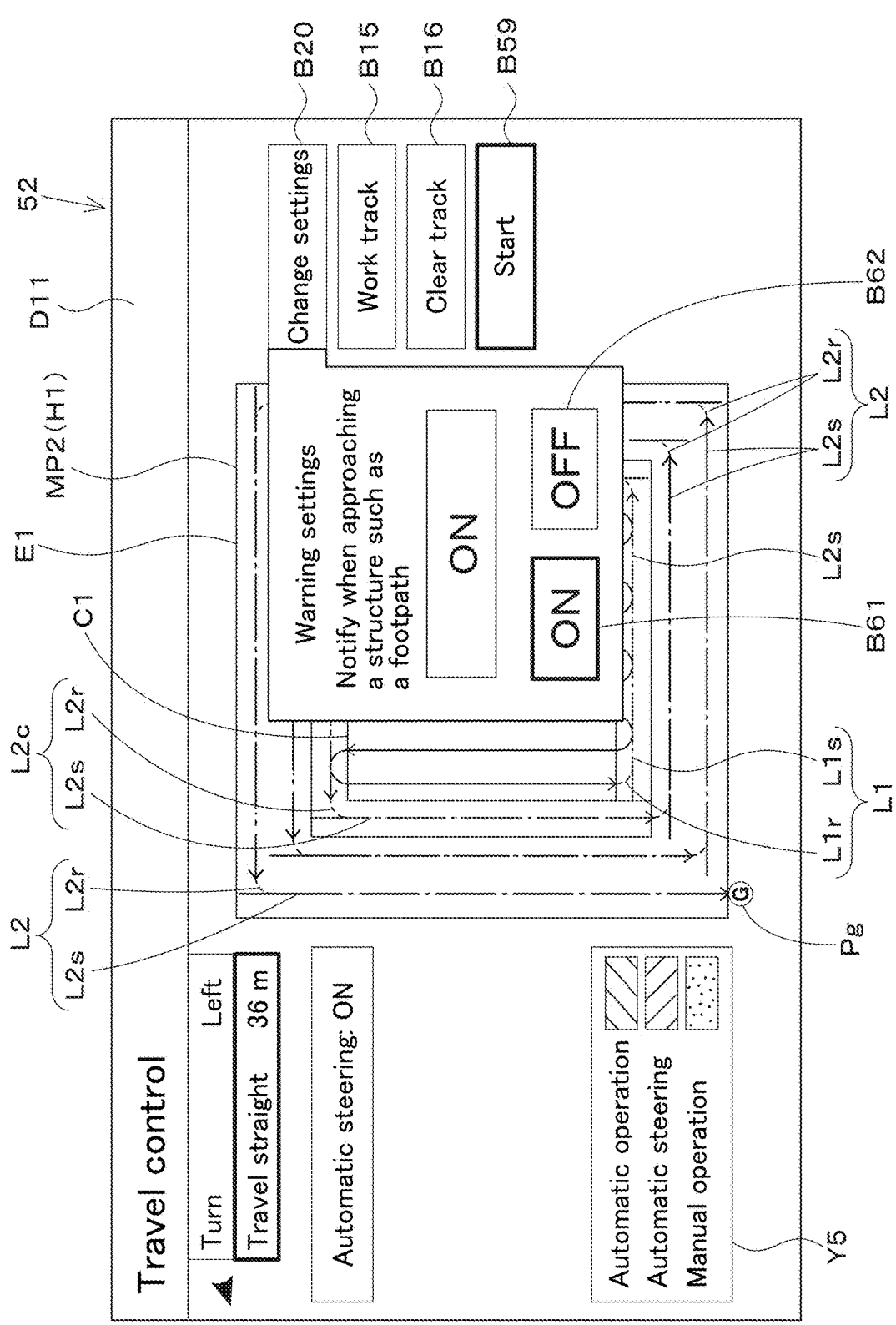
FIG. 44 is a diagram illustrating a display example of warning settings drawn on the travel control screen.

Alternatively or additionally, for example, as illustrated in FIG. 44, by selecting the setting change key B20 included in the travel control screen D11, display showing that the warning by the warner 51*i* is for notification of approaching to a structure such as a footpath may be performed on the display operation interface 52, and/or ON (enabled) or OFF (disabled) of the warning may be settable. This enables the user to know the meaning of the warning by the warner 51*i* and to enable or disable the warning desirably.

In the preferred embodiment described above, the agricultural work assistance apparatus 50 that is a portable tablet terminal device is discussed as an example. However, besides this example, the agricultural work assistance apparatus may include an electronic device that is not mounted on the agricultural machine 1, for example, a cloud server. Alternatively or additionally, the agricultural work assistance apparatus may include a portable or fixed electronic device in which application program(s) having functions equivalent to those of the agricultural work assistance apparatus 50 is installed. In place of the agricultural work assistance apparatus, for example, application program(s) that can be acquired from the cloud and installed on in an electronic device possessed by the user may be included in an agricultural work assistance system. In this case, travel routes, etc. may be displayed on a display provided in the electronic device in which the application program(s) is installed or on a display connected to the electronic device.

The agricultural work assistance system 100, the agricultural work assistance apparatus 50, and the agricultural machine 1 according to one or more preferred embodiments described above achieve the following effect(s).

An agricultural work assistance system 100 according to one or more preferred embodiments includes a display (display operation interface) 52 to display a map MP1, MP2 representing an agricultural field, a controller 51 configured or programmed to define or function as an area setter 51*b* to set a first area (headland area) E1 and a second area (central area) C1 located inward of the first area E1 on the map MP1, MP2 displayed by the display 52, and a route creator 51*c* to create, in at least one of the first area E1 or the second area C1, a travel route L1, L2 along which an agricultural machine 1 is to travel, wherein the route creator 51*c* may be configured or programmed to set at least a portion (straight route portion L1*a*, L2*a*, straight portion L1*s*, L2*s*, curved portion L2*c*) of the travel route L1, L2 as an automatic steering route on which the agricultural machine 1 is to be steered automatically and a travel speed of the agricultural machine 1 is to be manually changed.

With the above configuration, when the operator of the agricultural machine 1 manually operates the agricultural machine 1 to travel based on the automatic steering route, the agricultural machine 1 is steered automatically. This makes it possible to reduce the burden on the operator and improve the efficiency of agricultural work performed by the agricultural machine 1.

There may be cases in which, due to the influence of the degree of flatness, the degree of roughness, the contour, and/or the like of an agricultural field, it is difficult for the agricultural machine 1 to travel by automatic operation in some areas of the agricultural field. For example, headlands E2*a*, E2*b*, and E2*c*, in which the agricultural machine 1 travels and performs a multi-point turn more frequently than in a work area (central area) C1 located at the center of an agricultural field, are more likely to be rough, and are more likely to have areas where it is difficult for the agricultural machine 1 to travel by automatic operation in relation to, for example, a footpath. However, setting an automatic steering route in such difficult areas and automatically steering the agricultural machine 1 make it possible to reduce the burden on the operator and improve the efficiency of agricultural work performed by the agricultural machine 1 as compared to cases where the agricultural machine 1 is operated manually.

In one or more preferred embodiments, the route creator 51*c* may be configured or programmed to set at least a portion of the travel route L2, L1 created in the first area E1 and the second area C1 to the automatic steering route or an automatic operation route on which the agricultural machine 1 is to be steered automatically and the travel speed of the agricultural machine is to be changed automatically. This makes it possible to set a portion and another portion of the travel route L2, L1 created in the first area E1 and the second area C1 of the agricultural field as an automatic steering route and an automatic operation route. Therefore, it is possible to further reduce the burden on the operator of the agricultural machine 1, improve the efficiency of agricultural work performed by the agricultural machine 1, and improve convenience.

In one or more preferred embodiments, the controller 51 may be configured or programmed to define or function as a route changer 52, 51*c* (display operation interface 52, route creator 51*c*) to change the automatic operation route to the automatic steering route and change the automatic steering route to the automatic operation route. This makes it possible to desirably change the use of at least a portion of the travel route L1, L2 to the automatic steering route or the automatic operation route, making it possible to further improve convenience.

In one or more preferred embodiments, the route changer 52, 51*c* may be configured or programmed to change the automatic operation route or the automatic steering route to a manual operation route on which the agricultural machine 1 is to be manually steered and the travel speed of the agricultural machine 1 is to be manually changed and to change the manual operation route to the automatic operation route or the automatic steering route. This makes it possible to desirably change the use of at least a portion of the travel route L1, L2 to an automatic steering route, an automatic operation route, or a manual operation route, making it possible to further improve convenience.

In one or more preferred embodiments, the display 52 may be operable to display differently the automatic steering route and the automatic operation route on a screen such that the automatic steering route and the automatic operation route are visually recognizable. This makes it easier for the user to recognize the automatic steering route and the automatic operation route and change the use of these routes, making it possible to further improve convenience.

In one or more preferred embodiments, the display 52 may be operable to display, on a screen, at least one portion L2*s*, L1*s*, L1*a*, L2*a*, L3*s*, L2*c* (straight portion L2*s*, L1*s*, L3*s*, straight route portion L1*a*, L2*a*, curved portion L2*c*) of the travel route L2, L1, L3 created in the first area E1 and the second area C1 that is settable as the automatic steering route. This makes it easier for the user to recognize the portion(s) L2*s*, L1*s*, L3*s*, L1*a*, L2*a*, L2*c*, of the travel route L2, L1 that is/are settable as the automatic steering route and change the settings of the route, making it possible to further improve convenience.

In one or more preferred embodiments, the route creator 51*c* may be configured or programmed to, if an angular difference $\Delta\theta$ between a first portion (straight portion) L2*s* of the travel route and a second portion (straight portion) L2*s* of the travel route adjacent to each other in a direction of travel along the travel route L2 is greater than a predetermined threshold (first threshold) Δθs1, set a multi-point turn spot Px between the first portion L2s and the second portion L2s such that a position and a travel direction of the agricultural machine 1 change at the multi-point turn spot Px. The route creator 51c may be configured or programmed to, if the angular difference Δθ is not greater than the threshold Δθs1, connect the first portion L2s and the second portion L2s to obtain a continuous portion of the automatic steering route. With this, the agricultural machine 1, when traveling under manual operation and automatic steering based on the travel route L2 (which is an automatic steering route), does not perform impossible automatic steering at the point between the first portion L2s and the second portion L2s of the travel route L2 that have a large angular difference Δθ, and it is possible to cause the operator to manually perform a multi-point turn of the agricultural machine 1 at the multi-point turn spot Px set between the first portion L2s and the second portion L2s. This makes it possible to ensure safety during travel or ground work by the agricultural machine 1 under automatic steering. Moreover, since the first portion L2s and the second portion L2s of the travel route L2 that have a small angular difference Δθ are set as a continuous portion of the automatic steering route, it is possible to continue automatic steering of the agricultural machine 1 from the first portion L2s to the second portion L2s safely, making it possible to reduce the burden on the operator and improve the efficiency of agricultural work performed by the agricultural machine 1.

In one or more preferred embodiments, the route creator 51c may be configured or programmed to create a travel route L2 including straight portions L2s on which the agricultural machine 1 is to travel straight and which are connected together. The route creator 51c may be configured or programmed to, if an angular difference Δθ between one of the connected straight portions L2s of the travel route L2 that is a portion of the travel route L2 and the other of the connected straight portions L2s of the travel route L2 that is another portion of the travel route L2 is equal to or less than a threshold Δθs1, create a travel route portion (straight portion L2s or curved portion L2c) connecting a first intermediate point Pα1 of the one of the straight portions L2s and a second intermediate point Pα2 of the other of the straight portions L2s, the first intermediate point Pα1 and the second intermediate point Pα2 each being at a predetermined distance dx from a connection point Pα between the one and the other of the straight portions L2s, and delete a portion between the first intermediate point Pα1 of the one of the straight portions L2s and the connection point Pα and another portion between the second intermediate point Pα2 of the other of the straight portions L2s and the connection point Pα. This makes it possible to reduce the angular difference between connected straight portions L2s or between a straight portion L2s and a curved portion L2c of the travel route L2, making it possible to reduce the steering angle of the agricultural machine 1 when performing automatic steering based on the travel route L2 and improve the stability of the agricultural machine 1.

In one or more preferred embodiments, the route creator 51c may be configured or programmed to create, as the travel route portion, a straight portion L2s along which the agricultural machine 1 is to travel straight, between the one of the connected straight portions L2s of the travel route L2 that is a portion of the travel route L2 and the other of the connected straight portions L2s of the travel route L2 that is another portion of the travel route L2, the connected straight portions L2s having an angular difference Δθ equal to or less than the threshold Δθs1 between them. This makes it possible to perform automatic steering of the agricultural machine 1 more stably based on the one of the connected straight portions L2s, the newly created straight portion L2s, and the other of the connected straight portions L2s.

In one or more preferred embodiments, the controller 51 may be configured or programmed to define or function as a threshold changer 52, 51c (display operation interface 52, route creator 51c) to change the threshold Δθs1. This makes it possible, for example, by increasing the threshold Δθs1, to reduce the number of spots Px at which a multi-point turn of the agricultural machine 1 is to be performed by manual operation, making it possible to increase the distance over which automatic steering of the agricultural machine 1 is performed. Moreover, for example, by reducing the threshold Δθs1, it is possible to increase the number of spots Px at which a multi-point turn of the agricultural machine 1 is performed by manual operation to reduce the frequency of automatic steering that involves turning the agricultural machine 1, making it possible to improve the stability of automatic steering. That is, by changing the threshold Δθs1, it is possible to desirably adjust the distance over which and the locations at which the agricultural machine 1 is automatically steered to travel straight and the distance over which and the locations at which the agricultural machine 1 is automatically steered to make a gentle turn to the left or right, making it possible to further improve convenience.

In one or more preferred embodiments, the route creator 51c may be configured or programmed to create a travel route L1, L2 including one or more straight portions L2s, L1s, L1a, L2a on which the agricultural machine 1 is to travel straight and one or more turning portions L2r, L1b, L1r, L2b on which the agricultural machine 1 is to turn. The display 52 may be operable to display a position of the agricultural machine 1 detected by a position detector (positioning device) 40 on the map (agricultural field map) MP2 and display, when the position of the agricultural machine 1 is near the multi-point turn spot Px while the agricultural machine 1 travels based on the travel route L2, a notification U5 suggesting that a multi-point turn be performed to change the position and the travel direction of the agricultural machine 1. This makes it possible, before the agricultural machine 1 that is being steered automatically based on the travel route L2 (which is an automatic steering route) and that is being operated manually or the agricultural machine 1 that is traveling automatically reaches the multi-point turn spot Px, to prompt the operator to perform a multi-point turn of the agricultural machine 1 by manual operation. After the operator performs a multi-point turn of the agricultural machine 1 by manual operation, automatic steering is resumed based on the automatic steering route L2. Therefore, it is possible to reduce the burden on the operator and improve the efficiency of agricultural work performed by the agricultural machine 1.

In one or more preferred embodiments, the controller 51 may be configured or programmed to define or function as an agricultural field register 51a to register a contour H1 of the agricultural field located inward of an outline of the agricultural field represented by the map MP1. The area setter 51b may be configured or programmed to set, as the second area (central area) C1, an area enclosed by another contour C1 obtained by displacing the contour H1 of the agricultural field inward, and sets, as the first area (headland area) E1, an area between the second area C1 and the contour H1 of the agricultural field. The route creator 51c may be configured or programmed to create, in the first area E1, the travel route L1c, L2 which surrounds the second area C1 based on a working width W1 over which a working device 2 coupled to the agricultural machine 1 performs ground work or based on an outside width W6 of the working device 2. This makes it possible to set the contour H1 of the agricultural field at a location inward of the outline of the agricultural field, set the first area E1 at a location inward of the contour H1, and set the second area C1 at a location inward of the first area E1. It is also possible to create the travel route L1, L2, L1c for the agricultural machine 1 in the second area C1 and the first area E1 without allowing the travel route L1, L2, L1c to extend beyond the outline of the agricultural field.

In one or more preferred embodiments, the area setter 51b may be configured or programmed to, after obtaining a first contour E3 by displacing the contour H1 of the agricultural field inward once by a first displacement amount (W1−W2+W5=W4+W5, W1+W5, W4+W7=W4+(W6−W1)/2) calculated based on the working width W1 of the working device 2, the outside width W6 of the working device 2 greater than the working width W1 thereof, a predetermined overlap W2, and/or a predetermined shift amount W5, define one or more second contours E31, E32 by displacing the first contour E3 inward once or more each by a second displacement amount (W4=W1−W2) calculated based on the working width W1 or based on the working width W1 and the overlap W2, the second displacement amount being smaller than the first displacement amount, and set an area enclosed by the innermost one E32 of the one or more second contours as the second area C1. The route creator 51c may be configured or programmed to create, in the first area E1, the travel route L2, L1c between the contour H1 of the agricultural field and the first contour E3, between the first contour E3 and one E31 of the one or more second contours that is closest to the first contour E3, and between the one or more second contours E31, E32.

With the above configuration, when ground work is performed by the working device 2 on the agricultural machine 1 during automatic steering of the traveling vehicle body 3 based on the travel route L2 in the headland area E1, it is possible to reduce the likelihood that the working device 2 will go beyond the contour H1 of the agricultural field and collide with a footpath or the like. It is also possible, by setting the distance (shift amount) W5 by which the contour H1 of the agricultural field is displaced inward to a value greater than zero using an agricultural field shift amount change key B25, by creating the outermost headland E2c and creating the travel route L2 in the headland E2c in consideration of the outside width W6 greater than the working width W1 of the working device 2, to further reduce the likelihood that the working device 2 will go beyond the contour H1 of the agricultural field and collide with a footpath or the like. Furthermore, since the inner headland(s) E2b, E2a is set based on the width W4 that is less than the width of the outermost headland E2c in in the first area E1, it is possible to obtain a large central area C1 where the automatic traveling work route portion is set.

In one or more preferred embodiments, the route creator 51c may be configured or programmed to create, in the first area E1, the travel route L2, L1c that includes a plurality of loops which surround the second area C1 and which have different diameters, set a gap between an outermost loop of the travel route L2, L1c and the contour H1 of the agricultural field based on the working width W1 of the working device 2, the outside width W6 of the working device 2 greater than the working width W1 thereof, a predetermined overlap W2, and/or a predetermined shift amount W5, and set, based on the working width W1 or based on the working width W1 and the overlap W2, another gap between the outermost loop and a second outermost loop, and one or more further gaps between inner loops such that the another gap and the one or more further gaps are smaller than the gap between the outermost loop and the contour H1 of the agricultural field.

With the above configuration, the gap between the outermost loop L2 (portion of the travel route L2 created in the headland E2c) of the travel route L2, L1c created in the first area E1 and the contour H1 of the agricultural field is wide, making it possible to prevent or reduce the likelihood that, when the agricultural machine 1 is steered automatically based on the outermost loop L2 while the working device 2 performs ground work, the working device 2 will go beyond the contour H1 of the agricultural field and collide with a footpath or the like. Moreover, the gap between the outermost loop L2 of the travel route L2, L1c created in the first area E1 and its nearest inner loop L2 and the gap between the inner loops L2, L1c are narrow, making it possible to obtain a large central area C1. Moreover, since the route creator 51c creates travel route portions L2 and L1c which surround the second area C1 and which have different diameters such that the gap between the outermost portion L2 and its nearest portion L2 is smaller than the gap between inner route portions L2 and L1c, it is possible, when ground work is performed by the working device 2 while automatic steering of the agricultural machine 1 is performed based on the outermost portion L2, to further reduce the likelihood that the working device 2 will go beyond the contour H1 of the agricultural field and collide with a footpath or the like.

In one or more preferred embodiments, the agricultural work assistance system 100 may further include a position detector (positioning device) 40 configured or programmed to detect a position of the agricultural machine 1, and an automatic controller 61 configured or programmed to perform automatic steering in which the agricultural machine 1 is steered automatically based on the position of the agricultural machine 1 and the automatic steering route, and cause a working device 2 coupled to the agricultural machine 1 to perform agricultural work on the agricultural field. This makes it possible to cause the working device 2 to perform agricultural work on the agricultural field while automatically steering the agricultural machine 1 that is being manually operated to travel, based on the position of the agricultural machine 1 and the automatic steering route, thus possible to reduce the burden on the operator and improve the efficiency of agricultural work performed by the agricultural machine 1.

In one or more preferred embodiments, the route creator 51c may be configured or programmed to set the automatic steering route at a portion of the travel route L1, L2 created in the first area E1 and the second area C1 and sets an automatic operation route at another portion of the travel route L1, L2, the automatic operation route being a route on which the agricultural machine 1 is to be steered automatically and the travel speed of the agricultural machine 1 is to be changed automatically. The automatic controller 61 may be configured or programmed to perform an automatic operation in which the agricultural machine 1 is steered automatically and the travel speed of the agricultural machine 1 is changed automatically based on the position of the agricultural machine 1 and the automatic operation route, and switch between the automatic steering and the automatic operation of the agricultural machine 1 automatically as one of the automatic steering route and the automatic operation route that are connected to each other changes to the other while the agricultural machine 1 travels along the travel route L2, L1. This makes it unnecessary for the operator of the agricultural machine 1 to manually switch between the automatic operation and the automatic steering of the agricultural machine 1 and thus possible to further reduce the burden on the operator and improve the efficiency of agricultural work performed by the agricultural machine 1.

In one or more preferred embodiments, the automatic controller 61 may be configured or programmed to perform the automatic steering of the agricultural machine 1 when the agricultural machine 1 travels rearward along the automatic steering route as a multi-point turn to change the position and a travel direction of the agricultural machine 1 is performed manually. This makes it possible to reduce the burden on the operator and reduce the time taken for the multi-point turn to be performed when the agricultural machine 1 is manually operated to perform the multi-point turn.

In one or more preferred embodiments, the automatic controller 61 may be configured or programmed to, based on the automatic steering route L2, perform the automatic steering of the agricultural machine 1 and cause the working device 2 to start agricultural work on the agricultural field if the travel route based on which the agricultural work is started on the agricultural field by the agricultural machine 1 and the working device 2 is the automatic steering route L2. This makes it possible, when agricultural work is started in the agricultural field by the agricultural machine 1 and the working device 2, to perform the automatic steering work mode without going through the automatic operation work mode to cause the working device 2 to start the agricultural work on the agricultural field while automatically steering the agricultural machine 1. This also makes it unnecessary for the user (the operator of the agricultural machine 1) to perform a troublesome operation to perform the automatic operation work mode, making it possible to improve convenience. It follows that it is possible to reduce the burden on the user and improve the efficiency of the agricultural work.

In one or more preferred embodiments, the agricultural work assistance system 100 may further include a first selector S1 (a first portion of a display operation interface 52) to select whether or not to perform agricultural work by the automatic steering. The automatic controller 61 may be configured or programmed to, based on the position of the agricultural machine 1 and the travel route, perform the automatic steering of the agricultural machine 1 and cause the working device 2 to start agricultural work on the agricultural field if performing agricultural work by the automatic steering is selected via the first selector S1. This makes it possible, when agricultural work is started in the agricultural field by the agricultural machine 1 and the working device 2, to perform the automatic steering work mode without going through the automatic operation work mode and cause the working device 2 to start the agricultural work on the agricultural field while automatically steering the agricultural machine 1.

In one or more preferred embodiments, the agricultural work assistance system 100 may further include a second selector B43, B50 (a second portion B43, B50 of the display operation interface 52) (automatic headland work key B43, automatic center work key B50) to select whether or not to perform agricultural work by automatic operation. The automatic controller 61 may be configured or programmed to, based on the position of the agricultural machine 1 and the travel route, perform the automatic operation of the agricultural machine 1 and cause the working device 2 to start agricultural work on the agricultural field if performing agricultural work by the automatic operation is selected via the second selector B43, B50. The automatic steering is selectable via the first selector S1 if not performing agricultural work by the automatic operation is selected via the second selector B43, B50. This makes it possible, when agricultural work is started in the agricultural field by the agricultural machine 1 and the working device 2, to perform the automatic operation work mode to cause the working device 2 to start the agricultural work on the agricultural field while automatically operating the agricultural machine 1. This also makes it possible for the user to select not to perform the automatic operation work mode and then select whether or not to perform the automatic steering work mode instead.

In one or more preferred embodiments, the agricultural work assistance system 100 further includes a third selector S3 (a third portion S3 of a display operation interface 52) to select, when agricultural work on the agricultural field by the agricultural machine 1 and the working device 2 is to be resumed after a pause, whether to resume the agricultural work by the automatic steering or to resume the agricultural work by automatic operation in which the agricultural machine 1 is steered automatically and the travel speed of the agricultural machine 1 is changed automatically. The automatic controller 61 may be configured or programmed to, based on the position of the agricultural machine 1 and the travel route, perform the automatic steering of the agricultural machine 1 and cause the working device 2 to resume the agricultural work on the agricultural field if resuming the agricultural work by the automatic steering is selected via the third selector S3. The automatic controller 61 may be configured or programmed to, based on the position of the agricultural machine 1 and the travel route, perform the automatic operation of the agricultural machine 1 and cause the working device 2 to resume the agricultural work on the agricultural field if resuming the agricultural work by the automatic operation is selected via the third selector S3. This makes it possible, when agricultural work on the agricultural field by the agricultural machine 1 and the working device 2 is to be resumed after a pause, upon the user selecting to resume the agricultural work by the automatic steering via the third selector S3, to perform the automatic steering work mode without going through the automatic operation work mode to cause the working device 2 to start the agricultural work on the agricultural field while automatically steering the agricultural machine 1. This also makes it possible, upon the user selecting to resume the agricultural work by the automatic operation via the third selector S3, to perform the automatic operation work mode to cause the working device 2 to start the agricultural work on the agricultural field while automatically operating the agricultural machine 1.

In one or more preferred embodiments, the agricultural work assistance system 100 may include a distance calculator 51$h$ configured or programmed to, when the automatic controller 61 performs the automatic steering based on the position of the agricultural machine 1 and the automatic steering route set in the first area E1 and the agricultural machine 1 travels in the first area E1, calculate a distance from the position of the agricultural machine 1 detected by the position detector (positioning device) 40 to a structure which lies ahead of the agricultural machine 1 in a direction of travel and which defines the contour H1 of the agricultural field, and a warner 51$i$ to issue a warning if the distance da to the structure calculated by the distance calculator 51$h$ is equal to or less than a predetermined distance ds, wherein the warner 51*i* may be operable to increase an intensity of the warning as the distance da to the structure decreases. With this, the warner 51*i* issues a warning when the agricultural machine 1 approaches a structure such as a footpath which defines the contour H1 of the agricultural field while the agricultural machine 1 is traveling by automatic steering along the travel route L2 created in the first area E1 of the agricultural field, making it possible to allow the operator (user) of the agricultural machine 1 to perform operation to prevent or reduce the likelihood that the agricultural machine 1 will contact the structure or move out of the agricultural field (travel beyond the structure).

An agricultural work assistance apparatus 50 according to one or more preferred embodiments is an agricultural work assistance apparatus included in an agricultural work assistance system 100, the agricultural work assistance apparatus 50 including a controller 51 configured or programmed to cause a display (display operation interface) 52 to display a map MP2 representing an agricultural field, and configured or programmed to define or function as an area setter 51*b* to set a first area E1 and a second area C1 located inward of the first area E1 on the map MP2 displayed by the display 52, and a route creator 51*c* to create, in the first area E1 and the second area C1, a travel route L1, L2 along which an agricultural machine 1 is to travel, wherein the route creator 51*c* is configured or programmed to set at least a portion (straight route portion L1*a*, L2*a*, straight portion L1*s*, L2*s*, curved portion L2*c*) of the travel route L1, L2 as an automatic steering route on which the agricultural machine 1 is to be steered automatically and a travel speed of the agricultural machine 1 is to be changed manually. With this configuration, when the operator of the agricultural machine 1 causes the agricultural machine 1 to travel by manual operation based on the automatic steering route, the agricultural machine 1 is automatically steered, making it possible to reduce the burden on the operator and improve the efficiency of agricultural work performed by the agricultural machine 1.

In one or more preferred embodiments, the route creator 51*c* may be configured or programmed to set at least a portion of the travel route L1, L2 to the automatic steering route or an automatic operation route on which the agricultural machine 1 is to be steered automatically and the travel speed of the agricultural machine 1 is to be changed automatically. The controller 51 may be configured or programmed to define or function as a route changer 52, 51*c* to change the automatic operation route to the automatic steering route and change the automatic steering route to the automatic operation route and is mountable on the agricultural machine 1. This makes it possible to desirably change the use of at least a portion of the travel route L1, L2, L3 to the automatic steering route or the automatic operation route, reduce the burden on the operator, improve the efficiency of agricultural work performed by the agricultural machine 1, and improve convenience.

An agricultural machine 1 according to one or more preferred embodiments is an agricultural machine to perform agricultural work assisted by an agricultural work assistance system 100, the agricultural machine 1 including a traveling vehicle body 3, a coupling portion 8*g*, 8*h* to couple a working device 2 to the traveling vehicle body 3, a position detector (positioning device) 40 configured or programmed to detect a position of the traveling vehicle body 3, a display (display operation interface) 52 to display a map MP2 representing an agricultural field, and a controller configured or programmed to define or function as an area setter 51*b* to set a first area E1 and a second area C1 located inward of the first area E1 on the map MP2 displayed by the display 52, a route creator 51*c* to create, in the first area E1 and the second area C1, a travel route L2, L1 along which the traveling vehicle body 3 is to travel, and an automatic controller 61 configured or programmed to cause the working device 2 to perform the agricultural work on the agricultural field, wherein the route creator 51*c* is configured or programmed to set at least a portion (straight route portion L1*a*, L2*a*, straight portion L1*s*, L2*s*, curved portion L2*c*) of the travel route L1, L2 as an automatic steering route, and the automatic controller 61 is configured or programmed to automatically steer the traveling vehicle body 3 based on the position of the traveling vehicle body 3 and the automatic steering route. With this configuration, when the operator of the agricultural machine 1 causes the agricultural machine 1 to travel by manual operation based on the automatic steering route, the automatic controller 61 automatically steers the agricultural machine 1, making it possible to reduce the burden on the operator and improve the efficiency of agricultural work performed by the agricultural machine 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural work assistance system comprising:
   a display to display a map representing an agricultural field;
   a controller configured or programmed to define or function as:
      an area setter to set a first area and a second area located inward of the first area on the map displayed by the display; and
      a route creator to create, in the first area and the second area, a travel route or a series of travel routes along which an agricultural machine is automatically controlled to travel; wherein
   the route creator is configured or programmed to:
      set at least a portion of the travel route or of the series of travel routes created in the first area and the second area as an automatic steering route on which the agricultural machine is to be steered automatically and a travel speed of the agricultural machine is to be manually changed; and
      set at least another portion of the travel route or of the series of travel routes created in the first area and the second area as an automatic operation route on which the agricultural machine is to be steered automatically and the travel speed of the agricultural machine is to be changed automatically, the at least another portion being at least a portion of the travel route or of the series of travel routes other than the at least the portion set as the automatic steering route.

2. The agricultural work assistance system according to claim 1, wherein the controller is configured or programmed to define or function as a route changer to change the automatic operation route to the automatic steering route and change the automatic steering route to the automatic operation route.

3. The agricultural work assistance system according to claim 2, wherein the route changer is configured or programmed to change the automatic operation route or the automatic steering route to a manual operation route on which the agricultural machine is to be manually steered and the travel speed of the agricultural machine is to be manually changed and to change the manual operation route to the automatic operation route or the automatic steering route.

4. The agricultural work assistance system according to claim 1, wherein the display is operable to display differently the automatic steering route and the automatic operation route on a screen such that the automatic steering route and the automatic operation route are visually recognizable.

5. The agricultural work assistance system according to claim 1, wherein the display is operable to display, on a screen, at least one portion of the travel route created in the first area and the second area that is settable as the automatic steering route.

6. The agricultural work assistance system according to claim 1, wherein
the route creator is configured or programmed to, if an angular difference between a first portion of the travel route or of the series of travel routes and a second portion of the travel route or of the series of travel routes adjacent to each other in a direction of travel along the travel route or the series of travel routes is greater than a predetermined threshold, set a multi-point turn spot between the first portion and the second portion such that a position and a travel direction of the agricultural machine change at the multi-point turn spot; and
the route creator is configured or programmed to, if the angular difference is not greater than the threshold, connect the first portion and the second portion to obtain a continuous portion of the automatic steering route.

7. The agricultural work assistance system according to claim 6, wherein the route creator is configured or programmed to, if the angular difference is not greater than the threshold, create a travel route portion connecting a first intermediate point of the first portion and a second intermediate point of the second portion, the first intermediate point and the second intermediate point each being at a predetermined distance from a connection point between the first portion and the second portion, and delete a portion between the first intermediate point of the first portion and the connection point and another portion between the second intermediate point of the second portion and the connection point.

8. The agricultural work assistance system according to claim 7, wherein the route creator is configured or programmed to create, as the travel route portion, a straight portion along which the agricultural machine is to travel straight.

9. The agricultural work assistance system according to claim 6, wherein the controller is configured or programmed to define or function as a threshold changer to change the threshold.

10. The agricultural work assistance system according to claim 6, wherein the display is operable to display a position of the agricultural machine detected by a position detector on the map and display, when the position of the agricultural machine is near the multi-point turn spot while the agricultural machine travels based on the travel route or the series of travel routes, a notification suggesting that a multi-point turn be performed to change the position and the travel direction of the agricultural machine.

11. The agricultural work assistance system according to claim 1, wherein
the controller is configured or programmed to define or function as an agricultural field register to register a contour of the agricultural field located inward of an outline of the agricultural field represented by the map;
the area setter is configured or programmed to set, as the second area, an area enclosed by another contour obtained by displacing the contour of the agricultural field inward, and set, as the first area, an area between the second area and the contour of the agricultural field; and
the route creator is configured or programmed to create, in the first area, a go-around travel route of the travel route or of the series of travel routes which surrounds the second area based on a working width over which a working device coupled to the agricultural machine performs ground work or based on an outside width of the working device.

12. The agricultural work assistance system according to claim 11, wherein
the area setter is configured or programmed to, after obtaining a first contour by displacing the contour of the agricultural field inward once by a first displacement amount calculated based on the working width of the working device, the outside width of the working device greater than the working width thereof, a predetermined overlap, and/or a predetermined shift amount, define one or more second contours by displacing the first contour inward once or more each by a second displacement amount calculated based on the working width or based on the working width and the overlap, the second displacement amount being smaller than the first displacement amount, and set an area enclosed by the innermost one of the one or more second contours as the second area; and
the route creator is configured or programmed to create, in the first area, the go-around travel route between the contour of the agricultural field and the first contour, between the first contour and one of the one or more second contours that is closest to the first contour, and between the one or more second contours.

13. The agricultural work assistance system according to claim 11, wherein
the route creator is configured or programmed to:
create, in the first area, the go-around travel route that includes a plurality of loops which surround the second area and which have different diameters;
set a gap between an outermost loop of the go-around travel route and the contour of the agricultural field based on the working width of the working device, the outside width of the working device greater than the working width thereof, a predetermined overlap, and/or a predetermined shift amount; and
set, based on the working width or based on the working width and the overlap, another gap between the outermost loop and a second outermost loop, and one or more further gaps between inner loops such that the another gap and the one or more further gaps are smaller than the gap between the outermost loop and the contour of the agricultural field.

14. The agricultural work assistance system according to claim 1, further comprising:
a position detector configured or programmed to detect a position of the agricultural machine; and
an automatic controller configured or programmed to perform:
automatic steering in which the agricultural machine is steered automatically based on the position of the agricultural machine and the automatic steering route, and cause a working device coupled to the agricultural machine to perform agricultural work on the agricultural field; and automatic operation in which the agricultural machine is steered automatically and the travel speed of the agricultural machine is changed automatically based on the position of the agricultural machine and the automatic operation route.

15. The agricultural work assistance system according to claim 14, wherein
the automatic controller is configured or programmed to switch between the automatic steering and the automatic operation of the agricultural machine automatically as one of the automatic steering route and the automatic operation route that are connected to each other changes to the other while the agricultural machine travels along the travel route.

16. The agricultural work assistance system according to claim 14, wherein the automatic controller is configured or programmed to perform the automatic steering of the agricultural machine when the agricultural machine travels rearward along the automatic steering route as a multi-point turn to change the position and a travel direction of the agricultural machine is performed manually.

17. The agricultural work assistance system according to claim 14, wherein the automatic controller is configured or programmed to, based on the automatic steering route, perform the automatic steering of the agricultural machine and cause the working device to start agricultural work on the agricultural field if, in the travel route or the series of travel routes, a travel route based on which the agricultural work is started on the agricultural field by the agricultural machine and the working device is the automatic steering route.

18. The agricultural work assistance system according to claim 14, further comprising:
a first portion of a display operation interface to select whether or not to perform agricultural work by the automatic steering; wherein
the automatic controller is configured or programmed to, based on the position of the agricultural machine and the travel route or the series of travel routes, perform the automatic steering of the agricultural machine and cause the working device to start agricultural work on the agricultural field if performing agricultural work by the automatic steering is selected via the first portion of the display operation interface.

19. The agricultural work assistance system according to claim 18, further comprising:
a second portion of the display operation interface to select whether or not to perform agricultural work by automatic operation; wherein
the automatic controller is configured or programmed to, based on the position of the agricultural machine and the travel route or the series of travel routes, perform the automatic operation of the agricultural machine and cause the working device to start agricultural work on the agricultural field if performing agricultural work by the automatic operation is selected via the second portion of the display operation interface; and
the automatic steering is selectable via the first portion of the display operation interface if not performing agricultural work by the automatic operation is selected via the second portion of the display operation interface.

20. The agricultural work assistance system according to claim 14, further comprising:
a third portion of a display operation interface to select, when agricultural work on the agricultural field by the agricultural machine and the working device is to be resumed after a pause, whether to resume the agricultural work by the automatic steering or to resume the agricultural work by the automatic operation; wherein
the automatic controller is configured or programmed to, based on the position of the agricultural machine and the travel route or the series of travel routes, perform the automatic steering of the agricultural machine and cause the working device to resume the agricultural work on the agricultural field if resuming the agricultural work by the automatic steering is selected via the third portion of the display operation interface; and
the automatic controller is configured or programmed to, based on the position of the agricultural machine and the travel route or the series of travel routes, perform the automatic operation of the agricultural machine and cause the working device to resume the agricultural work on the agricultural field if resuming the agricultural work by the automatic operation is selected via the third portion of the display operation interface.

21. An agricultural work assistance apparatus comprising:
a controller configured or programmed to cause a display to display a map representing an agricultural field, and to define or function as:
an area setter to set a first area and a second area located inward of the first area on the map displayed by the display; and
a route creator to create, in the first area and the second area, a travel route or a series of travel routes along which an agricultural machine is automatically controlled to travel; wherein
the route creator is configured or programmed to:
set at least a portion of the travel route or of the series of travel routes created in the first area and the second area as an automatic steering route on which the agricultural machine is to be steered automatically and a travel speed of the agricultural machine is to be changed manually; and
set at least another portion of the travel route or of the series of travel routes created in the first area and the second area as an automatic operation route on which the agricultural machine is to be steered automatically and the travel speed of the agricultural machine is to be changed automatically, the at least another portion being at least a portion of the travel route or of the series of travel routes other than the at least the portion set as the automatic steering route.

22. The agricultural work assistance apparatus according to claim 21, wherein
the controller is configured or programmed to define or function as a route changer to change the automatic operation route to the automatic steering route and change the automatic steering route to the automatic operation route and is mountable on the agricultural machine.

23. An agricultural machine to perform agricultural work assisted by an agricultural work assistance system, the agricultural machine comprising:
a traveling vehicle body;
a coupling portion to couple a working device to the traveling vehicle body;
a position detector configured or programmed to detect a position of the traveling vehicle body;

a display to display a map representing an agricultural field;

a controller configured or programmed to define or function as an area setter to set a first area and a second area located inward of the first area on the map displayed by the display, and a route creator to create, in the first area and the second area, a travel route or a series of travel routes along which the traveling vehicle body is automatically controlled to travel; and an automatic controller configured or programmed to cause the working device to perform the agricultural work on the agricultural field; wherein the route creator is configured or programmed to:
  set at least a portion of the travel route or of the series of travel routes created in the first area and the second area as an automatic steering route, and
  set at least another portion of the travel route or of the series of travel routes created in the first area and the second area as an automatic operation route, the at least another portion being at least a portion of the travel route or of the series of travel routes other than the at least the portion set as the automatic steering route; and the automatic controller is configured or programmed to:
  automatically steer the traveling vehicle body based on the position of the traveling vehicle body and the automatic steering route, and
  automatically steer the traveling body and automatically change a travel speed of the traveling body based on the position of the traveling body and the automatic operation route.

* * * * *